United States Patent [19]

Breedlove et al.

[11] Patent Number: 4,516,260

[45] Date of Patent: May 7, 1985

[54] ELECTRONIC LEARNING AID OR GAME HAVING SYNTHESIZED SPEECH

[75] Inventors: Paul S. Breedlove, Plano; James H. Moore, Lubbock, both of Tex.

[73] Assignee: Texas Instruments Incorporated, Dallas, Tex.

[21] Appl. No.: 182,382

[22] Filed: Aug. 29, 1980

Related U.S. Application Data

[63] Continuation of Ser. No. 901,391, Apr. 28, 1978, abandoned.

[51] Int. Cl.³ .................... G10L 1/00

[52] U.S. Cl. .................... 381/51; 434/169

[58] Field of Search .................... 179/1 SM, 1 SG; 434/201, 167; 340/152 R; 273/237; 364/710

[56] References Cited

U.S. PATENT DOCUMENTS

| | | | |
|---|---|---|---|
| 3,371,321 | 2/1968 | Adams | 35/35 C |
| 3,584,398 | 6/1971 | Meyer et al. | 434/201 |
| 3,596,009 | 11/1968 | Clifford et al. | 35/35 C |
| 3,704,345 | 11/1972 | Coker et al. | 179/1 SM |
| 3,892,919 | 7/1975 | Ichikawa | 179/1 SM |
| 3,999,307 | 12/1976 | Tsuda et al. | 35/9 A |
| 4,016,540 | 4/1977 | Hyatt | 179/1 SM |
| 4,022,974 | 5/1977 | Kohut et al. | 179/1.5 M |
| 4,059,272 | 11/1977 | Pullman | 273/237 |
| 4,060,848 | 11/1977 | Hyatt | 364/200 |
| 4,117,607 | 10/1978 | Gill | 434/201 |
| 4,179,584 | 12/1979 | Tanimoto et al. | 179/1 SM |
| 4,215,240 | 7/1980 | Ostrowski | 179/1 SM |

OTHER PUBLICATIONS

Mozer, "Talking Board", Computer Design, Jul. 1976 pp. 46, 48.

ISI, "Speech Talking Calculator", Manual, Telesensory Systems, Inc., 1976.

Koike et al., "Parcor", Nippon Review of the Elec. Comm. Labs., May-Jun., 1975, pp. 490-501.

*Primary Examiner*—E. S. Matt Kemeny

*Attorney, Agent, or Firm*—William E. Hiller; James T. Comfort; Melvin Sharp

[57] ABSTRACT

An electronic talking learning aid is disclosed. The learning aid includes a speech synthesis circuit which, in the embodiment disclosed, includes a digital lattice filter circuit, a voiced/unvoiced speech excitation circuit, a speech parameter interpolator, an input parameter decoder, a digital-to-analog converter circuit and associated timing circuits. The learing aid is also provided with a controller and at least one memory for storing digitized speech parameters as well as other digital data. This other digital data may represent, for instance, correct answers to questions posed by the talking learning aid. A keyboard or other response insertion device is provided to permit an operator to input his or her answers to the questions posed by the learning aid. In the disclosed embodiment, the talking learning aid asks the operator to input the correct spelling of a spoken word and informs the operator whether or not the response was correct.

77 Claims, 54 Drawing Figures

ELECTRONIC LEARNING AID OR GAME HAVING SYNTHESIZED SPEECH

This is a continuation of application Ser. No. 901,391, filed Apr. 28, 1978, abandoned.

BACKGROUND OF THE INVENTION

This invention relates to electronic learning aids, teaching machines and electronic games. More particularly, this invention relates to electronic learning aids, teaching machines or games having means for producing synthesized speech.

In the prior art various electronic teaching devices and games are known. For example, a small electronic learning aid for teaching arithmetic to children using randomly selected problems is disclosed in U.S. Pat. No. 3,584,398. Further, teaching machines are known which rely on traditional movie film or video tape techniques for presenting both audio and visual information to a student and include means for posing questions to the student and receiving and correcting answers from the student. A proposal for such an automatic teaching device is found in the Paul K. Weimer article in "IRE Transactions on Education" of June 1958. It should be evident, however, that a teaching machine employing movie projectors or video tape machines is bulky, heavy and fairly expensive to manufacture. Furthermore, it is desirable to at least partially randomize the questions posed by the learning aid; this function is, of course, difficult to implement using conventional, audio or video tape machines or movie projectors.

The prior art also suggests various techniques for synthesizing human speech from digital data. For instance, some of the techniques used are briefly described in "Voice Signals: Bit by Bit" at pages 28–34 of the October 1973 issue of IEEE Spectrum. An important technique for synthesizing human speech, and the technique used by the speech synthesizer chip described herein, is called linear predictive coding. For a detailed discuission of this technique, see "Speech Analysis and Synthesis by Linear Prediction of the Speech Wave" by B. S. Atal and Suzanne L. Hanauer which appears at pp. 637–50 of Volume 50, No. 2 (part 2) (1971) of The Journal of the Acoustical Society of America.

Subsequent to the conception of this invention, a single MOS integrated circuit implementing a lattice filter used in linear predictive coding of speech was described in U.S. patent application Ser. No. 807,461, filed June 17, 1977, abandoned in favor of continuation application Ser. No. 905,328 filed May 12, 1978, now U.S. Pat. No. 4,209,844 issued June 24, 1980. The speech synthesis chip described herein makes use of the lattice filter described in the aforementioned U.S. Pat. No. 4,209,844.

It is one object of this invention that the learning aid or game be equipped to audibly ask questions of the user thereof.

It is another object of this invention that the teaching machine receive an answer to a posed question from the operator and to inform the operator whether or not the inputted answer is correct.

It is still yet another object of this invention that the questions posed be randomly selectable.

The foregoing objects are achieved as is now described. The questions to be posed by the machine are stored as digital codes in a memory device. This memory is preferably of the non-volatile type so that the questions posed are not erased when power is disconnected from the apparatus. A speech synthesizer circuit is connected to the output of the memory for selectively converting the digital signals stored wherein to speech signals from which audible speech is generated. As aforementioned, several types of speech synthesis circuits are known. In the disclosed embodiment, the speech synthesizer is implemented using linear predictive coding and integrated on a single semiconductor chip. A speaker or earphone and an amplifier (if needed) are provided to convert the output from the speech synthesizer to audible sounds. A keyboard and display, both of which preferably are capable of accommodating alphanumeric characters, are preferably provided. The display and keyboard are preferably coupled to the speech synthesis circuit and memory via a controller circuit. In the embodiment disclosed, the controller circuit is an appropriately programmed microprocessor device. The controller circuit controls the memory to read out the digital signals corresponding to a question to be posed, the question preferably being randomly selected from a plurality of questions stored therein. The question posed is converted to audible signals by means of the synthesizer circuit in combination with the speaker or earphone. The memory also preferably stores data indicative of the correct answer to the question posed, which data is supplied to the controller circuit. When the operator answers the questions posed by inputting his or her answer at the keyboard, the controller compares the inputted answer with the answer stored in the memory and the operator is informed of the results of this comparison. The operator may be so informed either visually via the display or audibly via the speech synthesis circuit and speaker or earphone, to inform the operator "very good", for example, if the operator gave the correct answer or "no, try again", for example, if the operator gave an incorrect answer. The question posed may, of course, be either a rather complex, lengthy question or alternatively, as in the case of the disclosed embodiment, may be as simple as speaking a word and awaiting a correct spelling thereof. Of course, the shorter the questions posed the greater the number of questions storable in a memory of given capacity. The learning aid is preferably arranged to have several levels of difficulty. Thus the easiest level might have such words as "dog", "cat", "time", and the like while the next level might have words such as "mother", "flower", and the like and so forth. Of course, the particular words selected for any given library are a design choice. The controller circuit preferably controls from which difficulty level the posed question is to be randomly selected. The particular difficulty level used is selected based on instructions inputted at the keyboard or by other means. After the operator gives a correct answer, e.g. the correct spelling of the word "spoken" then the learning aid goes on to preferably select another random word. When an incorrect answer is given, the controller circuit preferably causes the word to be posed again after the operator is informed that the answer is incorrect and if the operator continues to give an incorrect answer, the controller circuit provides via the display or the speech synthesis circuit the correct answer and then goes on to randomly select another word or question to be posed.

In the embodiment disclosed, the learning aid is preferably equipped with other modes of operation which are described in detail.

BRIEF DESCRIPTION OF THE DRAWINGS

The novel features believed characteristic of the invention are set forth in the appended claims. The invention itself, however, as well as a preferred mode of use, further objects and advantages thereof, will be best understood by reference to the following detailed description of an illustrative embodiment when read in conjunction with the accompanying drawings, wherein:

GENERAL DESCRIPTION

Figure 1:
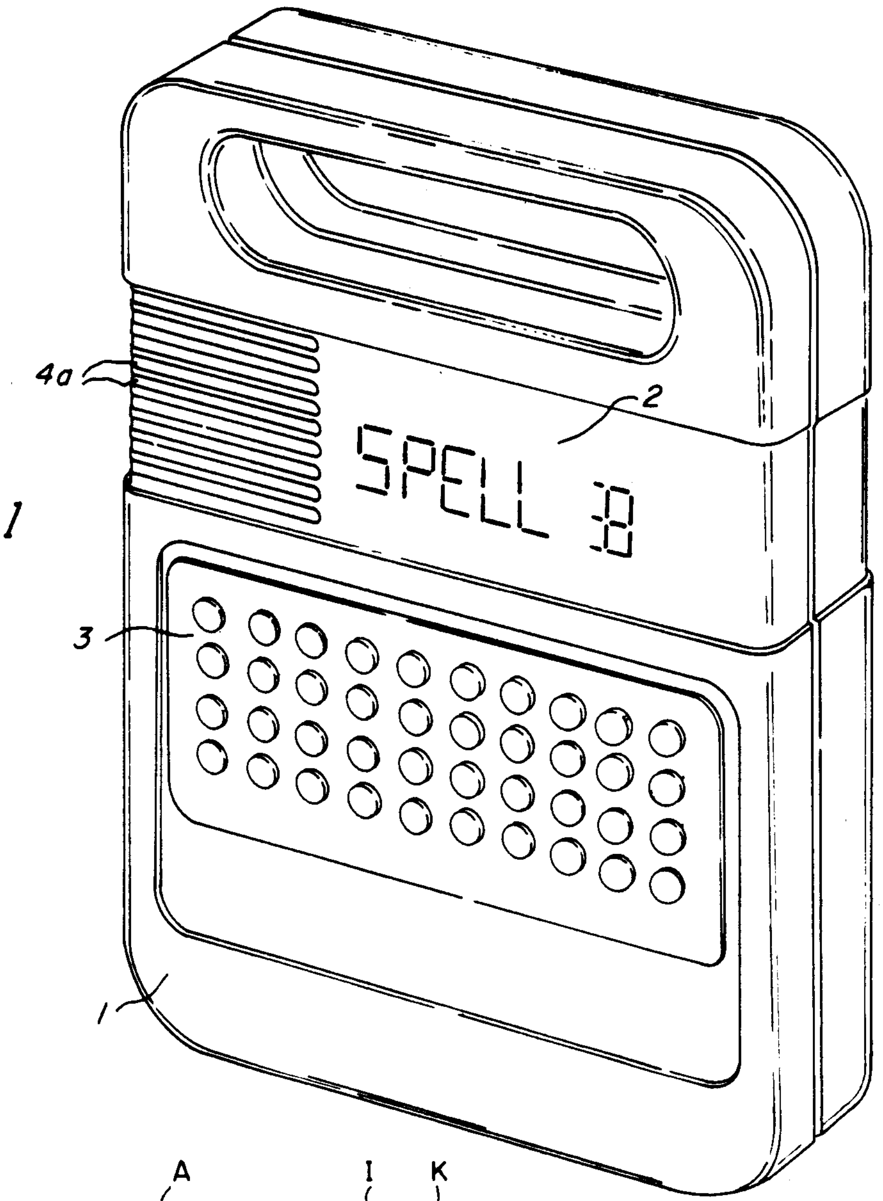
FIG. 1 is a front view of a talking learning aid.

FIG. 1 is a front view of a talking learning aid of the type which may embody the present invention. The learning aid includes a case 1 which encloses electronic circuits preferably implemented on integrated circuits (not shown in this figure). These circuits are coupled to a display 2, a keyboard 3 and a speaker 4 or other voice coil means (also not shown in FIG. 1). However, the openings 4*a* are shown behind which speaker 4 is preferably mounted. The display is preferably of the vacuum fluorescent type in the embodiment to be described; however, it will be appreciated by those skilled in the art that other display means, such as arrays of light emitting diodes, liquid crystal devices, electrochromic devices, gas discharge devices or other display means alternatively may be used if desired. Also, in this embodiment, as a matter of design choice, the display has eight character positions. The keyboard 3 of the learning aid of this embodiment has forty key switch positions, twenty-six of which are used to input the letters of the alphabet into the learning aid. Of the remaining fourteen key switch positions, five are utilized for mode keys (on/spelling mode, learn mode, word guesser game mode, code breaker mode and random letter mode), another five are used to control functions performed by the learning aid in its modes (enter, say again, replay, erase and go) and the remaining four are used for an apostrophe key, a blank space key, a word list select key and an off key. The words spoken by the learning aid, as well as the correct spelling of those words, are stored as digital information in one or more Read-Only-Memories.

The learning aid depicted in FIG. 1 may be battery powered or powered from a source of external electrical power, as desired. The case is preferably made from injection molded plastic and the keyboard switches may be provided by two 5 by 8 arrays of key switches of the type disclosed in U.S. Pat. No. 4,005,293, if desired. Of course, other types of case materials or switches alternatively may be used.

Having described the outward appearance of the learning aid, the modes in which the learning aid may operate will be first described followed by a description of the block diagrams and detailed logic diagrams of the various electronic circuits used to implement the learning aid of FIG. 1.

MODES OF OPERATION

The learning aid of this embodiment have five modes of operation which will be subsequently described. It will be evident to those skilled in the art, however, that these modes of operation may be modified, reduced in number or expanded in capability. As a matter of design choice, the present talking and learning aid is provided with the following modes of operation.

The first mode, the spelling mode, is automatically entered when the "on" key is depressed. In the spelling mode the learning aid randomly selects ten words from a selected word list and at a selected difficulty category within the selected word list. The word list may be changed by depressing the "word list select" key which is coupled to a software implemented flip flop circuit which flips each time the "word list select" key is depressed. The word list select flip flop then determines, as will be seen, which pair of read-only-memories from which the ten words will be randomly selected. Each word list preferably includes words arranged in four levels of difficulty. This embodiment of the learning automatically enters the least difficult level of difficulty. The fact that the least difficulty level has been selected is shown by displaying "SPELL A" in display 2. The level difficulty may be increased by depressing the B, C or D keys, and display 2 will show, in response, "SPELL B", "SPELL C" or "SPELL D", respectively. Having selected the word list and level difficulty, the "go" key is depressed upon which the learning aid commences to randomly select ten words and to say the word "spell" followed by the first randomly selected word. A dash, that being segment D in display 2 (FIG. 2), comes up in the left hand most character position. At this time the student may either (1) enter his or her spelling of the word and then depress the "enter" key or (2) depress the "say again" key. The student may also depress the "erase" key if he or she realizes that the spelling being inputted is incorrect before having depressed the "enter" key; the student may then again try to input the correct spelling. The "say again" key causes the word to be spoken by the learning aid again. In some embodiments a subsequent depression of the "say again" key may cause the selected word to be repeated once more, however, then at a slower rate. As the student enters his or her spelling of the word using the alphabet keys at keyboard 3, the inputted spelling appears at display 2 and the shifts from left to right as the letters are inputted. Following the depression the "enter" key, the learning aid compares the student's spelling with a correct spelling, which is stored in one of the Read-Only-Memories, and verbally indicates to the student whether the student spelling was correct or incorrect. The verbal response is also stored as digital information in a Read-Only-Memory. Of course, a visual response may likewise or alternatively be used, if desired. In this embodiment the student is given two opportunities to spell the word correctly and if the student has still failed to correctly spell the word, the learning aid then verbally (via speaker 4) and visually (via display 2) spells the word for the student and goes on to the next word from the group of ten randomly selected words.

At the end of the test of the spelling of the ten randomly selected words, the learning aid then verbally and visually indicates the number of right and wrong answers. Further, in order to give the student additional reinforcement, the learning aid preferably gives a audible response which is a function of the correctness of the spellings. In this embodiment the learning aid plays a tune, the number of notes of which is a function of the correctness of the student's spellings for the group of selected words. The use of the "enter", "say again", "erase", and "go" function keys has just been described with reference to the spelling mode of operation. There is an additional function key, "replay", whose function has not yet been described. The "replay" key causes the learning aid to repeat the group of ten randomly selected words after the group has been completed or causes the learning aid to start over with the first word of the group of ten words if it is depressed during the progression through the group. Alternatively, at the end of a group of ten words, the student may depress the "go" which initiates the random selection of another group of ten words from the selected word list.

An exemplary set of spell mode problems is shown in Table I; exemplary key depressions, which a student might make during the exemplary set of problems, are listed along with the responses made by the learning aid at display 2 and speaker 4.

The learn mode is entered by depressing the "learn" key. In the learn mode, after the "go" key is depressed the learning aid randomly selects ten words from the selected word list at the selected difficulty level and then proceeds to display the first randomly selected word at display 2 and approximately one second later to speak "say it". Approximately two seconds thereafter the learning aid proceeds to pronounce the word shown in display 2. During this interval the student is given the opportunity to try to pronounce the word spelled at display 2; the learning aid then goes on to demonstrate how the word should be pronounced. After going through the ten randomly selected words the learning automatically returns to the aforementioned spell mode, but the ten words tested during the spell mode are the ten words previously presented during the learn mode. While in the learn mode the "say again", "erase", "repeat" and "enter" keys are invalid. The difficulty level is selected as in the spelling mode, but in the learn mode the learning aid displays the various levels as "SAY IT A", "SAY IT B", etc. Depressing the "go" key causes the learning aid to select another group of ten words in the learn mode. An exemplary set of learn mode problems are set forth in Table II.

The word guesser mode is entered by depressing the "word guesser" mode key. In the word guesser mode the learning aid randomly selects a word from the selected word list and displays dashes in a number of character positions at display 2, the number of character positions corresponding to the number of letters in the randomly selected word. Thus, if the learning aid randomly selects the word "course" for instance, then the dashes will appear in six of the eight character positions in display 2, starting with the left most position and proceeding to the right for six character positions. The dash is shown in the characters of the display by energizing the D segments in those character positions (see FIG. 2). The child may then proceed to enter his or her guesses of the letters in the randomly selected word by depressing the letter keys at keyboard 3. For a correct choice, the learning aid gives an audible response of four tones and shows every place the chosen letter occurs in the randomly selected word. Once letters have been correctly guessed, they remain in the display until the end of the game. For incorrect guesses the learning aid preferably makes no response, but may alternatively say something like "incorrect guess." In this embodiment the child is given six incorrect guesses. Upon the seventh incorrect guess the learning says "I win". On the other hand, if the child correctly guesses all the latters before making seven incorrect guesses the learning aid speaks "you win" and gives an audible response of four tones. Thus in the word guesser mode, the learning aid permits the child to play the traditional spelling game known as "hangman" either by himself or herself or along with other children. Exemplary word guesser problems are set forth in Table III.

The disclosed learning aid has another mode of operation known as "code breaker" which is entered by depressing the "code breaker" mode key. In this mode the child may enter any word of his or her choice and upon depressing the "enter key" the letters in the display are exchanged according to a predetermined code. Thus, in the code breaker mode the learning aid may be used to encode words selected by the child. Further in the code breaker mode the learning aid may be used to decode the encoded words by entering the encoded word and depressing the "enter key".

Another mode with which the learning aid may be provided is the "random letter" mode which is entered by depressing the "random letter" key. In the random letter mode the learning aid automatically displays in response to depression of the "go" key a randomly selected letter of the alphabet in the first character position of display 2. The letters of the alphabet occur in approximate proportion to the frequency of their occurrence in the English language; thus, the more commonly letters are displayed more frequently than uncommonly used letters. If the "go" key is again depressed then another randomly selected letter is displayed in the first character position and the previously selected letter moves right to the second character position and so forth in response to further depressions of the "random letter" key.

Figure 2:
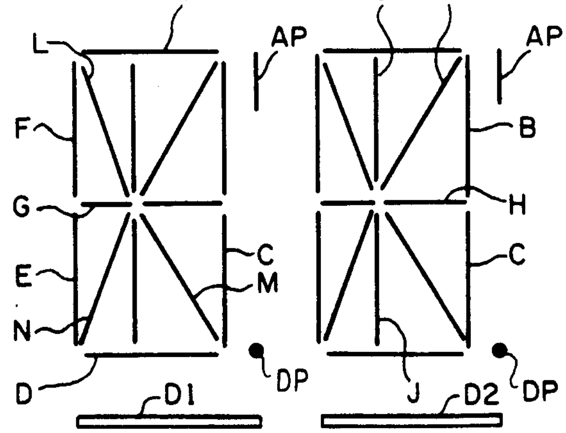
FIG. 2 depicts the segment details of the display.

Referring now to FIG. 2, there is shown a preferred arrangement of the segments of display 2. Display 2 preferably has eight character positions each of which is provided by a sixteen segment character which has fourteen segments arranged somewhat like a "British flag" with an additional two segments for an apostrophe and a decimal point. In FIG. 2, segments A–N are arranged more or less in the shape of the "British flag" while segment AP provides apostrophe and segment DP provides a decimal point. Segment conductors Sa through Sn, Sdp and Sap are respectively coupled to segments A through N, DP and AP in the eight character positions of display 2. Also, for each character position, there is a common electrode, labeled as D1–D8. When display 2 is provided by a vacuum fluorescent display device, the segment electrodes are provided anodes in the vacuum fluorescent display device while each common electrode is preferably provided by a grid associated with each character position. By appropriately multiplexing signals on the segment conductors (Sa–Sn, Sdp and Sap) with signals on the character common electrodes (D1–D8) the display may be caused to show the various letters of the alphabet, a period, and an apostrophe and various numerals. For instance, by appropriately energizing segment conductors A,B,C,E,F,G and H when character common electrode D1 is appropriately energized the letter A is actuated in the first character position of display 2. Further, by appropriate strobing segment conductors A,B,C,D,H,I and J when character common electrode D2 is appropriately energized, the letter B is caused to be actuated in the second character position of display 2. It should be evident to those skilled in the art that the other letters of the alphabet as well as the apostrophe, period and numerals may be formed by appropriate energization of appropriate segment conductors and common electrodes. In operation, the character common electrodes D1–D8 are sequentially energized with an appropriate voltage potential as selected segment conductors are energized to their appropriate voltage potential to produce a display of characters at display 2. Of course, the segment electrodes could alternatively be sequentially energized as the digit electrodes are selectively energized in producing a display at display 2.

BLOCK DIAGRAM OF THE LEARNING AID

Figure 3:
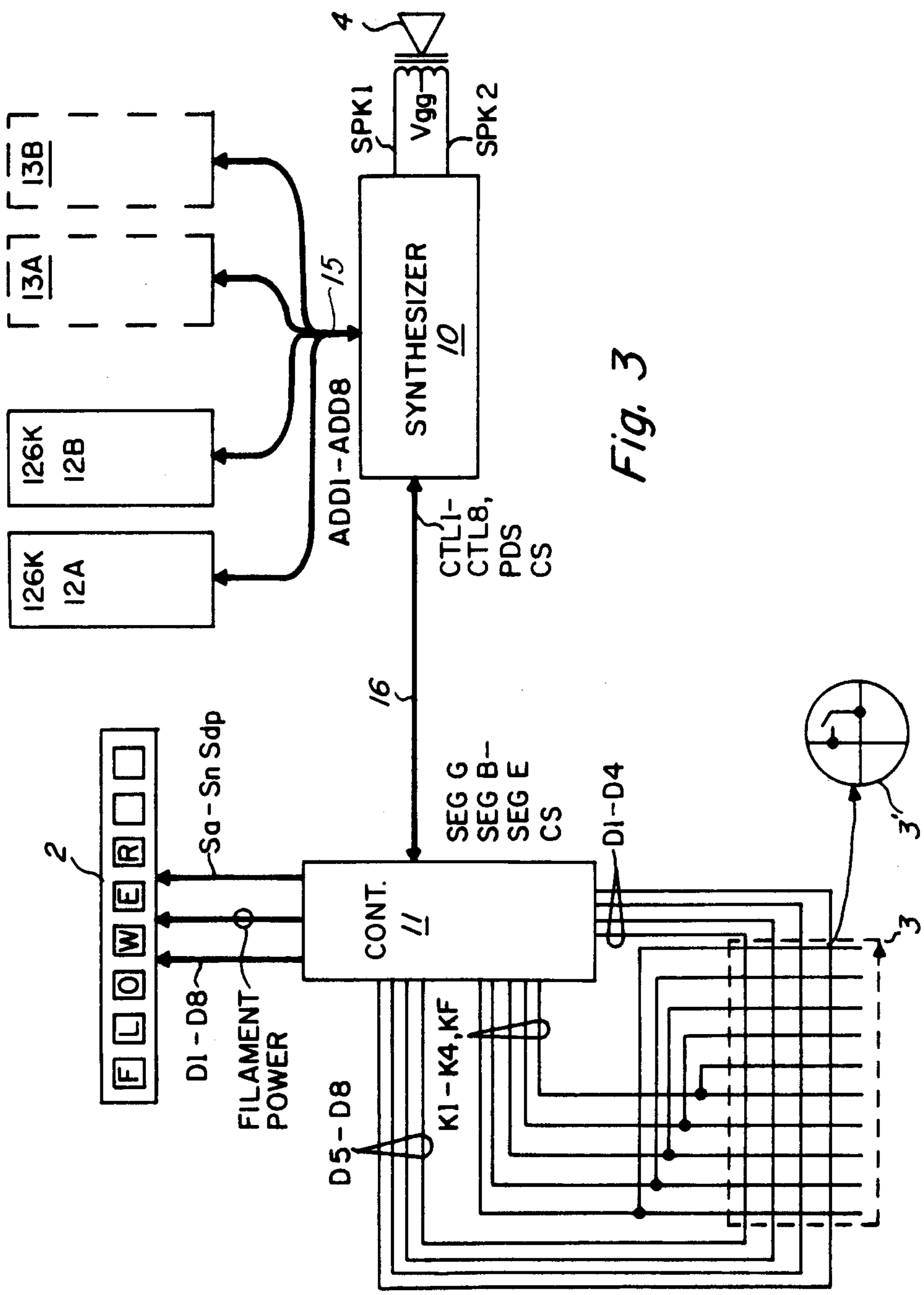
FIG. 3 is a block diagram of the major components preferably making up the learning aid.

FIG. 3 is a block diagram of the major components making up the disclosed embodiment of a speaking learning aid. The electronics of the disclosed learning aid may be divided into three major functional groups, one being a controller 11, another being a speech synthesizer 10, and another being a read-only-memory (ROM) 12. In the embodiment disclosed, these major electronic functional groups are each integrated on separate integrated circuit chips except for the ROM functional group which is integrated onto two integrated circuit chips. Thus, the speech synthesizer 10 is preferably implemented on a single integrated circuit denoted by the box labeled 10 in FIG. 3 while the controller is integrated on a separate integrated circuit denoted by a box 11 in FIG. 3. The word list for the learning aid is stored in the ROM functional group 12, which stores both the correct spellings of the words as well as frames of digital coding which are converted by speech synthesizer 10 to an electrical signal which drives speaker or other voice coil means 4. In the embodiment disclosed, ROM functional group 12 is preferably provided with 262,144 bits of storage. As a matter of design choice, the 262,144 bits of data are divided between two separate read-only-memory chips, represented in FIG. 3 at numerals 12A and 12B. The memory capacity of ROM functional group 12 is a design choice; however, using the data compression features which are subsequentially discussed with reference to FIG. 6, the 262,144 bits of read-only-memory may be used to store on the order of 250 words of spoken speech and their correct spellings as well as various tones, praise phrases and correction phases spoken by the learning aid.

As is discussed with reference to FIG. 1, the "word list select" causes the learning aid to select words from another word list. In FIG. 3, the basic word list used with the learning aid is stored in ROMs 12A and 12B along with their spellings and appropriate phraseology which the learning aid speaks during its different modes of operation. The second word list, which may be selected by depressing the "word list select" key, is preferably stored in another pair of ROMs 13A and 13B. In FIG. 3 there are depicted by dashed lines because these read-only-memories are preferably plugged into the learning aid by a person using the system (of course, when children use the system it is preferable that an adult change the read-only-memories since children may not have the required manual dexterity) rather than normally packaged with the learning aid. In this manner many different "libraries" of word lists may be made available for use with the learning aid.

Of course, the number of chips on which the learning aid is implemented is a design choice and as large scale integration techniques are improved (using electron beam etching and other techniques), the number of integrated circuit chips may be reduced from four to as few as a single chip.

Synthesizer chip 10 is interconnected with the read-only-memories via data path 15 and is interconnected with controller 11 via data path 16. The controller 11, which may be provided by an appropriately programmed microprocessor type device, preferably actuates display 2 by providing segment information on segment conductors Sa–Sn, Sdp and Sap along with character position information on connectors D1–D8. In the embodiment herein disclosed, controller 11 preferably also provides filament power to display 2 when a vacuum fluorescent device is used therefor. Of course, if a liquid crystal, electrochromic, light emitting diode or gas discharge display were used such filament power would not be required. Controller 11 also scans keyboard 3 for detecting key depressions thereat. Keyboard 3 has forty switch positions which are shown in representative form in FIG. 3, the switch locations occurring where the conductors cross within the dashed line at numeral 3 in FIG. 3. A switch closure causes the conductors shown as crossing in FIG. 3 to be coupled together. At numeral 3' the switch occurring at a crossing of conductors at numeral 3 is shown in detail. In addition to actuating display 2 and sensing key depression at keyboard 3, controller 11 also performs such functions as providing addresses for addressing ROMs 12A and 12B (via synthesizer 10), comparing the correct spellings from ROMs 12A or 12B with spellings input by a student at keyboard 3, and other such functions which will become apparent. Addresses from controller 11 are transmitted to ROMs 12A and 12B by synthesizer 10 because, as will be seen, synthesizer 10 preferably is equipped with buffers capable of addressing a plurality of read-only-memories. Preferably, only one of the pairs of ROMs will output information in response to this addressing because of a chip select signal which is transmitted from synthesizer 10 to all the Read-Only-Memories. Controller 11, in this embodiment, transmits addresses to the ROMs via synthesizer 10 so that only synthesizer 10 output buffers need be sized to transmit addresses to a plurality of ROMs simultaneously. Of course, controller 11 output buffers could also be sized to transmit information to a plurality of read-only-memories simultaneously and thus in certain embodiments it may be desirable to also couple controller 11 directly to the ROMs.

As will be seen, synthesizer chip 10 synthesizes human speech or other sounds according to frames of data stored in ROMs 12A-12B or 13A-13B. The synthesizer 10 employs a digital lattice filter of the type described in U.S. Pat. No. 4,209,844. U.S. patent application Ser. No. 807,461 is hereby incorporated herein by reference. As will also be seen, synthesizer 10 also includes a digital to analog (D to A) converter for converting the digital output from the lattice filter to analog signals for driving speaker 4 or other voice coil means with those analog signals. Synthesizer 10 also includes timing, control and data storage and data compression systems which will be subsequently described in detail.

SYNTHESIZER BLOCK DIAGRAM

Figure 4A:
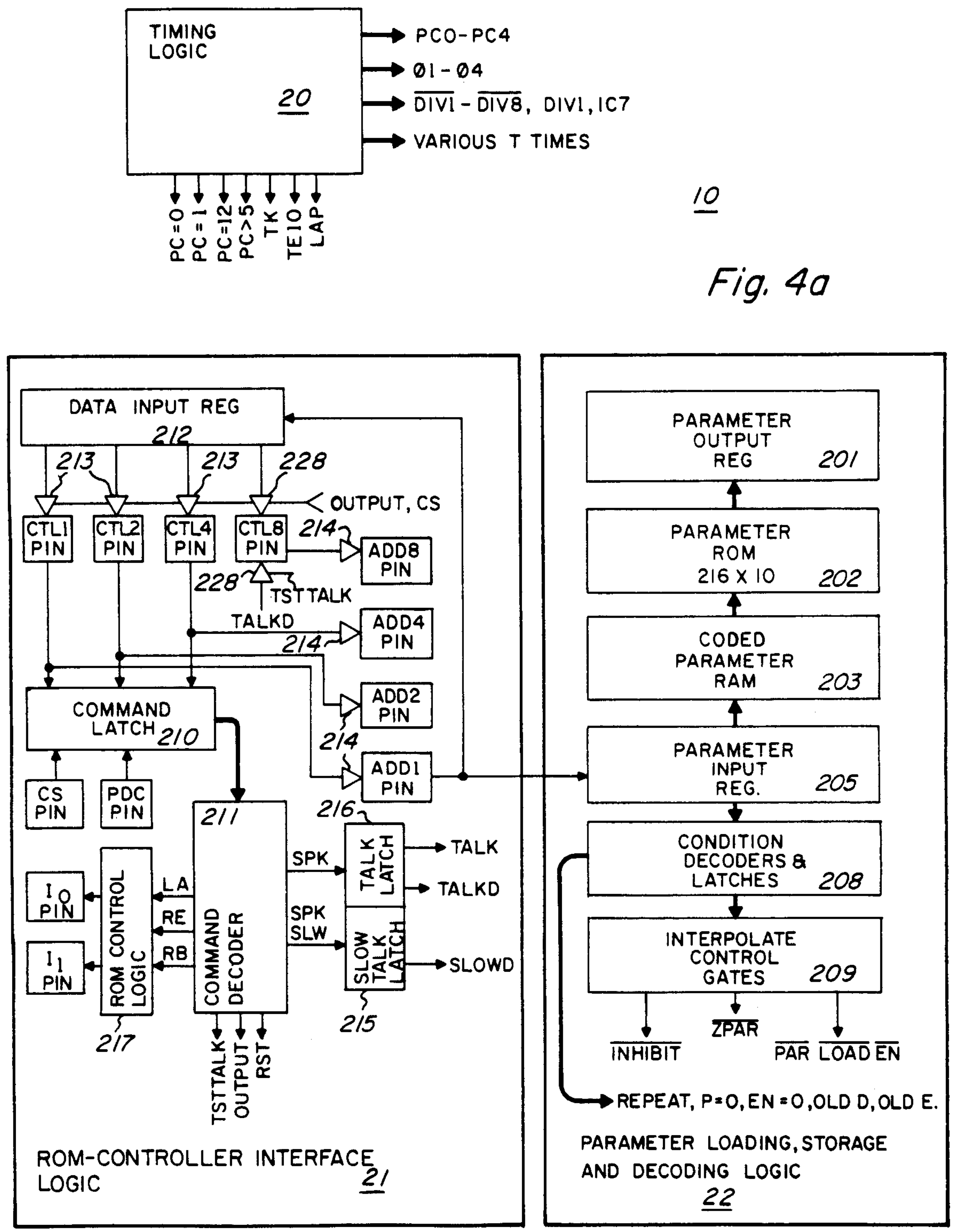
FIGS. 4*a* and 4*b* form a composite block diagram (when placed side by side) of the speech synthesizer chip.
Figure 4B:
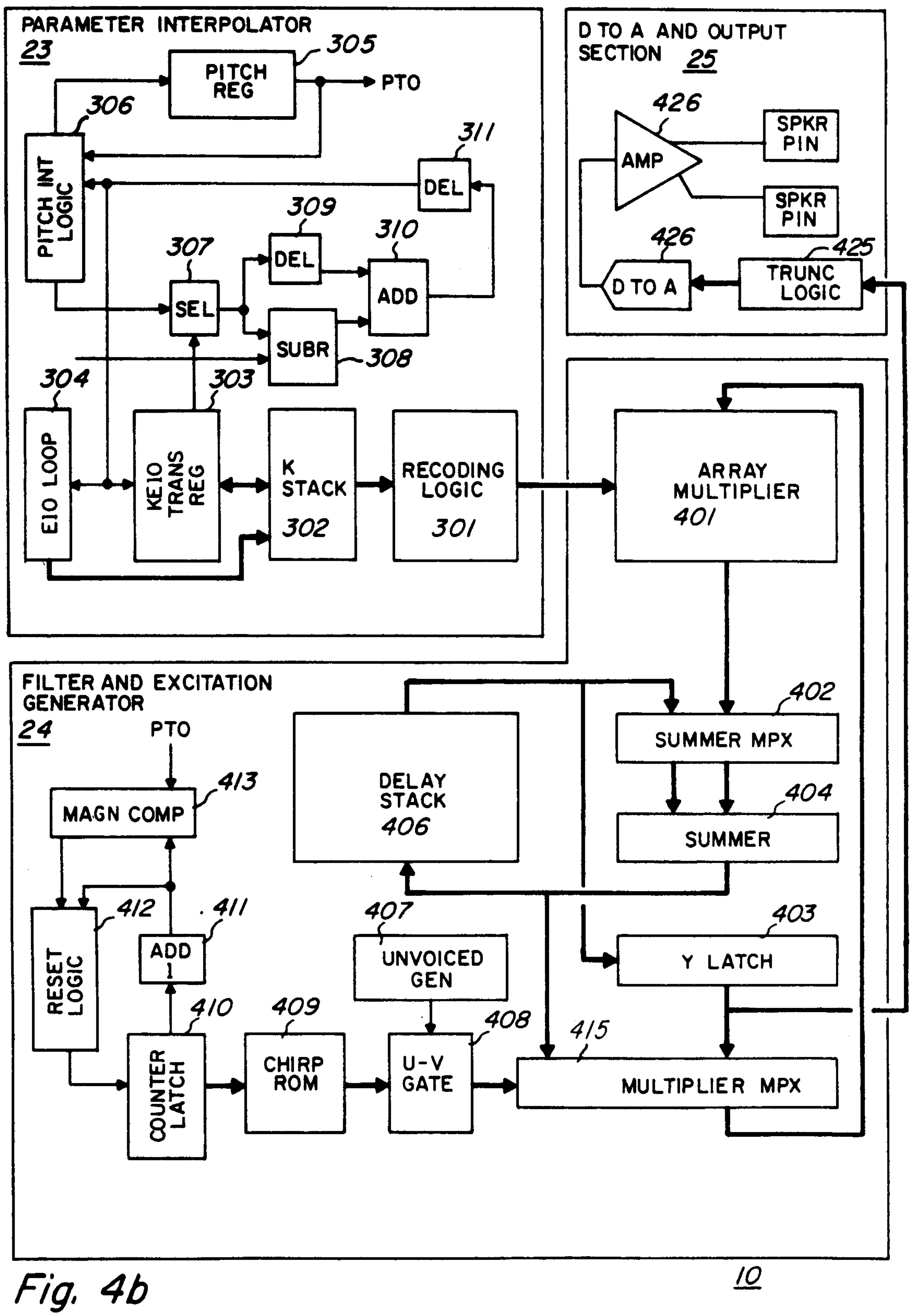

FIGS. 4*a* and 4*b* form a composite block diagram of the synthesizer 10. Synthesizer 10 is shown as having six major functional blocks, all but one of which are shown in greater detail in block diagram form in FIGS. 4*a* and 4*b*. The six major functional blocks are timing logic 20; ROM-Controller interface logic 21; parameter loading, storage and decoding logic 22; parameter interpolator 23; filter and excitation generator 24 and D to A and output section 25. Subsequently, these major functional blocks will be described in detail with respect to FIGS. 5, 6, *7a-7d*, 8*a*-8*f*, 9*a*-9*d*, 10*a*-10*c*, and 11*a*-11*d*.

ROM/Controller Interface Logic

Referring again to FIGS. 4*a* and 4*b*, ROM/Controller interface logic 21 couples synthesizer 10 to read-only-memories 12A and 12B and to controller 11. The control 1-8 (CTL1-CTL8), chip select (CS) and processor data clock (PDC) pins are coupled, in this embodiment, to the controller while the address 1-8 (ADD1-ADD8) and instruction 0-1 (I0-I1) pins are connected to ROMs 12A and 12B (as well as ROMs 13A-13B, if used). ROM/Controller interface logic 21 sends address information from controller 11 to the Read-Only-Memories 12A-12B and preferably returns digital information from the ROMs back to the controller 11; logic 21 also brings data back from the ROMs for use by synthesizer 10 and initiates speech. A Chip Select (CS) signal enables tristate buffers, such as buffers 213, and a three bit command latch 210. A Processor Data Clock (PDC) signal sets latch 210 to hold the data appearing at CTL1-CTL4 pins from the controller. Command latch 210 stores a three bit command from controller 11, which is decoded by command decoder 211. Command decoder 211 is responsive to eight commands which are: speak (SPK) or speak slowly (SPKSLW) for causing the synthesizer to access data from the Read-Only-Memory and speak in response thereto either at a normal rate or at a slow rate; a reset (RST) command for resetting the synthesizer to zero; a test talk (TSTTALK) so that the controller can assertain whether or not the synthesizer is still speaking; a load address (LA) where four bits are received from the controller chip at the CTL1-CTL8 pins and transferred to the ROMs as an address digit via the ADD1-ADD8 pins and associated buffers 214; a read and branch (RB) command which causes the Read-Only-Memory to take the contents of the present and subsequent address and use that for a branch address; a read (RE) command which causes the Read-Only-Memory to output one bit of data on ADD1, which data shifts into a four bit data input register 212; and an output command which transfers four bits of data in the data input register 212 to controller 11 via buffers 213 and the CTL1-CTL8 pins. Once the synthesizer 10 has commenced speaking in response to a SPK or SPKSLW command it continues speaking until ROM interface logic 21 encounters a RST command or an all ones gate 207 (see FIGS. 8*a*-8*f*) detects an "energy equal to fifteen" code and resets talk latch 216 in response thereto. As will be seen, an "energy equal to 15" code is used as the last frame of data in a plurality of frames of data for generating words, phases or sentences. The LA, RE and RB commands decoded by decoder 211 are re-encoded via ROM control logic 217 and transmitted to the read-only-memories via the instruction (I0-I1) pins.

The processor Data Clock (PDC) signal serves other purposes than just setting latch 210 with the data on CTL1-CTL4. It signals that an address is being transferred via CTL1-CTL8 after an LA or OUTPUT command has been decoded or that the TSTTALK test is to be performed and outputted on pin CTL8. A pair of latches 218*a* and 218*b* (FIGS. 8*a*-8*f*) associated with decoder 211 disable decoder 211 when the aforementioned LA, TSTTALK and OUTPUT commands have been decoded and a subsequent PDC occurs so that the data then on pins CTL1-CTL8 is not decoded.

A TALK latch 216 is set in response to a decoded SPK or SPKSLW command and is reset: (1) during a power up clear (PUC) which automatically occurs whenever the synthesizer is energized; (2) by a decoded RST command or (3) by an "energy equals fifteen" code in a frame of speech data. The TALKD output is delayed output to permit all speech parameters to be inputed into the synthesizer before speech is attempted. The slow talk latch 215 is set in response to a decoded SPKSLW command and reset in the same manner as latch 216. The SLOWD output is similarly a delayed output to permit all the parameters to be inputted into the synthesizer before speech is attempted.

Parameter Loading, Storage and Decoding Logic

The parameter loading, storage and decoding logic 22 includes a six bit long parameter input register 205 which receives serial data from the read-only-memory via pin ADD1 in response to a RE command outputted to the selected read-only-memory via the instruction pins. A coded parameter random access memory (RAM) 203 and condition decoders and latches 208 are connected to receive the data inputted into the parameter input register 205. As will be seen, each frame of speech data is inputted in three to six bit portions via parameter input register 205 to RAM 203 in a coded format where the frame is temporarily stored. Each of the coded parameters stored in RAM 203 is converted to a ten bit parameter by parameter ROM 22 and temporarily stored in a parameter output register 201.

As will be discussed with respect to FIG. 6, the frames of data may be either wholly or partially inputted into parameter input register 205, depending upon the length of the particular frame being inputted. Condition decoders and latches 208 are responsive to particular portions of the frame of data for setting repeat, pitch equal zero, energy equal zero, old pitch and old energy latches. The function of these latches will be discussed subsequently with respect to FIGS. 8*a*–8*f*. The condition decoders and latches 208 as well as various timing signals are used to control various interpolation control gates 209. Gates 209 generate an inhibit signal when interpolation is to be inhibited, a zero parameter signal when the parameter is to be zeroed and a parameter load enable signal which, among other things, permits data in parameter input register 205 to be loaded into the coded parameter RAM 203.

Parameter Interpolator

The parameters in parameter output registers 201 are applied to the parameter interpolator functional block 23. The inputted K1–K10 speech parameters, including speech energy are stored in a K-stack 302 and E10 loop 304, while the pitch parameter is stored in a pitch register 305. The speech parameters and energy are applied via recording logic 301 to array multiplier 401 in the filter and excitation generator 24. As will be seen, however, when a new parameter is loaded into parameter output register 201 it is not immediately inserted into K-stack 302 or E10 loop 304 or register 305 but rather the corresponding value in K-stack 302, E10 loop 304 or register 305 goes through eight interpolation cycles during which a portion of the difference between the present value in the K-stack 302, E10 loop 304 or register 305 and the target value of that parameter in parameter output register 201 is added to the present value in K-stack 302, E10 loop 304 or register 305.

Essentially the same logic circuits are used to perform the interpolation of pitch, energy and the K1–K10 speech parameters. The target value from the parameter output register 201 is applied along with the present value of the corresponding parameter to a subtractor 308. A selector 307 selects either the present pitch from pitch logic 306 or present energy or K coefficient data from KE10 transfer register 303, according to which parameter is currently in parameter output register 201, and applies the same to subtractor 308 and a delay circuit 309. As will be seen, delay circuit 309 may provide anywhere between zero delay to three bits of delay. The output of delay circuit 309 as well as the output of subtractor 308 is supplied to an adder 310 whose output is applied to a delay circuit 311. When the delay associated with delay circuit 309 is zero the target value of the particular parameter in parameter output register 201 is effectively inserted into K-stack 302, E10 loop 304 or pitch register 305, as is appropriate. The delay in delay circuit 311 is three to zero bits, being three bits when the delay in the delay circuit 309 is zero bits, whereby the total delay through selector 307, delay circuits 309 and 311, adder 310 and subtractor 308 is constant. By controlling the delays in delay circuits 309 and 311, either all, $\frac{1}{2}$, $\frac{1}{4}$ or $\frac{1}{8}$ of the difference outputted from subtractor 308 (that being the difference between the target value and the present value) is added back into the present value of the parameter. By controlling the delays in the fashion set forth in Table IV, a relatively smooth eight step parameter interpolation is accomplished.

U.S. Pat. No. 4,209,844 discusses with reference to FIG. 7 thereof a speech synthesis filter wherein speech coefficients K1–K9 are stored in the K-stack continuously, until they are updated, while the K10 coefficient and the speech energy (referred to by the letter A in U.S. Pat. No. 4,209,844) are periodically exhanged. In parameter interpolator 23, speech coefficients K1–K9 are likewise stored in stack 302, until they are updated, whereas the energy parameter and the K10 coefficient effectively exchange places in K-stack 302 during a twenty time period cycle of operations in the filter and excitation generator 24. To accomplish this function, E10 loop 304 stores both the energy parameter and the $K_{10}$ coefficient and alternately inputs the same into the appropriate location in K-stack 302. KE10 transfer register 303 is either loaded with the K10 or energy parameter from E10 loop 304 or the appropriate K1–K9 speech coefficient from K-stack 302 for interpolation by logics 307–311.

As will be seen, recoding logic 301 preferably performs a Booth's algorithm on the data from K-stack 302, before such data is applied to array multiplier 401. Recoding logic 301 thereby permits the size of the array multiplier 401 to be reduced compared to the array multiplier described in U.S. Patent No. 4,209,844.

Filter and Excitation Generator

The filter excitation generator 24 includes the array multiplier 401 whose output is connected to a summer multiplexer 402. The output of summer multiplexer 402 is coupled to the input of summer 404 whose output is coupled to a delay stack 406 and multiplier multiplexer 415. The output of the delay stack 406 is applied as an input to summer multiplexer 402 and to Y latch 403. The output of Y latch 403 is coupled to an input of multiplier multiplexer 415 and is applied as an input to truncation logic 425. The output of multiplier multiplexer 415 is applied as an input to array multiplier 401. As will be seen filter and excitation generator 24 make use of the lattice filter described in U.S. Pat. No.4,209,844. Various minor interconnections are not shown in FIG. 4*b* for sake of clarity, but which will be described with reference to FIGS. 10*a*–10*c* and 11*a*–11*d*. The arrangement of the foregoing elements generally agrees with the arrangement shown in FIG. 7 of U.S. Pat. No. 4,209,844; thus array multiplier 401 corresponds to element 30′, summer multiplexer 402 corresponds to elements 37*b*′, 37*c*′ *and* 37*d*′, gates 414 (FIGS. 11*a*–11*d*) correspond to element 33′, delay stack 406 corresponds to elements 34′ and 35′, Y latch 403 corresponds to element 36′ and multiplier multiplexer 415 corresponds to elements 38*a*′, 38*b*′, 38*c*′ and 38*d*′.

The voice excitation data is supplied from unvoiced/-voice gate 408. As will be subsequently described in greater detail, the parameters inserted into parameter input register 205 are supplied in a compressed data format. According to the data compression scheme used, when the coded pitch parameter is equal to zero in input register 205, it is interpreted as an unvoiced condition by condition decoders and latches 208. Gate 408 responds by supplying randomized data from unvoiced generator 407 as the excitation input. When the coded pitch parameter is of some other value, however, it is decoded by parameter ROM 202, loaded into parameter output register 201 and eventually inserted into pitch register 305, either directly or by the interpolation scheme previously described. Based on the period indicated by the number in pitch register 305, voiced excitation is derived from chirp ROM 409. As discussed in U.S. Pat. No. 4,209,844, the voiced excitation signal may be an impulse function or some other repeating function such as a repeating chirp function. In this embodiment, a chirp has been selected as this tends to reduce the "fuzziness" from the speech generated (because it apparently more closely models the action of the vocal cords than does a impulse function) which chirp is repetitively generated by chirp ROM 409. Chirp ROM 409 is addressed by counter latch 410, whose address is incremented in an add one circuit 411. The address in counter latch 410 continues to increment in add one circuit 411, recirculating via reset logic 412 until magnitude comparator 413, which compares the magnitude of the address being outputted from add one circuit 411 and the contents of the pitch register 305, indicates that the value in counter latch 410 then compares with or exceeds the value in pitch register 305, at which time reset logic 412 zeroes the address in counter latch 410. Beginning at address zero and extending through approximately fifty addresses is the chirp function in chirp ROM 409. Counter latch 410 and chirp ROM 409 are set up so that addresses larger than fifty do not cause any portion of the chirp function to be outputted from chirp ROM 409 to UV gate 408. In this manner the chirp function is repetitively generated on a pitch related period during voiced speech.

SYSTEM TIMING

Figure 5:
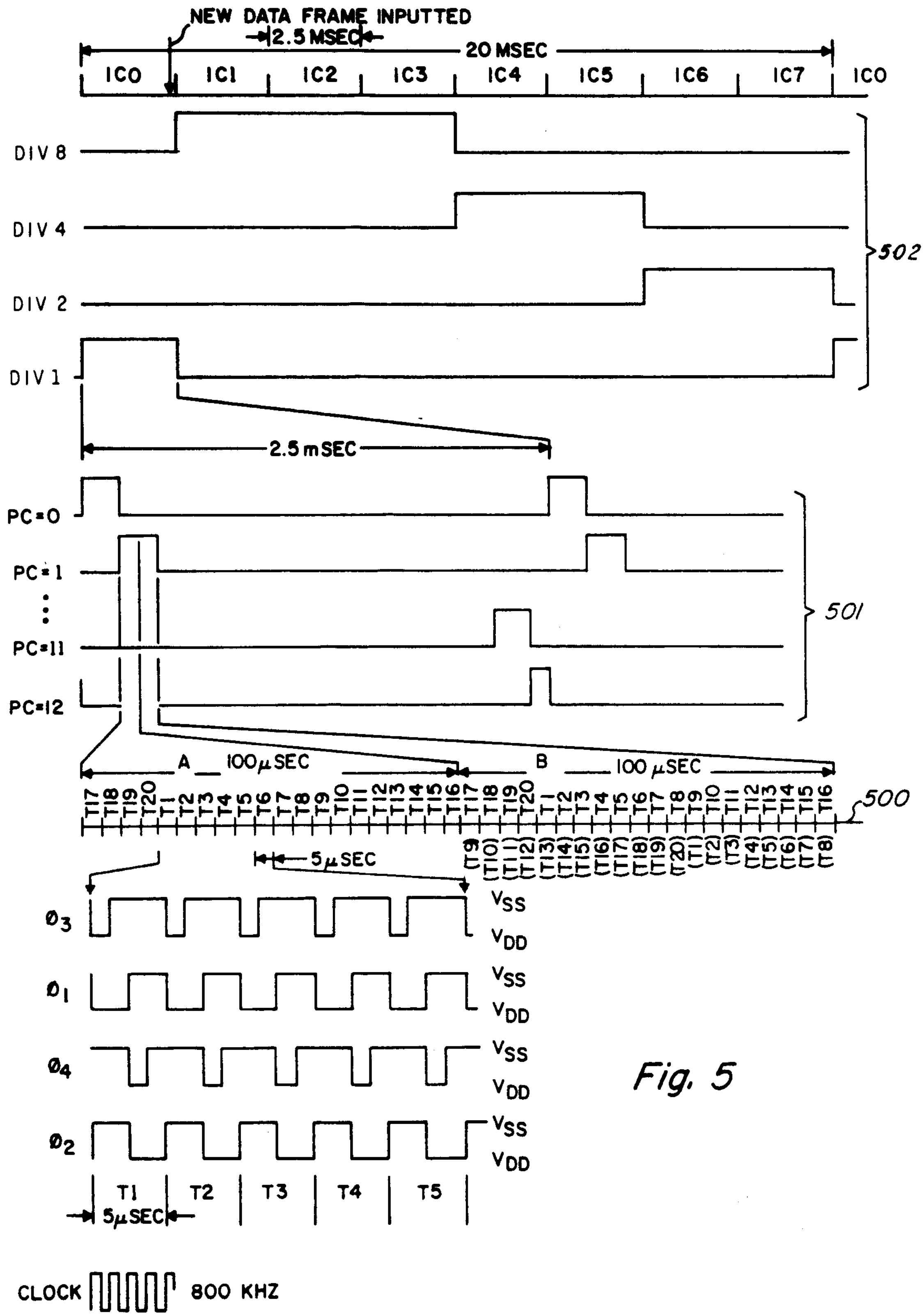
FIG. 5 is a timing diagram of various timing signals preferably used on the synthesizer.

FIG. 5 depicts the timing relationships between the occurrences of the various timing signals generated on synthesizer chip 10. Also depicted are the timing relationships with respect to the time new frames of data are inputted to synthesizer chip 10, the timing relationship with respect to the interpolations performed on the inputted parameters, the timing relations with respect to the foregoing with the time periods of the lattice filter and the relationship of all the foregoing to the basic clock signals.

The synthesizer is preferably implemented using precharged, conditional discharge type logics and therefore FIG. 5 shows clocks Φ1–Φ4 which may be appropriately used with such precharge-conditional discharge logic. There are two main clock phases (Φ1 and Φ2) and two precharge clock phases (Φ3 and Φ4). Phase Φ3 goes low during the first half of phase Φ1 and serves as a precharge therefor. Phase Φ4 goes low during the first half of phase Φ2 and serves as a precharge therefore. A set of clocks Φ1–Φ4 is required to clock one bit of data and thus corresponds to one time period.

The time periods are labeled T1–T20 and each preferably has a time period on the order of five microseconds. Selecting a time period on the order of five microseconds permits, as will be seen, data to be outputted from the digital filter at a ten kilohertz rate (i.e., at a 100 microsecond period) which provides for a frequency response of five kilohertz in the D to A output section 25 (FIG. 4*b*). It will be appreciated by those skilled in the art, however, that depending on the frequency response which is desired and depending upon the number of Kn speech coefficients used, and also depending upon the type of logics used, that the periods or frequencies of the clocks and clock phases shown in FIG. 5 may be substantially altered, if desired.

As is explained in U.S. Pat. No. 4,209,844, one cycle time of the lattice filter in filter excitation generator 24, preferably comprises twenty time periods, T1–T20. For reasons not important here, the numbering of these time periods differs between this application and U.S. Pat. No. 4,209,844. To facilitate an understanding of the differences in the numbering of the time periods, both numbering schemes are shown at the time period time line 500 in FIG. 5. At time line 500, the time periods, T1–T20 which are not enclosed in parentheses identify the time periods according to the convention used in this application. On the other hand, the time periods enclosed in parenthesis identify the time periods according to the convention used in U.S. Pat. No. 4,209,844. Thus, time period T17 is equivalent to time period (T9).

At numeral 501 is depicted the parameter count (PC) timing signals. In this embodiment there are thirteen PC signals, PC=0 through PC=12. The first twelve of these, PC=0 through PC=11 correspond to times when the energy, pitch, and K1–K10 parameters, respectively, are available in parameter output register 201. Each of the first twelve PC's comprise two cycles, which are labeled A and B. Each such cycle starts at time period T17 and continues to the following T17. During each PC the target value from the parameter output register 201 is interpolated with the existing value in K-stack 302 in parameter interpolator 23. During the A cycle, the parameter being interpolated is withdrawn from the K-stack 302, E10 loop 304 or pitch register 305, as appropriate, during an appropriate time period. During the B cycle the newly interpolated value is reinserted in the K-stack (or E10 loop or pitch register). The thirteenth PC, PC=12, is provided for timing purposes so that all twelve parameters are interpolated once each during a 2.5 milliseconds interpolation period.

As was discussed with respect to the parameter interpolator 23 of FIG. 4*b* and Table IV, eight interpolations are performed for each inputting of a new frame of data from ROMs 12A–12B into synthesizer 10. This is seen at numeral 502 of FIG. 5 where timing signals DIV 1, DIV 2, DIV 4 and DIV 8 are shown. These timing signals occur during specific interpolation counts (IC) as shown. There are eight such interpolation counts, IC0–IC7. New data is inputted from the ROMs 12A–12B into the synthesizer during IC0. These new target values of the parameters are then used during the next eight interpolation counts, IC1 through IC0; the existing parameters in the pitch register 305 K-stack 302 and E10 loop 304 are interpolated once during each interpolation count. At the last interpolation count, IC0, the present value of the parameters in the pitch register 305, K-stack 302 and E10 loop 304 finally attain the target values previously inputted toward the last IC0 and thus new target values may then again be inputted as a new frame of data. Inasmuch as each interpolation count has a period of 2.5 milliseconds, the period at which new data frames are inputted to the synthesizer chip is 20 microseconds or equivalent to a frequency of 50 hertz. The DIV 8 signal corresponds to those interpolation counts in which one-eighth of the difference produced by subtractor 308 is added to the present values in adder 310 whereas during DIV 4 one-fourth of the difference is added in, and so on. Thus, during DIV 2, ½ of the difference from subtractor 308 is added to the present value of the parameter in adder 310 and lastly during DIV 1 the total difference is added in adder 310. As has been previously mentioned, the effect of this interpolation scheme can be seen in Table IV.

PARAMETER DATA COMPRESSION

It has been previously mentioned that new parameters are inputted to the speech synthesizer at a 50 hertz rate. It will be subsequently seen that in parameter interpolator 23 and excitation generator 24 (FIG. 4*b*) the pitch data, energy data and $K_1$-Kn parameters are stored and utilized as ten bit digital binary numbers. If each of these twelve parameters were updated with a ten bit binary number at a fifty hertz rate from an external source, such as ROMs 12A and 12B, this would require a $12\times10\times50$ or 6,000 hertz bit rate. Using the data compression techniques which will be explained this bit rate requied for synthesizer 10 is reduced to on the order of 1,000 to 1,200 bits per second. And more importantly, it has been found that the speech compression schemes herein disclosed do not appreciably degrade the quality of speech generated thereby in comparison to using the data uncompressed.

Figure 6:
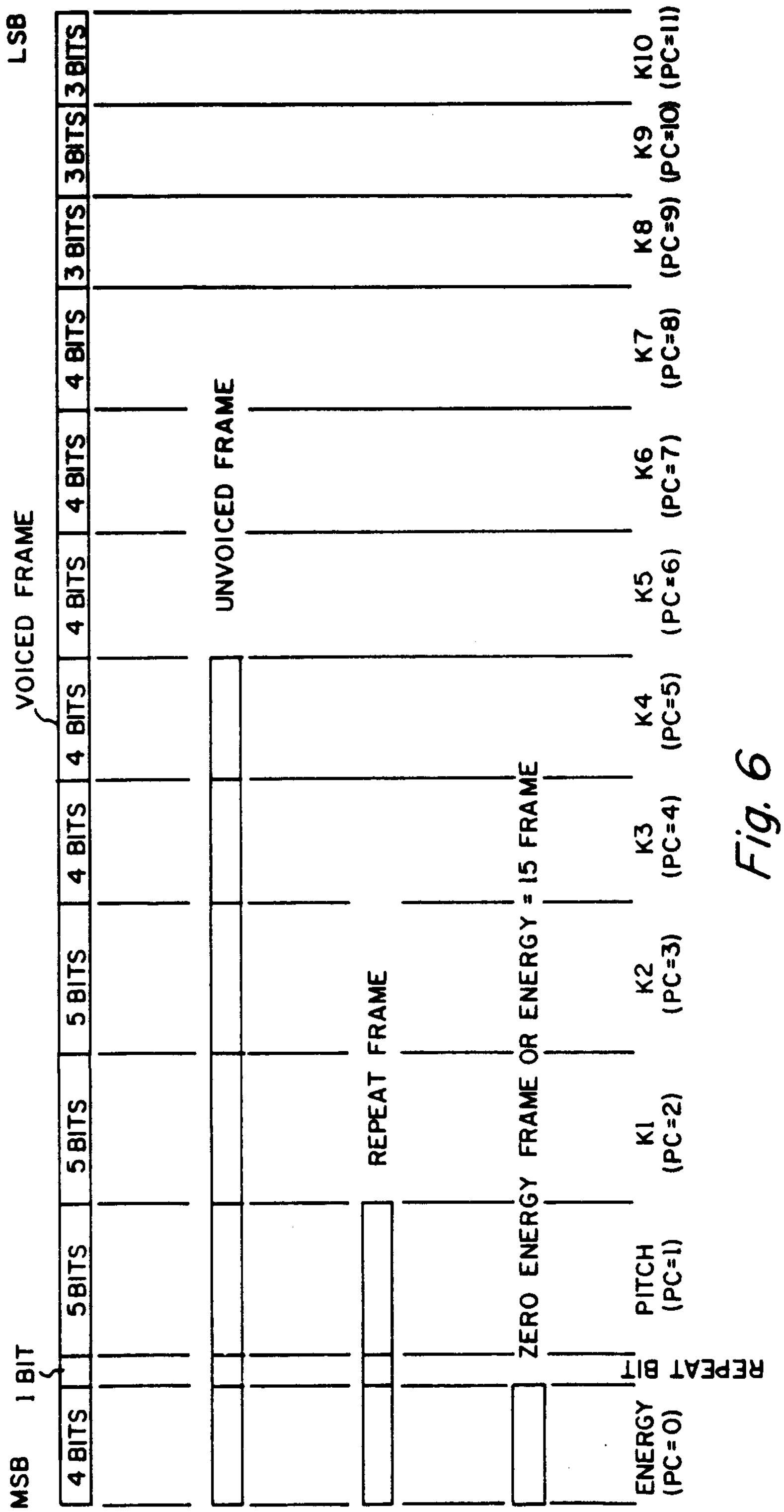
FIG. 6 pictorially shows the data compression scheme preferably used to reduce the data rate required by the synthesizer.

The data compression scheme used is pictorially shown in FIG. 6. Referring now to FIG. 6, it can be seen that there is pictorially shown four different lengths of frames of data. One, labeled voiced frame, has a length of 49 bits while another entitled unvoiced frame, has a length of 28 bits while still another called "repeat frame" has a length of ten bits and still another which may be alternatively called zero energy frame or energy equals fifteen frame has the length of but four bits. The "voiced frame" supplies four bits of data for a coded energy parameter as well as coded four bits for each of five speech parameters K3 through K7. Five bits of data are reserved for each of three coded parameters, pitch, K1 and K2. Additionally, three bits of data are provided for each of three coded speech parameters K8–K10 and finally another bit is reserved for a repeat bit.

In lieu of inputting ten bits of binary data for each of the parameters, a coded parameter is inputted which is converted to a ten bit parameter by addressing parameter ROM 202 with the coded parameter. Thus, coefficient K1, for example, may have any one of thirty-two different values, according to the five bit code for K1, each one of the thirty-two values being a ten bit numerical coefficient stored in parameter ROM 202. Thus, the actual values of coefficients K1 and K2 may have one of thirty-two different values while the actual values of coefficients K3 through K7 may be one of sixteen different values and the values of coefficients K8 through K10 may be one of eight different values. The coded pitch parameter is five bits long and therefore may have up to thirty-two different values. However, only thirty-one of these reflect actual pitch values, a pitch code of 00000 being used to signify an unvoiced frame of data. The coded energy parameter is four bits long and therefore would normally have sixteen available ten bit values; however, a coded energy parameter equal to 0000 indicates a silent frame such as occur as pauses in and between words, sentences and the like. A coded energy parameter equal to 1111 (energy equals fifteen), on the other hand, is used to signify the end of a segment of spoken speech, thereby indicating that the synthesizer is to stop speaking. Thus, of the sixteen codes available for the coded energy parameter, fourteen are used to signify different ten bit speech energy levels.

Coded coefficients K1 and K2 have more bits then coded coefficients K3–K7 which in turn have more bits than coded coefficients K8 through K10 because coefficient K1 has a greater effect on speech than K2 which has a greater effect on speech than K3 and so forth through the lower order coefficients. Thus given the greater significance of coefficients K1 and K2 than coefficients K8 through K10, for example, more bits are used in coded format to define coefficients K1 and K2 than K3–K7 or K8–K10.

Also it has been found that voiced speech data needs more coefficients to correctly model speech than does unvoiced speech and therefore when unvoiced frames are encountered, coefficients K5 through K10 are not updated, but rather are merely zeroed. The synthesizer realizes when an unvoiced frame is being outputted because the encoded pitch parameter is equal to 00000.

It has also been found that during speech there often occur instances wherein the parameters do not significantly change during a twenty millisecond period; particularly, the K1–K10 coefficients will often remain nearly unchanged. Thus, a repeat frame is used wherein new energy and new pitch are inputted to the synthesizer, however, the K1–K10 coefficients previously inputted remain unchanged. The synthesizer recognizes the ten bit repeat frame because the repeat bit between energy and pitch then comes up whereas it is normally off. As previously mentioned, there occur pauses between speech or at the end of speech which are preferably indicated to the synthesizer; such pauses are indicated by a coded energy frame equal to zero, at which time the synthesizer recognizes that only four bits are to be sampled for that frame. Similarly, only four bits are sampled when an "energy equals fifteen" frame is encountered.

Using coded values for the speech in lieu of actual values, alone would reduce the data rate to $48\times50$ or 2400 bits per second. By additionally using variable frame lengths, as shown in FIG. 6, the data rate may be further reduced to on the order of one thousand to twelve hundred bits per second, depending on the speaker and on the material spoken.

The effect of this data compression scheme can be seen from Table V where the coding for the word "HELP" is shown. Each line represents a new frame of data. As can be seen, the first part of the word "HELP", "HEL", is mainly voiced while the "P" is unvoiced. Also note the pause between "HEL" and "P" and the advantages of using the repeat bit. Table VI sets forth the encoded and decoded speech parameter. The 3, 4 or 5 bit code appears as a hexadecimal number in the left-hand column, while the various decoded parameter values are shown as ten bit, two's complement numbers expressed as hexadecimal numbers in tabular form under the various parameters. The decoded speech parameter is stored in ROM 203. The repeat bit is shown in Table V between the pitch and K parameters for sake of clarity; preferably, according to the embodiment of FIG. 6, the repeat bit occurs just before the most significant bit (MSB) of the pitch parameter.

SYNTHESIZER LOGIC DIAGRAMS

The various portions of the speech synthesizer of FIGS. 4*a* and 4*b* will now be described with reference to FIGS. 7*a* through 14*b* which, depict, in detail, the logic circuits implemented on a semiconductor chip, for example, to form the synthesizer 10. The following discussion, with reference to the aforementioned drawings, refers to logic signals available at many points in the circuit. It is to be remembered that in P channel MOS devices a logical zero corresponds to a negative voltage, that is, Vdd, while a logical one refers to a zero voltage, that is, Vss. It should be further remembered that P-channel MOS transistors depicted in the aforementioned figures are conductive when a logical zero, that is, a negative voltage, is applied at their respective gates. When a logic signal is referred to which is unbarred, that is, has no bar across the top of it, the logic signal is to be interpreted as "TRUE" logic; that is, a binary one indicates the presence of the signal (Vss) whereas a binary zero indicates the lack of the signal (Vdd). Logic signal names including a bar across the top thereof are "FALSE" logic; that is, a binary zero (Vdd voltage) indicates the presence of the signal whereas a binary one (Vss voltage) indicates that the signal is not present. It should also be understood that a numeral three in clocked gates indicates that phase Φ3 is used as a precharge whereas a four in a clocked gate indicates that phase Φ4 is used as a precharge clock. An "S" in the gate indicates that the gate is statically operated.

Timing Logic Diagram

Referring now to FIGS. *7a–7d*, they form a composite, detailed logic diagram of the timing logic for synthesizer 10. Counter 510 is a pseudorandom shift counter including a shift register 510*a* and feed back logic 510*b*. The counter 510 counts into pseudorandom fashion and the TRUE and FALSE outputs from shift register 510*a* are supplied to the input section 511 of a timing PLA. The various T time periods decoded by the timing PLA are indicated adjacent to the output lines thereof. Section 511*c* of the timing PLA is applied to an output timing PLA 512 generating various combinations and sequences of time period signals, such as T odd, $\overline{T10}$–$\overline{T18}$, and so forth. Sections 511*a* and 511*b* of timing PLA 511 will be described subsequently.

The parameter count in which the synthesizer is operating is maintained by a parameter counter 513. Parameter counter 513 includes an add one circuit and circuits which are responsive to SLOW and SLOW D. In SLOW, the parameter counter repeats the A cycle of the parameter count twice (for a total of three A cycles) before entering the B cycle. That is, the period of the parameter count doubles so that the parameters applied to the lattice filter are updated and interpolated at half the normal rate. To assure that the inputted parameters are interpolated only once during each parameter count during SLOW speaking operations each parameter count comprises three A cycles followed by one B cycle. It should be recalled that during the A cycle the interpolation is begun and during the B cycle the interpolated results are reinserted back into either K-stack 302, E10 loop 304 or pitch register 305, as appropriate. Thus, merely repeating the A cycle has no affect other than to recalculate the same value of a speech parameter but since it is only reinserted once back into either K-stack 302, E10 loop 304 or pitch register 305 only the results of the interpolation immediately before the B cycle are retained.

Inasmuch as parameter counter 513 includes an add one circuit, the results outputted therefrom, PC1–PC4, represent in binary form, the particular parameter count in which the synthesizer is operating. Output PC0 indicates in which cycle, A or B, the parameter count is. The parameter counter outputs PC1–PC4 are decoded by timing PLA 514. The particular decimal value of the parameter count is decoded by timing PLA 514 which is shown adjacent to the timing PLA 514 with nomenclature such as PC=0, PC=1, PC=7 and so forth. The relationship between the particular parameters and the value of PC is set forth in FIG. 6. Output portions 511*a* and 511*b* of timing PLA 511 are also interconnected with outputs from timing PLA 514 whereby the Transfer K (TK) signal goes high during T9 of PC=2 or T8 of PC=3 or T7 of PC=4 and so forth through T1 of PC=10. Similarly, a LOAD Parameter (LDP) timing signal goes high during T6 of PC=10 or T1 of PC=1 or T3 of PC=2 and so forth through T7 of PC=11. As will be seen, signal TK is used in controlling the transfer of data from parameter output register 201 to subtractor 308, which transfer occurs at different T times according to the particular parameter count the parameter counter 513 is in to assure that the appropriate parameter is being outputted from KE10 transfer register 303. Signal LDP is, as will be seen, used in combination with the parameter input register to control the number of bits which are inputted therein according to the number of bits associated with the parameter then being loaded according to the number of bits in each coded parameter as defined in FIG. 6.

Interpolation counter 515 includes a shift register and an add one circuit for binary counting the particular interpolation cycle in which the synthesizer 10 is operating. The relationship between the particular interpolation count in which the synthesizer is operating and the DIV1, DIV2, DIV4 and DIV8 timing signals derived therefrom is explained in detail with reference to FIG. 5 and therefore additional discussion here would be superfluous. It will be noted, however, that interpolation counter 515 includes a three bit latch 516 which is loaded at TI. The output of three bit latch 516 is decoded by gates 517 for producing the aforementioned DIV1 through DIV8 timing signals. Interpolation counter 515 is responsive to a signal RESETF from parameter counter 513 for permitting interpolation counter 515 to increment only after PC=12 has occurred.

ROM/Controller Interface Logic Diagram

Turning now to FIGS. 8*a*–8*f*, which form a composite diagram, there is shown a detailed logic diagram of ROM/Controller interface logic 21. Parameter input register 205 is coupled, at its input to address pin ADD1. Register 205 is a six bit shift register, most of the stages of which are two bits long. The stages are two bits long in this embodiment inasmuch as ROMs 12*a* and *b* output, as will be seen, data at half the rate at which data is normally clocked in synthesizer 10. At the input of parameter input register 205 is a parameter input control gate 220 which is responsive to the state of a latch 221. Latch 221 is set in response to LDP, PC0 and DIV1 all being a logical one. It is reset at T14 and in response to parameter load enable from gate 238 being a logical zero. Thus, latch 221 permits gate 220 to load data only during the A portion (as controlled by PC0) of the appropriate parameter count and at an appropriate T time (as controlled by LDP) of IC0 (as controlled by DIV1) provided parameter load enable is at a logical one. Latch 221 is reset by T14 after the data has been inputted into parameter register 205.

The coded data in parameter input register 205 is applied on lines IN0:-IN4 to coded parameter RAM 203, which is addressed by PC1–PC4 to indicate which coded parameter is then being stored. The contents of register 205 is tested by all one's gate 207, all zeroes gate 206 and repeat latch 208*a*. As can be seen, gate 206 tests for all zeroes in the four least significant bits of register 205 whereas gate 207 tests for all ones in those bits. Gate 207 is also responsive to PC0, DIV1, T16 and PC=0 so that the zero condition is only tested during the time that the coded energy parameter is being loded into parameter register 205. The repeat bit occurs in this embodiment immediately in front of the coded pitch parameter; therefore, it is tested during the A cycle of PC=1. Pitch latch 208*b* is set in response to all zeroes in the coded pitch parameter and is therefore responsive to not only gate 206 but also the most significant bit of the pitch data on line 222 as well as PC=1. Pitch latch 208*b* is set whenever the loaded coded pitch parameter is a 00000 indicating that the speech is to be unvoiced.

Energy=0 latch 208*c* is responsive to the output of gate 206 and PC=0 for testing whether all zeroes have been inputted as the coded energy parameter and is set in response thereto. Old pitch latch 208*d* stores the output of the pitch=0 latch 208*b* from the prior frame of speech data while old energy latch 208*e* stores the output of energy=0 latch 208*c* from the prior frame of speech data. The contents of old pitch latch 208*d* and pitch=0 latch 208*b* are compared in comparison gates 223 for the purpose of generating an INHIBIT signal. As will be seen, the INHIBIT signal inhibits interpolations and this is desirable during changes from voiced to unvoiced or unvoiced to voiced speech so that the new speech parameters are automatically inserted into K-stack 302, E10 loop 304 and pitch register 305 as opposed to being more slowly interpolated into those memory elements. Also, the contents of old energy latch 208*e* and energy=0 latch 208*c* is tested by NAND gate 224 for inhibiting interpolation for a transition from a non-speaking frame to a speaking frame of data. The outputs of NAND gate 224 and gates 223 are coupled to a NAND gate 235 whose output is inverted to INHIBIT by an inverter 236. Latches 208*a*–208*c* are reset by gate 225 and latches 208*d* and 208*e* are reset by gate 226. When the excitation signal is unvoiced, the K5–K10 coefficients are set to zero, as aforementioned. This is accomplished, in part, by the action of gate 237 which generates a ZPAR signal when pitch is equal to zero and when the parameter counter is greater than five, as indicated by PC 5 from PLA 514.

Also shown in FIGS. 8*a*–8*f* is a command latch 210 which comprises three latches 210*a*, *b*, and *c* which latch in the data at CTL2,4 and 8 in response to a processor data clock (PDC) signal in conjunction with a chip select (CS) signal. The contents of command latch 210 is decoded by command decoder 211 unless disabled by latches 218*a* and 218*b*. As previously mentioned, these latches are responsive to decoded LA, output and TTALK commands for disabling decoder 211 from decoding what ever data happens to be on the CTL2–CTL8 pins when subsequent PDC signals are received in conjunction with the LA, output and TTALK commands. A decoded TTALK command sets TTALK latch 219. The output of TTALK latch 219, which is reset by a Processor Data Clock Leading Edge (PDCLE) signal or by an output from latch 218*b*, controls along with the output of latch 218*a* NOR gates 227*a* and *b*. The output of NOR gate 227*a* is a logical one if TTALK latch 219 is set, thereby coupling pins CTL1 to the talk latch via tristate buffer 228 and inverters 229. Tristate latch 228 is shown in detail in FIG. 8*d*. NOR gate 227*b*, on the other hand, outputs a logical one if an output code has been detected, setting latch 228*a* and thereby connecting pins CTL1 to the most significant bit of data input register 212.

Data is shifted into data input register 212 from address pin 8 in response to a decoded read command by logics 230. RE, RB and LA instructions are outputted to ROM via instruction pins $I_0$–$I_1$ from ROM control logic 217 via buffers 214*c*. The contents of data input register 212 is outputted to CTL1–CTL4 pins via buffers 213 and to the aforementioned CTL1 pin via buffer 228 when NOR gate 227*b* inputs a logical one. CTL1–CTL4 pins are connected to address pins ADD1–ADD4 via buffers 214*a* and CTL8 pin is connected to ADD8 pin 8 via a control buffer 214*b* which is disabled when addresses are being loaded on the ADD1–ADD8 pins by the signal on line 231.

Figure 8A:
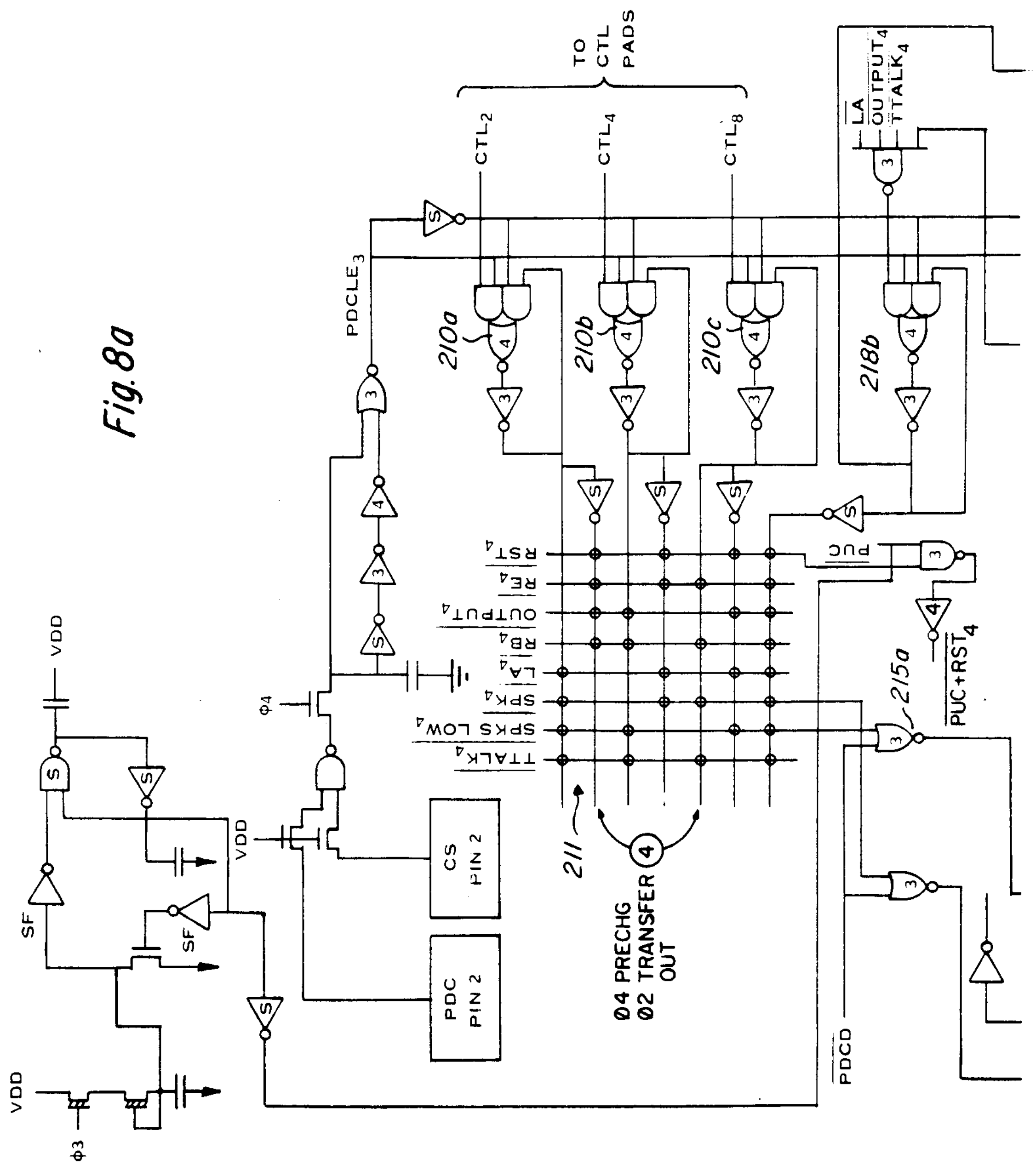
FIGS. 8*a*–8*f* form a composite logic diagram of the synthesizer's ROM/Controller interface logics.
Figure 8B:
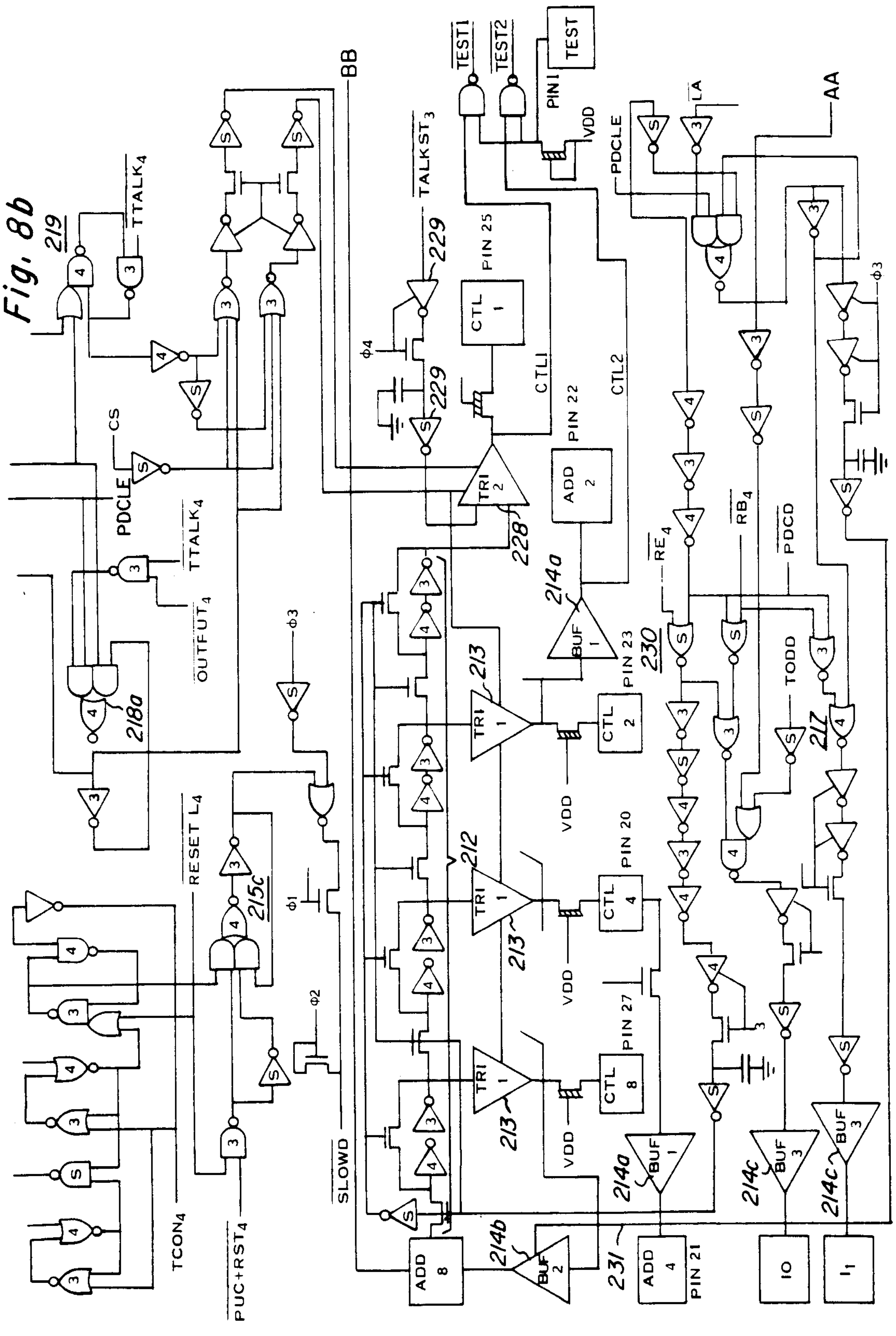
Figure 8C:
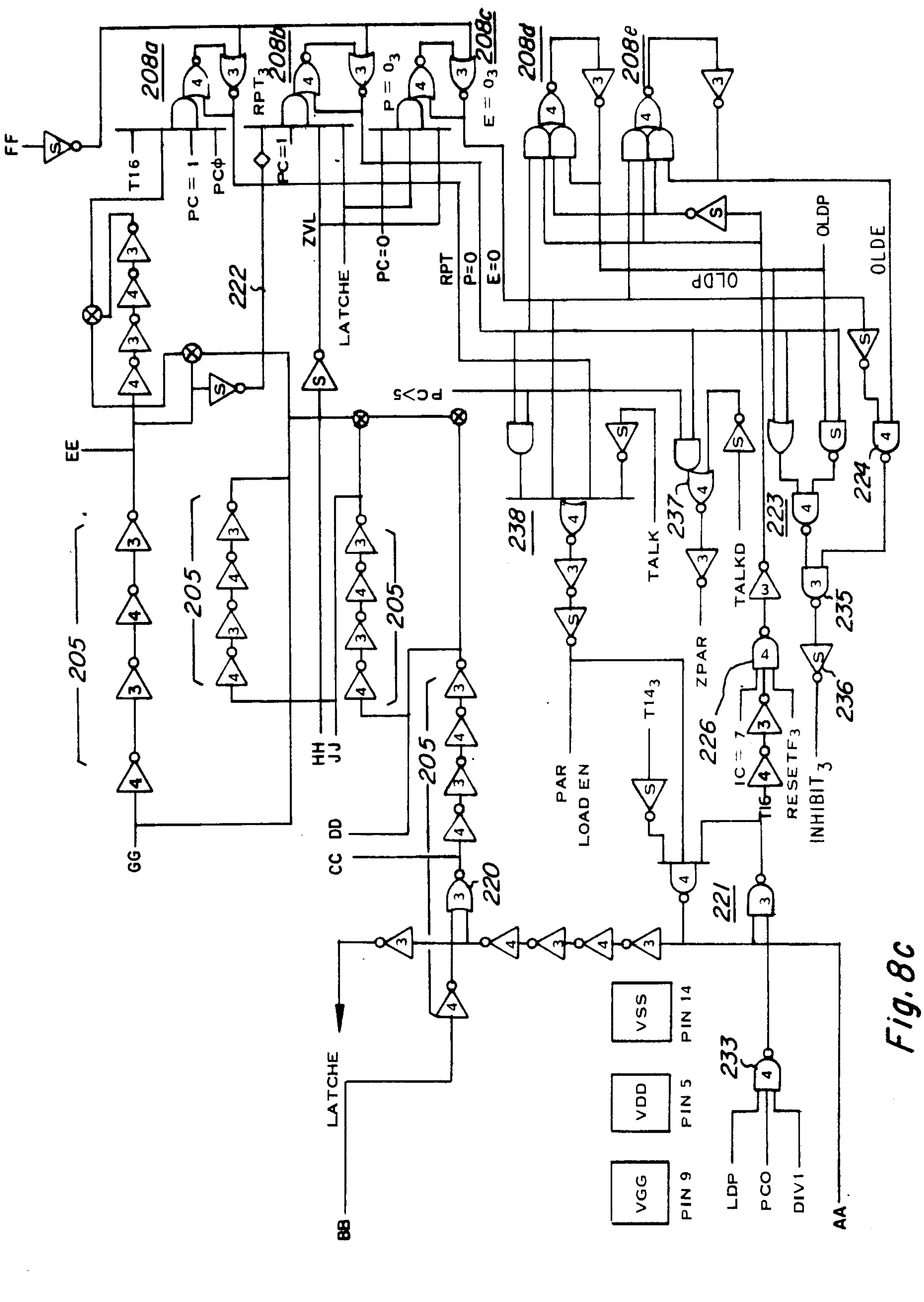
Figure 8D:
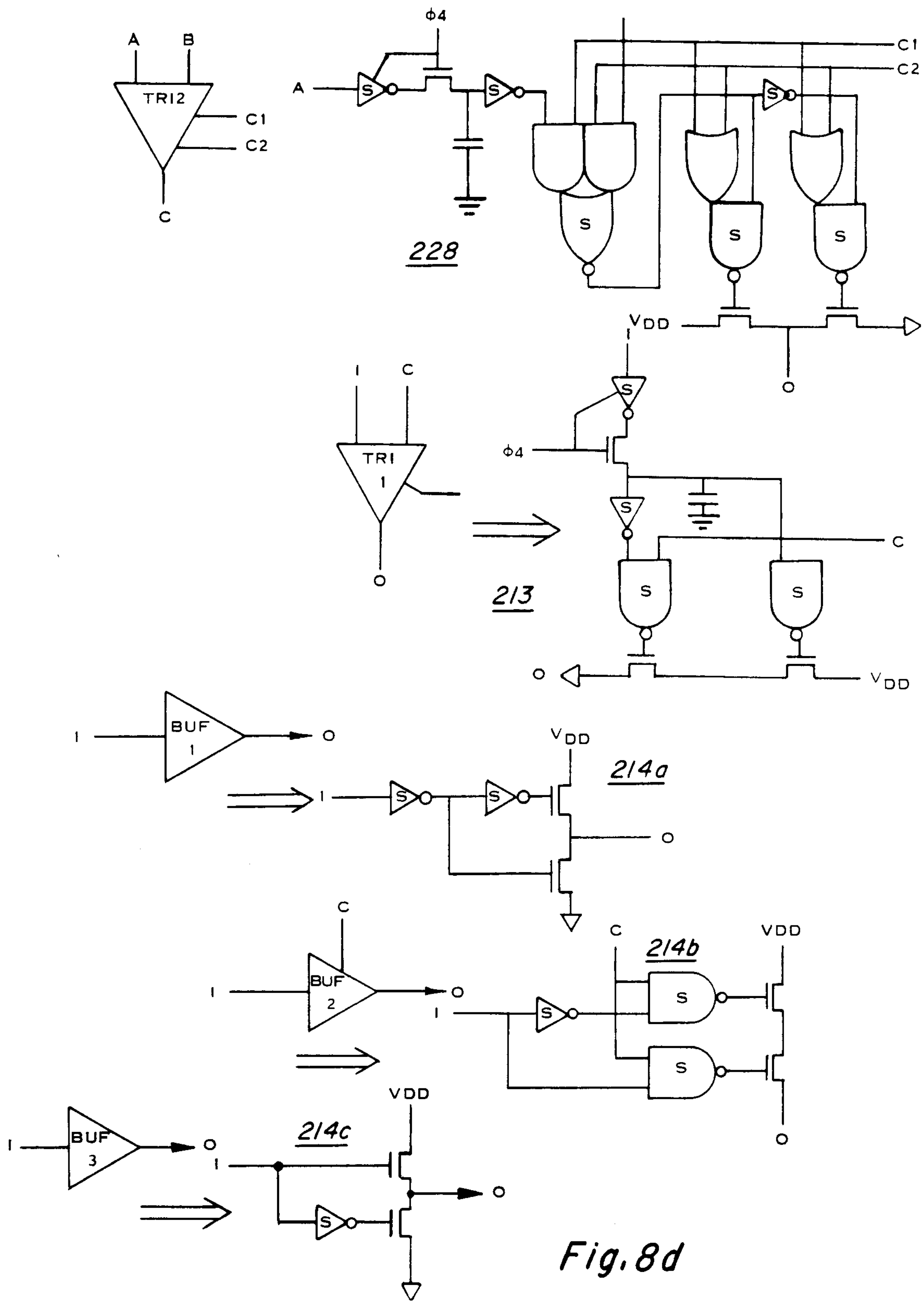
Figure 8E:
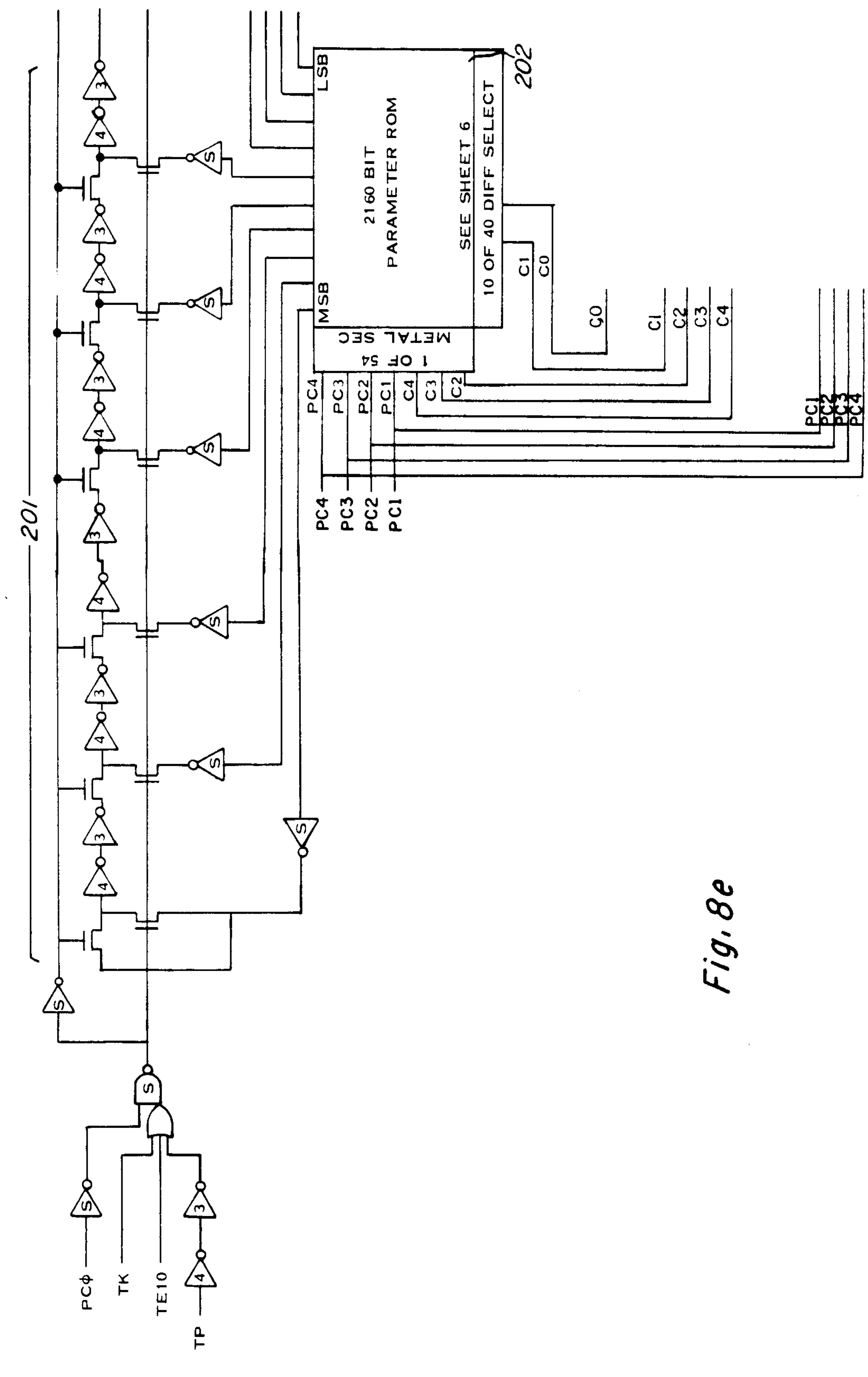
Figure 8F:
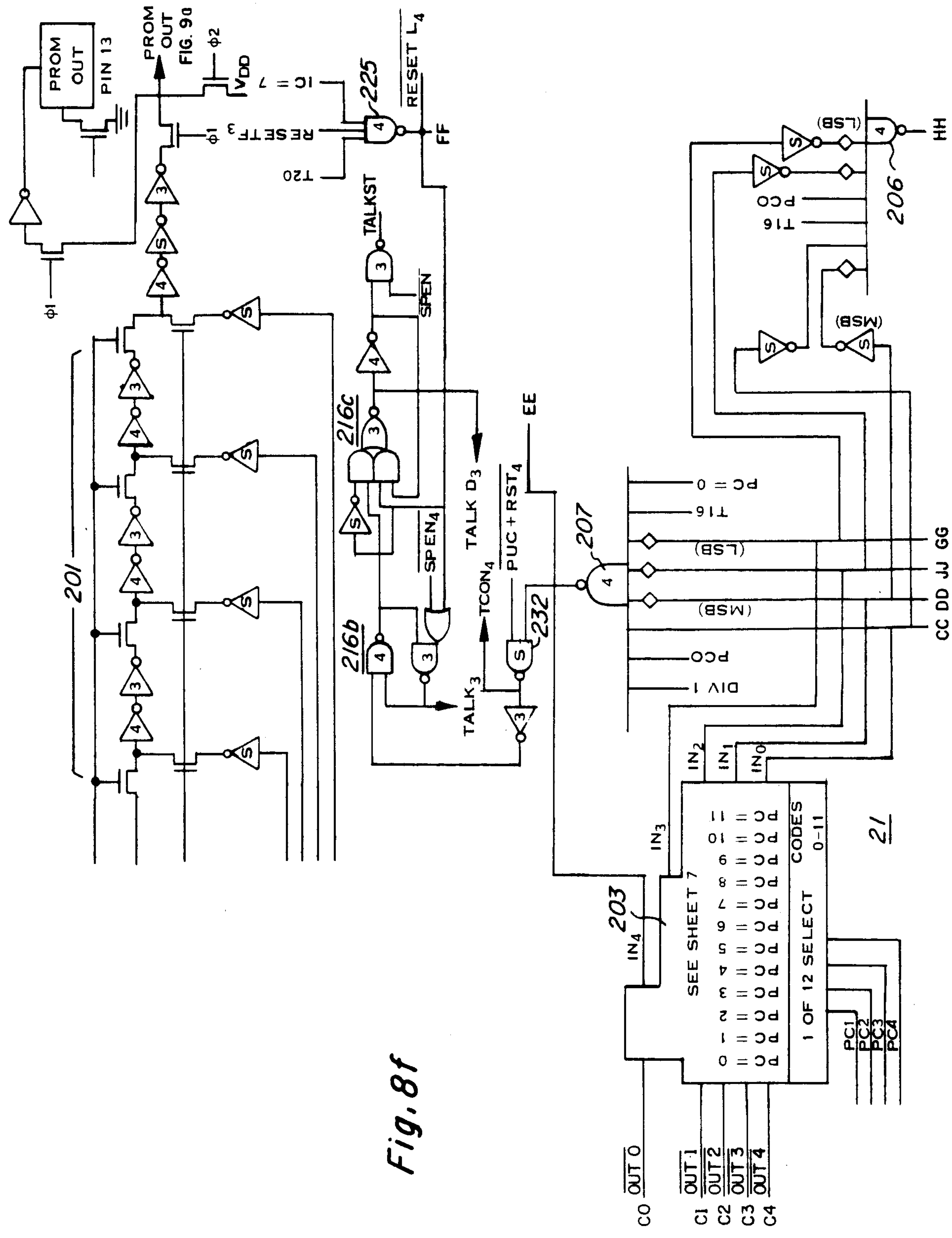

The Talk latch 216 shown in FIG. 8*f* preferably comprises, three latches 216*a*, 216*b* and 216*c*. Latch 216*a* is set in response to a decoded SPK command and generates, in response thereto, a speak enable (SPEN) signal. As will be seen, SPEN is also generated in response to a decoded SPKSLOW command by latch 215*a*. Latch 216*b* is set in response to speak enable during IC7 as controlled by gate 225. Latches 216*a* and 216*b* are reset in response to (1) a decoded reset command, (2) an energy equals fifteen code or (3) on a power-up clear by gate 232. Talk delayed latch 216*c* is set with the contents of latch 216*b* at the following IC7 and retains that data through eight interpolation counts. As was previously mentioned, the talk delayed latch permits the speech synthesizer to continue producing speech data for eight interpolation cycles after a coded energy=0 condition has been detected setting latch 208*c*. Likewise, slow talk latch 215 is implemented with latches 215*a*, 215*b* and 215*c*. Latch 215*a* enables the speak enable signal while latches 215*b* and 215*c* enable the production of the SLOWD signal in much the same manner as latches 216*b* and 216*c* enable the production of the TALKD signal.

Considering now, briefly, the timing interactions for inputting data into parameter input register 205, it will be recalled that this is controlled chiefly by a control gate 220 in response to the state of a parameter input latch 221. Of course, the state of the latch is controlled by the LDP signal aplied to gate 233. The PC0 and DIV1 signals applied to gate 233 to assure that the parameters are loaded during the A cycle of a particular parameter count during IC0. The particular parameter and the parameter T-Time within the parameter count is controlled by LDP according to the portion 511*a* of timing PLA 511 (FIGS. 7*a*–7*d*). The first parameter inputted (Energy) is four bits long and therefore LDP is initiated during time period T5 (as can be seen in FIGS. 7*a*–7*d*). During parameter count 1, the repeat bit and pitch bits are inputted, this being six bits which are inputted according to LDP which comes up at time period T1. Of course, there four times periods difference between T1 and T5 but only two bits difference in the length of the inputted information. This occurs because it takes two time periods to input each bit into parameter input register 205 (which has two stages per each inputted bit) due to the fact that ROMs 12A–12B are preferably clocked at half the rate at that which synthesizer 10 is clocked. By clocking the ROM chips at half the rate, that the synthesizer 10 chip is clocked simplifies the addressing of the read-only-memories in the aforesaid ROM chips and yet, as can be seen, data is supplied to the synthesizer 10 in plenty of time for performing numerical operations thereon. Thus, in section 511*a* of timing PLA 511, LDP comes up at T1 when the corresponding parameter count indicates that a six bit parameter is to be inputted, comes up at T3 when the corresponding parameter count indicates that a five bit parameter is to be inputted, comes up at T5 when the corresponding parameter count indicates that a four bit parameter is to be inputted and comes up at time period T7 when the corresponding parameter count (EG parameter counts 9, 10, and 11) which correspond to a three bit coded parameter. ROMs 12A–12B are signaled that the addressed parameter ROM is to output information when signaled via $I_0$ instruction pin, ROM control logic 217 and line 234 which provides information to ROM control logic 217 from latch 221.

Parameter Interpolator Logic Diagram

Figure 9A:
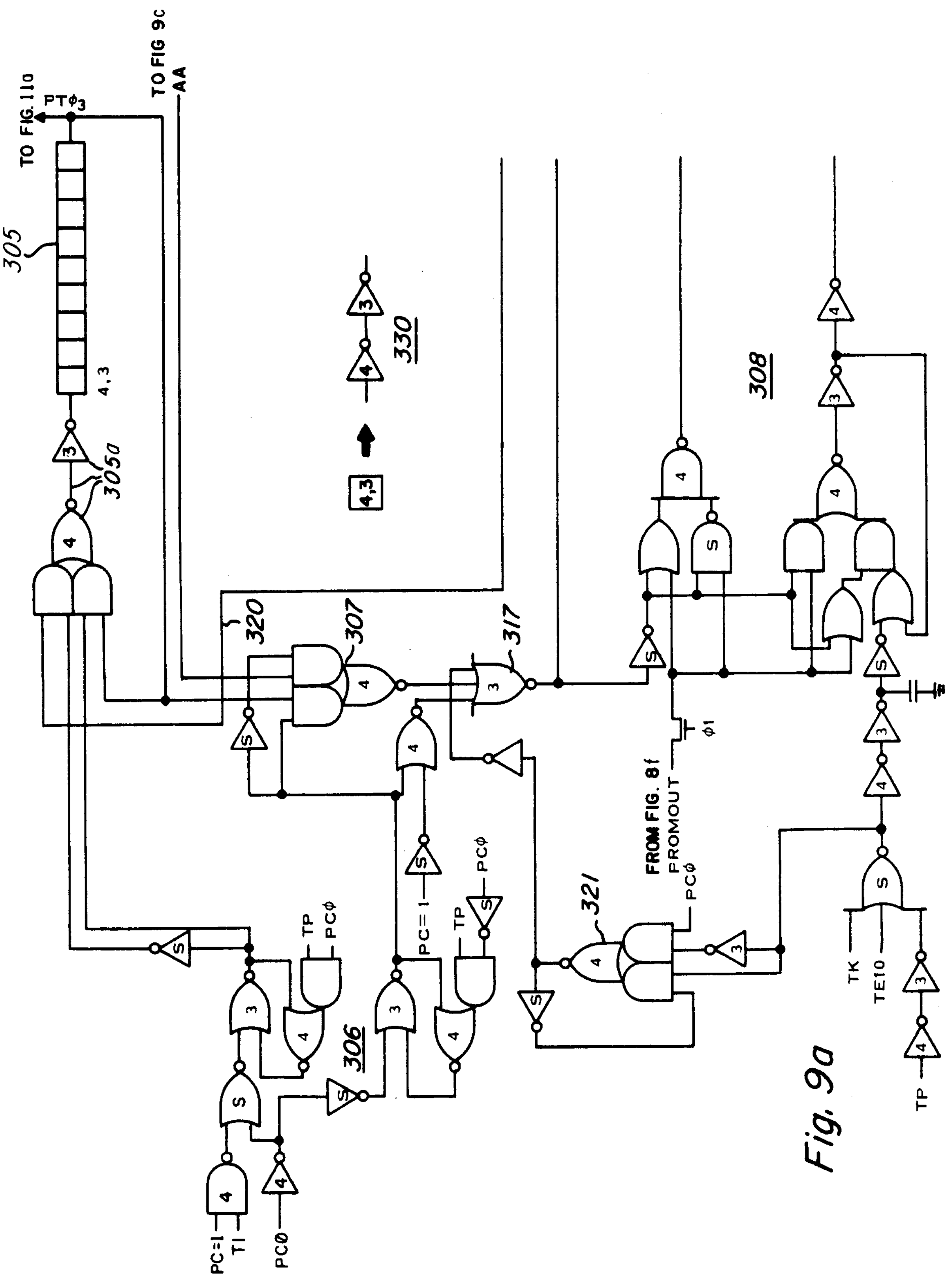
FIGS. 9*a*–9*d* form a composite logic diagram of the interpolator logics.
Figure 9B:
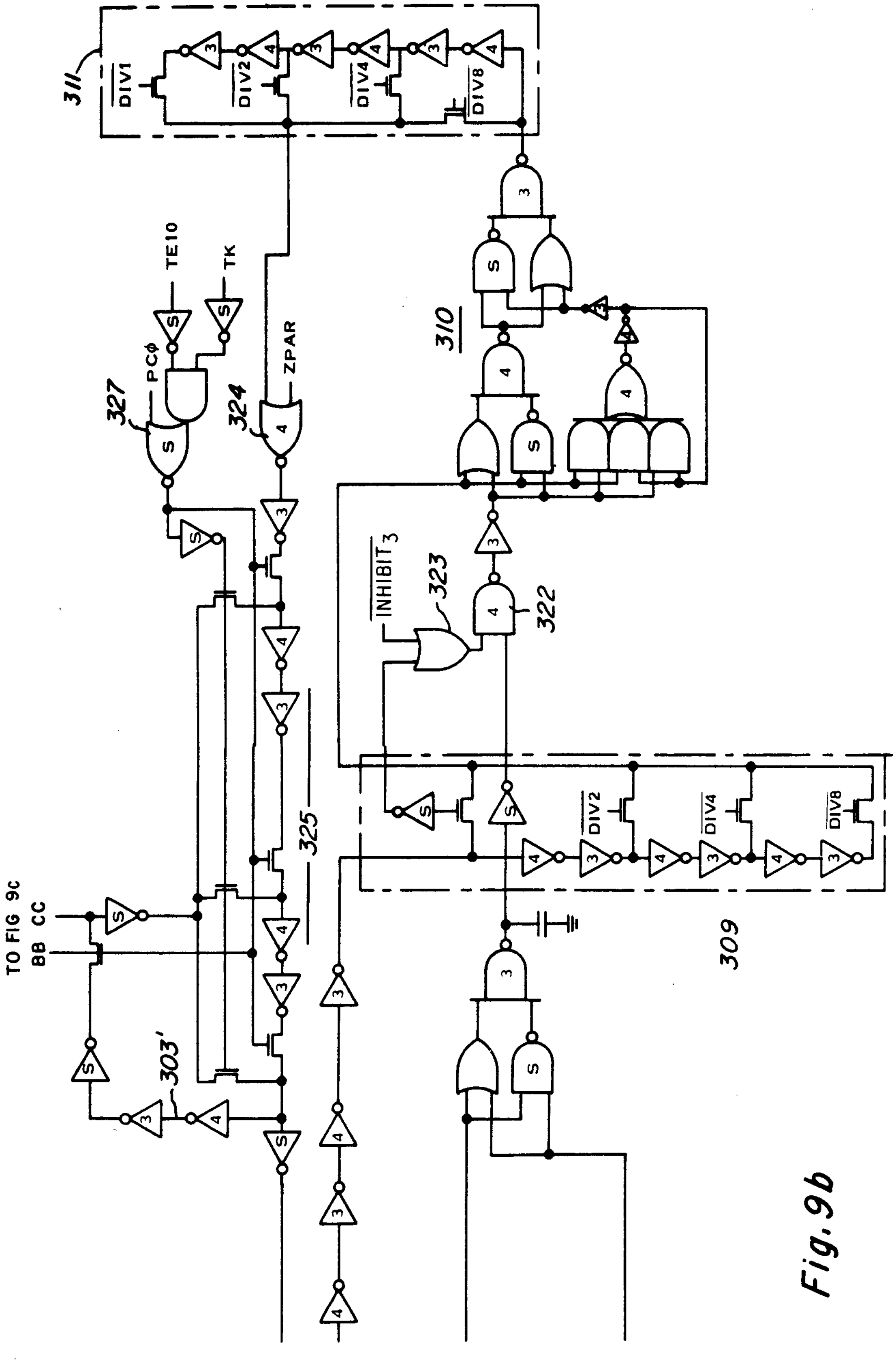
Figure 9C:
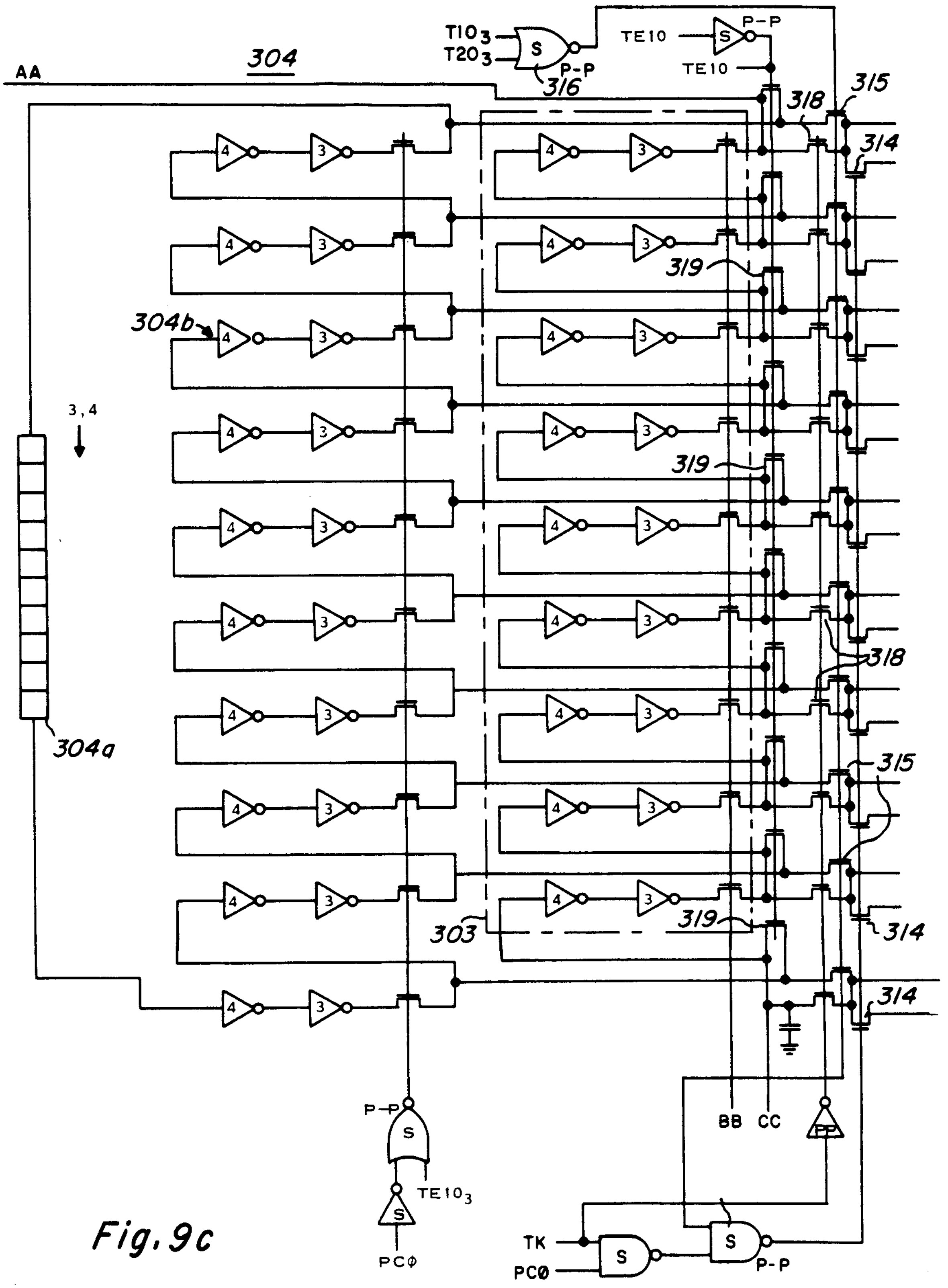

Referring now to FIGS. 9*a* and 9*b*, whic form a composite diagram the parameter interpolator logic 23 is shown in detail. K-stack 302 comprises ten registers each of which store ten bits of information. Each small square represents one bit of storage, according to the convention depicted at numeral 330. The contents of each shift register is arranged to recirculate via recirculation gates 314 under control of a recirculation control gate 315. K-stack 302 stores speech coefficients K1–K9 and temporarily stores coefficient K10 or the energy parameter generally in accordance with the speech synthesis apparatus of FIG. 7 of U.S. Pat. No. 4,209,844. The data outputted from K-stack 302 to recoding logic 301 at various time periods is shown in Table VII. In Table III of U.S. Pat. No. 4,209,844 is shown the data outputted from the K-stack of FIG. 7 thereof. Table VII of this patent differs from Table III of the aforementioned patent because of (1) recoding logic 301 receives the same coefficient on lines 32-1 through 32-4, on lines 32-5 and 32-6, on lines 32-7 and 32-8 and on lines 32-9 and 32-10 because, as will be seen, recoding logic 301 responds to two bits of information for each bit which was responded to by the array multiplier of the aforementioned U.S. Patent; (2) because of the difference in time period nomenclature as was previously explained with reference to FIG. 5; and (3) because of the time delay associated with the recoding logic 301.

Figure 10A:
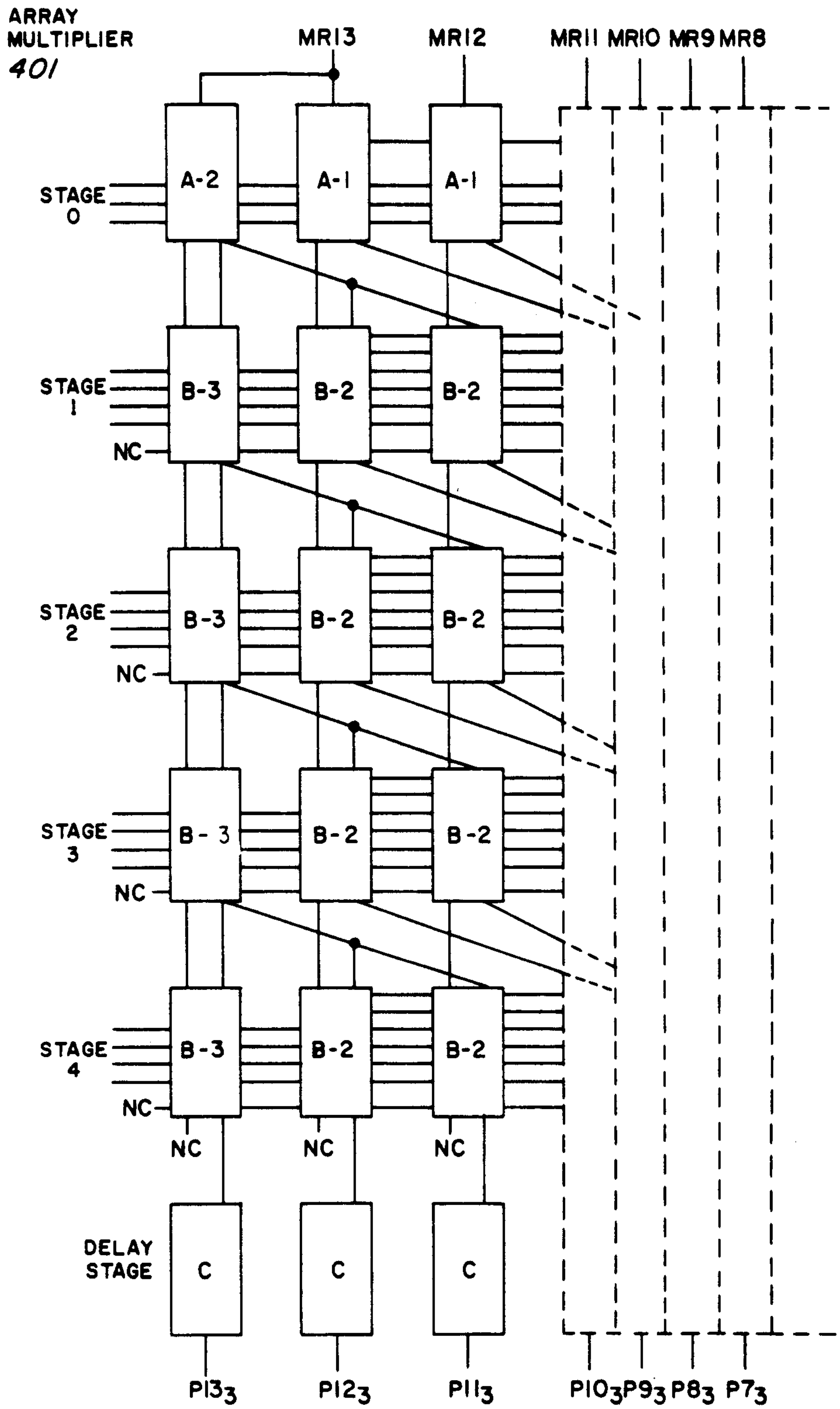
FIGS. 10*a*–10*c* form a composite logic diagram of the array multiplier.
Figure 10B:
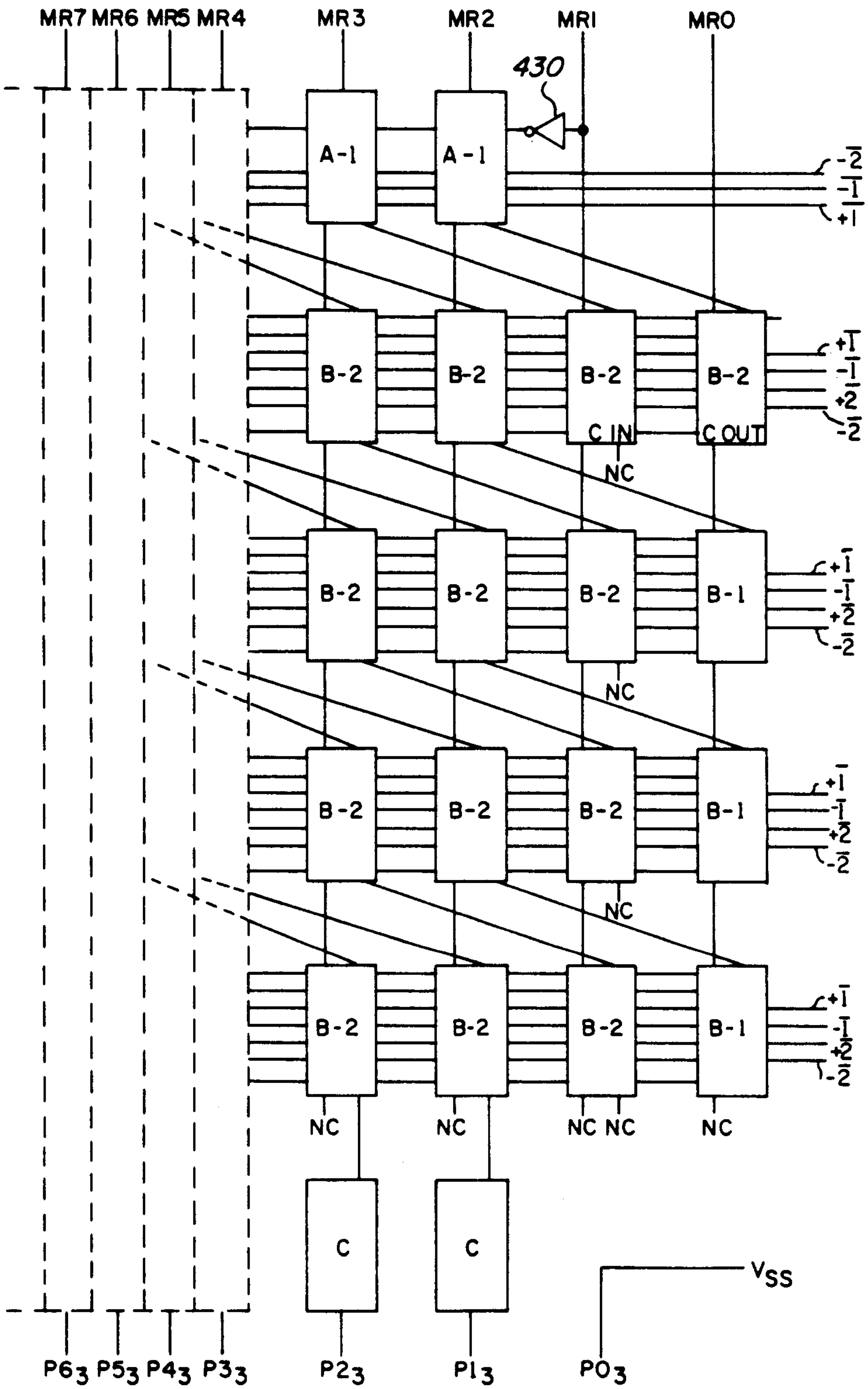
Figure 10C:
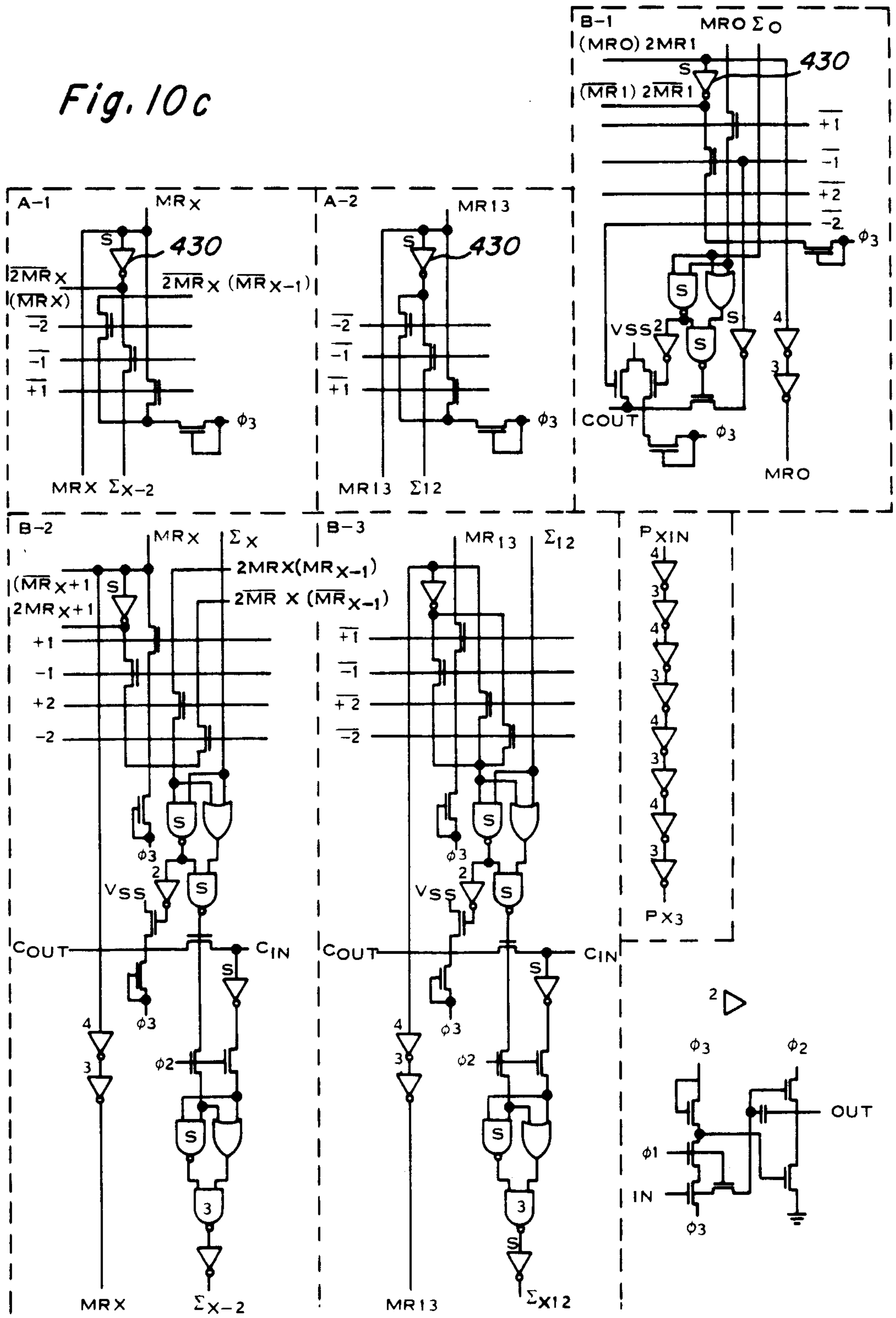

Recoding logic 301 couples K-stack 302 to array multiplier 401 (FIGS. 10*a*–10*c*). Recoding logic 301 includes four identical recoding stages 312*a*–312*d*, only one of which, 312*a*, is shown in detail. The first stage of the recoding logic, 313, differs from stages 312*a*–312*d* basically because there is, of course, no carry, such as occurs on input A in stages 312*a*–312*d*, from a lower order stage. Recoding logic outputs $\overline{+2}$, $\overline{-2}$, $\overline{+1}$ and $\overline{-1}$ to each stage of a five stage array multiplier 401, except for stage zero which receives only $\overline{-2}$, $\overline{+1}$ and −1 outputs. Effectively recoding logic 301 permits array multiplier to process, in each stage thereof, two bits in lieu of one bit of information, using Booth's algorithm. Booth's algorithm is explained in "Theory and Application of Digital Signal Processing", published by Prentice-Hall 1975, at pp. 517–18.

The K10 coefficient and energy are stored in E10 loop 304. E10 loop preferably comprises a twenty stage serial shift register; ten stages 304*a* of E10 loop 304 are preferably coupled in series and another ten stages 304*b* are also coupled in series but also have parallel outputs and inputs to K-stack 302. The appropriate parameter, either energy or the K10 coefficient, is transferred from E10 loop 304 to K-stack 302 via gates 315 which are responsive to a NOR gate 316 for transferring the energy parameter from E10 loop 304 to K-stack 302 at time period T10 and transferring coefficient K10 from E10 loop 304 to K-stack 302 at time period T20. NOR gate 316 also controls recirculation control gate 315 for inhibiting recirculation in K-stack 302 when data is being transferred.

KE10 transfer register 303 facilitates the transferring of energy or the K1–K10 speech coefficients which are stored in E10 loop 304 or K-stack 302 to subtractor 308 and delay circuit 309 via selector 307. Register 303 has nine stages provided by paired inverters and a tenth stage being effectively provided by selector 307 and gate 317 for facilitating the transfer of ten bits of information either from E10 loop 304 or K-stack 302. Data is transferred from K-stack 302 to register 303 via transfer gates 318 which are controlled by a Transfer K (TK) signal generated by decoder portion 511*b* of timing PLA 511 (FIGS. 7*a*–7*d*). Since the particular parameter to be interpolated and thus shifted into register 303 depends upon the particular parameter count in which the synthesizer is operating and since the particular parameter available to be outputted from K-stack 302 is a function of particular time period the synthesizer is operating in, the TK signal comes up at T9 for the pitch parameter, T8 for the K1 parameter, T7 for the K2 parameter and so forth, as is shown in FIGS. 7*a*–7*d*. The energy parameter or the K10 coefficient is clocked out of E10 loop 304 into register 303 via gates 319 in response to a TE10 signal generated by a timing PLA 511. After each interpolation, that is during the B cycle, data is transferred from register 303 into (1) K-stack 302 via gates 318 under control of signal TK, at which time recirculation gates 314 are turned off by gate 315, or (2) E10 loop 304 via gates 319.

A ten bit pitch parameter is stored in a pitch register 305 which includes a nine stage shift register as well as recirculation elements 305*a* which provide another bit of storage. The pitch parameter normally recirculates in register 306 via gate 305*a* except when a newly interpolated pitch parameter is being provided on line 320, as controlled by pitch interpolation control logics 306. The output of pitch 305 (PT0) or the output from register 303 is applied by selector 307 to gate 317. Selector 307 is also controlled by logics 306 for normally coupling the output of register 303 to gate 317 except when the pitch is to be interpolated. Logics 306 are responsive for outputting pitch subtractor 308 and delay 309 during the A cycle of PC=1 and for returning the interpolated pitch value on line 320 on the B cycle of PC=1 to register 305. Gate 317 is responsive to a latch 321 for only providing pitch, energy or coefficient information to subtractor 308 and delay circuit 309 during the interpolation. Since the data is serially clocked, the information may be started to be clocked during an A portion and PC0 may switch to a logical one sometime during the transferring of the information from register 303 or 305 to subtractor 308 or delay circuit 309, and therefore, gate 317 is controlled by an A cycle latch 321, which latch is set with PC0 at the time a transfer coefficient (TK) transfer E10 (TE10) or transfer pitch (TP) signal is generated by timing PLA 511.

Figure 7A:
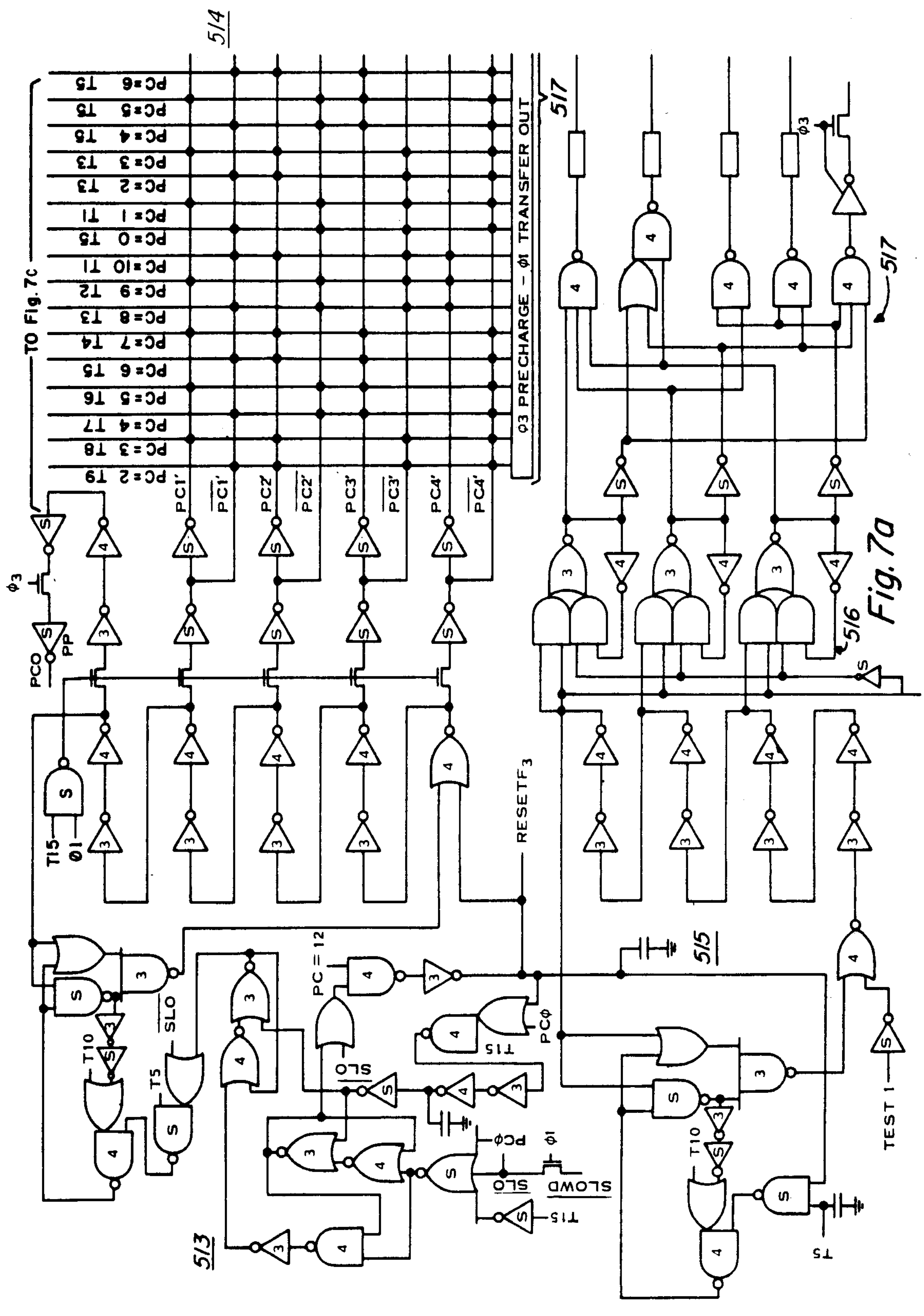
FIGS. 7*a*–7*d* form a composite logic diagram of the synthesizer's timing circuits.

The output of gate 317 is applied to subtractor 308 and delay circuit 309. The delay in delay circuit 309 depends on the state of DIV1–DIV8 signals generated by interpolation counter 515 (FIG. 7*a*). Since the data exits gate 317 with the least significant bit first, by delaying the data in delay circuit 309 a selective amount, and applying the output to adder 310 along with the output of subtractor 308, the more delay there is in circuit 309, the smaller the effective magnitude of the difference from subtractor 308 which is subsequently added back in by adder 310. Delay circuit 311 couples adder 310 back into registers 303 and 305. Both delay circuits 309 and 311 can insert up to three bits of delay and when delay circuit 309 is at its maximum, delay circuit 311 is at its minimum delay and vice-versa. A NAND gate 322 couples the output of subtractor 308 to the input of adder 310. Gate 322 is responsive to the output of an OR gate 323 which is in turn responsive to INHIBIT from inverter 236 (FIGS. 8*c* and 9*b*). Gates 322 and 323 act to zero the output from subtractor 308 when the INHIBIT signal comes up unless the interpolation counter is at IC0 in which case the present values in K-stack 302, E10 loop 304 and pitch register 305 are fully interpolated to their new target values in a one step interpolation. When an unvoiced frame (FIG. 6) is supplied to the speech synthesis chip, coefficients K5–K10 are set to zero by the action of gate 324 which couples delay circuit 311 to shift register 325 whose output is then coupled to gates 305*a* and 303'. Gate 324 is responsive to the zero parameter (ZPAR) signal generated by gate 237 (FIGS. 8*c* and 9*b*).

Gate 326 disables shifting in the 304*b* portion of E10 loop 304 when a newly interpolated value of energy or K10 is being inputted into portion 304*b* from register 303. Gate 327 controls the transfer gates coupling the stages of register 303, which stages are inhibited from serially shifting data therebetween when TK or TE10 goes high during the A cycle, that is, when register 303 is to be receiving data from either K-stack 302 or E10 loop 304 as controlled by transfer gates 318 or 319, respectively. The output of gates 327 is also connected to various stages of shift register 325 and to a gate coupling 303' with register 303. Whereby up top the three bits which may trail the ten most significant bits after an interpolation operation may be zeroed.

Array Multiplier Logic Diagram

FIGS. 10*a*–10*c* form a composite logic diagram of array multiplier 401. Array multipliers are sometimes referred to as Pipeline Multipliers. For example, see "Pipeline Multiplier" by Granville E. Ott, published by the University of Missouri.

Figure 9D:
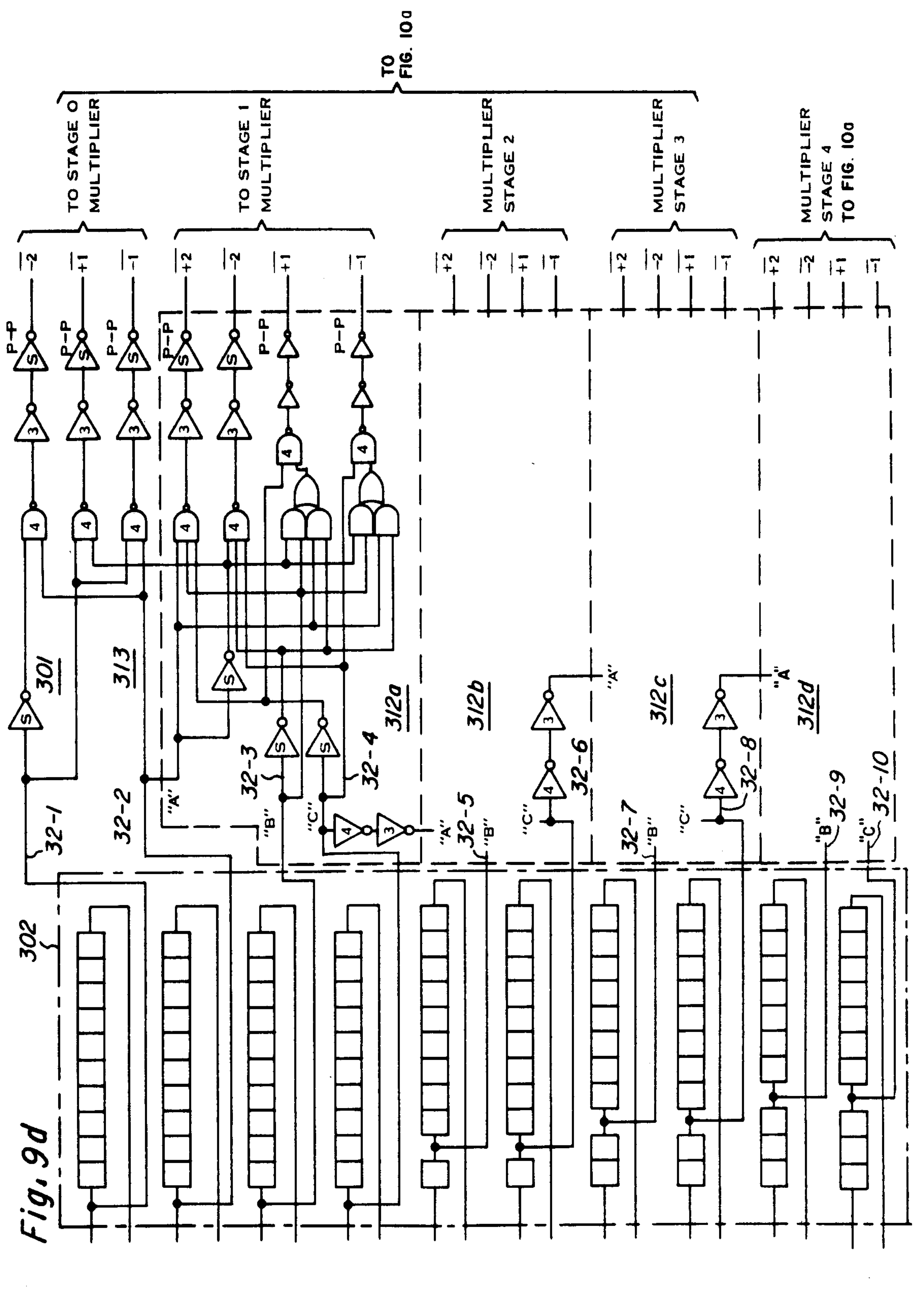

Array multiplier 401 has five stages, stage 0 through stage 4, and a delay stage. The delay stage is used in array multiplier 401 to give it the same equivalent delay as the array multiplier shown in U.S. Pat. No. 4,209,844. The input to array multiplier 401 is provided by signals $MR_0$–$MR_{13}$, from multiplier multiplexer 415. $MR_{13}$ is the most significant bit while $MR_0$ is the least significant bit. Another input to array multiplier are the aforementioned +2, −2, +1 and −1 outputs from recoding logic 301 (FIG. 9*d*). The output from array multiplier 401, $P_{13}$–$P_0$, is applied to summer multiplexer 402. The least significant bit thereof, P0, is in this embodiment always made a logical one because doing so establishes the mean of the truncation error as zero instead of $-\frac{1}{2}$ LSB which value would result from a simple truncation of a two's complement number.

Array multiplier 401 is shown by a plurality of box elements labeled A-1, A-2, B-1, B-2, B-3 or B-C. The specific logic elements making up these box elements are shown in FIG. 10*c* in lieu of repetitively showing these elements and making up a logic diagram of array multiplier 401, for simplicity sake. The A-1 and A-2 block elements make up stage zero of the array multiplier and thus are each responsive to the $\overline{-2}$, $\overline{+1}$ and $\overline{-1}$ signals outputted from decoder 313 and are further responsive to MR2–MR13. When multiplies occur in array multiplier 401, the most significant bit is always maintained in the left most column elements while the partial sums are continuously shifted toward the right. Inasmuch as each stage of array multiplier 401 operates on two binary bits, the partial sums, labeled $\rho n$, are shifted to the right two places. Thus no A type blocks are provided for the MR0 and MR1 data inputs to the first stage. Also, since each block in array multiplier 401 is responsive to two bits of information from K-stack 302 received via recording logic 301, each block is also responsive to two bits from multiplier multiplexer 415, which bits are inverted by inverters 430, which bits are also supplied in true logic to the B type blocks.

Filter and Excitation Generator Logic Diagram

FIGS. 11*a*–11*d* form a composite, detailed logic diagram of lattice filter and excitation generator 24 (other than array multiplier 401) and output section 25. In filter and excitation generator 24 is a summer 404 which is connected to receive at one input thereof either the true or inverted output of array multiplier 401 (see FIGS. 10*a*–10*c*) on lines P0–P13 via summer multiplexer 402. The other input of adder 404 is connected via summer multiplexer 402 to receive either the output of adder 404 (at T10–T18), the output of delay stack 406 on lines 440–453 at T20–T7 and T9), the output of Y-latch 403 (at T8) or a logical zero from Φ3 precharge gate 420 (at T19 when no conditional discharge is applied to this input). The reasons these signals are applied at these times can be seen from FIG. 8 of the aforementioned U.S. Pat. No. 4,209,844; it is to be remembered of course, that the time period designations differ as discussed with reference to FIG. 5 hereof.

The output of adder 404 is applied to delay stack 406, multiplier multiplexer 415, one period delay gates 414 and summer multiplexer 402. Multiplier multiplexer 415 includes one period delay gates 414 which are generally equivalent to one period delay 34' of FIG. 7 in U.S. patent application Ser. NO. 807,461. Y-latch 403 is connected to receive the output of delay stack 406. Multiplier multiplexer 415 selectively applies the output from Y-latch 403, one period delay gates 414, or the excitation signal on bus 415' to the input MR0–MR13 of array multiplier 401. The inputs D0–D13 to delay stack 406 are derived from the outputs of adder 404. The logics for summer multiplexer 402, adder 404, Y-latch 403, multiplier multiplexer 415 and one period delay circuit 414 are only shown in detail for the least significant bit as enclosed by dotted line reference A. The thirteen most significant bits in the lattice filter also are provided by logics such as those enclosed by the reference line A, which logics are denoted by long rectangualr phantom line boxes labeled "A". The logics for each parallel bit being processed in the lattice filter are not shown in detail for sake of clarity. The portions of the lattice filter handling bits more significant than the least significant bit differ from the logic shown for elements 402, 403, 404, 415, and 414 only with respect to the interconnections made with truncation logics 425 and bus 415' which connects to UV gate 408 and chirp ROM 409. In this respect, the output from UV gate 408 and chirp ROM 409 is only applied to inputs I13–I6 and therefore the input labeled $I_x$ within the reference A phantom line is not needed for the six least significant bits in the lattice filter. Similarly, the output from the Y-latch 403 is only applied for the ten most significant bits, $YL_{13}$ through $YL_4$, and therefore the connection labeled $YL_X$ within the reference line A is not required for the four least significant bits in the lattice filter.

Delay stack 406 comprises 14 nine bit long shift registers, each stage of which comprise inverters clocked on Φ4 and Φ2 clocks. As is discussed in U.S. Pat. No. 4,209,844, the delay stack 406 which generally corresponds to shift register 35' of FIG. 7 of the aforementioned patent, is only shifted on certain time periods. This is accomplished by logics 416 whereby Φ1B–Φ4B clocks are generated from T10–T18 timing signal from PLA 512 (FIGS. *7a-7d*). The clock buffers 417 in circuit 416 are also shown in detail in FIG. 11*c*.

Delay stack 406 is nine bits long whereas shift register 35' in FIG. 7 of U.S. Pat. No. 4,209,844 was eight bits long; this difference occurs because the input to delay stack 406 is shown as being connected from the output of adder 404 as opposed to the output of one period delay circuit 414. Of course, the input to delay stack 406 could be connected from the outputs of one period delay circuit 414 and the timing associated therewith modified to corespond with that shown in U.S. Pat. No. 4,209,844.

The data handled in delay stack 406, array multiplier 401, adder 404, summer multiplexer 402, Y-latch 403, and multiplier multiplexer 415 is preferably handled in two's complement notation.

Unvoiced generator 407 is a random noise generator comprising a shift register 418 with a feedback term supplied by feedback logics 419 for generating pseudorandom terms in shift register 418. An output is taken therefrom and is applied to UV gate 408 which is also responsive to OLDP from latch 208*d* (FIG. 8*c*). Old pitch latch 208*d* controls gate 408 because pitch=0 latch 208*b* changes state immediately when the new speech parameters are inputted to register 205. However, since this occurs during interpolation count ICO and since, during an unvoiced condition the new values are not interpolated into K-stack 302, E10 loop 304 and pitch register 305 until the following ICO, the speech excitation value cannot change from a periodic excitation from chirp ROM 409 to a random excitation from unvoiced generator 407 until eight interpolation cycles have occurred. Gate 402 nors the output of gate 408 into the most significant bit of the excitation signal, $I_{13}$, thereby effectively causing the sign bit to randomly change during unvoiced speech. Gate 421 effectively forces the most significant bit of the excitation signal, $I_{12}$, to a logical one during unvoiced speech conditions. Thus the combined effect of gates 408, 420 and 421 is to cause a randomly changing sign to be associated with a steady decimal equivalent value of 0.5 to be applied to the lattice filter and Filtering Excitation Generator 24.

Figure 14A:
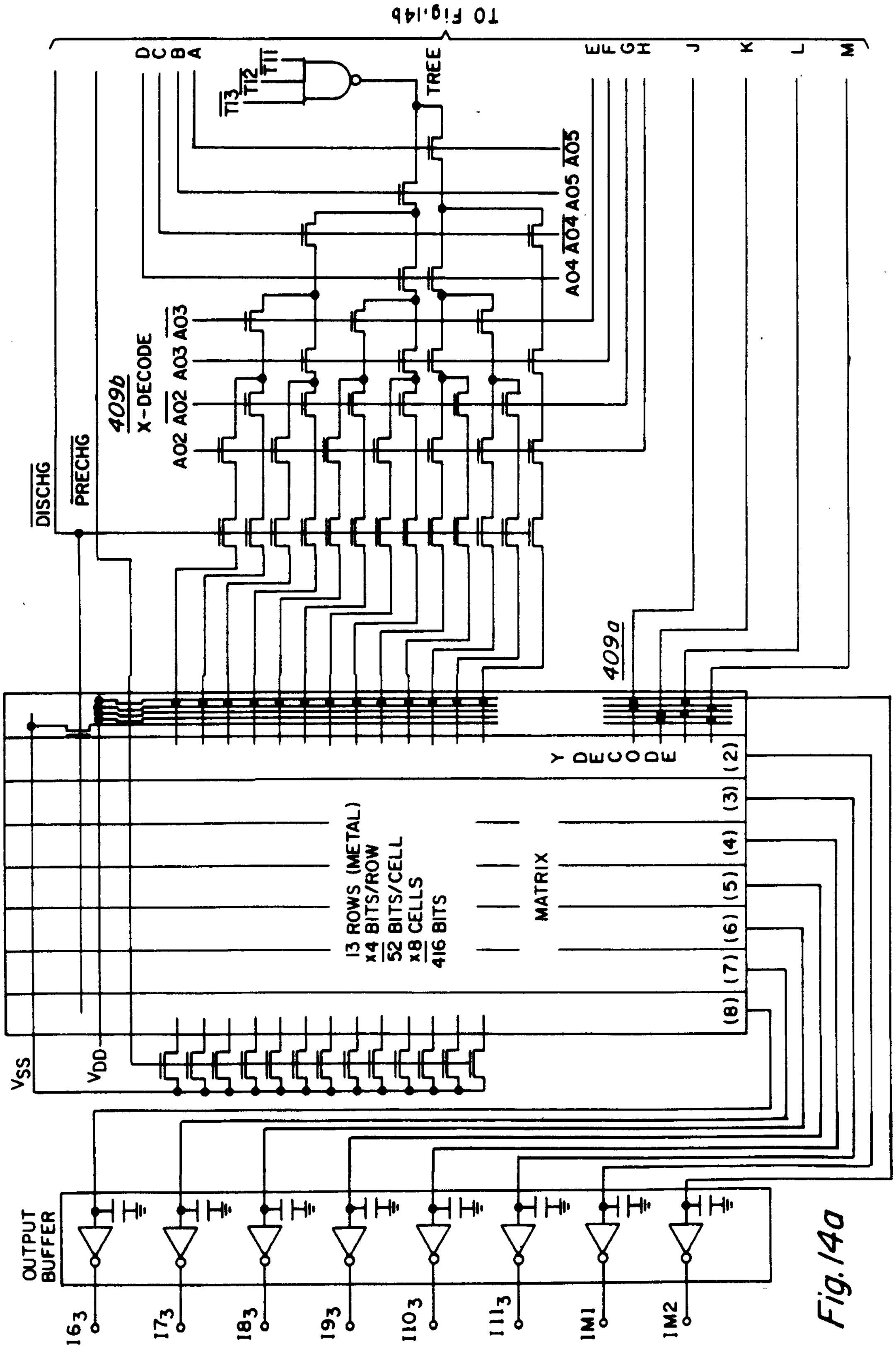
FIGS. 14*a*–14*b* form a composite diagram of the chirp ROM.
Figure 14B:
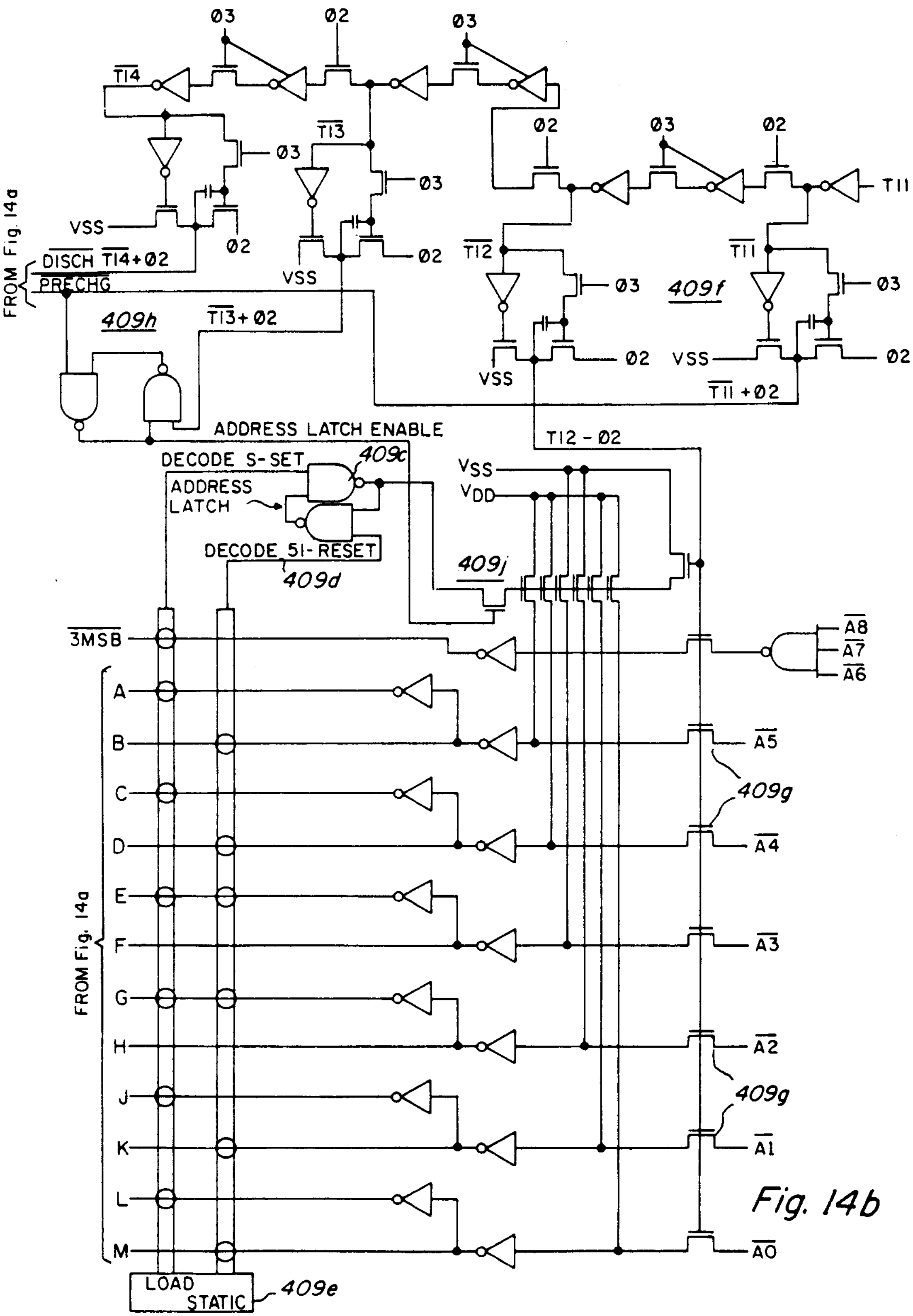

During voiced speech, chirp ROM 409 provides an eight bit output on lines $I_6$–$I_{13}$ to the lattice filter. This output comprises forty-one successively changing values which, when graphed, represent a chirp function. The contents of ROM 409 are listed in Table VIII; ROM 409 is set up to invert its outputs and thus the data is stored therein in complemented format. The chirp function value and the complemented value stored in the chirp ROM are expressed in two's complement hexadecimal notation. ROM 409 is addressed by an eight bit register 410 whose contents are normally updated during each cycle through the lattice filter by add one circuit 411. The output of register 410 is compared with the contents of pitch register 305 in a magnitude comparator 403 for zeroing the contents of 410 when the contents of register 410 become equal to or greater than the contents of register 305. ROM 409, which is shown in greater detail in FIGS. 14*a*–14*b*, is arranged so that addresses greater than 110010 cause all zeroes to be outputted on lines $I_{13}$–$I_6$ to multiplier multiplexer 415. Zeros are also stored in address locations 41–51. Thus, the chirp may be expanded to occupy up to address location fifty, if desired.

Random Access Memory Logic Diagram

Figures 12A, 12B:
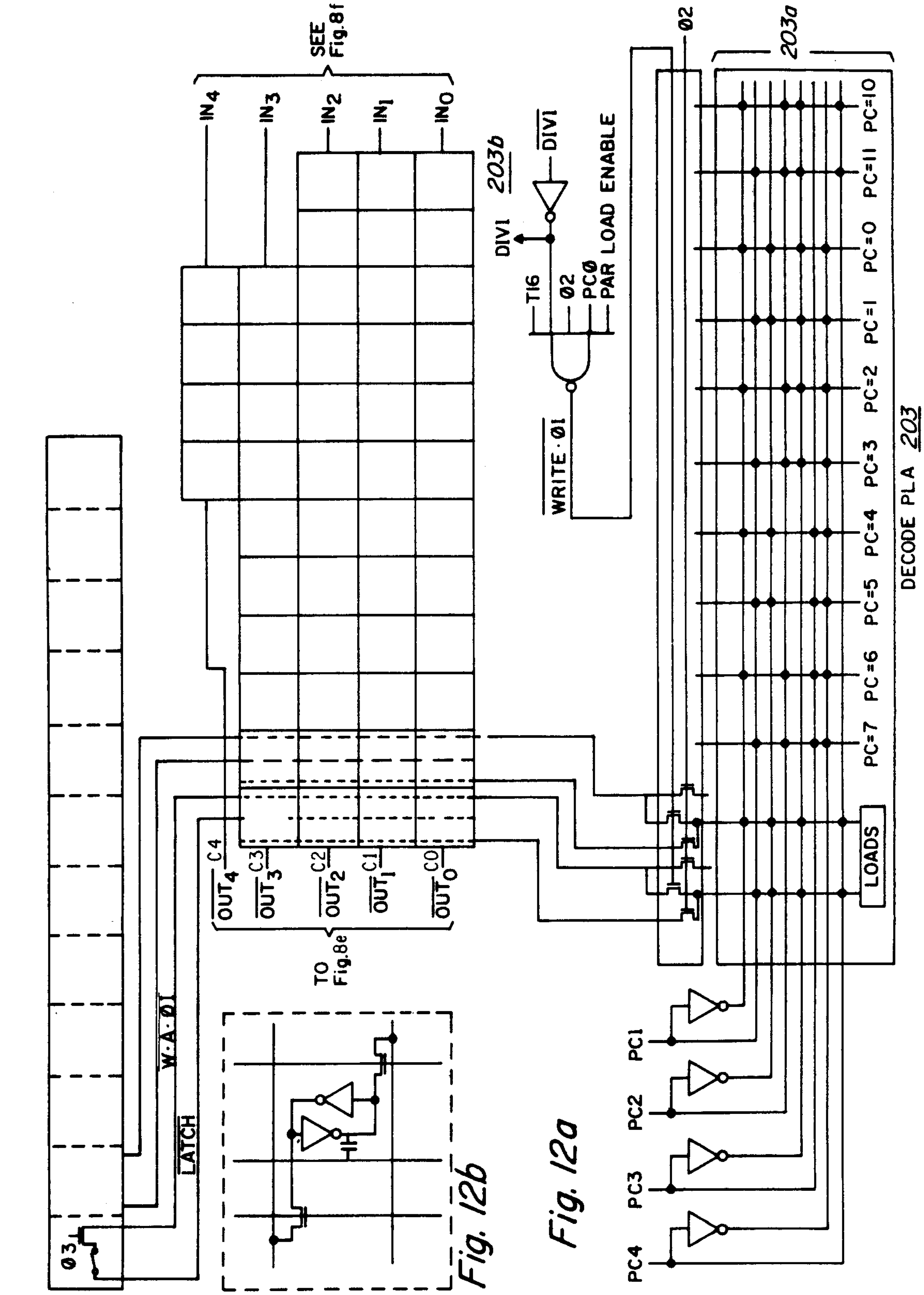
FIGS. 12*a* and 12*b* are schematic diagrams of the parameter RAM.

Referring now to FIGS. 12*a*–12*b*, there is shown a composite detailed logic diagram of RAM 203. RAM 203 is addressed by address on PC1-PC4, which address is decoded in a PLA 203*a* and defines which coded parameter is to be inputted into RAM 203. RAM 203 stores the twelve decoded parameters, the parameters having bit lengths varing between three bits and five bits according to the decoding scheme described with reference to FIG. 6. Each cell, reference B, of RAM 203 is shown in greater detail in FIG. 12*b*. Read/Write control logic 203*b* is responsive to T1, DIV1, PCO and parameter load enable for writing into the RAM 203 during the A cycle of each parameter count during interpolation count zero when enabled by parameter load enable from logics 238 (FIG. 8*c*). Data is inputted to RAM 203 on lines INO-IN4 from register 205 as shown in FIGS. 8*c* and 8*f* and data is outputted on lines CO–C4 to ROM 202 as is shown in FIGS. 8*f* and 9*e*.

Parameter Read-Only-Memory Logic Diagram

Figure 13A:
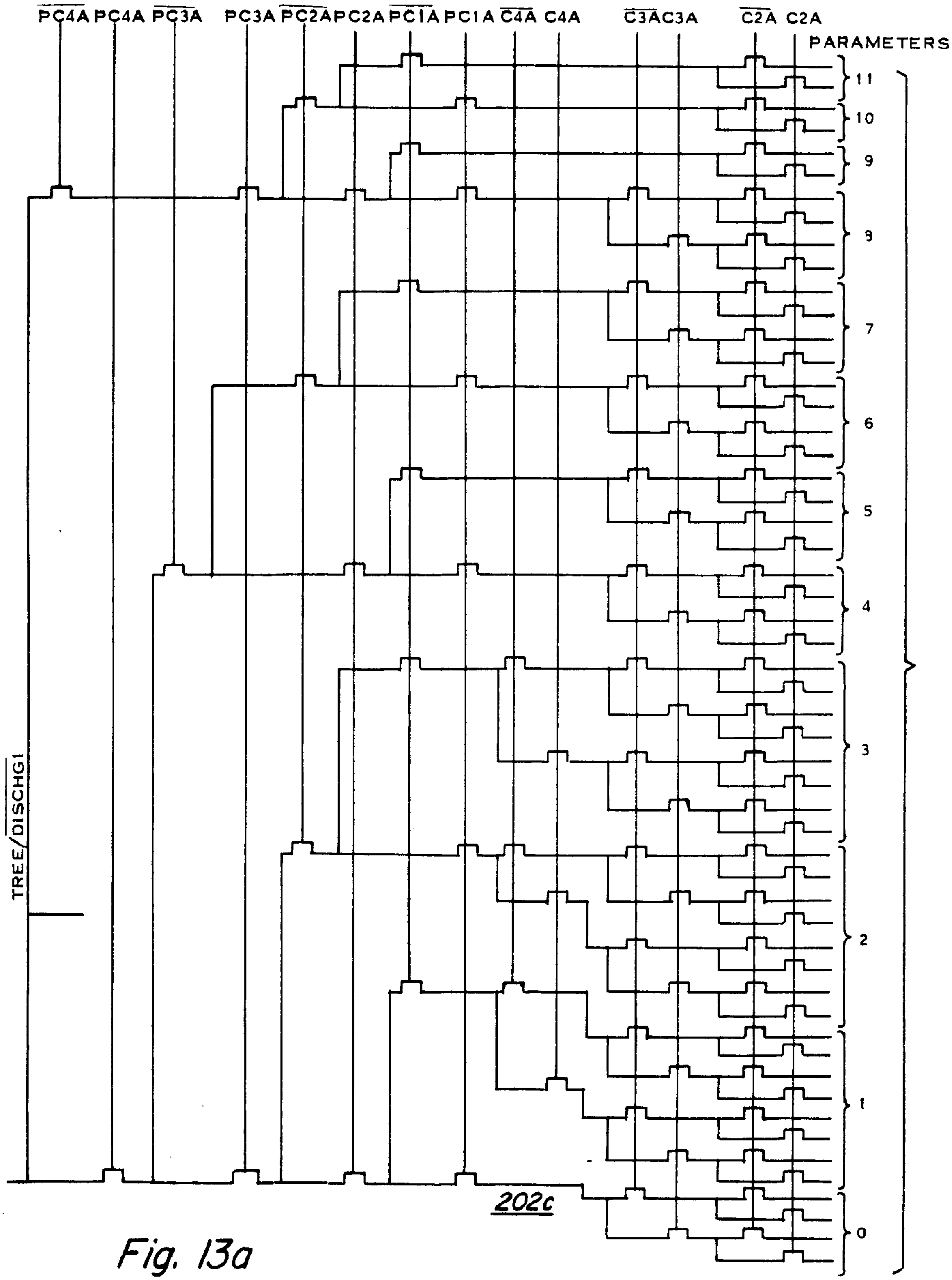
FIGS. 13*a*–13*c* are schematic diagrams of the parameter ROM.
Figure 13B:
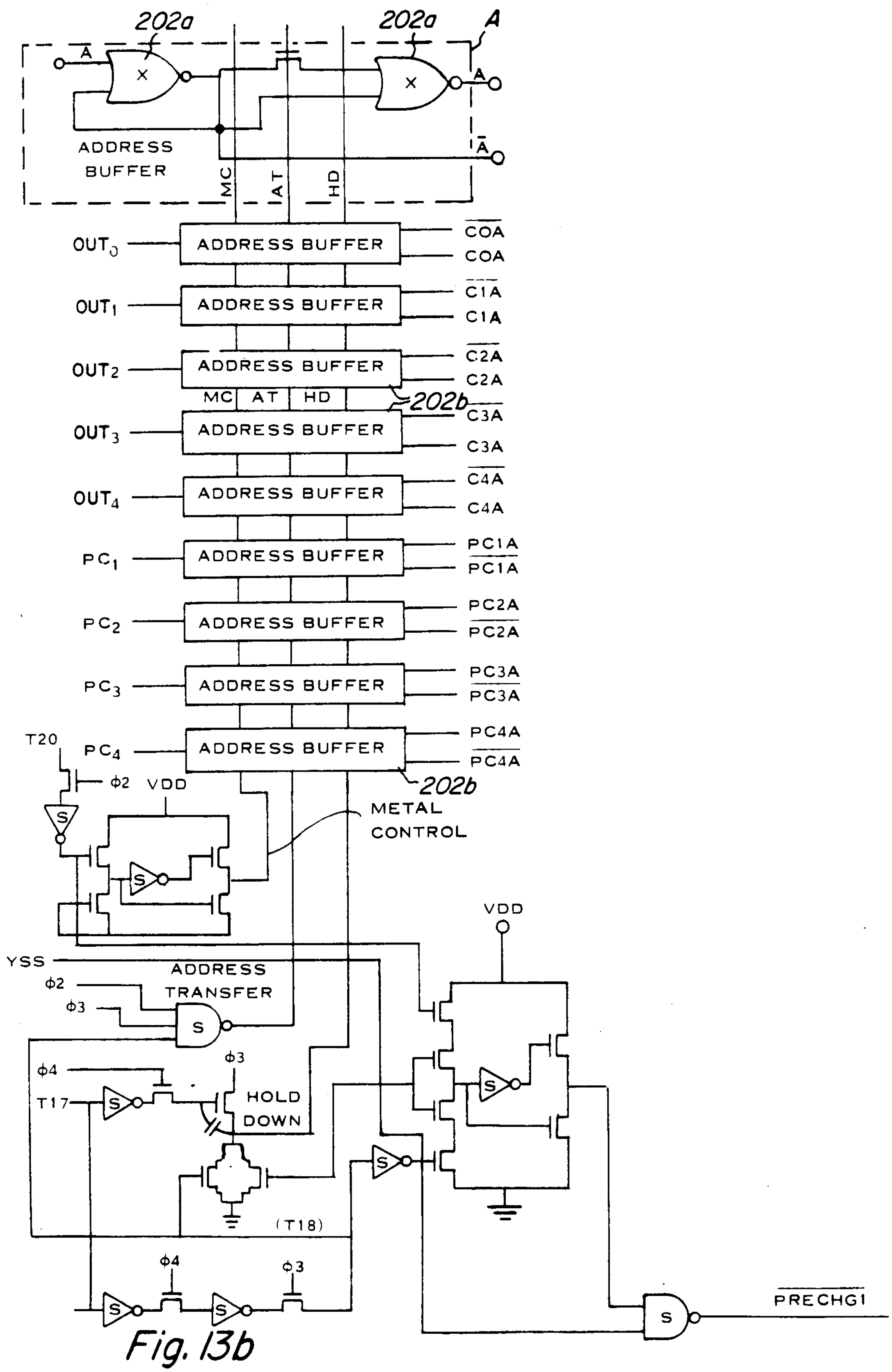
Figure 13C:
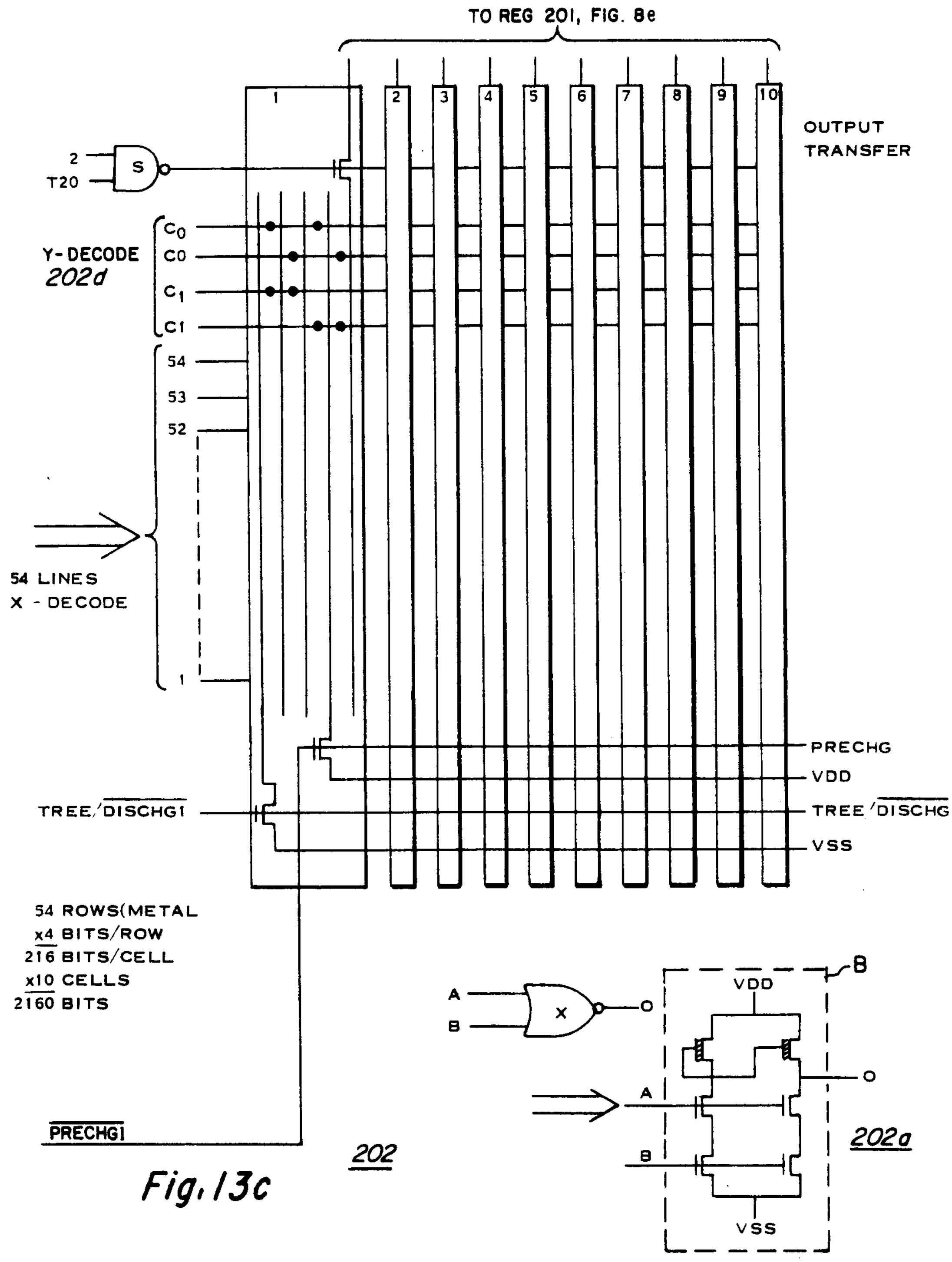

In FIGS. 13*a*–13*c*, there is shown a logic diagram of ROM 202. ROM 202 is preferably a virtual ground ROM of the type disclosed in U.S. Pat. No. 3,934,233. Address information from ROM 202 and from parameter counter 513 are applied to address buffers 202*b* which are shown in detail at reference A. The NOR gate 202*a* used in address buffers 202*b* are shown in detail at reference B. The outputs of the address buffers 202*b* are applied to an X-decoder 202*c* or to a Y-decoder 202*d*. The ROM is divided into ten sections labeled reference C, one of which is shown in greater detail. The outline for output line from each of the sections is applied to register 201 via inverters as shown in FIGS. 8*e* and 8*f*. X-decoder selects one of fifty-four X-decode lines while Y-decoder 202*d* tests for the presence or nonpresence of a transistor cell between an adjacent pair of diffusion lines, as is explained in greater detail in the aforementioned U.S. Pat. No. 3,934,233. The data preferably stored in ROM 202 of this embodiment is listed in Table VI.

Chirp Read-Only-Memory Logic Diagram

Figure 11A:
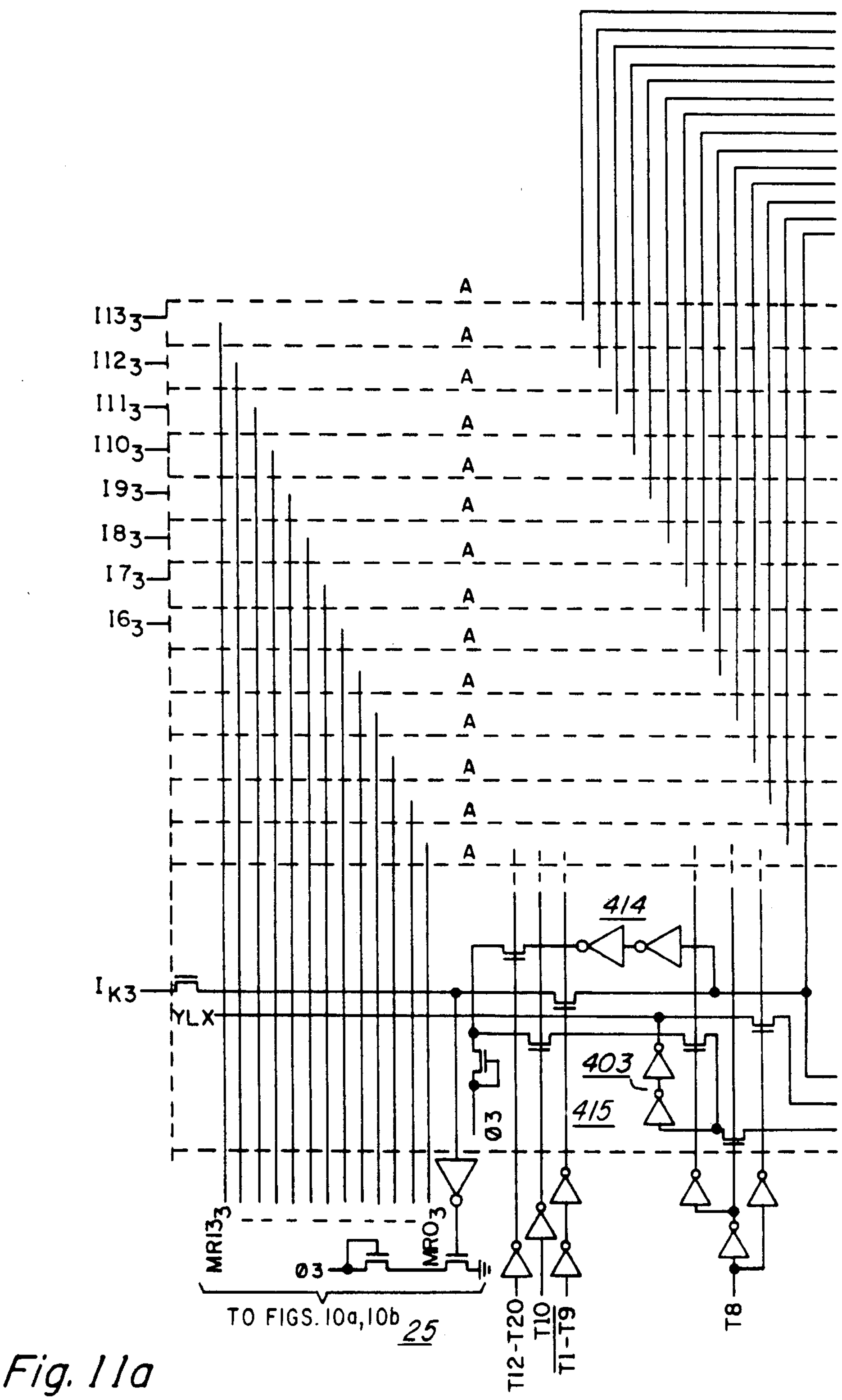
FIGS. 11*a*–11*d* form a composite logic diagram of the speech synthesizer's lattice filter and excitation generator.
Figure 11B:
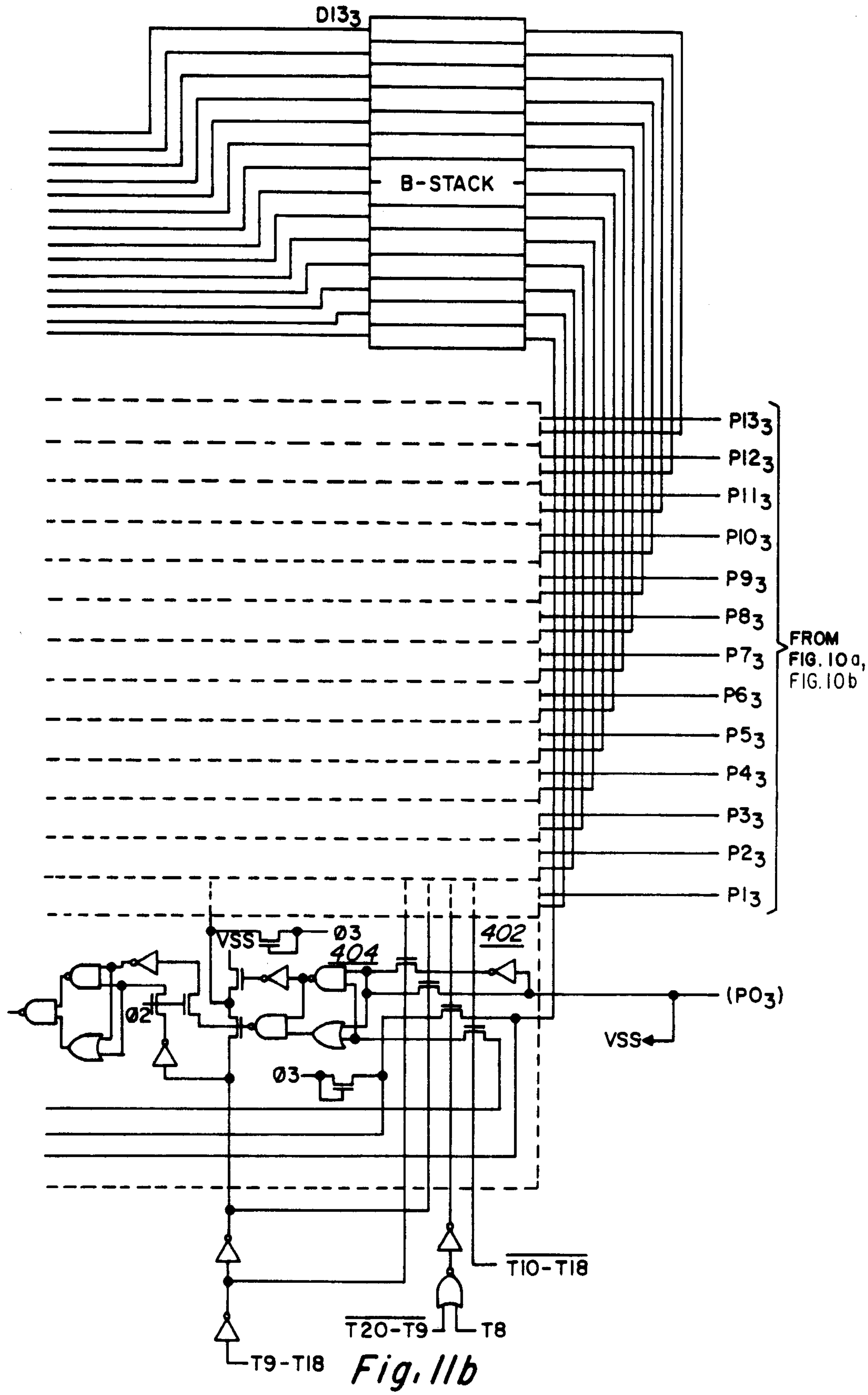
Figure 11C:
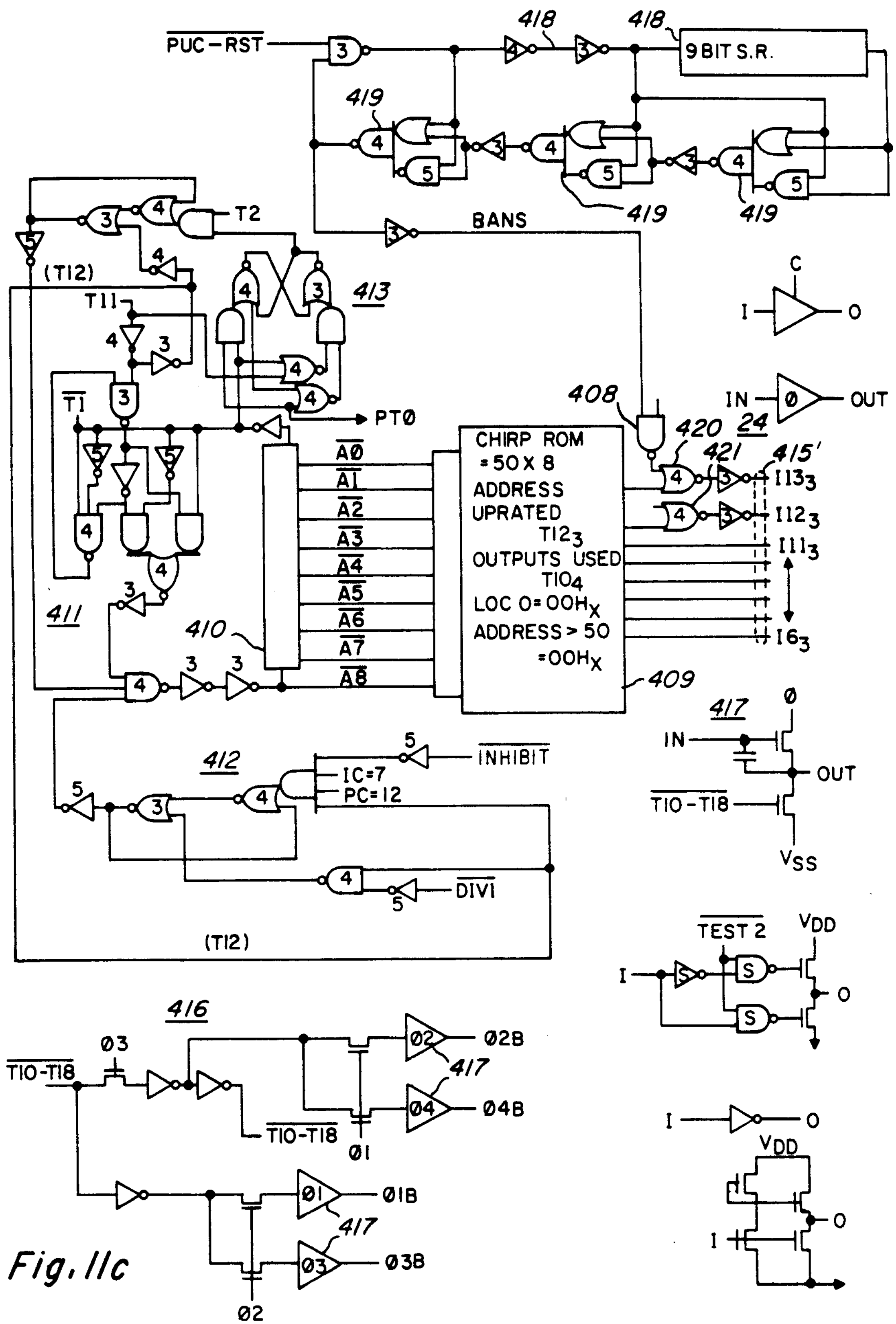
Figure 11D:
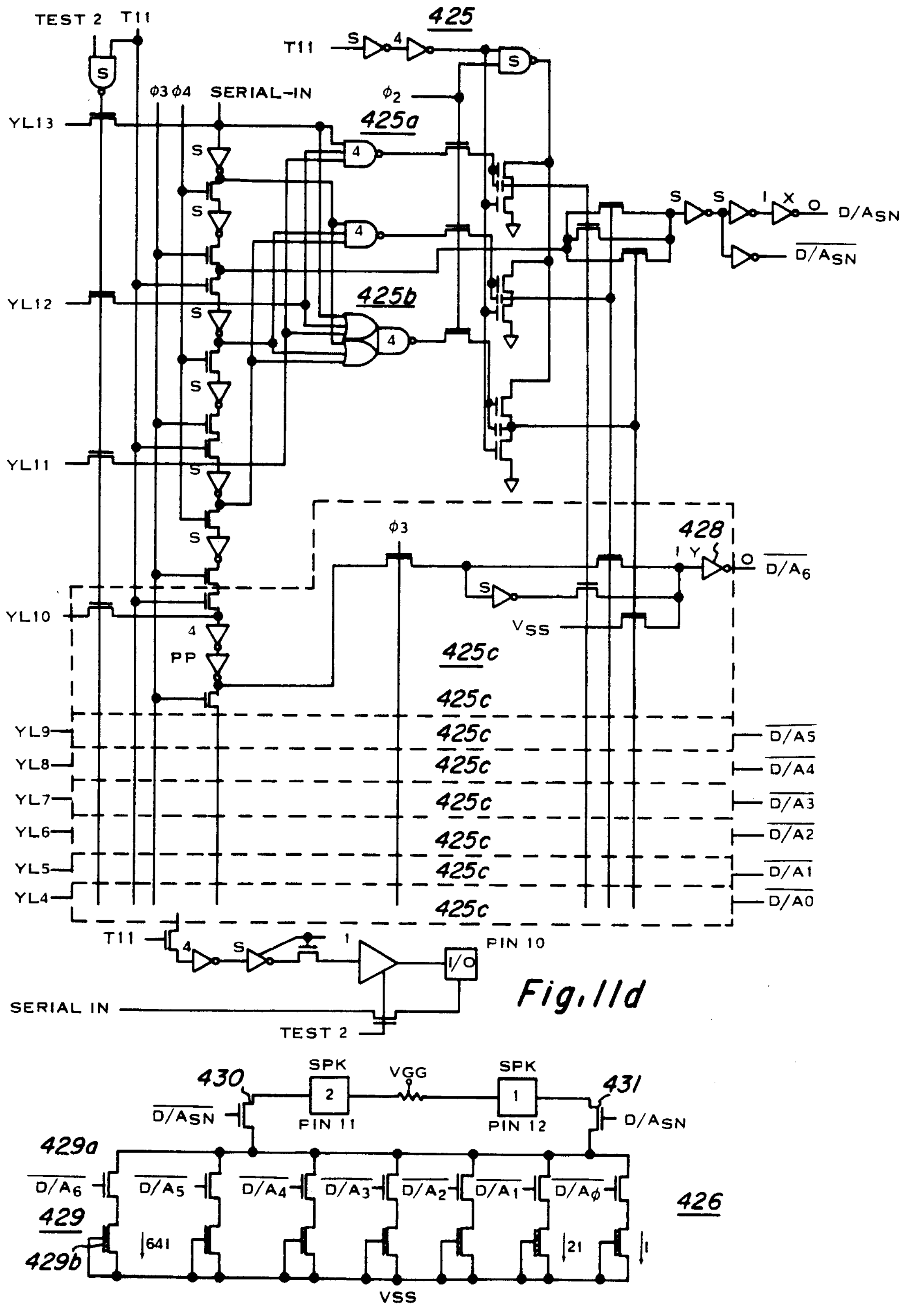

FIGS. 14*a*–14*b* form a composite diagram of chirp ROM 409. ROM 409 is addressed via address lines $\overline{A_0}$–$\overline{A_8}$ from register 410 (FIG. 11*c*) and output information on lines $I_6$–$I_{11}$ to multiplier multiplexer 415, and lines $I_{m1}$ and $I_{m2}$ to gates 421 and 420, all which are shown in FIGS. 11*a*–11*c*. As was previously discussed with reference to FIGS. 11*a*–11*d*, chirp ROM outputs all zeros after a predetermined count is reached in register 410, which, in this case is the count equivalent to a decimal 51. ROM 409 includes a Y-decoder 409*a* which is responsive to the address on lines $\overline{A_0}$ and $\overline{A_1}$ (and $A_0$ and $A_1$) and an X-decoder 409*b* which is responsive to the address on lines $\overline{A_2}$ through $\overline{A_5}$ (and $A_2$–$A_5$).

ROM 409 also includes a latch 409*c* which is set when decimal 51 is detected on lines $\overline{A_0}$–$\overline{A_5}$ according to line 409*c* from a decoder 409*e*. Decoder 409*e* also decodes a logical zero on lines $\overline{A_0}$–$\overline{A_8}$ for resetting latch 409*c*.

ROM 409 includes timing logics 409$F$ which permit data to be clocked in via gates 409$g$ at time period T12. At this time decoder 409$e$ checks to determine whether either a decimal 0 or decimal 51 is occurring on address lines $\overline{A_0}$–$\overline{A_8}$. If either condition occurs, latch 409$c$, which is a static latch, is caused to flip.

In address latch 409$h$ is set at time period T13 and reset at time period T11. Latch 409$h$ permits latch 409$c$ to force a decimal 51 onto lines $\overline{A_0}$–$\overline{A_5}$ when latch 409$c$ is set. Thus, for addresses greater than 51 address register 410, the address is first sampled at time period T12 to determine whether it has been reset to zero by reset logic 412 (FIG. 11$c$) for the purpose of resetting latch 409$c$ and if the address has not been reset to zero then whatever address has been inputted on lines $\overline{A_0}$–$\overline{A_8}$ is written over by logics 409$j$ at T13. Of course, at location 51 in ROM 409 will be stored all zeros on the output lines I6–I11, IM1 and IM2. Thus by the means of logics 409$c$, 409$h$ and 409$j$ addresses of a preselected value, in this case a decimal 51, are merely tested to determine whether a reset has occurred but are not permitted to address the array of ROM cells via decoders 409$a$ and 409$b$. Addresses between a decimal 0 and 50 address the ROM normally via decoders 409$a$ and 409$b$. The ROM matrix is preferably of the virtual ground type described in U.S. Pat. No. 3,934,233. As aforementioned, the contents of ROM 409 are listed in Table VIII. The chirp function is located at addresses 00–40 while zeros are located at addresses 41–51.

Truncation Logic and Digital-To-Analog Converter

Turning again to FIGS. 11$a$–11$d$, the truncation logic 425 and Digital-to-analog (D/A) converter are shown in detail. Truncation logic 425 includes circuitry for converting the two's complement data on $YL_{13}$–$YL_{14}$ to sign magnitude data. Logics 425$a$ test the MSB from Y-latch 403 on line $YL_{13}$ for the purpose of generating a sign bit and for controlling the two's complement to sign magnitude conversion accomplished by logics 425$c$. The sign bit is supplied in true and false logic on lines D/Asn and D/Asn to D/A converter 426.

Logics 425$c$ convert the two's complement data from Y-latches 403 in lines $YL_{10}$–$YL_4$ to simple magnitude notation on lines $D/A_6$–$D/A_0$. Only the logics 425$c$ associated with YL10 are shown in detail for sake of simplicity.

Logics 425$b$ sample the $YL_{12}$ and $YL_{11}$ bits from the Y-latches 403 and perform a magnitude truncation function thereon by forcing outputs $D/A_6$ through $D/A_0$ to a logical zero (i.e., a value of one if the outputs were in true logic) wherever either $YL_{12}$ or $YL_{11}$ is a logical one and $YL_{13}$ is a logical zero, indicating that the value is positive or either $YL_{12}$ or $YL_{11}$ is a logical zero and $YL_{13}$ is a logical one, indicating that the value is negative (and complemented, of course). Whenever one of these conditions occurs, a logical zero appears on line 427 and Vss is thereby coupled to the output buffer 428 in each of logics 425$c$. The magnitude function effectively truncates the more significant bits on $YL_{11}$ and $YL_{12}$. It is realized that this is somewhat unorthodox truncation, since normally the less significant bits are truncated in most other circuits where truncation occurs. However, in this circuit, large positive or negative values are effectively clipped. More important digital speech information, which has smaller magnitudes, is effectively amplified by a factor of four by this truncation scheme.

Figure 23A:
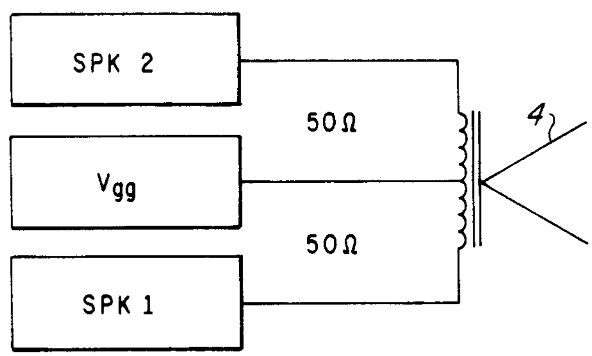
FIGS. 23*a* and 23*b* show loudspeaker output circuits.
Figure 23B:
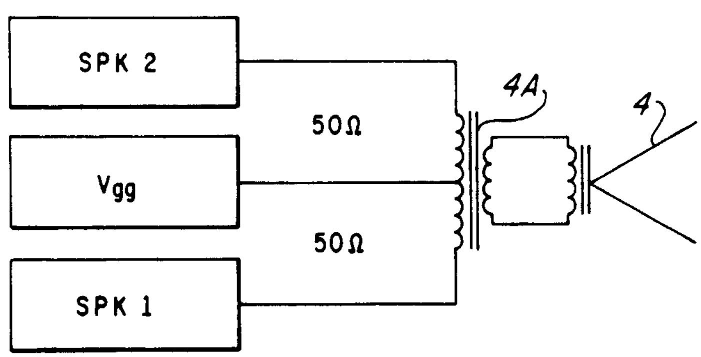

The outputs $\overline{D/A_6}$–$\overline{D/A_0}$, along with $\overline{D/Asn}$ and D/Asn, are coupled to D/A converter 426. D/A converter 426 preferably has seven MOS devices 429 coupled to the seven lines $\overline{D/A_6}$ through $\overline{D/A_0}$ from truncation logics 425. Each device 429 preferably includes a MOS transistor whose gates is coupled to one of the lines $\overline{D/A_6}$–$\overline{D/A_0}$ and a series connected implanted load transistor 429$b$. Devices 429 are arranged, by controlling their length to width ratios, to act as current sources, the device 429 coupled to $\overline{D/A_6}$ sourcing twice as much current (when on) as the device 429 coupled to $\overline{D/A_5}$. Likewise the devices 429 coupled to $\overline{D/A_5}$ is capable of sourcing twice as much current as the device 429 coupled to $\overline{D/A_4}$. This two to one current sourcing capability similarly applies to the remaining devices 429 coupled to the remaining lines $\overline{D/A_3}$–$\overline{D/A_0}$. Thus, device 429 coupled to $\overline{D/A_1}$, is likewise capable of sourcing twice as much current as the device 429 coupled to $\overline{D/A_0}$, but only one-half of that source by the device 429 coupled to $\overline{D/A_2}$. All devices 429 are connected in parallel, one side of which are preferably coupled to Vss and the other side is preferably coupled to either side of the speaker 4 via trnsistors 430 and 431. Transistor 430 is controlled by $\overline{D/Asn}$ which is applied to its gates; transistor 431 is turned off and on in response to D/Asn. Thus, either transistor 430 or 431 is on depending on the state of the sign bit, D/Asn. The voice coil of speaker 4 preferably has a 100 ohm impedance and has a center tap connected to Vgg, as shown in FIG. 23$a$. Thus, the signals on lines $\overline{D/A_6}$–$\overline{DA_0}$ control the magnitude of current flow through the voice coil while the signals on lines D/Asn and $\overline{D/Asn}$ control the direction of that flow.

Alternatively to using a center-topped 100 ohm voice coil, a more conventional eight ohm speaker may be used along with a transformer having a 100 ohm center topped primary (connected to Vgg and transistors 430 and 431) and an eight ohm secondary (connected to the speaker's terminals), as shown in FIG. 23$b$.

It should now be appreciated by those skilled in the art that D/A converter 426 not only converts digital sign magnitude information on lines $\overline{D/A_6}$–$\overline{D/A_0}$ and D/Asn–$\overline{D/Asn}$ to an analog signal, but has effectively amplified this analog signal to sufficient levels to permit a speaker to be driven directly from the MOS synthesis chip 10 (or via the aforementioned transformer, if desired). Of course, those skilled in the art will appreciate that simple D/A converters, such as that disclosed here, will find use in other applications in addition to speech synthesis circuits.

THE SPEECH SYNTHESIZER CHIP

Figure 22:
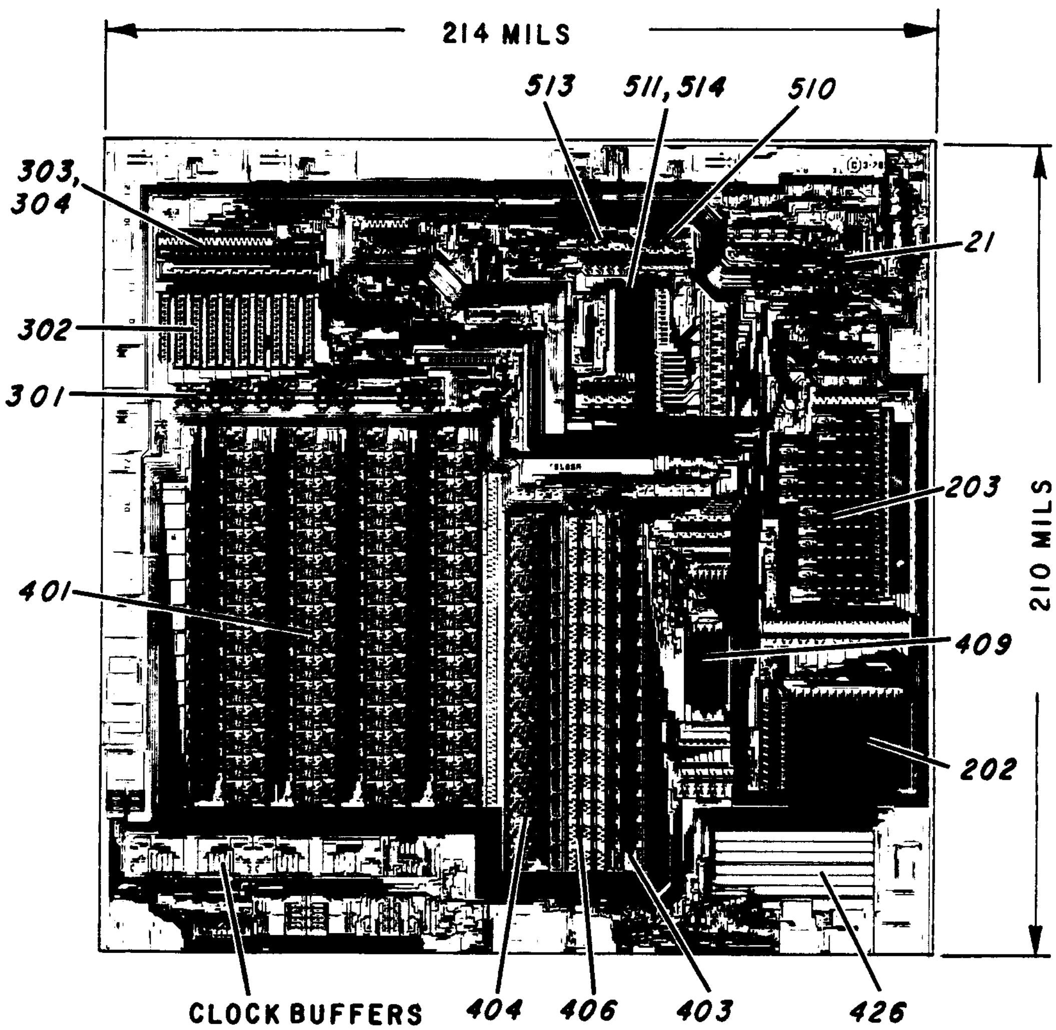
FIGS. 22 is a plan view of the synthesizer chip herein described, showing the metal mask or metal pattern, enlarged about fifty times.

In FIG. 22 a greatly enlarged plan view of a semiconductor chip which contains the entire system of FIGS. 4$a$ and 4$b$ is illustrated. The chip is only about two hundred fifteen mils (about 0.215 inches) on a side. In the example shown, the chip is manufactured by the P-channel metal gate process using the following design rules: metal line width 0.25 mil; metal line spacing 0.25 mil; diffusion line width 0.15 mil; and diffusion line spacing 0.30 mil. Of course, as design rules are tightened with the advent of electron beam mask production or slice writing, and other techniques, it will be possible to further reduce the size of the synthesizer chip. The size of the synthesizer chip can, of course also be reduced by not taking advantage of some of the features preferably used on the synthesizer chip.

The total active area of speech synthesizer chip 10 is approximately 45,000 square mils.

It will also be appreciated by those skilled in the art, that other MOS manufacturing techniques, such as N-channel, complementary MOS (CMOS) or silicon gate processes may alternatively be used.

The various parts of the system are labeled with the same reference numerals previously used in this description.

CONTROLLER LOGIC DIAGRAMS

The controller used in the learning aid is preferably a microprocessor of the type described in U.S. Pat. No. 4,074,355, with modifications which are subsequently described. U.S. Pat. No. 4,074,355 is hereby incorporated herein by reference. It is to be understood, of course, that other microprocessors, as well as future microprocessors, may well find use in applications such as the speaking learning aid described herein.

The microprocessor of U.S. Pat. No. 4,074,355 is an improved version of an earlier microprocessor described in U.S. Pat. No. 3,991,305. One of the improvements concerned the elimination of digit driver devices so that arrays of light emitting diodes (LED's) forming a display could be driven directly from the microprocessor. As a matter of design choice, the display used with this learning aid is preferably a vacuum fluorescent (VF) display device. Those skilled in the art will appreciate that when LED's are directly driven, the display segments are preferably sequentially actuated while the display's common character position electrodes are selectively actuated according to information in a display register or memory. When VF displays are utilized, on the other hand, the common character position electrodes are preferably sequentially actuated while the segments are selectively actuated according to information in the display register or memory. Thus, the microprocessor of U.S. Pat. No. 4,074,355 is preferably altered to utilize digit scan similar to that used in U.S. Pat. No. 3,991,305.

The microprocessor of U.S. Pat. No. 4,074,355 is a four bit processor and to process alphanumeric information, additional bits are required. By using six bits, which can represent 26 or 64 unique codes, the twenty-six characters of the alphabet, ten numerals as well as several special characters can be handled with ease. In lieu of converting the microprocessor of U.S. Pat. No. 4,074,355 directly to a six bit processor, it was accomplished indirectly by software pairing the four bit words into eight bit bytes and transmitting six of those bits to the display decoder.

Figure 7B:
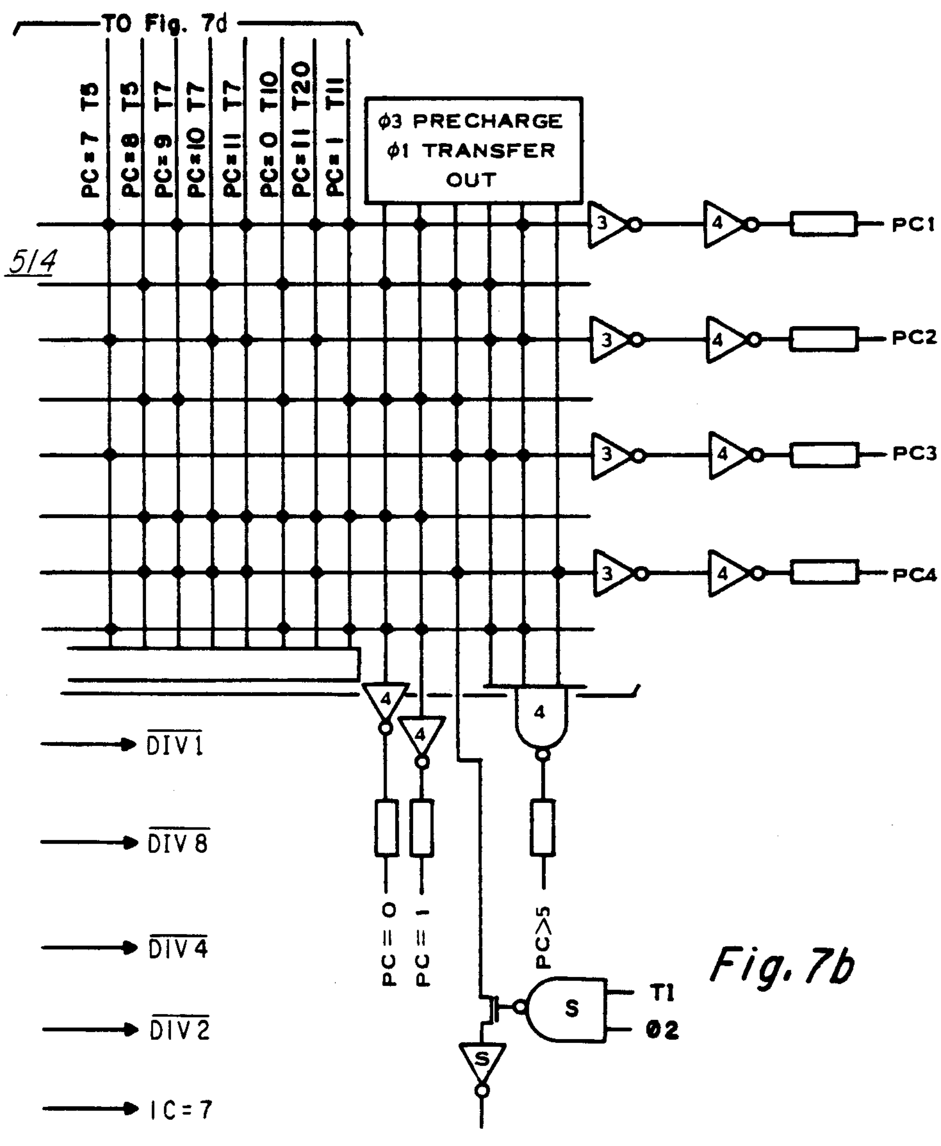
Figure 7C:
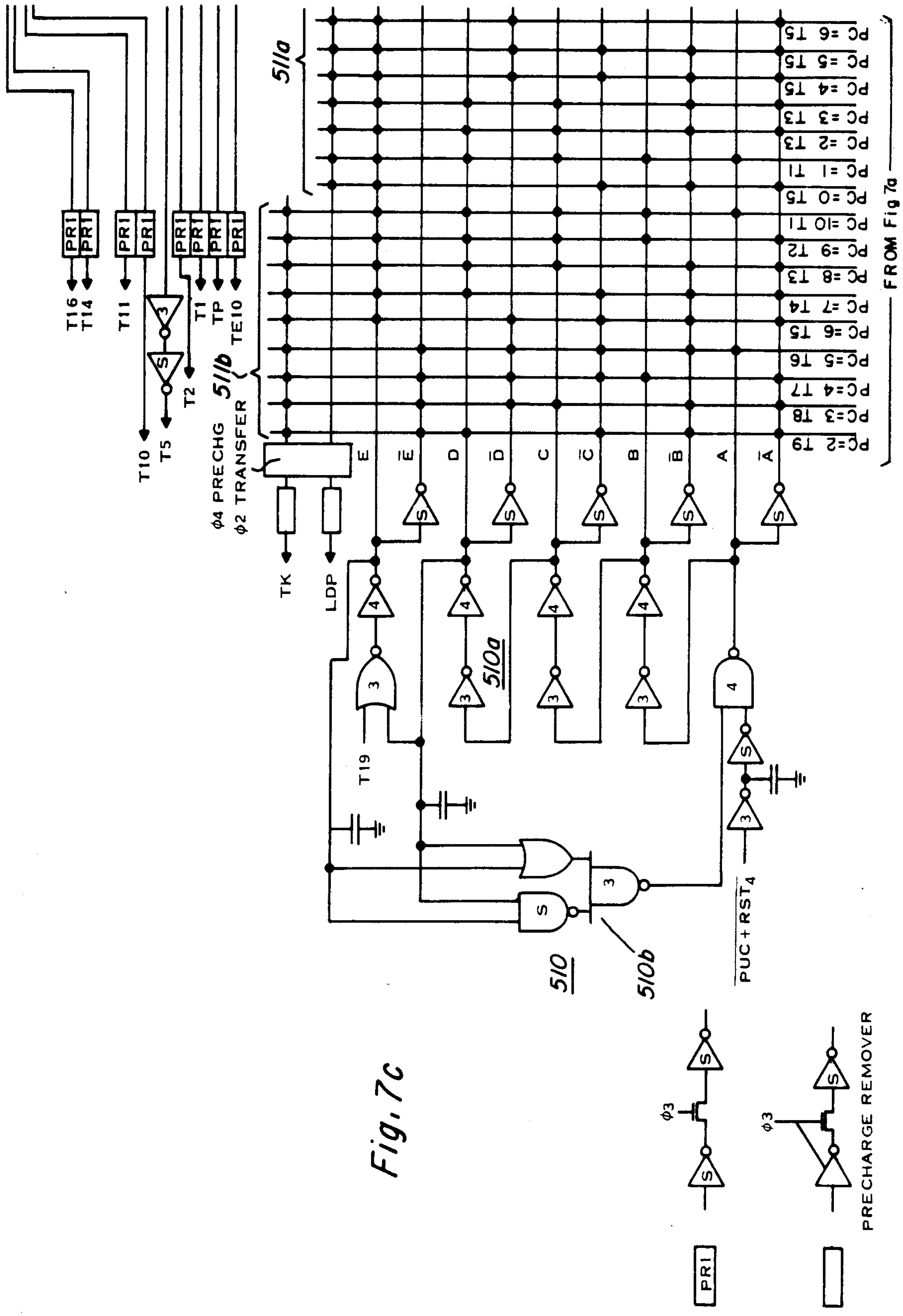
Figure 7D:
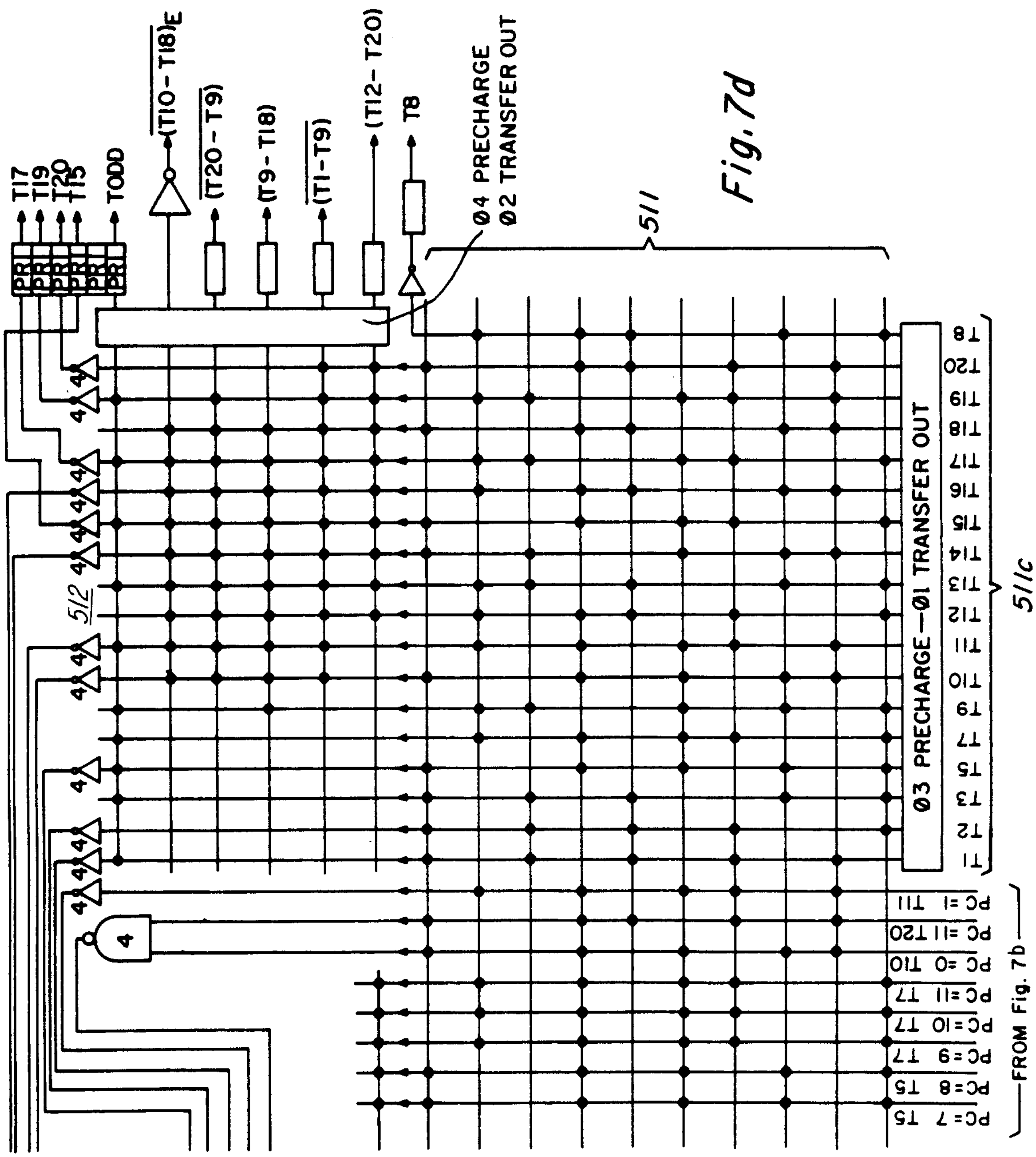
Figure 15A:
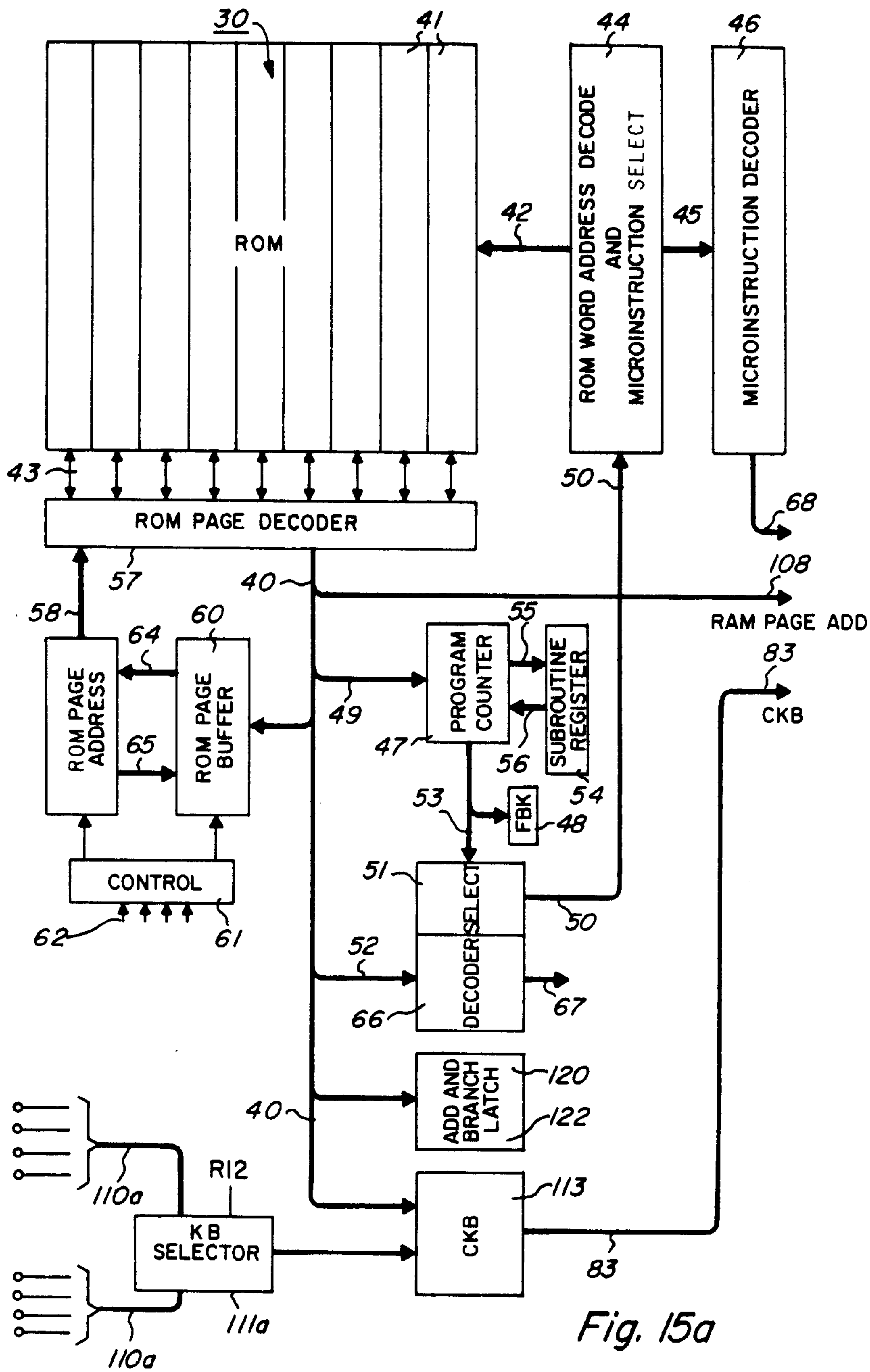
FIGS. 15*a*–15*b* form a composite block diagram of a microprocessor which may be utilized as the controller.
Figure 15B:
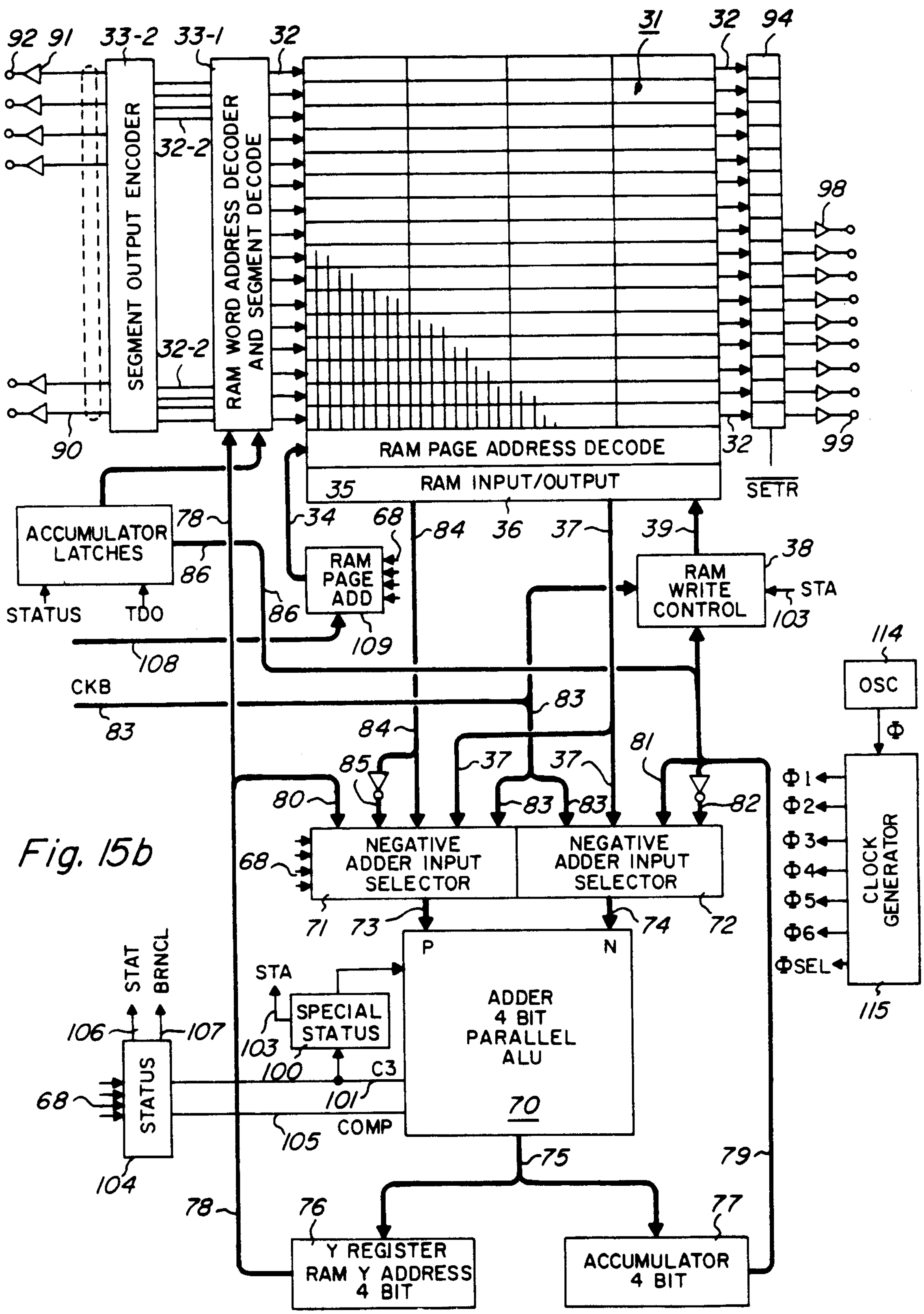

Referring now to FIGS. 15*a*–15*b*, which form a composite block diagram of the microprocessor preferably used in the learning aid, it should be appreciated that this block diagram generally corresponds with the block diagram of FIGS. 7*a* and 7*b* of U.S. Pat. NO. 4,074,355; several modifications to provide the aforementioned features of six bit operaion and VF display compatability are also shown. The numbering shown in FIGS. 15*a* and 15*b* generally agrees with that of U.S. Pat. No. 4,074,355. The modifications will now be described in detail.

Figure 16A:
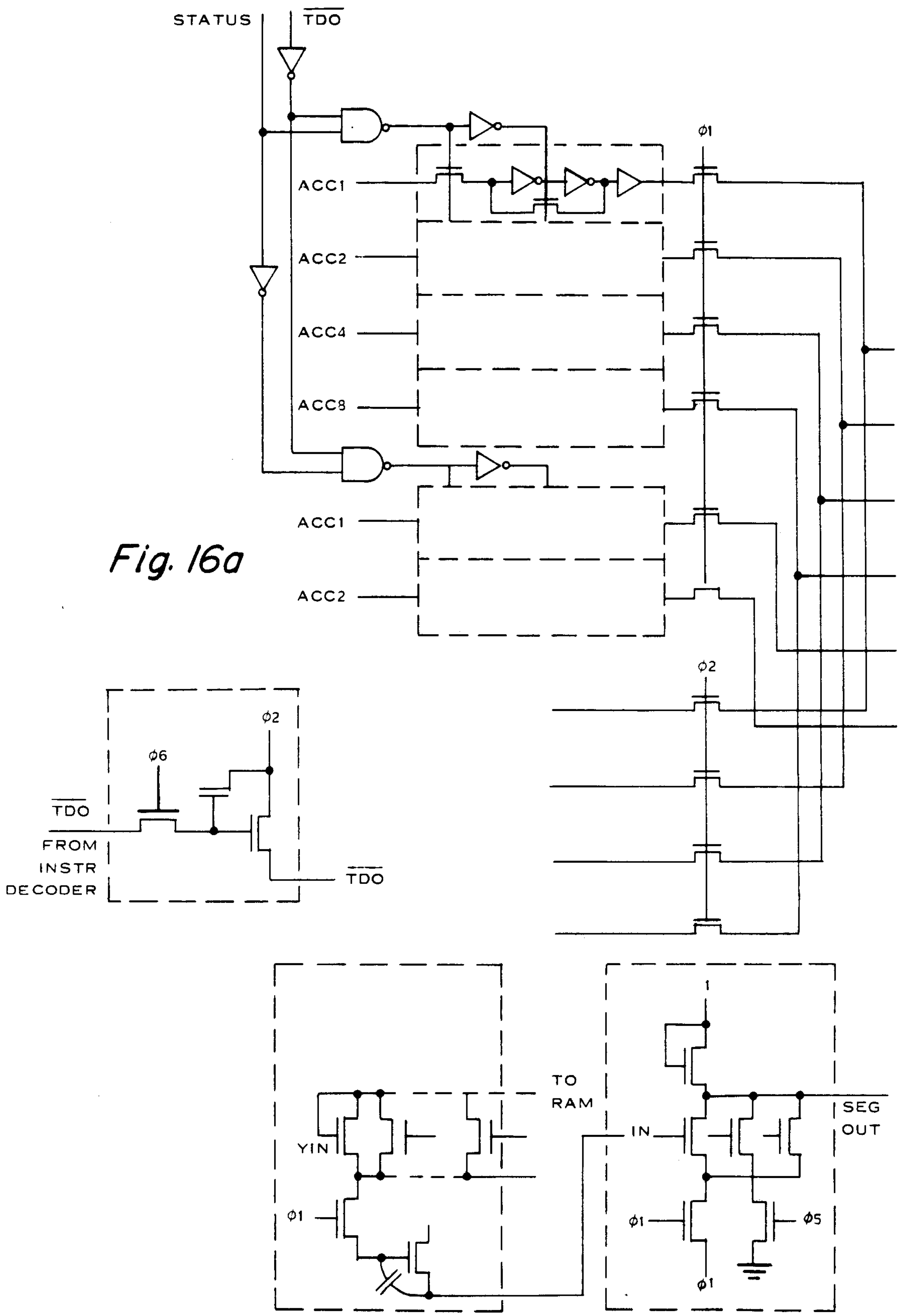
FIGS. 16*a*–16*c* form a composite logic diagram of the segment decoder of the microprocessor.
Figure 16B:
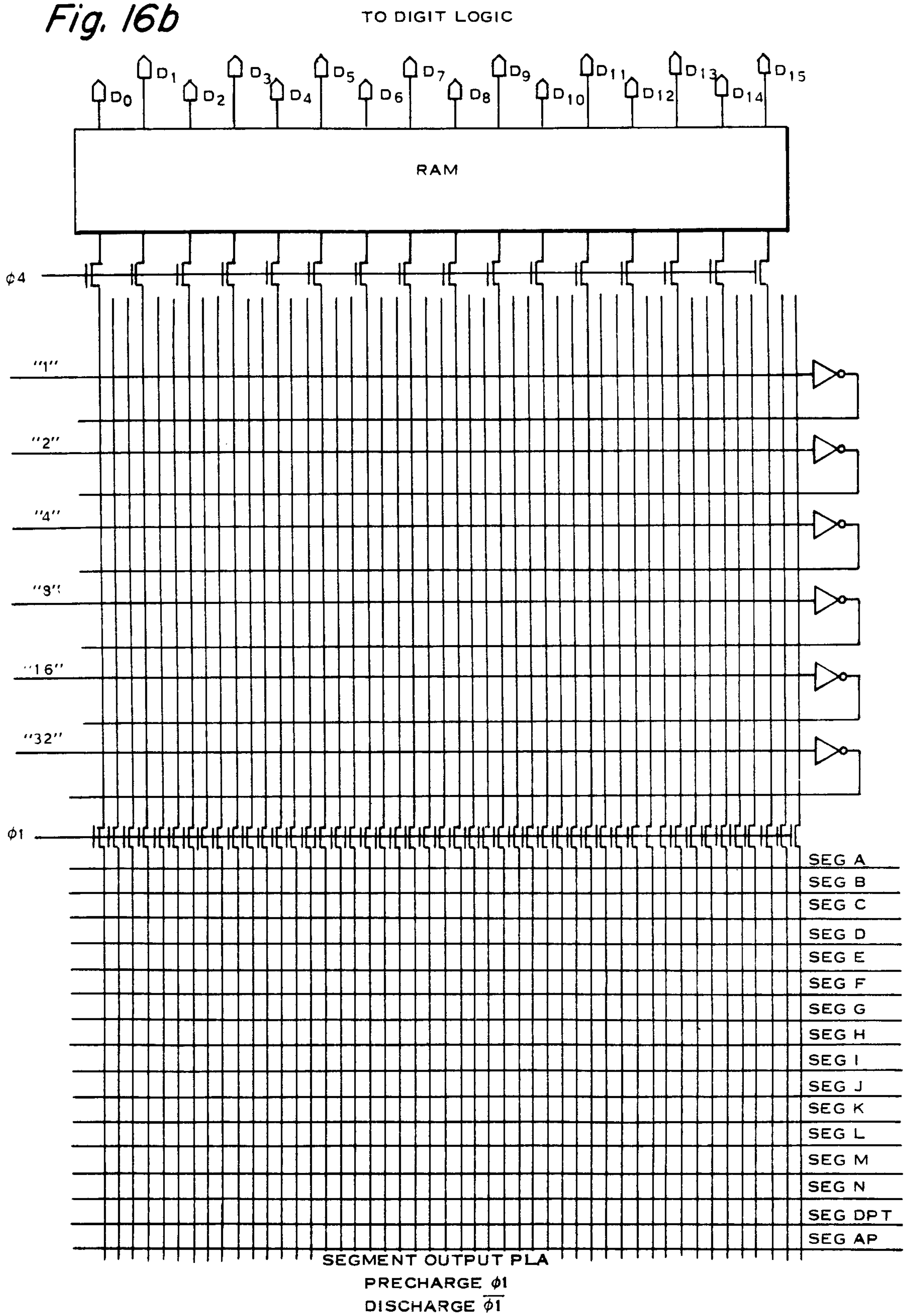
Figure 16C:
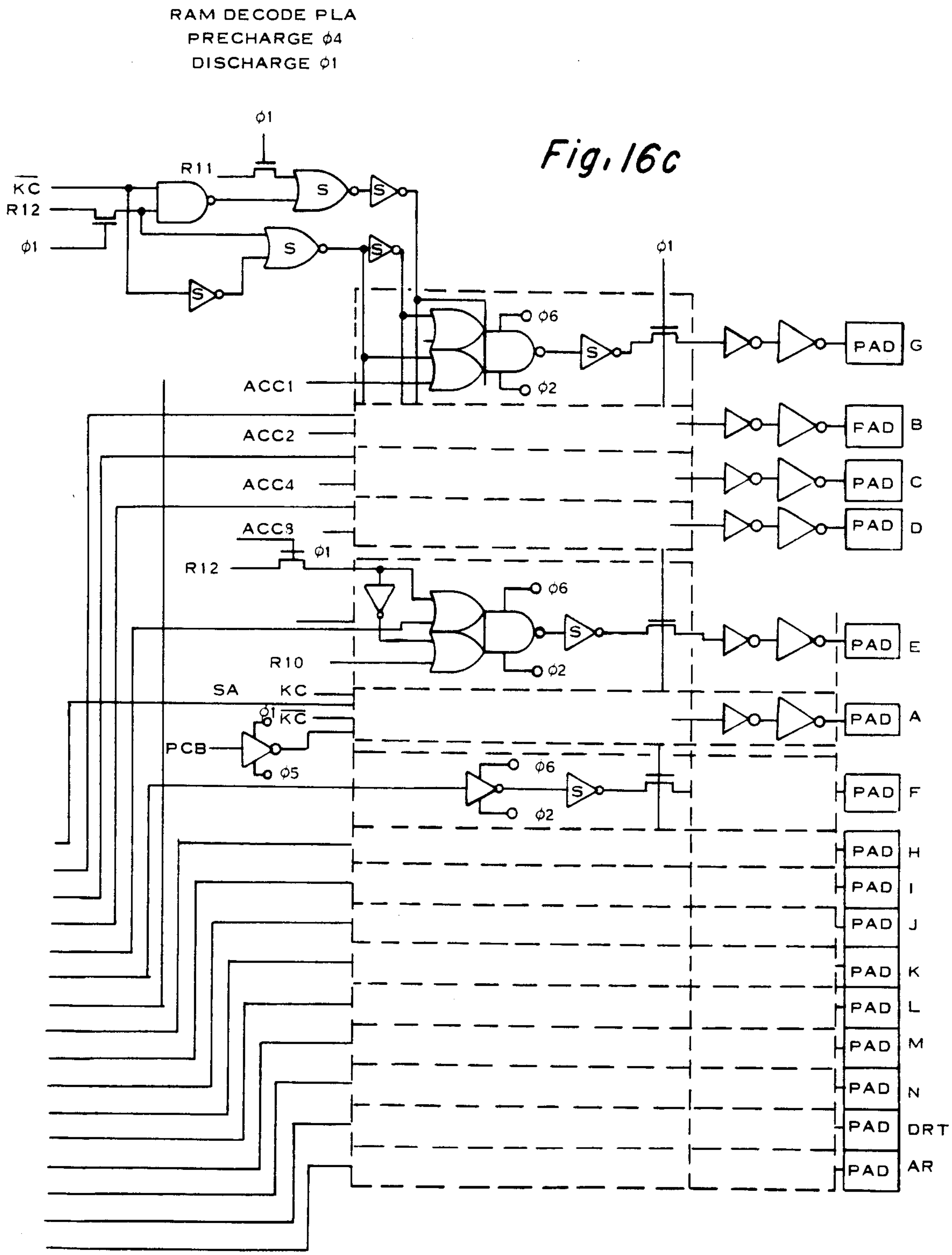

Referring now to the composite diagram formed by FIGS 16*a*–16*c*, which replace FIG. 13 of U.S. Pat. No. 4,074,355, there can be seen the segment decoder and RAM address decoder 33-1 which decodes RAMY for addressing RAM 31 or ACC1–ACC8 for decoding segment information. Decoder 33-1 generally corresponds to decoder 33 in the aforementioned U.S. patent. The segment information is re-encoded into particular segment line information in output section 32-2 and outputted on bus 90 to segment drivers 91. Six bits of data from the processor's four bit accumulator 77 are decoded in decoder 33-1 as is now described. First, four bits on bus 86 are latched into accumulator latches 87-1 through 87-8 on a TDO (Transfer Data Out) instruction when status is a logical one. Then, two bits on bus 86 (from lines 86-1 and 86-2) are latched into accumulator latches 87-16 and 86-32, respectively, on another TDO instruction when status is a logical zero. Then the six bits in latches 87-1 through 87-32 are decoded in decoder 33-1. Segment drivers 91 may preferably be of tone of three types, 91A, 91B or 91C as shown in FIGS. 16*a*–16*c*. The 91A type driver permits the data on ACC-1–ACC8 to be communicated externally via pins SEG G, SEG B, SEG C and SEG D. The 91B type driver coupled to pin SEG E permits the contents of digit register 94-10 to be communicated externally when digit register 94-12 is set. The 91C type driver coupled to pin SEG A permits the contents of the program counter to be outputted during test operations.

Figure 17:
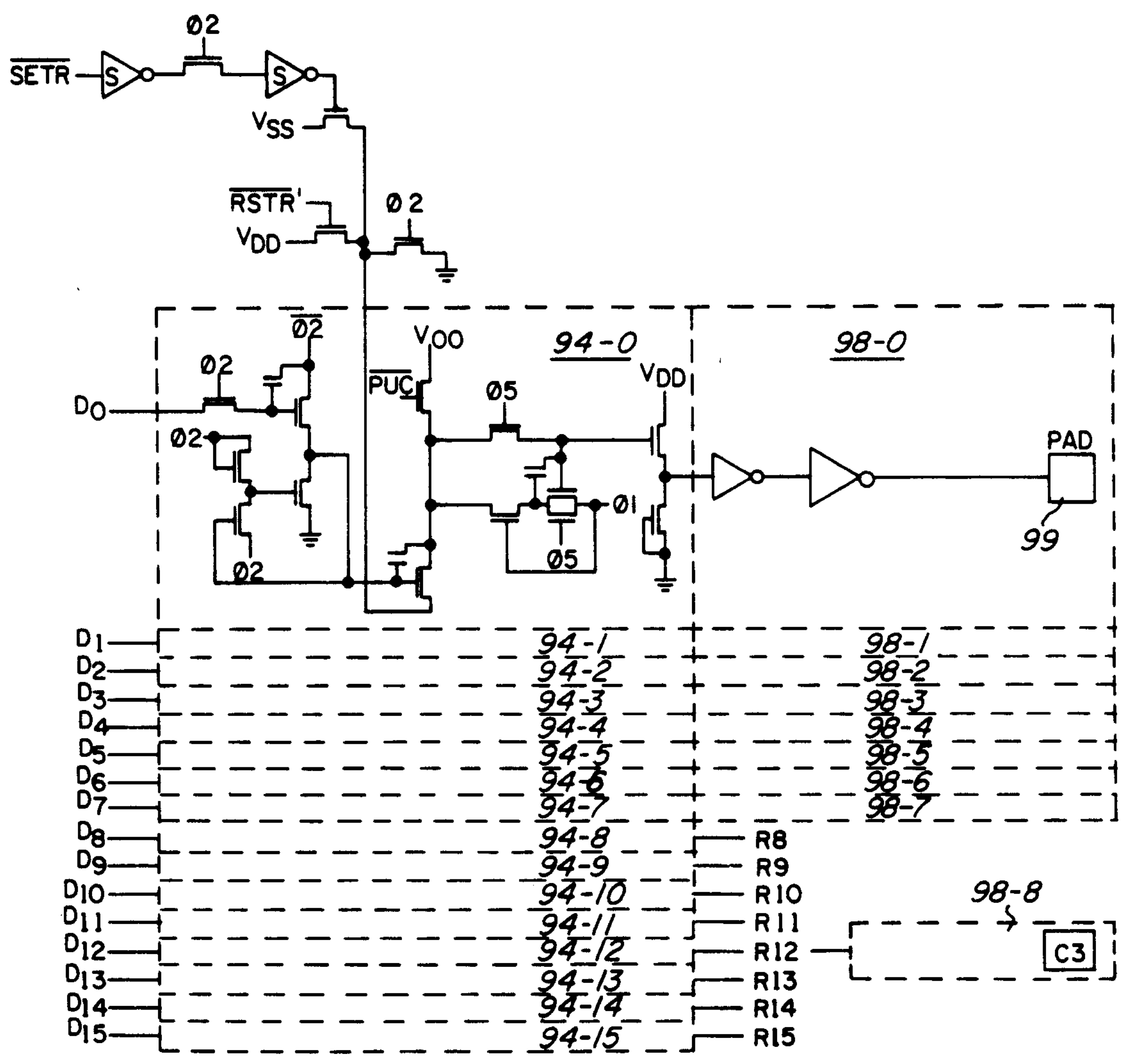
FIG. 17 depicts the digit output buffers and digit registers of the microprocessor.

The digit buffers registers and TDO latches of FIG. 14 of U.S. Pat. No. 4,074,355 are also preferably replaced with the digit buffers registers of FIG. 17 herein inasmuch as (1) the DDIG signal is no longer used and (2) the digit latches (elements 97 in U.S. Pat. NO. 4,074,355) are no longer used. For simplicity's sake, only one of the digit output buffer registers 94 is shown in detail. Further, since in this embodiment of the learning aid, display 2 preferably has eight character positons, eight output buffers 98-0 through 98-7 connect $D_0$–$D_7$ to the common electrodes of display 2 via registers 94-0 through 94-7 as shown in FIG. 17. An additional output buffer 98-8 communicates the contents of register 94-12, which is the chip select signal, to synthesizer 10.

To facilitate bi-directional communication with synthesizer 10, the microprocessor of U.S. Pat. No. 4,074,355 is preferably modified to permit bi-directional communication on pins SEG G, SEG B, SEG C and SEG D. Thus, in FIG. 18, these SEG pins are coupled to the normal K lines, 112-1 through 112-8, via an input selector 111*a* for inputting information when digit register 94-12 (R12) is set. Further, these pins are also coupled to ACC1-ACC8 via segment drivers 91A when digit registers 94-12 (R12) and 94-11 (R11) are set for outputting information in accumulator 77.

Figure 18:
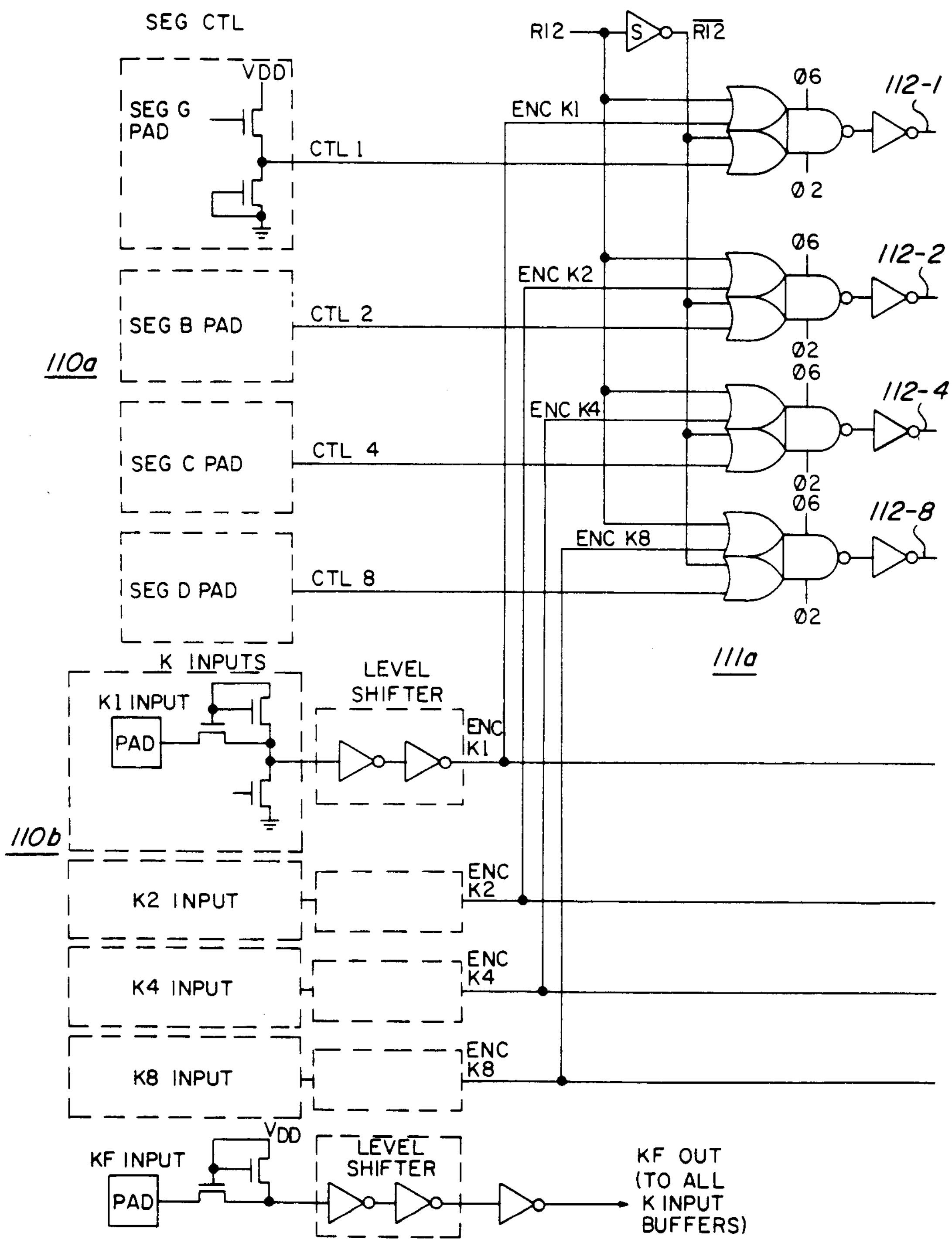
FIG. 18 depicts the KB selector circuit of the microprocessor.

Thus, when digit latch 94-12 (which communicates the chip select signal exxternally) is set, SEG E is coupled to R10 (digit register 94-10) for communicating the PDC signal to synthesizer 10. Also, ACC1-ACC8 is outputted on SEG G and SEG B-SEG D, during the time R12 and R11 are set. When R11 is a logical 0, i.e., is reset, segment drivers 91A are turned off and data may be read into CKB circuit 113 for receiving data from ROMs 12A–12B via synthesizer 10, for instance. FIG. 18 replaces the keyboard circuit 111 shown in FIG. 22 of U.S. Pat. No. 4,064,554.

Preferably, pins SEG G and SEG B-SEG D are coupled to CTL1–CTL8 pins of synthesizer 10, while pin SEG E is coupled to the PDC pin of synthesizer 10.

In Table IX (which comprises Tables 0 through IX-15) is listed the set of instructions which may be stored in the main Read-Only-Memory 30 of FIGS. 15*a*–15*b* to provide controller 11. Referring now to Table IX, there are several columns of data which are, reading from left to right: PC (Program Counter), INST (Instruction), BRLN (Branch Line), Line and Source Statement (which includes Name, Title and Comments). In U.S. Pat. No. 4,074,355, it can be seen that main Read-Only-Memory 30 is addressed with a seven bit address in program counter 47 and a four bit address in a buffer 60. The address in buffer 60 is referred to as a page addres in the main Read-Only-Memory. The instructions listed on Table IX-0 correspond to page zero in the microprocessor while the instructions listed in Table IX-1 are those on page one and so forth through to the instructions in Table IX-15 which are stored on page fifteen in the microprocessor.

The program counter 47 of the aforementioned microprocessor is comprised of a feedback shift register and therefore counts in a pseudorandom fasion, thus the addresses in the left-hand column of Table IX, which are expressed as a hexadecimal number, exhibit such pseudorandomness. If the instruction starting at page zero were read out sequentially from the starting position in the program counter (00) then the instructions would be read out in the order shown in Table IX. In the "Line" column is listed a sequentially increasing decimal number associated with each source statement and its instruction and program counter address as well as those lines in which only comments appear. The line number starts at line 55 merely for reasons of convenience not important here. When an instruction requiring either a branch or call is to be performed, the address to which the program counter will jump and the page number to which the buffer will jump, if required, is reflected by the binary code comprising the instruction or instructions performing the branch or call. For sake of convenience, however, the branch line column indicates the line number in Table IX to which the branch or call will be made. For example, the instruction on line 59 (page 0, Program Counter Address Of) is a branch instruction, with a branch address of 1010111 (57 in hexadecimal. To facilitate finding the 57 address in the program counter, the branch line column directs the reader to line 80, where the 57 address is located.

READ-ONLY-MEMORY LOGIC DIAGRAMS

Figure 19:
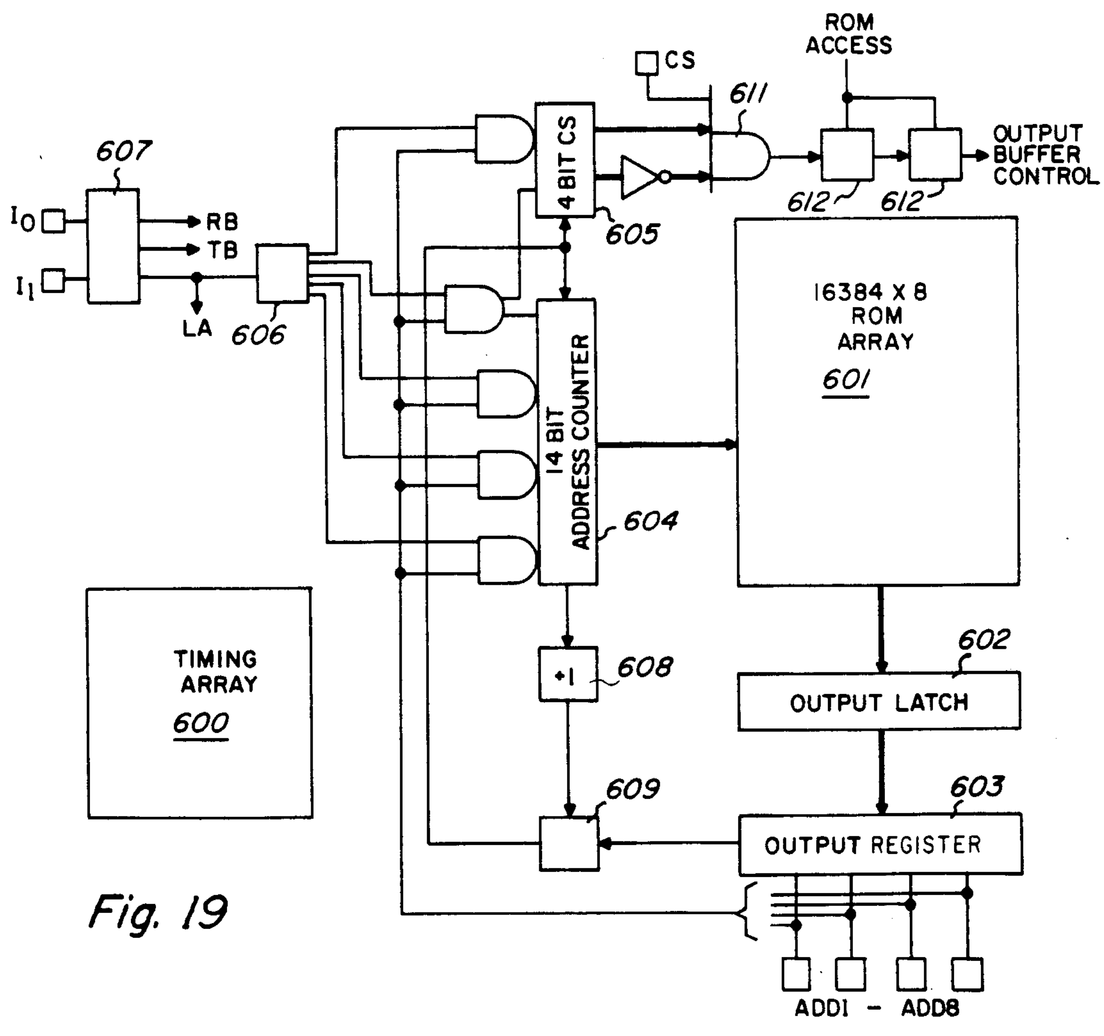
FIG. 19 is a block diagram of a ROM employed as a memory of the talking learning aid.
Figure 20A:
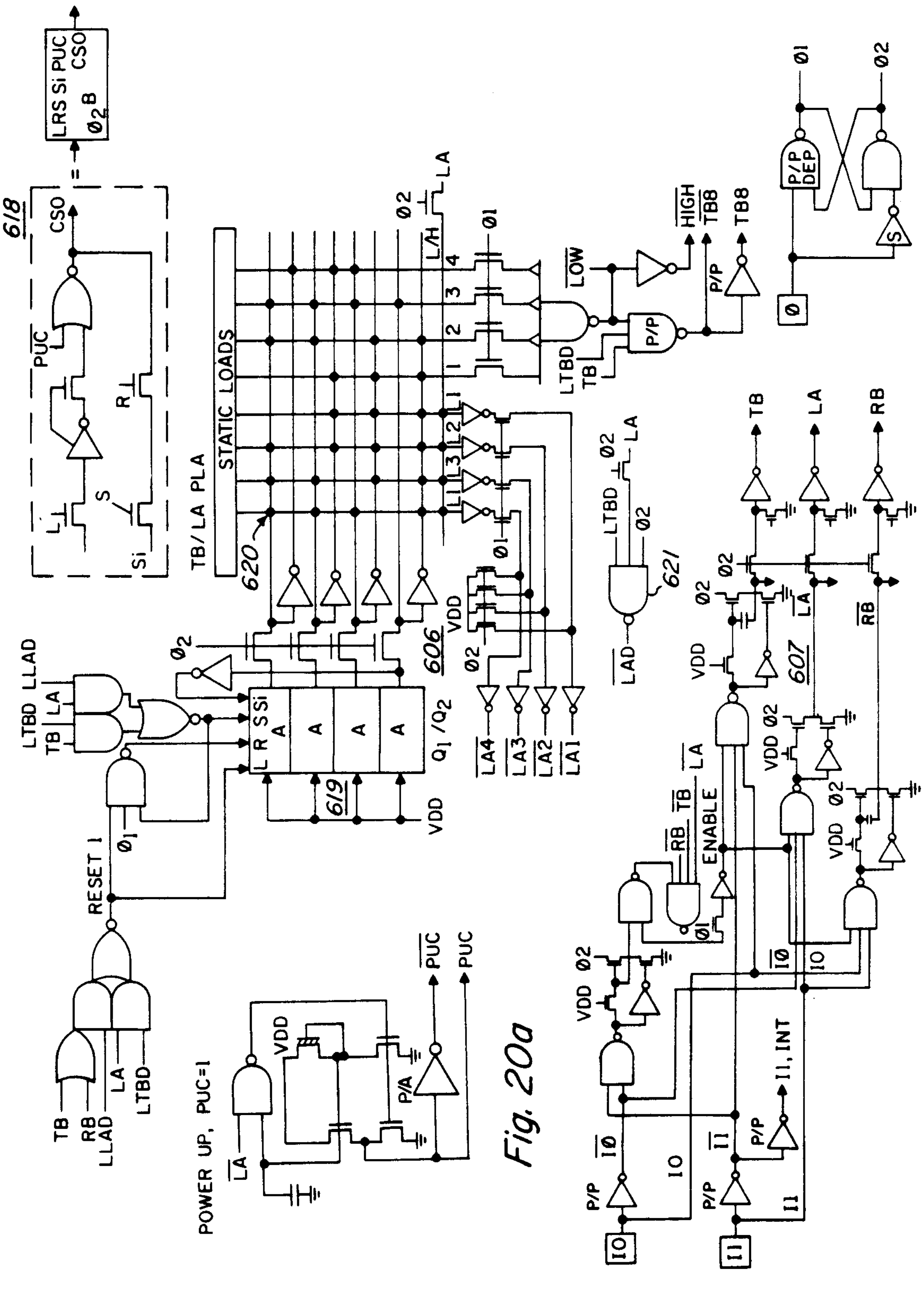
FIGS. 20*a*–20*f* form a composite logic diagram of the control logic for the ROM of FIG. 19.
Figure 20B:
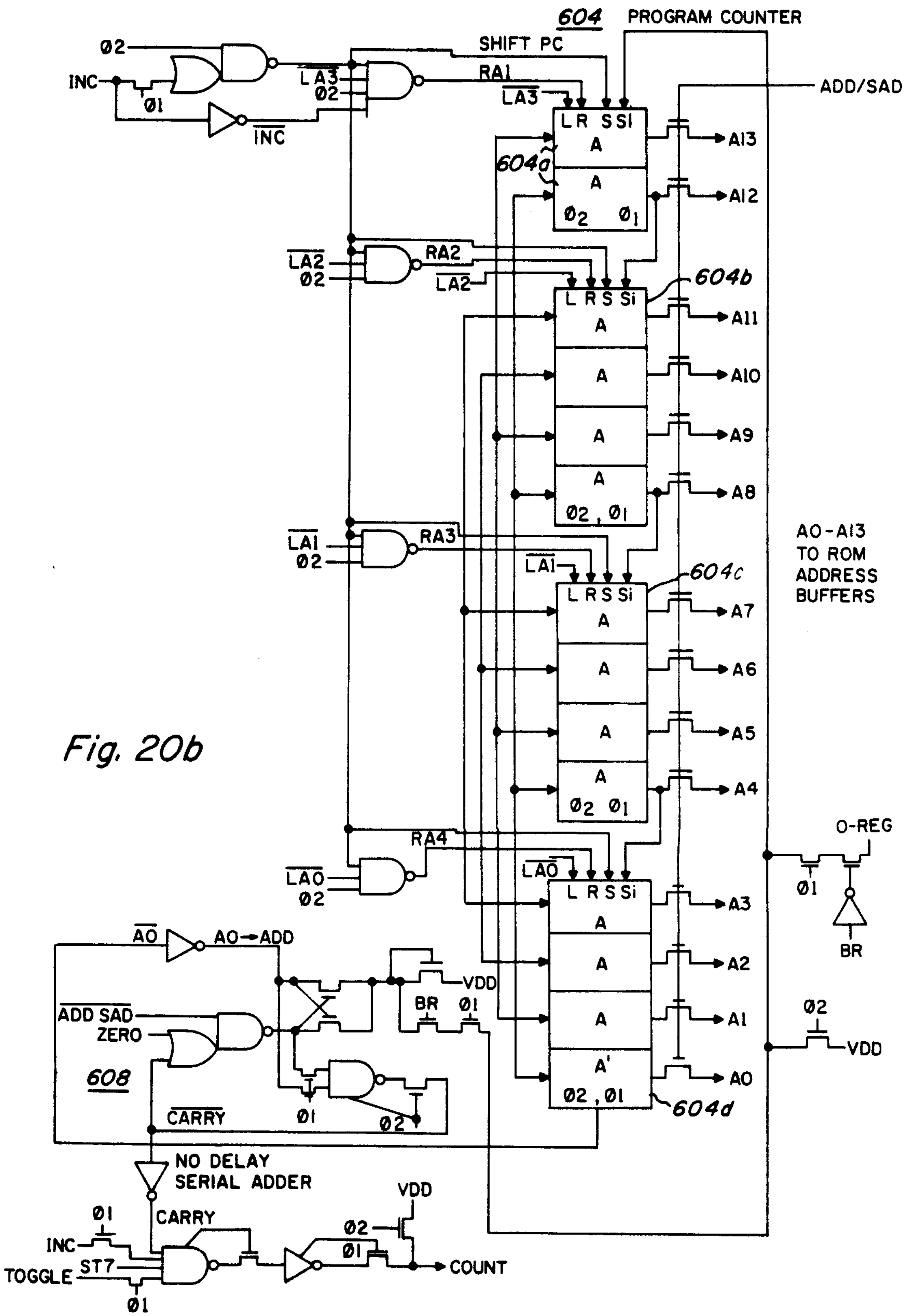
Figure 20C:
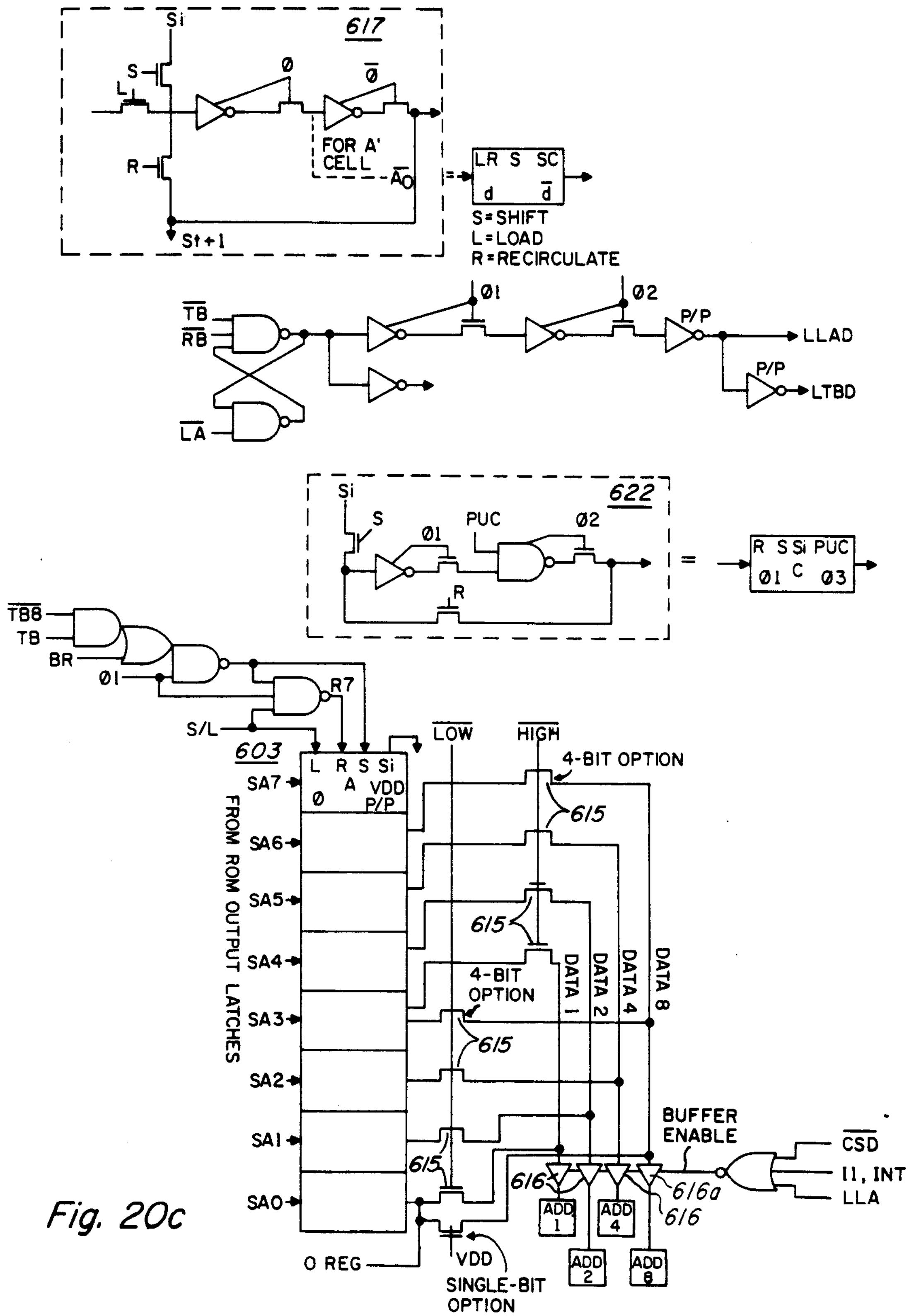
Figure 20D:
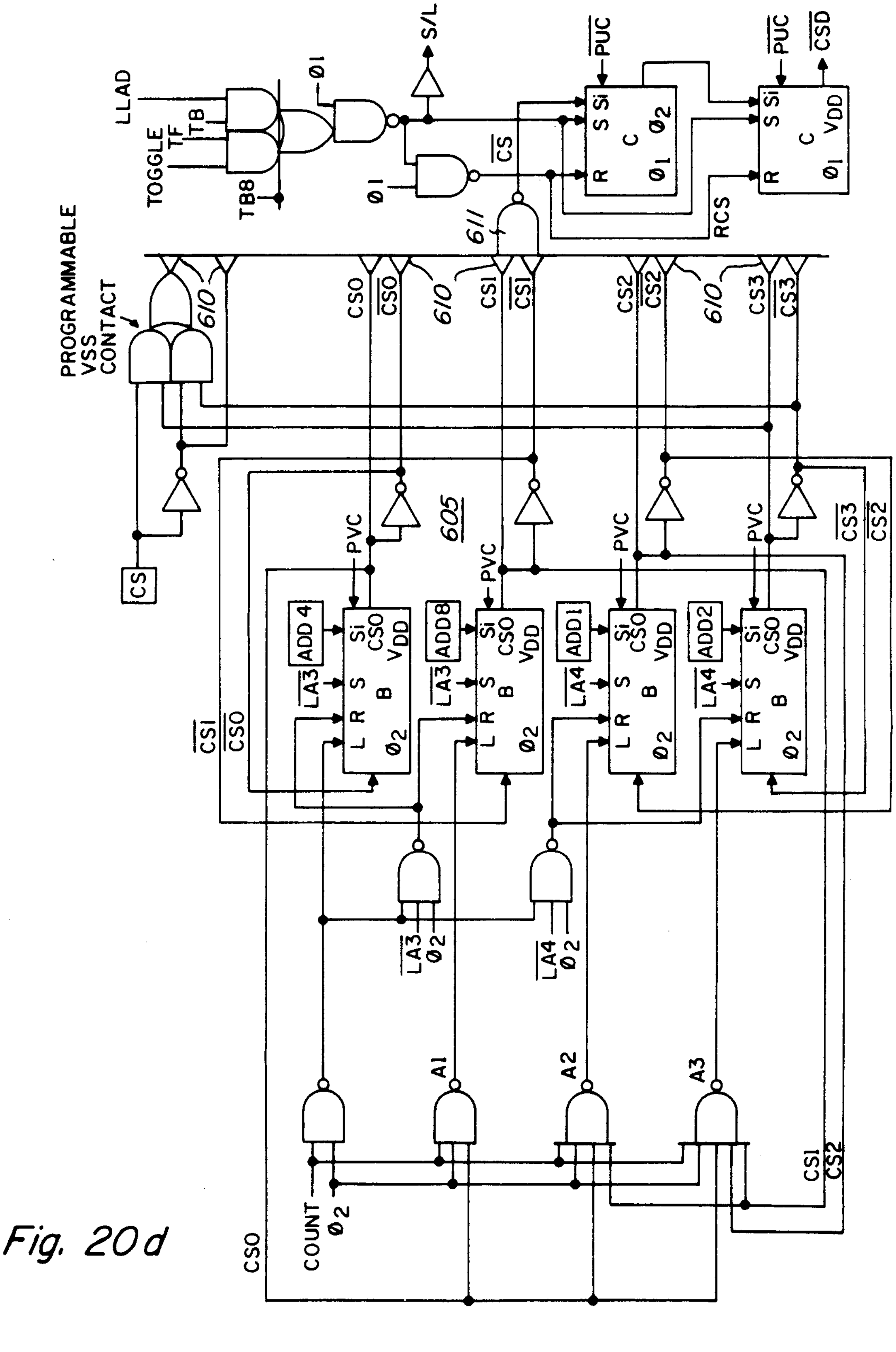
Figure 20E:
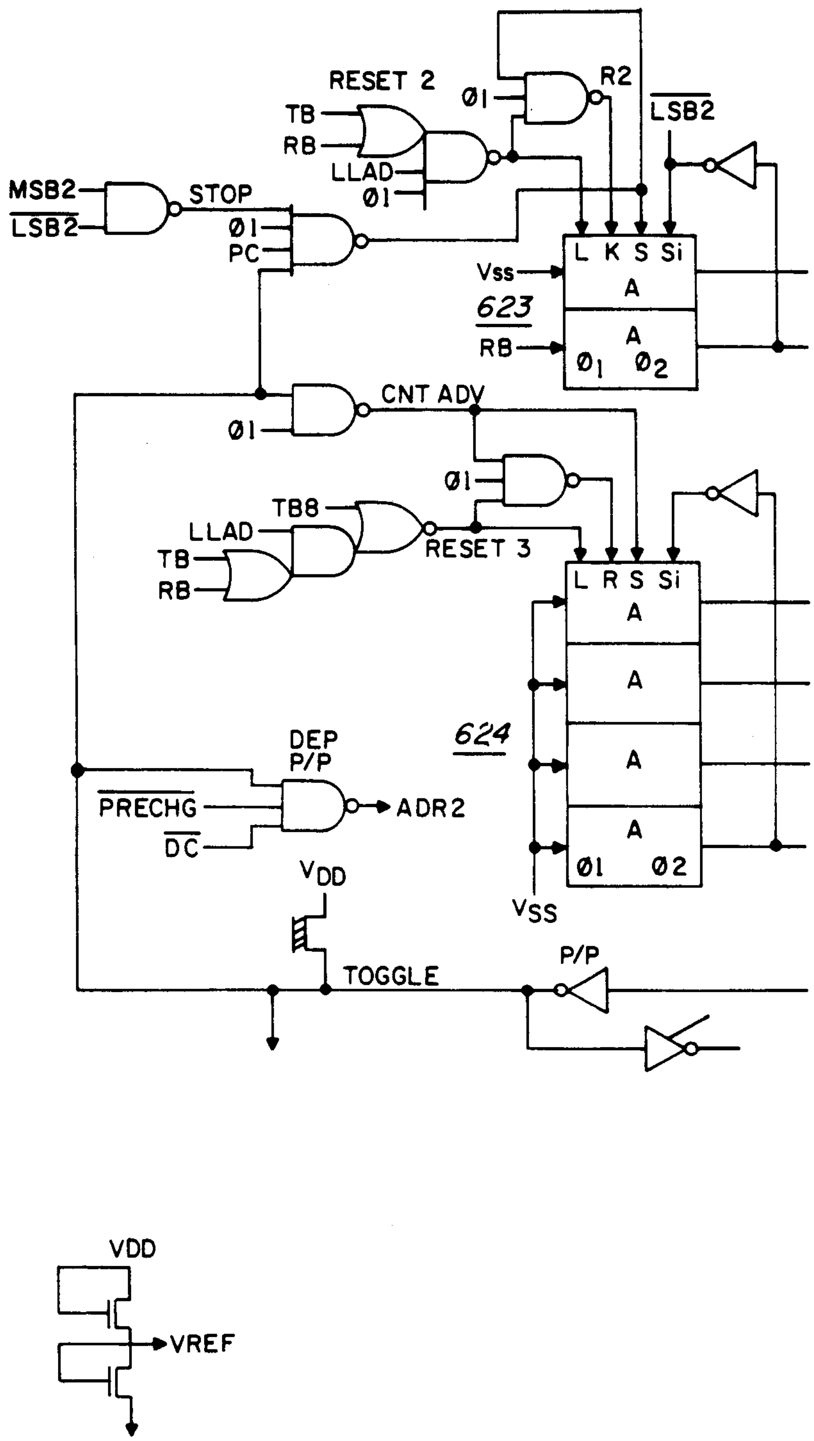
Figure 20F:
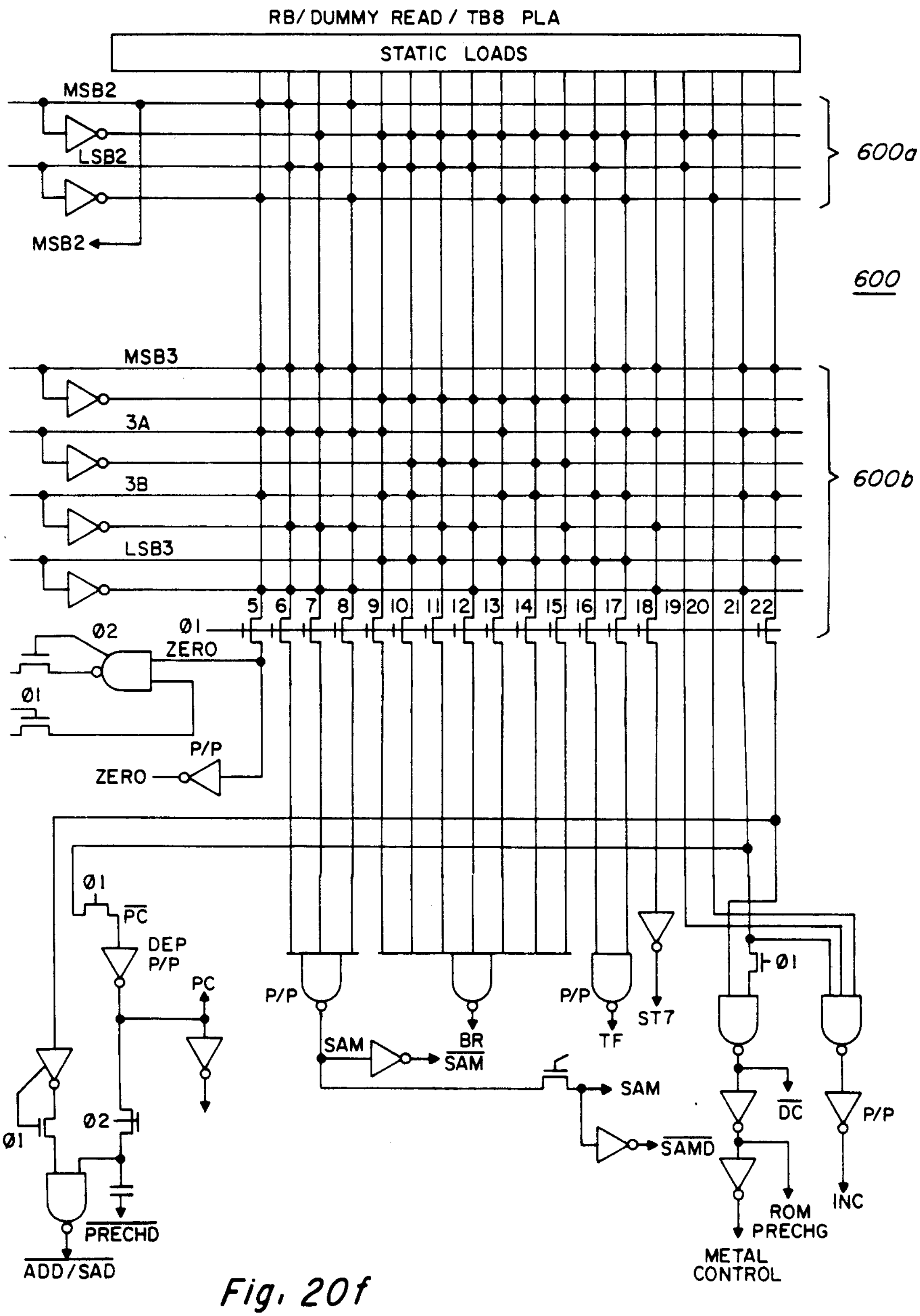
Figure 21A:
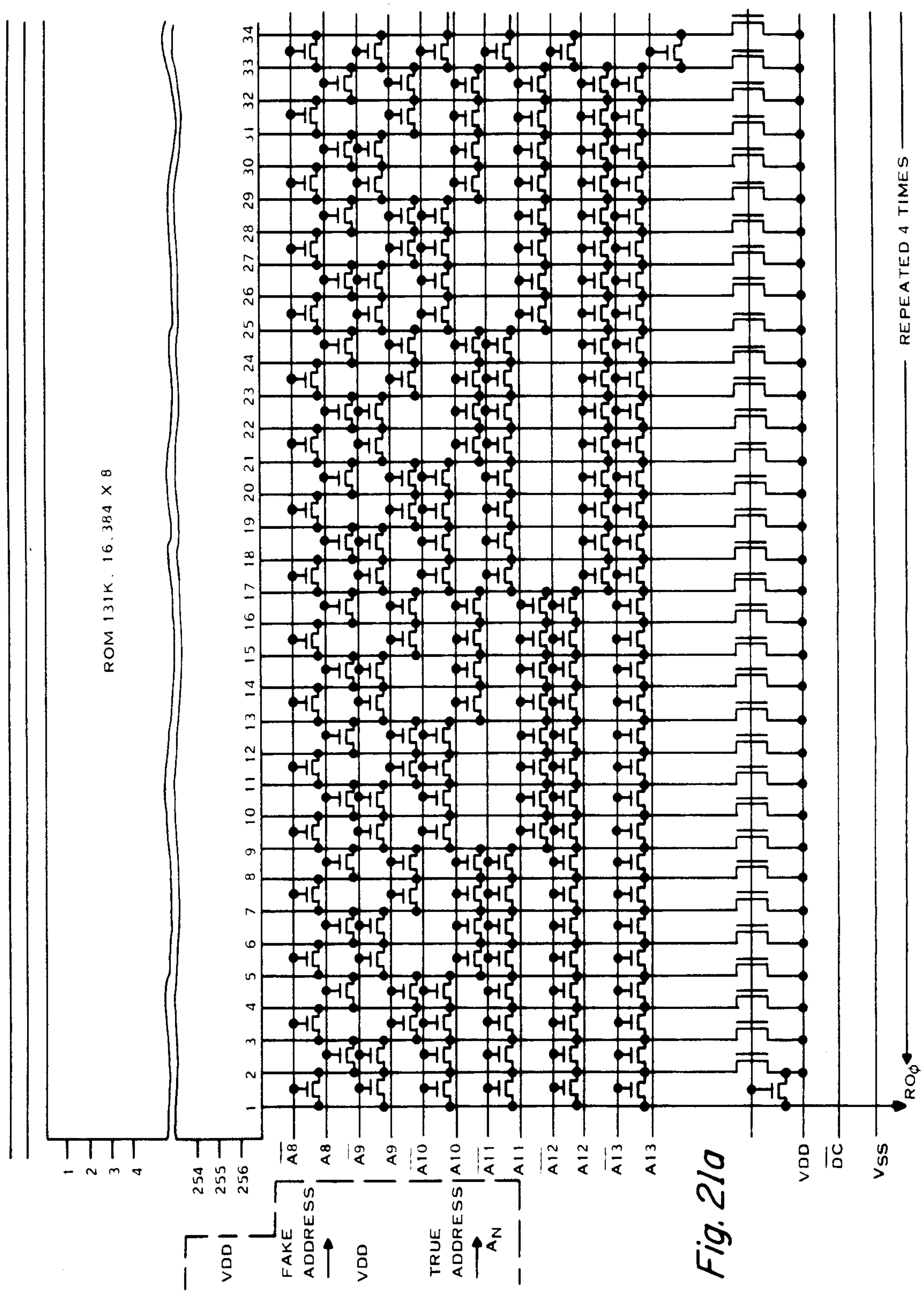
FIGS. 21*a* and 21*b* form a composite logic diagram of the X and Y address decoders and the array of memory cells.
Figure 21B:
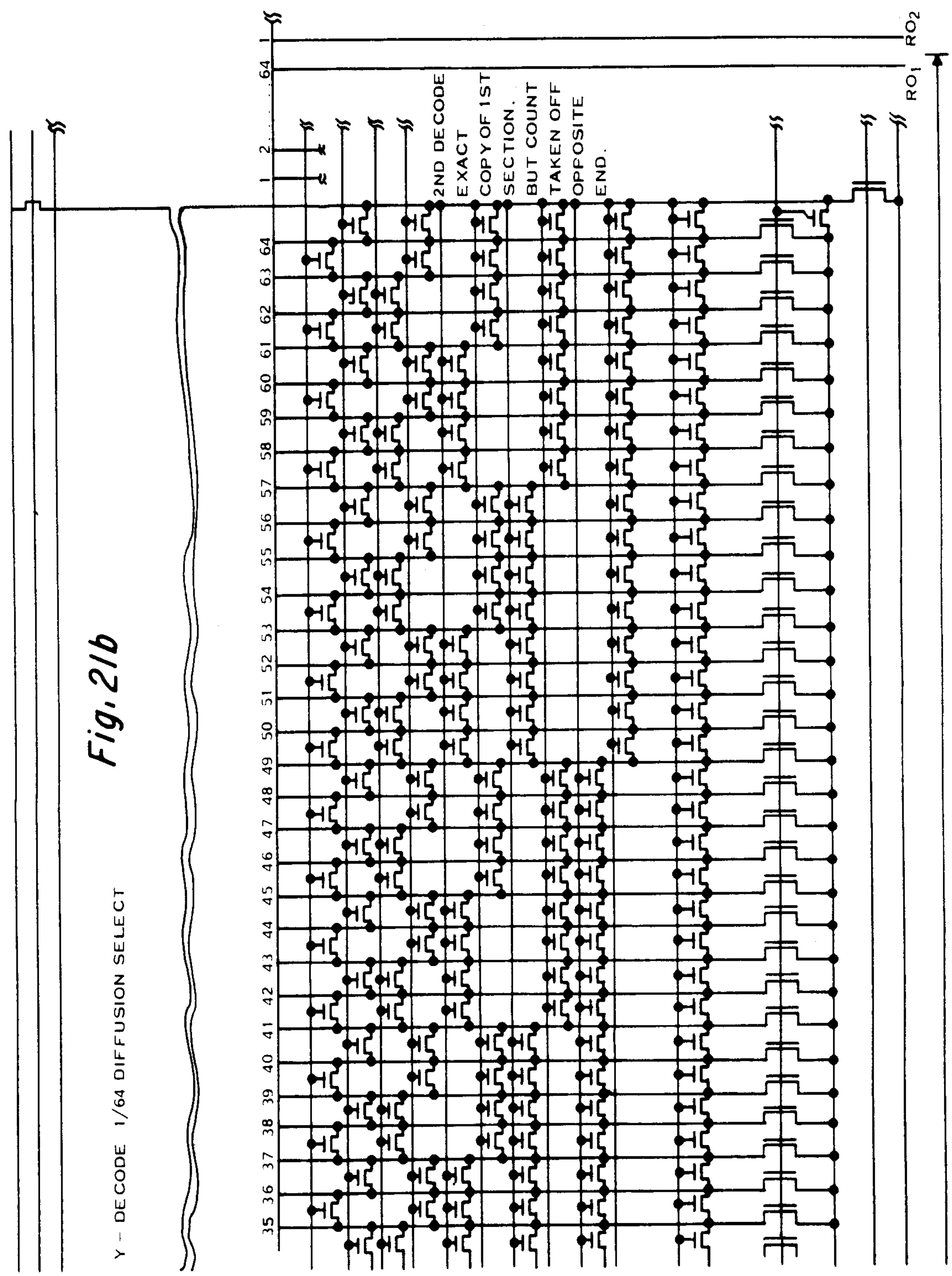

Anyone of Read-Only-Memories 12A and 12B or 13A and 13B is shown in FIGS. 19, 20*a*-20*f*, 21*a* and 21*b*. FIG. 19 is a block diagram of any one of these ROMs. FIGS. 20*a*-20*f* form a composite logic diagram of the control logic for the ROMs while FIGS. 21*a* and 21*b* form a composite logic diagram of the X and Y address decoders and pictorially show the array of memory cells.

Referrring now to FIG. 19, the ROM array 601 is arranged with eight output lines, one output line from each section of 16,384 bits. The eight output lines from ROM array 601 are connected via an output latch 602 to an eight bit output register 603. The output register 603 is interconnected with pins ADD1-ADD8 and arranged either to communicate the four high or low order bits from output register 603 via the four pins ADD-1-ADD8 or alternatively to communicate the bit serially from output register 603 via pin ADD1. The particular alternative used may be selctive according to mask programmable gates.

ROM array 601 is addressed via a 14 bit address counter 604. The address counter 604 has associated therewith a four bit chip select counter 605. Addresses in address counter 604 and chip select counter 605 are loaded four bits at a time from pins ADD1-ADD8 in response to a decoded Load Address (LA) command. The first LA command loads the four least significant bits in address counter 604 (bits $A_0$-$A_3$, and subsequent LA commands load the higher order bits, ($A_4$-$A_7$, $A_8$-$A_{11}$ and $A_{12}$-$A_{13}$). During the fourth LA cycle the $A_{12}$ and $A_{13}$ bits are loaded at the same time the CSO and CS1 bits in chip select counter 605 are loaded. Upon the fifth LA command the two most significant bits in chip select counter 605 are loaded from ADD1 and ADD2. A counter 606 counts consecutively received LA commands for indicating where the four bits on ADD1-ADD8 are to be inputted into counters 604 and/or 605.

Commands are sent to the ROM chip via $I_0$ and $I_1$ pins to a decoder 607 which outputs the LA command a TB (transfer bit) and a RB (read and branch) command.

Address register 604 and chip select register 605 have an add-one circuit 608 associated therewith for incrementing the address contained therein. When a carry occurs outside the fourteen bit number stored in address register 604 the carry is carried into chip select register 605 which may enable the chip select function if not previously enabled or disable the chip select function if previously enabled, for example. Alternatively, the eight bit contents of output register 603 may be loaded into address register 604 by means of selector 609 in response to an RB command. During an RB command, the first byte read out of array 601 is used as the lower order eight bits while the next successive byte is used for the higher order six bits in counter 604.

The output of chip select register 605 is applied via programmable connectors 610 to gate 611 for comparing the contents of chip select counter 605 with a preselected code entered by the programming of connectors 610. Gate 611 is also responsive to a chip select signal on the chip select pin for permitting the chip select feature to be based on either the contents of the four bit chip select register 605 and/or the state of the chip select bit on the CS pin. The output of gate 611 is applied to two delay circuits 612, the output of which controls the output buffers associated with outputting information from output register 603 to pins ADD1-ADD8. The delay imposed by delay circuits 612 effect the two byte delay in this embodiment, because the address information inputted on pins ADD1-ADD8 leads the data outputted in response thereto by the time to require to access ROM array 601. The CS pin is preferably used in the embodiment of the learning aid disclosed herein.

A timing PLA 600 is used for timing the control signals outputted to ROM array 601 as well as the timing of other control signals.

Referring now to the composite drawing formed by FIGS. 20*a*-20*f*, output register 603 is formed by eight "A" bit latches, an exemplary one of which is shown at 617. The output of register 603 is connected in parallel via a four bit path controlled on $\overline{\text{LOW}}$ or $\overline{\text{HIGH}}$ signals to output buffers 616 for ADD1-ADD4 and 616*a* for ADD8.

Gates 615 which control the transferring of the parallel outputs from register 603 via in response to $\overline{\text{LOW}}$ and $\overline{\text{HIGH}}$ are preferably mask level programmble gates which are preferably not programmed when this chip is used with the learning aid described herein. Rather the data in register 603 is communicated serially via programmable gate 614 to buffer 616*a* and pin ADD8. The bits outputted to ADD1-ADD8 in response to a $\overline{\text{HIGH}}$ signal are driven from the third through sixth bits in register 603 rather than the fourth through seventh bits inasmuch as a serial shift will normally be accomplished between a $\overline{\text{LOW}}$ and $\overline{\text{HIGH}}$ signal.

Address register 604 comprises fourteen of the bit latches shown at 617. The address in address 604 on lines $A_0$–$A_{13}$ is communicated to the ROM X and Y address buffers. Register 604 is divided into four sections 604*a*–604*d*, the 604*d* section loading four bits from ADD1–ADD8 in response an $\overline{\text{LA0}}$ signal, the 604*c* section loading four bits from ADD1–ADD8 in response to an $\overline{\text{LA1}}$ signal and likewise for section 604*b* in response to an $\overline{\text{LA2}}$ signal. Section 604*a* is two bits in length and loads the ADD1 and ADD2 bits in response to an $\overline{\text{LA3}}$ signal. The chip select register 605 comprise four B type bit latches of the type shown at 618. The low order bits, CS0 and CS1 are loaded from ADD4 and ADD8 in response to an $\overline{\text{LA3}}$ signal while the high order bits CS2 and CS3 are loaded from ADD1 and ADD2 on an $\overline{\text{LA4}}$ signal. The $\overline{\text{LA0}}$–$\overline{\text{LA4}}$ signals are generated by counter 606. Counter 606 includes a four bit register 619 comprised of four A bit latches 617. The output of the four bit counter 619 is applied to a PLA 620 for decoding the $\overline{\text{LA1}}$–$\overline{\text{LA4}}$ signals. The $\overline{\text{LA0}}$ signal is generated by a NAND gate 621. As can be seen, the $\overline{\text{LA0}}$ signal comes up in response to an LA signal being decoded immediately after a TB signal. The gate 621 looks for a logical one on the LA signal and a logical one on an LTBD (latched transfer bit delay) signal from latch 622. Decoder 607 decodes the $I_0$ and $I_1$ signals applied to pins $I_0$ and $I_1$ for decoding the TB, LA and RB control signals. The signals on the $I_0$ and $I_1$ pins are set out in Table X. Latch circuit 622 is responsive to LA, RB and TB for indicating whether the previously received instruction was either an LA or a TB or RB command.

In addition to counting successive LA commands, four bit counter 619 and PLA 620 are used to count successive TB commands. This is done because in this embodiment each TB command transfers one bit from register 603 on pin ADD8 to the synthesizer chip 10 and output register 603 is loaded once each eight successive TB commands. Thus, PLA 620 also generates a TB8 command for initiating a ROM array addressing sequence. The timing sequence of counter 619 and PLA 620 are set forth in Table XI. Of course, the $\overline{\text{LA1}}$–$\overline{\text{LA4}}$ signal is only generated responsive to successive LA commands while the TB8 signals only generate in response to successive TB commands.

Add-one circuit 608 increments the number in program counter 604 in response to a TB command. Since two successive bytes are used as a new address during an RB cycle, the card address and the present address incremented by one must be used to generate these two bytes. The output of add-one circuit 608 is applied via selector 609 for communicating the results of the incrementation back to the input of counter 604. Selector 609 permits the bits in output register 603 to be communicated to program counter 604 during an RB cycle as controlled by signal BR from array 600. Add-one circuit 608 is also coupled via COUNT to chip select counter 605 for incrementing the number stored therein whenever a CARRY would occur outside the fourteen bits stored in program counter 604. The output of chip select counter 605 is applied via programmable gate 610 to gate 611. The signal on the CS pin may also be applied to gate 611 or compared with the contents of CS3. Thus, gate 611 can test for either (1) the state of the CS signal, (2) a specific count in counter 605 or (3) a comparison between the state on the chip select and the state of CS3 or (4) some combination of the foregoing, as may be controlled by those knowledgeable in the art according to how programmable links 610 are programmed during chip manufacture. The output of gate 611 is applied via two bit latches of the C type, which are shown at 622. Timing array 600 controls the timing of ROM sequencing during RB and TB sequences. Array 600 includes PLA sections 600*a* and 600*b* and counters 623 and 624. Counter 623 is a two bit counter comprising two A type bit latches shown at 617. Counter 623 counts the number of times a ROM access is required to carry out a particular instruction. For instance, a TB command requires one ROM access while an RB command requires three ROM accesses. Counter 624, which comprises four "A" type bit latches of the type shown at 617, counts through the ROM timing sequence for generating various control signals used in accessing ROM array 601. The timing sequence for a TB command is shown in Table XII which depicts the states in counters 623 and 624 and the signals generated in response thereto. A similar timing sequence for an RB command is shown in Table XIII. The various signals generated by PLA 600*a* and 600*b* will now be briefly described. The BR signal controls the transfer of two serial bits from the output register 603 to the program counter 604. The TF signal controls the transfer of eight bits from the sense amp output latch 602 (FIG. 19) to output register 603 on lines SA0–SA7. INC controls the serial incrementing of the program counter, two bits for each INC signal generated. PC is the precharge signal for the ROM array and normally exists for approximately ten microseconds. The DC signal discharges the ROM 601 array and preferably lasts for approximately ten microseconds for each DC signal. This particular ROM array uses approximately seventy microseconds to discharge and thus seven DC signals are preferably generated during each addressing sequence. SAM gates the data outputted from the ROM into the sense amp output latch 602 while SAD sets the address lines by gating the address from the program counter into the ROM address buffers.

ALTERNATIVE EMBODIMENTS

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

TABLE I

THE FOLLOWING SEQUENCE IS AN EXAMPLE OF THE LEARNING AID IN THE SPELLING MODE.

| KEY | DISPLAY | SPEAKER |
|---|---|---|
| COMPUSPELL | | 4 RANDOM TONES |
| | SPELL A | |
| B | SPELL B | B |
| C | SPELL C | C |
| D | SPELL D | D |
| P | SPELL D | P |
| A | SPELL A | A |
| GO | - | SPELL DO AS IN DO NOT |
| D | D- | D |
| O | DO- | O |
| ENTER | DO | THAT IS CORRECT, NOW SPELL WAS |
| | - | |
| W | W- | W |
| U | WU- | U |
| S | WUS- | S |
| ERASE | - | |
| W | W- | W |
| A | WA- | A |
| S | WAS- | S |
| ENTER | WAS | THAT IS RIGHT, NEXT SPELL ANY |
| | - | |
| A | A- | A |
| N | AN- | N |
| I | ANI- | I |
| ENTER | ANI | TRY AGAIN, ANY |
| | - | |
| | - | |
| REPEAT | - | ANY |
| REPEAT | - | ANY (½ SPEED) |
| E | E- | E |
| N | EN- | N |
| Y | ENY- | Y |
| ENTER | ENY | THAT IS INCORRECT, THE CORRECT SPELLING OF ANY IS |
| | A | A |
| | AN | N |
| | ANY | Y |
| | ANY | ANY |
| | | NOW TRY FULL |
| | - | |
| F | F- | F |
| U | FU- | U |
| L | FUL- | L |
| L | FULL- | L |
| | FULL | THAT IS CORRECT, TRY SHOE MEANING FOOTWEAR |
| | - | |
| S | S- | S |
| H | SH- | H |
| O | SHO- | O |
| E | SHOE- | E |
| ENTER | SHOE | YOUR ARE CORRECT, SPELL COMB |
| C | C- | C |
| O | CO- | O |
| M | COM- | M |

TABLE I (Continued)

| KEY | DISPLAY | SPEAKER |
|---|---|---|
| E | COME- | E |
| ENTER | COME | TRY AGAIN, |
| | - | COMB |
| C | C- | |
| O | CO- | |
| M | COM- | |
| B | COMB- | |
| ENTER | COMB | YOU ARE CORRECT, |
| | | NOW SPELL |
| | | FOUR AS IN |
| | - | THE NUMBER |
| F | F- | F |
| O | FO- | O |
| U | FOU- | U |
| R | FOUR- | R |
| ENTER | FOUR | THAT IS CORRECT, |
| | - | NEXT SPELL WHO |
| W | W- | W |
| H | WH- | H |
| O | WHO- | O |
| ENTER | WHO | YOU ARE RIGHT, |
| | - | NOW TRY SOUP |
| S | S- | S |
| O | SO- | O |
| U | SOU- | U |
| P | SOUP- | P |
| ENTER | SOUP | THAT IS RIGHT, |
| | - | TRY MOST |
| M | M- | M |
| O | MO- | O |
| S | MOS- | S |
| T | MOST- | T |
| ENTER | MOST | YOU ARE CORRECT |
| | +8 -2 | 4 TONES |
| | +8 -2 | 4 TONES |
| | +3 -2 | HERE IS YOUR SCORE, |
| | | EIGHT CORRECT, TWO |
| | | DID NOT COMPUTE. |

TABLE II

LEARN MODE

| KEY | DISPLAY | SPEAKER |
|---|---|---|
| | BUSY | (1 SECOND PAUSE) |
| | | SAY IT |
| | | (2 SECOND PAUSE) |
| | | BUSY |
| | MANY | (1 SECOND PAUSE) |
| | | SAY IT |
| | | (2 SECOND PAUSE) |
| | | MANY |
| | CARRY | (1 SECOND PAUSE) |
| | | SAY IT |
| | | (2 SECOND PAUSE) |
| | | CARRY |

| | | | |
|---|---|---|---|
| | | YOUR | (1 SECOND PAUSE) |
| | | | SAY IT |
| | | | (2 SECOND PAUSE) |
| | | | YOUR |
| | | WILD | (1 SECOND PAUSE) |
| | | | SAY IT |
| | | | (2 SECOND PAUSE) |
| | | | WILD |
| | | LOVE | (1 SECOND PAUSE) |
| | | | SAY IT |
| | | | (2 SECOND PAUSE) |
| | | | LOVE |
| | | BUSH | (1 SECOND PAUSE) |
| REPEAT | } IGNORED | | SAY IT |
| REPEAT | | | (2 SECOND PAUSE) |
| REPEAT | | | BUSH |
| REPEAT | | EARN | (1 SECOND PAUSE) |
| | | | SAY IT |
| | | | (2 SECOND PAUSE) |
| | | | EARN |
| | | - | SPELL MANY |
| M | | M- | M |
| A | | MA- | A |
| N | | MAN- | N |
| Y | | MANY- | Y |
| ENTER | | MANY | YOU ARE CORRECT, |
| | | - | NOW SPELL EARN |

THE LEARNING AID CONTINUES THROUGH THE REMAINING 9 WORDS AS IN THE SPELLING MODE.

TABLE III

IN THE WORD GUESSER MODE THE LEARNING AID RANDOMLY SELECTS A WORD FROM LEVEL C OR D AND DISPLAYS DASHES TO REPRESENT THE NUMBER OF LETTERS IN THE CHOSEN WORD. THE USER TRIES TO GUESS THE WORD. THE USER MUST COMPLETE THE WORD BEFORE MAKING SEVEN INCORRECT GUESSES. THE FOLLOWING IS AN EXAMPLE OF THE FUNCTION OF THE LEARNING AID IN THE SPELLING MODE.

| KEY | DISPLAY | SPEAKER |
|---|---|---|
| HANGMAN | -------- | 4 TONES |
| A | -------- | |
| E | E-E----E | 4 TONES |
| I | E-E----E | |
| O | E-E--O-E | 4 TONES |
| U | E-E--O-E | |
| B | E-E--O-E | |
| C | E-E--O-E | |
| D | E-E--O-E | |
| F | E-E--O-E | |
| | EVERYONE | 4 TONES, I WIN |
| | ------ | |
| A | ------ | |
| E | -----E | 4 TONES |
| I | -----E | |
| O | -O---E | 4 TONES |
| U | -OU--E | 4 TONES |
| B | -OU--E | |
| C | COU--E | 4 TONES |
| R | COUR-E | 4 TONES |
| S | COURSE | 4 TONES |
| | COURSE | 4 TONES, YOU WIN |

TABLE IV

The synthesizer 10 includes interpolation logics to accomplish a nearly linear interpolation of all twelve speech parameters at eight points within each frame, that is, once each 2.5 msec. The parameters are interpolated one at a time as selected by the parameter counter. The interpolation logics calculate a new value of a parameter from its present value (i.e. the value currently stored in the K-stack, pitch register or E-10 loop) and the target value stored in encoded form in RAM 203 (and decoded by ROM 202). The value computed by each interpolation is listed below.

Where $P_i$ is the present value of the parameter, $P_{i+1}$ is the new parameter value $P_t$ is the target value $N_i$ is an integer determined by the interpolation counter The values of $N_i$ for specific interpolation counts and the values $\frac{P_i-P_0}{P_t-P_0}$ ($P_0$ is initial parameter value) are as follows:

| INTERPOLATION COUNT | $N_i$ | $\frac{P_i-P_0}{P_t-P_0}$ |
|---|---|---|
| 1 | 8 | 0.125 |
| 2 | 8 | 0.234 |
| 3 | 8 | 0.330 |
| 4 | 4 | 0.498 |
| 5 | 4 | 0.623 |
| 6 | 2 | 0.717 |
| 7 | 2 | 0.859 |
| 0 | 1 | 1.000 |

TABLE V

"HELP"

```
0000
0100000000100110111010010111          ┐
0111000001                            │
1101100100100001010010000111001111100011010100101010
1101100111                            │
1110100111                            ┘
110110100001101011111101010100100101111000100101101   ┐
11011010000111001011100011001101110000100100011101    │ HEL
1101100110100010101001101001111110110101010000110     │
1011100101                                            │
1010100100011010011110001100111101110010001010110     │
1001100001                                            │
1001011101                                            │
1000011011                                            │
0010011100000101001011101100111100101011100101011     ┘
0000
0000
0000
0111000000101000101110111000          ┐
0111000000100010101110110110          │
0101000001                            │ P
0011000000100110011110100110          │
0010000000100100001011011101          ┘
0000
1111
```

ENERGY PITCH REPEAT $K_1$ $K_2$ $K_3$ $K_4$ $K_5$ $K_6$ $K_7$ $K_8$ $K_9$ $K_{10}$

TABLE VI DECODED PARAMETERS

| CODE | E | P | K1 | K2 | K3 | K4 | K5 | K6 | K7 | K8 | K9 | K10 |
|---|---|---|---|---|---|---|---|---|---|---|---|---|
| 00 | 000 | 000 | 20B | 2A3 | 273 | 2B6 | 2C1 | 2DE | 2DD | 325 | 31F | 30D |
| 01 | 000 | 029 | 20F | 2BB | 295 | 2B2 | 2E2 | 304 | 300 | 37B | 363 | 3A6 |
| 02 | 001 | 02B | 215 | 2CF | 2B9 | 2DB | 306 | 32F | 32B | 3DA | 3AF | 3C3 |
| 03 | 001 | 02D | 21[illegible] | 2FA | 2F6 | 30B | 320 | 35D | 352 | 03B | 3FD | 001 |
| 04 | 002 | 02F | 220 | 304 | 31B | 341 | 35B | 3BE | 3B0 | 09B | 04C | 03F |
| 05 | 003 | 031 | 229 | 321 | 356 | 37D | 3B6 | 3C2 | 3B0 | 0FB | 097 | 07B |
| 05 | 005 | 033 | 234 | 340 | 39B | 3BD | 3B6 | 3F7 | 3E1 | 131 | 0DC | 0B3 |
| 07 | 007 | 035 | 242 | 362 | 3DC | 3FF | 3E7 | 02C | 013 | 169 | 11B | 0F7 |
| 08 | 00A | 037 | 255 | 3B4 | 023 | 040 | 018 | 061 | 045 | | | |
| 09 | 00F | 03A | 26B | 3AB | 06B | 080 | 049 | 093 | 075 | | | |
| 0A | 015 | 03C | 2B6 | 3CD | 0A9 | 0BC | 079 | 0C2 | 0A5 | | | |
| 0B | 01F | 03F | 2AB | 3F2 | 0E4 | 0F3 | 0A7 | 0FF | 0CF | | | |
| 0C | 02A | 042 | 2CF | 017 | 119 | 123 | 0D2 | 116 | 0F6 | | | |
| 0D | 03D | 046 | 2E[illegible] | 03C | 146 | 14C | 0F9 | 139 | 11B | | | |
| 0E | 056 | 049 | 332 | 061 | 16C | 16F | 11D | 15B | 13C | | | |
| 0F | 000 | 04C | [illegible] | 085 | 18C | 18D | 13F | 173 | 159 | | | |
| 10 | | 04F | 3A3 | 0A7 | | | | | | | | |
| 11 | | 053 | [illegible] | 0C7 | | | | | | | | |
| 12 | | 057 | 02[illegible] | 0F6 | | | | | | | | |
| 13 | | 05A | 06F | 103 | | | | | | | | |
| 14 | | 05F | [illegible] | 11F | | | | | | | | |
| 15 | | 063 | [illegible] | 136 | | | | | | | | |
| 16 | | 067 | 115 | 14D | | | | | | | | |
| 17 | | [illegible] | [illegible] | 162 | | | | | | | | |
| 18 | | 070 | 165 | 174 | | | | | | | | |
| 19 | | 076 | [illegible] | 185 | | | | | | | | |
| 1A | | [illegible] | [illegible] | [illegible] | | | | | | | | |
| 1B | | [illegible] | [illegible] | [illegible] | | | | | | | | |
| 1C | | [illegible] | [illegible] | [illegible] | | | | | | | | |
| 1D | | [illegible] | [illegible] | [illegible] | | | | | | | | |
| 1E | | [illegible] | [illegible] | 1C1 | | | | | | | | |
| 1F | | [illegible] | 1E2 | 1FA | | | | | | | | |

TABLE VII

DATA OUTPUTTED FROM K-STACK 302 TO RECODING LOGIC 301 BY TIME PERIODS

K-STACK OUTPUT — TIME PERIODS

| | BIT LINE | T8 | T9 | T10 | T11 | T12 | T13 | T14 | T15 | T16 | T17 | T18 | T19 | T20 | T21 | T22 | T23 | T24 | T25 | T26 | T27 |
|---|---|---|---|---|---|---|---|---|---|---|---|---|---|---|---|---|---|---|---|---|---|
| LSB | 32-1 | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ | $K_3$ |
| | 32-2 | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ | $K_3$ |
| | 32-3 | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ | $K_3$ |
| | 32-4 | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ | $K_3$ |
| | 32-5 | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ |
| | 32-6 | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ |
| | 32-7 | $K_4$ | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ |
| | 32-8 | $K_4$ | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ |
| | 32-9 | $K_5$ | $K_4$ | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ |
| MSB | 32-10 | $K_5$ | $K_4$ | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ |

TABLE VIII

CHIRP ROM CONTENTS

| ADDRESS | CHIRP FUNCTION VALUE | STORED VALUE (COMPLEMENTED) |
|---|---|---|
| 00 | 00 | FF |
| 01 | 2A | D5 |
| 02 | D4 | 2B |
| 03 | 32 | CD |
| 04 | B2 | 4D |
| 05 | 12 | ED |
| 06 | 25 | DA |
| 07 | 14 | EB |
| 08 | 02 | FD |
| 09 | E1 | 1E |
| 10 | C5 | 3A |
| 11 | 02 | FD |
| 12 | 5F | A0 |
| 13 | 5A | A5 |
| 14 | 05 | FA |
| 15 | 0F | F0 |
| 16 | 26 | D9 |
| 17 | FC | 03 |
| 18 | A5 | 5A |
| 19 | A5 | 5A |
| 20 | D6 | 29 |
| 21 | DD | 22 |
| 22 | DC | 23 |
| 23 | FC | 03 |
| 24 | 25 | DA |
| 25 | 2B | D4 |
| 26 | 22 | DD |
| 27 | 21 | DE |
| 28 | 0F | F0 |
| 29 | FF | 00 |
| 30 | F8 | 07 |
| 31 | EE | 11 |
| 32 | ED | 12 |
| 33 | EF | 10 |
| 34 | F7 | 08 |
| 35 | F6 | 09 |
| 36 | FA | 05 |
| 37 | 00 | FF |
| 38 | 03 | FC |
| 39 | 02 | FD |
| 40 | 01 | FE |

TABLE IX-0 LEARNING AID INSTRUCTION SET

| Address | Instruction | Branch Line | Line | Name | Title | | Comments |
|---|---|---|---|---|---|---|---|
| [illegible] | [illegible] | | 0055 | KO3 | TAMZA | | ADD 5 TO KEY |
| [illegible] | [illegible] | | 0056 | | ALACC | 5 | CODE EACH TIME |
| [illegible] | [illegible] | | 0057 | | TCY | 14 | R-LINE POINTER IS DECREMENTED |
| [illegible] | [illegible] | 0112 | 0058 | | CALL | ADDCARRY | |
| [illegible] | [illegible] | 0080 | 0059 | | BRANCH | KO2 | |
| [illegible] | [illegible] | | 0060 | KEYDOWN | TCMIY | 0 | RESET DEBOUNCE COUNTER |
| [illegible] | [illegible] | | 0061 | | LDX | 1 | |
| [illegible] | [illegible] | | 0062 | | TCY | 14 | |
| [illegible] | [illegible] | | 0063 | | TKM | | |
| [illegible] | [illegible] | | 0064 | | MNEZ | | DOUBLE CHECK KEY DOWN |
| [illegible] | [illegible] | 0068 | 0065 | | BRANCH | KO1 | |
| [illegible] | [illegible] | | 0066 | | LDX | 0 | |
| [illegible] | [illegible] | 0134 | 0067 | | BRANCH | CARS | KEY GOT DOWN |
| [illegible] | [illegible] | | 0068 | KO1 | LDX | 0 | |
| [illegible] | [illegible] | | 0069 | | TCMIY | 6 | |
| [illegible] | [illegible] | | 0070 | | TCMIY | 0 | |
| [illegible] | [illegible] | | 0071 | | TCY | 15 | |
| [illegible] | [illegible] | | 0072 | | TMY | | |
| [illegible] | [illegible] | | 0073 | | RSTR | | RESET PRESENT R-LINE |
| [illegible] | [illegible] | | 0074 | | TCY | 13 | |
| [illegible] | [illegible] | | 0075 | | TMA | | |
| [illegible] | [illegible] | | 0076 | | ALACC | 6 | PUT 6 IN ACC |
| [illegible] | [illegible] | | 0077 | | MNEZ | | SEE IF KEY IS ON VSS |
| [illegible] | [illegible] | 0080 | 0078 | | BRANCH | KO2 | VSS |
| [illegible] | [illegible] | | 0079 | | TMA | | |
| [illegible] | [illegible] | | 0080 | KO2 | TAM | | * STORE 6 IF K=VSS |
| [illegible] | [illegible] | | 0081 | | TCY | 13 | |
| [illegible] | [illegible] | | 0082 | | DMAN | | |
| [illegible] | [illegible] | 0055 | 0083 | | BRANCH | KO3 | |
| [illegible] | [illegible] | | 0084 | SUMSIT | LDX | ONE | * BUMP ROUTINE TO CALCUL VALUE OF KP |
| [illegible] | [illegible] | | 0085 | | TCY | VALUE | ** |
| [illegible] | [illegible] | | 0086 | | TMA | | ** |
| [illegible] | [illegible] | | 0087 | | ALEC | 2 | |
| [illegible] | [illegible] | [illegible] | 0088 | | BRANCH | ARGD+5 | |
| [illegible] | [illegible] | | 0089 | | ACACC | 15 | |
| [illegible] | [illegible] | | 0090 | | ALEC | 3 | |
| [illegible] | [illegible] | [illegible] | 0091 | | BRANCH | ARGD+5 | |
| [illegible] | [illegible] | | 0092 | | ACACC | 13 | |
| [illegible] | [illegible] | | 0093 | | ALEC | 4 | |
| [illegible] | [illegible] | [illegible] | [illegible] | | BRANCH | ARGD+5 | |

TABLE IX-0 (Continued)

```
[illegible] [illegible]        0095              ACACC     10
[illegible] [illegible]        0096  ARRD+5      ACACC     MINUS1          **
[illegible] [illegible]        0097              LDX       ZERO            **
[illegible] [illegible]        0098              TCY       VALUE           **
[illegible] [illegible] 0112   0099              CALL      ADDCARRY
[illegible] [illegible]        0100  EVLAOUT     BL        KEYLEVL
[illegible] [illegible] 2282   0101
                               0102  * THIS ROUTINE USES ,CARRY, TO INCREMENT THE RANDOM NUMBER/TIMEOUT COUNTER
[illegible] [illegible]        0103  TIMEUP      TCY       12
[illegible] [illegible]        0104              KNEZ
[illegible] [illegible] 0123   0105              BRANCH    CAR2
[illegible] [illegible]        0106  TIMEUP1     LDX       3
[illegible] [illegible]        0107              TCY       6
[illegible] [illegible] 0116   0108              BRANCH    CARRYON
                               0109  *
                               0110  *   CARRY:  FOR ADDITION TO ROM ADDR SECTION OF RAM
                               0111  *
[illegible] [illegible]        0112  ADDCARRY    AMAAC
[illegible] [illegible] 0115   0113              BRANCH    CARRY
[illegible] [illegible] 0119   0114              BRANCH    NOCARRY
[illegible] [illegible]        0115  CARRY       TAMIYC                    CARRY
[illegible] [illegible]        0116  CARRYON     IMAC                      INCREMENT MEM IF CARRY
[illegible] [illegible] 0115   0117              BRANCH    CARRY
[illegible] [illegible]        0118  NOCARRY     TAY
[illegible] [illegible]        0119              RETN
[illegible] [illegible]        0120              TCY       12
[illegible] [illegible]        0121              TMA
[illegible] [illegible]        0122              ALEC      5               CHECK TIMEOUT COUNTER
[illegible] [illegible] 0126   0123              BRANCH    CAR1
[illegible] [illegible]        0124  OFF         TCY       13
[illegible] [illegible]        0125              RSTR                      TURNS OFF CALCULATOR
[illegible] [illegible]        0126  CAR1        LDX       0
[illegible] [illegible] 0133   0127              BRANCH CAR3
[illegible] [illegible]        0128  CAR2        TAM
[illegible] [illegible]        0129  CAR4        TCY       10
[illegible] [illegible]        0130              YNEC      5               TEST DEBOUNCE COUNTER
[illegible] [illegible] 0135   0131              BRANCH    CAR5            ACCEPT KEY IF COUNTER>7
[illegible] [illegible]        0132              TCMIY     0               RESET DEBOUNCE COUNTER
[illegible] [illegible]        0133  CAR3        TL        DISP/KB1
[illegible] [illegible] 2295   0134
[illegible] [illegible]        0135  CAR5        ALEC      13              *TEST TO SEE IF SPEECH IS
[illegible] [illegible] 0133   0136              BRANCH    CAR3            *FINISHED (TEST TALK COUNTER=14)
[illegible] [illegible] [illegible] 0137         BRANCH    KEYDOWN
                               0138  *
```

TABLE IX-0 (Continued)

```
                                *
                                *
                                *
[illegible]  [illegible]        GAME#3   LDX      8
0012         [illegible]                 TCY      7
0025         [illegible]                 TMA
[illegible]  [illegible]                 ALEC     6
[illegible]  [illegible]  0148           BRANCH   FIRST
[illegible]  [illegible]  0152           BRANCH   GM3A
[illegible]  [illegible]        FIRST    TCMIY    7
[illegible]  [illegible]                 SBIT     1
[illegible]  [illegible]                 CALLL    CLEAR
[illegible]  [illegible]  0234
0021         [illegible]        GM3A     CALLL    CURLEVL
[illegible]  [illegible]  0769
[illegible]  [illegible]                 TCMIY    0
[illegible]  [illegible]                 TCMIY    8            * TO 00BC; 00BC=00BD
                                *                              * CONTAIN ADDRESS FOR
                                *                              * RANDOM LETTER TABLE
[illegible]  [illegible]                 CALLL    RFMADDR      ADDRESS 0350
0027         [illegible]  1501
[illegible]  [illegible]                 CALLL    LOADRESS     * LOAD DATA FROM 0350 INTO
[illegible]  [illegible]  1121
                                *                              * ROM ADDRESS LOCATION
[illegible]  [illegible]                 LDX      5
[illegible]  [illegible]                 TCY      9
[illegible]  [illegible]                 RBIT     5
[illegible]  [illegible]                 TMA
[illegible]  [illegible]                 LDX      1            * ADD
[illegible]  [illegible]                 TCY      11           * TO
[illegible]  [illegible]  0112           CALL     ADDCARRY     * ROM ADDRESS
[illegible]  [illegible]                 LDX      5            GET LSD OF RANDOM NUMBER
[illegible]  [illegible]                 TCY      [illegible]  GET MSD OF RANDOM NUMBER
[illegible]  [illegible]                 TMA
[illegible]  [illegible]                 LDX      1
[illegible]  [illegible]                 TCY      10
[illegible]  [illegible]  0112           CALL     ADDCARRY     * ADD TO ROM ADDRESS
[illegible]  [illegible]                 CALLL    RFMADDR      LOAD ADDRESS TO 0350
[illegible]  [illegible]  1501
[illegible]  [illegible]                 CALLL    LOTAFDR2     GET LSD OF RANDOM LETTER
[illegible]  [illegible]  [illegible]
[illegible]  [illegible]                 LDX      0
[illegible]  [illegible]                 TCY      14
```

TABLE IX-0 (Continued)

```
0066  00011111        0182            TAM
0062  01001111        0183            CALLL    OUTADDR2          GET MSD OF RANDOM LETTER
001A  11100001  1085  0184
0035  11001000        0185            LDX      0                 * STORE
006A  00100111        0186            TCY      15                * LIKE A
0055  00010111        0187            TAM                        * KEYPRESS
002A  01001010        0188            LDX      2
0054  01110000        0189            TCMIY    6
0028  10000111        0190            BL       TRANSFER          ** SAYS LETTER AND
0050  10111111  1875  0191
                      0192     *                                 ** PUTS IT IS DISPLAY
```

TABLE IX-1

```
                      0193            ORGPG    1
0000  00101101        0194   NOTFULL  TAMIYC
0001  00110100        0195            TCMIY    1
0003  00100111        0196            TCY      14
0007  00110101        0197            TYA
000F  00101111        0198            TCY      11
001E  00101010        0199            TAY
003C  00111000        0200            LDX      1
0079  00101101        0201            TAMIYC
0072  00110011        0202            TCMIY    12
0064  00100100        0203            LDX      0
0049  00100101        0204            TCY      NXTDSP            **
0012  00110010        0205            IMAC                       **
0024  00101111        0206            TAM                        **
0048  00100010        0207            BL       POSTRANS          **
0010  00101100  1080  0208
                      0209     *
                      0210     *   GO ROUTINE==> DECIDES WHICH MODE YOUR IN AND BRANCHES
                      0211     *        TO THAT MODE, ELSE GOES TO DISP/KB.
                      0212     *
```

TABLE IX-1 (Continued)

```
[illegible]          0213  GO      PL      RANDOM
[illegible]   0753   0214
[illegible]          0215  RANRTN  LDX     8          RAM
[illegible]          0216          TCY     6
[illegible]          0217          RBIT    1
[illegible]          0218          TCY     8          SET GO MODE FLAG
[illegible]          0219          SBIT    1          *
[illegible]          0220          TCY     7          TEST WHICH MODE
[illegible]          0221          TKA
[illegible]          0222          LDX     5
[illegible]          0223          TCY     13
[illegible]          0224          TCMIY   0
[illegible]          0225          CALLL   CORR$SPL
[illegible]   1582   0226
[illegible]          0227          LDP     2
[illegible]          0228          ALEC    1          SPELL?
[illegible]   0342   0229          BRANCH  USPELL     *
[illegible]          0230          LDP     8          *
[illegible]          0231          ALEC    3          LEARN?
[illegible]   1269   0232          BRANCH  ULRN+1
[illegible]          0233          LDP     11
[illegible]          0234          ALEC    5          GAME#1?
[illegible]   1590   0235          BRANCH  CORR+1
[illegible]          0236  CLEAR   TCY     0
[illegible]          0237  HERE    LDX     0
[illegible]          0238          TCMIY   1
[illegible]          0239          [illegible]
[illegible]          0240          LDX     1
[illegible]          0241          TCMIY   11
[illegible]          0242          YNEC    8
[illegible]   0237   0243          BRANCH  HERE
[illegible]          0244          TCY     0
[illegible]          0245          TCMIY   12
[illegible]          0246          LDX     0
[illegible]          0247          TCY     11
[illegible]          0248          TCMIY   0
[illegible]          0249          RETN
[illegible]   0215   0250  REPLAY  BRANCH  RANRTN
                     0251  *
                     0252  *  ENTER=  ROUTINE TO PROCESS ENTER KEY DEPRESS
                     0253  *
```

TABLE IX-1 (Continued)

| | | | | | | | |
|---|---|---|---|---|---|---|---|
| [illegible] | [illegible] | | 0254 | ENTER | LDY | 8 | RAM |
| [illegible] | [illegible] | | 0255 | | TCY | 7 | FLAG |
| 0060 | [illegible] | | 0256 | | MNEZ | | SPELL MODE? |
| 0041 | [illegible] | 0259 | 0257 | | BRANCH | TST4A3 | NO |
| 0002 | [illegible] | 0273 | 0258 | | BRANCH | SPACE-3 | |
| 0005 | [illegible] | | 0259 | TST4A3 | TMY | | |
| 0006 | [illegible] | | 0260 | | YNEC | 3 | SPELL IT MODE? |
| 0017 | [illegible] | 0263 | 0261 | | BRANCH | TST4A6 | NO |
| 002F | [illegible] | 0273 | 0262 | | BRANCH | SPACE-3 | |
| 0051 | [illegible] | | 0263 | TST4A6 | YNEC | 6 | GAME 2 MODE? |
| 003C | [illegible] | 0273 | 0264 | | BRANCH | SPACE-3 | |
| 007E | [illegible] | | 0265 | | BL | CRYPTO | |
| 0071 | [illegible] | 0894 | 0266 | | | | |
| | | | 0267 | * | | | |
| | | | 0268 | * TEST FOR CURSER POSITION | | | |
| | | | 0269 | * FIRST POSITION? ---RETURN | | | |
| | | | 0270 | * ELSE, REPLACE CURSER WITH SPACE | | | |
| | | | 0271 | * | | | |
| | | | 0272 | * TEST FOR POSITION OF CURSER AND REPLACE WITH SPACE | | | |
| 0063 | [illegible] | | 0273 | SPACE-3 | TCY | 7 | LAST CHAR |
| 0007 | [illegible] | | 0274 | | LDX | 1 | |
| [illegible] | [illegible] | | 0275 | SPACE-2 | CLA | | ACC=8 |
| 0010 | [illegible] | | 0276 | | ACACC | 11 | 1H=SPACE |
| 003E | [illegible] | | 0277 | | MNEA | | MEM=11? |
| 0076 | [illegible] | 0283 | 0278 | | BRANCH | CHAROR+ | NO |
| [illegible] | [illegible] | | 0279 | | LDX | 6 | YES |
| [illegible] | [illegible] | | 0280 | | MNEZ | | BLANK? |
| 0036 | [illegible] | 0296 | 0281 | | BRANCH | SPACE-1 | YES, GO TO SPACE-1 |
| [illegible] | [illegible] | 0293 | 0282 | | BRANCH | CHAR | ELSE, CHAR |
| 0054 | [illegible] | | 0283 | CHAROR+ | LDX | 1 | |
| 0032 | [illegible] | | 0284 | | ACACC | 1 | ACC=12 FOR CURSER |
| [illegible] | [illegible] | | 0285 | | MNEA | | |
| [illegible] | [illegible] | 0293 | 0286 | | BRANCH | CHAR | CHAR |
| 0012 | [illegible] | | 0287 | | LDX | 0 | TEST MSB |
| 0025 | [illegible] | | 0288 | | MNEZ | | CURSER |
| [illegible] | [illegible] | 0291 | 0289 | | BRANCH | CUR-1 | YES |
| [illegible] | [illegible] | 0293 | 0290 | | BRANCH | CHAR | NO, THEN CHAR |
| 0027 | [illegible] | | 0291 | CUR-1 | LDX | 1 | LSB |
| [illegible] | [illegible] | | 0292 | | TCMIY | 11 | |
| [illegible] | [illegible] | | 0293 | CHAR | RETN | | |
| [illegible] | [illegible] | | 0294 | | BL | SPLENTER | GO TO SPELL ROUTINE |

TABLE IX-1 (Continued)

| | | | | | | | |
|---|---|---|---|---|---|---|---|
| 0010 | 10101 111 | 0373 | 0295 | | | | |
| 0021 | 00000 100 | | 0296 | SPACE-1 | DYE | | SEARCH FOR CURSER |
| 0092 | 01001000 | | 0297 | | LDX | 1 | * |
| 0084 | [illegible] | 0275 | 0298 | | BRANCH | SPACE-2 | * |
| | | | 0299 | * | | | |
| | | | 0300 | * | | | |
| | | | 0301 | * NOPHRASE LOADS ROM ADDR WITH SECOND WRONG RESPONSE | | | |
| | | | 0302 | * THEN CONTINUES TO NEXT WORD | | | |
| | | | 0303 | * | | | |
| 0069 | [illegible] | | 0304 | NOPHRASE | LDX | 3 | FLAG |
| 0013 | [illegible] | | 0305 | | TCY | 13 | * |
| 0027 | [illegible] | | 0306 | | TCMIY | 3 | |
| 004F | [illegible] | | 0307 | | CALLL | CURLEVL | |
| 001C | 11111 1111 | 0769 | 0308 | | | | |
| 0039 | [illegible] | | 0309 | | TCMIY | 2 | |
| 0072 | [illegible] | | 0310 | | TCMIY | 6 | |
| 0065 | [illegible] | | 0311 | SPK4 | CALLL | MEMADDR | |
| 0040 | [illegible] | 1501 | 0312 | | | | |
| 0016 | [illegible] | | 0313 | | CALLL | LOADRESS | |
| 0020 | [illegible] | 1121 | 0314 | | | | |
| 0054 | [illegible] | | 0315 | | CALLL | MEMADDR | |
| 0059 | [illegible] | 1501 | 0316 | | | | |
| 0068 | [illegible] | | 0317 | | BL | LNRSET | ALWAYS BRANCH |
| 0051 | [illegible] | 1751 | 0318 | | | | |
| 0022 | [illegible] | | 0319 | F-SCORE | LDX | 2 | RETNRCH FLAG |
| 0044 | [illegible] | | 0320 | | TCY | 14 | |
| 0058 | [illegible] | | 0321 | | TCMIY | 1 | |
| 0011 | [illegible] | | 0322 | | TCMIY | 0 | * |
| 0023 | [illegible] | | 0323 | | CALLL | CURLEVL | ZERO ROM ADDR |
| 0046 | 11111 1111 | 0769 | 0324 | | | | |
| 0031 | [illegible] | | 0325 | | LDP | 6 | |
| 0019 | [illegible] | | 0326 | | ALEC | 9 | 10 CORRECT????? |
| 0033 | [illegible] | 0255 | 0327 | | BRANCH | F2 | NO, |
| 0062 | [illegible] | | 0328 | | LDX | 0 | |
| 0040 | [illegible] | | 0329 | | TCY | 2 | |
| 0012 | [illegible] | | 0330 | | TCMIY | 2 | |
| 0035 | [illegible] | | 0331 | | LDX | 1 | FLCE-------- |
| 0052 | [illegible] | | 0332 | | TCY | 1 | |
| 0055 | [illegible] | | 0333 | | TCMIY | 1 | |
| 0023 | [illegible] | | 0334 | | TCMIY | 0 | |
| 0051 | [illegible] | | 0335 | | LDX | 2 | |
| 002 | [illegible] | | 0336 | | TCY | 14 | |
| [illegible] | [illegible] | | 0337 | | TMAC | | |

TABLE IX-2

```
                   TT        TONE22

                   DRGPG     2
*
USPELL    COMXA                          ADDRESS DAM
          TCY       0
          TCMIY     0
USPELL+1  CALLL     CLEAR                * BLANK DISPLAY = INPUT CURSER
*   LOAD PHRASE INTO ROM ADDRESS REG
MISSPELL  CALLL     CONLEVL

          TCMIY     0
          TCMIY     6
ADDCTR    COMXA                          ADDRESS DAM
          TCY       4                    PHRASE COUNTER==>ACC
          TMA                            *
          LDX       1
          TCY       16
          RETN
          CALLL     ADDCARRY
*   SET UP WORD ADDRESS IN LNK/EDT
          LDX       2
          TCY       15
          TCMIY     9
          CALLL     REMADDR

          CALLL     LOADRESS

          BRANCH    SHIT3
*
*   SPLETTER= BEGINS BY COMPARING CORRECT SPELLING BUFFER
*             TO DISPLAY BUFFER
*
SPLETTER  TCY       0                    FIRST LETTER==LS...
SPLETR+1  LDX       3                    *
          TMA
          LDX       1                    DISPLAY BUFFER
          MNEA                           SAME?
          BRANCH    MISS1
          TCA       2                    YES, TEST MSW
          CLA
          TBIT1     0
```

TABLE IX-2 (Continued)

```
0013  [illegible]  0386  0382             BRANCH   CONXT1
0037  [illegible]  0385  0383             BRANCH   CONXT2
006F  [illegible]        0384  CONXT1     ACACC    1
0056  [illegible]        0385  CONXT2     LDX      0
0052  [illegible]        0386             MOEA                           SAME?
0074  [illegible]  0125  0387             BRANCH   MISS1
0069  [illegible]        0388             CLA
0053  [illegible]        0389             RETN
0026  [illegible]        0390             TYC                            NEXT LETTER
004C  [illegible]        0391             YNEC     8
0010  [illegible]  0374  0392             BRANCH   SPLNTR+1              NO
                         0393  *    SPELLING IS CORRECT
0041  [illegible]        0394             COMXA                          ADDRESS DAM
0062  [illegible]        0395             TCY      6                     FLAG
0045  [illegible]        0396             TBIT     0                     BIT 0-->0=FIRST TRY
0003  [illegible]  0400  0397             BRANCH   XBIT                  *          1-->MORE TN ONE
0015  [illegible]        0398             SBIT     0
                         0399  *    BEGIN LOADING PRAISE PHRASE
0026  [illegible]        0400  XBIT       LDX      3
0056  [illegible]        0401             TCY      13                    FLAG
0021  [illegible]        0402             TCMIY    1
0053  [illegible]        0403             COMXA
0030  [illegible]        0404             TCY      1
0066  [illegible]        0405             TCMIY    0
0041  [illegible]        0406             LDX      2
0002  [illegible]        0407             TCY      15
0005  [illegible]        0408             TCMIY    3
0006  [illegible]        0409             CALLL    COMLEVL
0017  [illegible]  0769  0410
002F  [illegible]        0411             TCMIY    8
005F  [illegible]        0412             TCMIY    5
003C  [illegible]  0352  0413             CALL     ADDCTR
0070  [illegible]        0414             ALEC     6
0071  [illegible]  0121  0415             BRANCH   XBIT2
0003  [illegible]        0416             COMXA
0017  [illegible]        0417             TCY      4
000E  [illegible]        0418             TCMIY    0
001[illegible]  [illegible]        0419             CLA
0030  [illegible]        0420             COMXA
0076  [illegible]        0421  XBIT2      LDP      0
0061  [illegible]  0112  0422             CALL     ADDCARRY
0005  [illegible]        0423  XBIT3      RT       ADDCTR6
0036  [illegible]  0700  0424
```

```
006C  00000110        0425  MISS1   CLA
0057  01110011        0426          ACACC   12
0032  01001000        0427          LDX     0
0064  01011111        0428          RETN
0049  01000101        0429          BL      MISSPELL
0012  10111001  1546  043.
0025  01000100        0431  F3      CALLL   CLEAR              CLEAR DISPLAY
004A  11011010  0236  0432
0014  01001001        0433          LDX     8
0029  01000001        0434          TCY     8
0052  01010001        0435          SBIT    2
0024  01010110        0436          RBIT    1
0044  01001000        0437          TCY     1
0010  01001000        0438          LDX     0
0021  01100100        0439          TCMIY   2
0012  01001110        0440          TCY     7
0003  01100100        0441          TCMIY   2
0009  01001100        0442          LDX     1
0013  01000000        0443          TCY     0
0027  01101011        0444          TCMIY   13
004F  01000110        0445          TCY     6
001C  01100111        0446          TCMIY   14
0039  01001101        0447          LDX     5
0072  01001011        0448          TCY     13
0065  00101001        0449          TMA
0046  01001100        0450          LDX     1
0016  01001110        0451          TCY     7
0020  00101111        0452          TAM
0054  01000111        0453          CALLL   FL2
0034  11001100  1145  0454
0068  01001100        0455          LDX     1
0051  01001000        0456          TCY     1
0022  00101111        0457          TAM
0044  01000100        0458          BL      F-SCORE
0005  10010010  0319  0459
                      0460  *  LEARN MODE BEGINS HERE
                      0461  *
0011  01001001        0462  SPELL   LDX     8
0023  01001110        0463          TCY     7
0046  01100000        0464          TCMIY   0
000C  11001101  0469  0465          BRANCH  SPELL9
```

TABLE IX-2 (continued)

| | | | | | | | |
|---|---|---|---|---|---|---|---|
| 0019 | 010010001 | | 0466 | LEARN | LDX | 8 | |
| 0033 | 001001110 | | 0467 | | TCY | 7 | |
| 0066 | 001100100 | | 0468 | | TCMIY | 2 | |
| 0040 | 010001111 | | 0469 | SPELL9 | BL | DSP7 | |
| 001A | 101110000 | 2188 | 0470 | | | | |
| 0035 | 001111100 | | 0471 | MISS3 | ACACC | 3 | |
| 006A | 000101111 | | 0472 | | TAM | | |
| 0055 | 010000010 | | 0473 | | LDP | 4 | |
| 002A | 011110110 | | 0474 | | ALEC | 6 | |
| 0054 | 100101100 | 0680 | 0475 | | BRANCH | NOSTRANS | |
| 0029 | 010001100 | | 0476 | | BL | IWIN | |
| 0050 | 100101100 | 0541 | 0477 | | | | |

TABLE IX-3

| | | | | | | | |
|---|---|---|---|---|---|---|---|
| | | | 0478 | | ORGPG | 3 | |
| 0000 | 010010100 | | 0479 | GAME#1 | LDX | 2 | |
| 0001 | 000000110 | | 0480 | | CLA | | |
| 0003 | 001001011 | | 0481 | | TCY | 13 | |
| 0007 | 000101111 | | 0482 | | TAM | | CLEAR GUESS COUNTER |
| 000F | 010011100 | | 0483 | | LDX | 3 | |
| 001F | 001100111 | | 0484 | | TCMIY | 14 | HANGMAN FLAG |
| 003F | 001000101 | | 0485 | | TCY | 10 | |
| 007F | 000100000 | | 0486 | | TBIT | 0 | * TEST RANDOM COUNTER |
| 007E | 101111011 | 0489 | 0487 | | BRANCH | HANG2 | * HIT AND PUT 2 OR 3 |
| 007D | 001111000 | | 0488 | | ACACC | 1 | * IN ACC |
| 007A | 001110100 | | 0489 | HANG2 | ACACC | 2 | * |
| 0077 | 010011000 | | 0490 | | LDX | 1 | |
| 006F | 001001111 | | 0491 | | TCY | 15 | * STORE 2 OR 3 IN LEVEL |
| 005F | 000101111 | | 0492 | | TAM | | * OF DIFFICULTY |
| 003E | 010010001 | | 0493 | | LDX | 8 | DAM |
| 007C | 001001110 | | 0494 | | TCY | 7 | |
| 0079 | 001101010 | | 0495 | | TCMIY | 5 | SET HANGMAN MODE |
| 0073 | 010001010 | | 0496 | | BL | CURLEVL | |
| 0067 | 101101111 | 0769 | 0497 | | | | |

TABLE IX-3 (Continued)

```
                              0498   * 'RANDOM' GENERATES A RANDOM WORD,
                              0499   * PUTS IT IN THE CORRECT SPELLING
                              0500   * BUFFER AND RETURNS TO 'HANG'
004F 01000100          0501   HANG      CALLL     CLEAR          PUT BLANKS IN DISPLAY
001F 110111010   0236  0502
0030 00100001          0503             TCY       8
007A 00000100          0504   HANG3     DYN
0075 01000100          0505             CALLL     SPLNTR+1       * COMPARE DISPLAY DIGIT TO
0069 110101110   0374  0506
0057 01110000          0507             ALEC      0              * DIGIT IN CORRECT
002F 110111010   0504  0508             BRANCH    HANG3          * SPELLING BUFFER
                              0509   * FINDS THE FIRST DIGIT THAT IS NOT A
                              0510   * BLANK, STARTING FROM THE RIGHT SIDE;
                              0511   * THE ROUTINE BELOW THEN PUTS CURSORS IN
                              0512   * THE DIGITS CORRESPONDING TO LETTERS
005C 01001100          0513             LDX       1
0038 00101100          0514   HANG4     TAMDYN
0070 100111000   0514  0515             BRANCH    HANG4
0061 01000101          0516   SONG      BL        TONES
0043 101000111   1657  0517
                              0518   * IF THE HANGMAN FLAGS ARE SET UP, LETTER
                              0519   * KEYS GO TO 'HANG1' AFTER SPEAKING THE LETTER
                              0520   ** THIS ROUTINE COMPARES LETTER ENTERED TO CORRECT SPELLING
0005 00100101          0521   HANG1     TCY       13
0009 01001000          0522             LDX       0              * BIT 1= WORD NOT COMPLETE
0014 00110000          0523             TCMIY     0              * BIT 0=CORRECT LETTER
0037 00100001          0524             TCY       8
006E 01010011          0525   HANG5     SBIT      3              BIT IS SET AFTER EACH DIGIT IS COMPARED
0050 00000100          0526             DYN
0033 101011011   0562  0527             BRANCH    HANG6
0074 00100001          0528             TCY       8              COMPARISONS ARE COMPLETE
0069 01010011          0529   HANG10    RBIT      3              RESET BIT 3 IN EACH DIGIT
0053 00000100          0530             DYN
0025 101101001   0529  0531             BRANCH    HANG10
000F 00100101          0532             TCY       13
001B 00010000          0533             TBIT      0              WAS THE LETTER CORRECT?
0031 101100011   0555  0534             BRANCH    HANG11
0062 01001010          0535             LDX       2              NO
0005 00011010          0536             IMAC                     * ADD 1 TO INCORRECT
000A 00001111          0537             TAY                      * GUESS COUNTER
```

TABLE IX-3 (Continued)

| | | | | | | | |
|---|---|---|---|---|---|---|---|
| 0015 | 010001111 | | 0538 | | LDP | 15 | |
| 0026 | 011100110 | | 0539 | | ALEC | 6 | |
| 0056 | 100101100 | 2219 | 0540 | | BRANCH | DISP/KH | |
| 002C | 010011000 | | 0541 | IWIN | LDX | 1 | |
| 0058 | 001000101 | | 0542 | | TCY | 10 | |
| 0030 | 001100000 | | 0543 | | TCMIY | 0 | |
| 0060 | 001101110 | | 0544 | | TCMIY | 7 | |
| 0041 | 001100000 | | 0545 | IWIN1 | TCMIY | 0 | |
| 0002 | 001100000 | | 0546 | | TCMIY | 0 | |
| 0005 | 001001111 | | 0547 | | TCY | 15 | |
| 0003 | 010010100 | | 0548 | | LDX | 2 | |
| 0017 | 001100000 | | 0549 | | TCMIY | 0 | |
| 002F | 010010001 | | 0550 | | LDX | 8 | CLEAR HANGMAN |
| 005E | 001000001 | | 0551 | | TCY | 8 | |
| 003C | 010100110 | | 0552 | | RBIT | 1 | |
| 0078 | 010000101 | | 0553 | | BL | LOADDISP | |
| 0071 | 101111001 | 1456 | 0554 | | | | |
| 0063 | 000100010 | | 0555 | HANG11 | TBIT | 1 | |
| 0047 | 101100001 | 0516 | 0556 | | BRANCH | SONG | |
| 000E | 001000101 | | 0557 | YOUWIN | TCY | 10 | YES |
| 001D | 010011000 | | 0558 | | LDX | 1 | |
| 0038 | 001100100 | | 0559 | | TCMIY | 2 | |
| 0076 | 001101110 | | 0560 | | TCMIY | 7 | * 'YOU WIN' |
| 0060 | 101100001 | 0545 | 0561 | | BRANCH | IWIN1 | |
| 005B | 010000100 | | 0562 | HANG6 | CALLL | SPLNTR+1 | *CHECK IF CORRECT |
| 0036 | 110101110 | 0374 | 0563 | | | | |
| 006C | 011100000 | | 0564 | | ALEC | 0 | *LETTER HAS ALREADY |
| 0059 | 101101110 | 0525 | 0565 | | BRANCH | HANG5 | *BEEN ENTERED IN EACH DIGIT |
| 0032 | 001001111 | | 0566 | | ICY | 15 | NO |
| 0064 | 000101001 | | 0567 | FINDIT | TMA | | PUT LETTER CODE IN ACC |
| 0049 | 001000001 | | 0568 | | TCY | 8 | * FIND THE FIRST LETTER |
| 0012 | 000000100 | | 0569 | HANG7 | DYN | | * THAT HASN,T YET |
| 0025 | 000100011 | | 0570 | | TBIT | 3 | * BEEN ENTERED |
| 004A | 100010010 | 0569 | 0571 | | BRANCH | HANG7 | * CORRECTLY |
| 0014 | 010111111 | | 0572 | | RETN | | * |
| 0029 | 000101111 | | 0573 | | TAM | | STORE LETTER CODE |
| 0052 | 001001111 | | 0574 | | TCY | 14 | *GET OTHER HALF OF |
| 0024 | 010001100 | | 0575 | | CALLL | FINDIT | *LETTER CODE AND STORE IT |
| 0049 | 111100100 | 0567 | 0576 | | | | |
| 0010 | 010011000 | | 0577 | | LDX | 1 | * |

TABLE IX-3 (Continued)

```
0021  00101111          0578               TAM                         *
0042  01000100          0579               CALLL     SPLNTR+1          CHECK TO SEE IF
0004  11010110   0374   0580
0009  01110000          0581               ALEC      0                 NEW LETTER MATCHES
0013  10010101   0591   0582               BRANCH    HANG8
0027  01001000          0583               LDX       1                 * DOES NOT MATCH
004E  00101011          0584               TYA                         * PUT BLANK BACK
001C  00110011          0585               TCMIY     12                * IN DISPLAY
0039  01001000          0586               LDX       0
0072  00100101          0587               TCY       13
0005  01010010          0588               SBIT      1                 SET FLAG FOR WORD NOT COMPLETE
0048  00010100          0589               TAY
0016  10011010   0593   0590               BRANCH    HANG9             RET
0020  00101011          0591    HANG8      TYA                         CORRECT LETTER GUESS
005A  01001011          0592               TCY       13                *
0034  01010000          0593    HANG9      SBIT      0                 * CORRECT LETTER FLAG IF Y=13
0008  00101000          0594               TAY
0051  10110110   0525   0595               BRANCH    HANG5
                        0596    *
                        0597    *   NXTWORD--RESETS FLAGS, INCREMENTS COUNTERS AND POINTERS
                        0598    *
0022  01011010          0599    NXTWORD    COMX8                       *
0044  00100010          0600               TCY       4                 INCREMENT PHRASE COUNTER
000B  00101001          0601               TMA
0011  00111010          0602               ACACC     2
0023  01110001          0603               ALEC      8
0045  10001101   0606   0604               BRANCH    NXT2
000F  00000110          0605               CLA
0019  00101111          0606    NXT2       TAM
0033  00100110          0607               TCY       6                 RESET HITS FLAG6
0065  01010100          0608               RBIT      0
0040  01010110          0609               RBIT      1
001A  00100000          0610               TCY       0                 INCREMENT RWE POINTER
0035  00110010          0611               IMAC                        *
0064  00101111          0612               TAM                         *
0055  00101010          0613               TMY                         *
002A  01000100          0614               LDP       2
0054  00101101          0615               YNEC      10                *
0028  10000111   0345   0616               BRANCH    USPELL+1
0059  01000100          0617               BL        F3
0020  10010101   0431   0618
```

TABLE IX-4

```
0000  010001000         GAME#2   CALLL   CLEAR     PUTS BLANKS AND CURSOR IN DISPLAY
0001  110111010  0236
0003  010010001                  LDX     8         DAM
0007  001001110                  TCY     7
003F  001100110                  TCMIY   6         SET MODE FOR CODE BREAKER
001F  110100010                  SBIT    1         SET GO FLAG
003E  010001101                  BL      TONES
007F  101000111  1657
                         *
007E  010010001         DIFFSLV  LDX     8
007D  001001110                  TCY     SEVEN     **
007B  000101001                  TMA
0077  010010000                  LDX     0
006F  001000000                  TCY     0
005F  001101000         BLANKM   TCMIY   1
003E  001010001                  YNEC    8
007C  101011111  0634            BRANCH  BLANKM
0079  001001000                  TCY     1
0073  011100000                  ALEC    0
0067  101000011  0656            BRANCH  LZEROS
                         *
004F  001100000                  TCMIY   0         A
001F  001000010                  TCY     4
003D  001100000                  TCMIY   0         I
                         *
007A  010011000                  LDX     ONE       **
0075  001000000                  TCY     DISPLAY   **
006B  001101100                  TCMIY   2         S
0057  001100000                  TCMIY   0         A
002F  001100001                  TCMIY   8         Y
005C  001110101                  TCMIY   11
0039  001101001                  TCMIY   8         I
0073  001101100                  TCMIY   3         T
0061  111111100  0665            BRANCH  BLANK
                         *
                         *
0043  001100000         LZEROS   TCMIY   0         PUT ,SPELL, IN DISPLAY
0006  001011010                  YNEC    5
0009  101000011  0656            BRANCH  LZEROS
                         *
001B  010011000                  LDX     ONE       **
```

TABLE IX-4 (Continued)

```
0037  001000000        0661            TCY     DISPLAY          **
006F  001100100        0662            TCMIY   LSW$S            **
0050  001101111        0663            TCMIY   LSW$P            **
003A  001100010        0664            TCMIY   LSW$E            **
0074  001101101        0665  BLANK     TCMIY   11
0069  001010001        0666    /       YNEC    8
0053  101110100  0665  0667            BRANCH  BLANK
0026  001001111        0668  PUTSLVL   TCY     LEVEL            * PUT LEVEL IN DISPLAY
004C  000101001        0669            TMA                      **
0018  001001110        0670            TCY     7
0031  000101111        0671            TAM                      **
                       0672  *
0062  010010000        0673            LDX     ZERO             **
0045  001100000        0674            TCMIY   0
                       0675  *
000A  010110010        0676            COMX8                    * CLEAR GO FLAG
0015  001000001        0677            TCY     FLAG2            **
002B  001100000        0678            TCMIY   0
0055  010111111        0679            RETN                     **
002C  010010000        0680  NUSTRANS  LDX     0                CALCULATE LETTER ADDRESS
0058  001001111        0681            TCY     15
0030  000101001        0682            TMA
0060  010011000        0683            LDX     1
0041  001000011        0684            TCY     12
0002  001100000        0685            TCMIY   0
0005  001100000        0686            TCMIY   0
000B  001001101        0687            TCY     11
0017  000101111        0688            TAM
002F  010000000        0689            CALLL   ADDCARRY
005F  111011000  0112  0690
003C  010010000        0691            LDX     0
0078  001000111        0692            TCY     14
0071  000101001        0693            TMA
0063  010011000        0694            LDX     1
0047  001000101        0695            TCY     10
000F  000101111        0696            TAM
001E  010000000        0697            CALLL   ADDCARRY
003D  111011000  0112  0698
007B  000100110        0699            CLA
006F  001110011        0700            ACACC   12
005A  001000101        0701            TCY     10
0036  010000000        0702            CALLL   ADDCARRY
006C  111011000  0112  0703
0059  010000101        0704  ADDCTR6   CALLL   MEMADDR
```

TABLE IX-4 (Continued)

```
0032  111011000  1501  0705
0064  110001110        0706                CALLL     LOADRESS
0049  111000010  1121  0707
0012  010000111        0708                BL        ADDWDS2
0025  100001010  2057  0709
004A  010010100        0710    RETNSHCH    LDX       2              RETNSHCH FLAG=ACC
0014  001001111        0711                TCY       15             *
0029  000101001        0712                TMA
0052  010001111        0713                LDP       15
0024  011101000        0714                ALEC      1              SPELL?
0048  100101100  2219  0715                BRANCH    DISP/KB
0010  010001101        0716                LDP       11
0021  011100100        0717                ALEC      2
0042  101000010  1680  0718                BRANCH    NXTTONE
0003  010001100        0719                LDP       3
0009  011101100        0720                ALEC      3              NXTWORD?
0013  100100010  0599  0721                BRANCH    NXTWORD
0027  010000101        0722                LDP       10
004E  011100010        0723                ALEC      4              NEG?
001C  100001001  1540  0724                BRANCH    NSPEL3
0039  010000001        0725                LDP       8
0072  011101010        0726                ALEC      5              SAY IT?
0065  101110011  1232  0727                BRANCH    DISLF=5
0038  010001001        0728                LDP       9
0016  011100110        0729                ALEC      6              SPEAK LETTER?
0020  101110110  1372  0730                BRANCH    LET+4
0054  010001100        0731                LDP       3
0034  011101110        0732                ALEC      7
0068  100000110  0521  0733                BRANCH    HANG1
0051  011100001        0734                ALEC      8
0022  100000000  0479  0735                BRANCH    GAME#1
0044  010000101        0736                LDP       10
0008  011101001        0737                ALEC      9
0011  101101010  1570  0738                BRANCH    ADDCTR2
0023  010000001        0739                LDP       8
0046  011100101        0740                ALEC      10
004C  101100011  1232  0741                BRANCH    DISLP=5
                       0742    *   TSTHIT2==>USED IN LOADING LNK/EDT TO TEST FOR 3 WORDS OF ZERO
                       0743    *             1 WORD OF 0001
                       0744    *
0019  010110010        0745    TSTHIT2     COMX8                    DAM REG
0033  001000100        0746                TCY       2
```

```
0066  01010110        0747            WAIT      1
004D  01010101        0748            WAIT      2
001A  01011010        0749            COMX8
0035  01011111        0750            RETN
TABLE IX-5
                      0751            ORGPG     5                                   **
                      0752   *  STORE SEED NUMBER
0000  01001001O       0753   RANDOM   LDX       4
0001  00100101        0754            TCY       10
0003  00000110        0755            CLA
0007  01000111        0756            CALLL     FILSLOOP
000F  11010110  2183  0757
001F  00100110        0758            TCY       7
003F  01001001        0759            LDX       8
007F  01000110        0760            LDP       7
007E  00010000        0761            TBIT      0
007D  10111011  1039  0762            BRANCH    LDPREV
007B  01010000        0763            SBIT      0
0077  01001010        0764            LDP       5
                      0765   *  CURLEVL-->
                      0766   *  STORES NUMBER OF ENTRIES IN CURRENT LEVEL
                      0767   *  INTO RAM
                      0768   *
006F  00100101        0769   CURLEVL  TCY       10
005F  01001000        0770            LDX       1
                      0771   *   ZERO OUT ROM ADDR
003E  00110000        0772            TCMIY     0
007C  00110000        0773            TCMIY     0
0079  00110000        0774            TCMIY     0
0073  00110000        0775            TCMIY     0
0067  00100101        0776            TCY       10
004F  01011111        0777            RETN
                      0778   *  FIND DIFFICULTY LEVEL
001E  00101111        0779            TCY       15
003D  00101001        0780            TMA
007A  00100101        0781            TCY       10
0075  00101111        0782            TAM
006B  01000111        0783            CALLL     ADD8
0057  11000110  2139  0784
002E  01000101        0785            CALLL     MEMADDR
005C  11101100  1501  0786
                      0787   *  OUTPUT # OF ENTRIES IN THIS LEVEL
0038  01000110        0788            CALLL     OUTADDR2
0071  11100001  1083  0789
```

```
0051  001001111          0790            TCY      15
0045  010011010          0791            LDX      5
0066  000101111          0792            TAM
```

TABLE IX-5 (Continued)

```
000D  010001110          0793            CALLL    OUTADDR2
0018  111000001   1083   0794
0037  001001111          0795            TCY      15
006E  010010010          0796            LDX      4
0050  000101111          0797            TAM
005A  010011010          0798            LDX      5
0074  000000111          0799            DMAN
0069  100011000   0804   0800            BRANCH   DECMEM
0053  000101111          0801            TAM
0026  010010010          0802            LDX      4
004C  000000111          0803            DMAN
0016  000101111          0804   DECMEM   TAM
0031  010011100          0805            LDX      3
0062  001000001          0806            TCY      8
0045  000101001          0807            TMA
000A  010011010          0808            LDX      5
0015  001000000          0809            TCY      0
0026  000101111          0810            TAM
0055  010011100          0811            LDX      3
002C  001001001          0812            TCY      9
0056  000101001          0813            TMA
0030  010010010          0814            LDX      4
0060  001000000          0815            TCY      0
0041  000101111          0816            TAM
                         0817   *  DETERMINE IF SFED IS '>' NUMBER OF ENTRIES
0002  001001111          0818   DECLOOP  TCY      15
0005  000000001          0819            ALEM
0008  101111000   0825   0820            BRANCH   RANOK
0017  001000000          0821            TCY      0
002F  001111100          0822            ACACC    3
005E  000101111          0823            TAM
003C  100000010   0818   0824            BRANCH   DECLOOP
0078  000001001          0825   RANOK    MNEA
0071  101011001   0837   0826            BRANCH   RANOK2
0063  001000000          0827            TCY      0
0047  010011010          0828            LDX      5
006F  000101001          0829            TMA
001D  001001111          0830   DECLOOP3 TCY      15
003B  000001001          0831            ALEM
```

| | | | | | | |
|---|---|---|---|---|---|---|
| 0076 | 101011001 | 0837 | 0832 | | BRANCH | RANUK2 |
| 0060 | 001000000 | | 0833 | | TCY | 0 |
| 0054 | 001111100 | | 0834 | | ACACC | 3 |
| 0036 | 000101111 | | 0835 | | TAM | |

TABLE IX-5 (Continued)

| | | | | | | |
|---|---|---|---|---|---|---|
| 006C | 100011101 | 0830 | 0836 | | BRANCH | DECLOOP3 |
| 0059 | 010110010 | | 0837 | RANUK2 | COMX8 | |
| | | | 0838 | * ZERO RAE POINTER | | |
| 0032 | 001000000 | | 0839 | | TCY | 0 |
| 0064 | 001100000 | | 0840 | | TCMIY | 0 |
| 0049 | 010011010 | | 0841 | RPLOOP | LDX | 5 |
| 0012 | 010001101 | | 0842 | | CALLL | RCOMX8 |
| 0025 | 111001100 | 1631 | 0843 | | | |
| 004A | 001010001 | | 0844 | | TMA | |
| 0011 | 000000101 | | 0845 | | IYC | |
| 0023 | 001111000 | | 0846 | | ACACC | 1 |
| 0052 | 110101000 | 0888 | 0847 | | CALL | INCARRY |
| 0024 | 000101100 | | 0848 | | TAMDYN | |
| 0048 | 010010010 | | 0849 | | LDX | 4 |
| 0010 | 001010001 | | 0850 | | TMA | |
| 0021 | 000000101 | | 0851 | | IYC | |
| 0042 | 000001011 | | 0852 | | AMAAC | |
| 0004 | 000101111 | | 0853 | | TAM | |
| 0009 | 010001101 | | 0854 | RANARND | CALLL | RCOMX8 |
| 0015 | 111001100 | 1631 | 0855 | | | |
| 0027 | 001010001 | | 0856 | | TMA | |
| 000E | 001001111 | | 0857 | | TCY | 15 |
| 001C | 000000001 | | 0858 | | ALEM | |
| 0059 | 101100101 | 0861 | 0859 | | BRANCH | RANCNT |
| 0072 | 101000100 | 0870 | 0860 | | BRANCH | ZRORAND |
| 0065 | 000001001 | | 0861 | RANCNT | MNEA | |
| 0038 | 101100110 | 0878 | 0862 | | BRANCH | RANCOMP |
| 0016 | 010011010 | | 0863 | | LDX | 5 |
| 0020 | 010001101 | | 0864 | | CALLL | RCOMX8 |
| 0053 | 111001100 | 1631 | 0865 | | | |
| 0034 | 001010001 | | 0866 | | TMA | |
| 0068 | 001001111 | | 0867 | | TCY | 15 |
| 0051 | 000000001 | | 0868 | | ALEM | |
| 0022 | 101100110 | 0878 | 0869 | | BRANCH | RANCOMP |
| 0044 | 010001101 | | 0870 | ZRORAND | CALLL | RCOMX8 |
| 0008 | 111001100 | 1631 | 0871 | | | |
| 0011 | 001100000 | | 0872 | | TCMIY | 0 |
| 0023 | 000000100 | | 0873 | | DYN | |

```
0045  01001010         0874            LDX      4
003C  00110000         0875            TCMIY    0
0019  00110000         0876            TCMIY    0
```

TABLE IX-5 (Continued)

```
0033  10100101   0841  0877            BRANCH   RPLOOP
0066  00100000         0878  RANCOMP   TCY      0
                       0879  *  COMPARE RANDOM # TO # OF ENTRIES
0040  01110010         0880            COMXB
001A  00110010         0881            IMAC
0035  00101111         0882            TAM
006A  01110101         0883            ALEC     9
0055  10100101   0841  0884            BRANCH   RPLOOP
002A  01001110         0885            BL       RANSTOP
0054  10000000   1021  0886
                       0887  *
0028  00101111         0888  INCARRY   TAM
0050  01001010         0889            LDX      4
0020  00110010         0890            IMAC
0040  01011111         0891            RETN
```

TABLE IX-6

```
                       0892            ORGPG    6                   **
                       0893  ****      CODE     BREAKER             ******
0000  01000100         0894  CRYPTO    CALLL    SPACE-3             ELIMINATE CURSOR FROM DISPLAY
0001  11110011   0273  0895
0003  00100000         0896            TCY      0
0007  01000000         0897  CRY1      LDX      0
000F  00110011         0898            MNEZ                         TEST MSB OF DISPLAY CHARACTER
001F  10111101   0915  0899            BRANCH   CRY2                BRANCH IF MSB=1
003F  01001100         0900  COMPL     LDX      1
007F  00110010         0901            IMAC                         * COMPLEMENT THE LSD OF
007E  00110001         0902            CPAIZ                        * THE DISPLAYED LETTER
007C  01011111         0903            RETN
0078  01110101         0904            ALEC     9                   * IF A CHARACTER CODE
0077  10111110   0908  0905            BRANCH   CRY3                * PAST 'Z' HAS BEEN
006F  00111011         0906            ACACC    6                   * CREATED, ADD 6 TO GET A LETTER
005F  10101111   0919  0907            BRANCH   CRY6                RET
003E  00101111         0908  CRY3      TAM                          STORE COMPLEMENT OF LSD
007C  01001000         0909  CRY5      LDX      0
0077  00110100         0910            TCMIY    1                   SET MSB TO 1
0073  00101001         0911  CRY4      YNEC     8                   ARE ALL LETTERS FINISHED?
0067  11000111   0897  0912            BRANCH   CRY1                NO, CONTINUE
```

TABLE IX-6 (Continued)

| | | | | | | | |
|---|---|---|---|---|---|---|---|
| 004F | 01001101 | | 0913 | CRY12 | BL | TONES | |
| 001E | 10100111 | 1657 | 0914 | | | | |
| 003D | 01000110 | | 0915 | CRY2 | CALLL | COMPL | |
| 007A | 11011111 | 0900 | 0916 | | | | |
| 0075 | 01110101 | | 0917 | | ALEC | 5 | * TEST FOR CODES OTHER |
| 0064 | 10111100 | 0909 | 0918 | | BRANCH | CRY5 | * THAN LETTERS AND SKIP THEM |
| 0057 | 00101111 | | 0919 | CRY6 | TAM | | |
| 002E | 01001000 | | 0920 | | LDX | 0 | |
| 005C | 00110000 | | 0921 | | TCMIY | 0 | SET MSB TO ZERO |
| 0038 | 10111011 | 0911 | 0922 | | BRANCH | CRY4 | RET |
| 0070 | 01001110 | | 0923 | CLUE | LDX | 3 | |
| 0061 | 00100001 | | 0924 | | TCY | 8 | |
| 0043 | 00101001 | | 0925 | | TMA | | GET HEX RANDOM NUMBER |
| 0006 | 01110110 | | 0926 | | ALEC | 7 | * IF NUMBER IS GREATER |
| 0000 | 10011011 | 0929 | 0927 | | BRANCH | CLUE1 | * THAN 7, ADD 8 |
| 0018 | 00111001 | | 0928 | | ACACC | 8 | * |
| 0037 | 00010100 | | 0929 | CLUE1 | TAY | | SET Y RANDOMLY 0- 7 |
| 006E | 00000100 | | 0930 | CLUE2 | DYN | | * LOOK FOR FIRST |
| 0050 | 10111010 | 0933 | 0931 | | BRANCH | YOK | |
| 0034 | 00100111 | | 0932 | | TCY | 7 | |
| 0074 | 01000100 | | 0933 | YOK | CALLL | SPLNTR+1 | * LETTER THAT HASN'T |
| 0069 | 11010111 | 0374 | 0934 | | | | |
| 0055 | 01110000 | | 0935 | | ALEC | 0 | * BEEN CORRECTLY ENTERED |
| 0026 | 10110111 | 0930 | 0936 | | BRANCH | CLUE2 | |
| 004C | 01001010 | | 0937 | | LDX | 2 | |
| 0018 | 00010000 | | 0938 | | TBIT | 0 | MSB IS A ONE? |
| 0031 | 10000101 | 0952 | 0939 | | BRANCH | CLUE3 | YES |
| 0062 | 01001110 | | 0940 | GETIT | LDX | 3 | NO |
| 0045 | 00101001 | | 0941 | | TMA | | * GET LSD OF LETTER |
| 0004 | 01001000 | | 0942 | | LDX | 0 | * FROM CORRECT SPELLING |
| 0015 | 00110111 | | 0943 | | TCY | 14 | * BUFFER AND PUT IT IN |
| 0028 | 00101101 | | 0944 | | TAMIYC | | * KEY CODE |
| 0056 | 01111111 | | 0945 | | RETN | | |
| 002C | 00110000 | | 0946 | | TCMIY | 0 | SET MSB=0 |
| 0054 | 00101011 | | 0947 | CLUE4 | TCY | 13 | |
| 0030 | 01001010 | | 0948 | | LDX | 2 | |
| 0063 | 00010101 | | 0949 | | TMA | | |
| 0041 | 01000100 | | 0950 | | BL | MISS3 | |
| 0002 | 10011101 | 0471 | 0951 | | | | |
| 0025 | 11110010 | 0940 | 0952 | CLUE3 | CALL | GETIT | |
| 0003 | 00111000 | | 0953 | | TCMIY | 1 | SET MSB=1 |
| 0017 | 10111000 | 0947 | 0954 | | BRANCH | CLUE4 | RET |
| 002F | 00101000 | | 0955 | F2 | TAY | | |
| 005E | [illegible] | | 0956 | | YNEC | 0 | |

TABLE IX-6 (Continued)

| | | | | | | | |
|---|---|---|---|---|---|---|---|
| 003F | 101001111 | 0913 | 0957 | | BRANCH | CRY12 | |
| 0078 | 010010000 | | 0958 | | LDX | 0 | 10 |
| 0071 | 001001010 | | 0959 | | TCY | 5 | |
| 0063 | 001101000 | | 0960 | | TCMIY | 1 | |
| 0067 | 001100100 | | 0961 | | TCMIY | 2 | |
| 000E | 001100100 | | 0962 | | TCMIY | 2 | |
| 0010 | 010011000 | | 0963 | | LDX | 1 | |
| 0034 | 001001010 | | 0964 | | TCY | 5 | |
| 0076 | 001100111 | | 0965 | | TCMIY | 14 | |
| 0060 | 001101000 | | 0966 | | TCMIY | 1 | |
| 0058 | 001100000 | | 0967 | | TCMIY | 0 | |
| 0035 | 101001111 | 0913 | 0968 | | BRANCH | CRY12 | |
| 006C | 010011100 | | 0969 | F5 | LDX | 3 | |
| 0059 | 001001011 | | 0970 | | TCY | 13 | LNK/EOT VALUE |
| 0032 | 001100000 | | 0971 | | TCMIY | 0 | |
| 0064 | 010011000 | | 0972 | F2LOOP | LDX | 1 | |
| 0049 | 001000101 | | 0973 | | TCY | 10 | |
| 0012 | 001100100 | | 0974 | | TCMIY | 2 | |
| 0025 | 001100010 | | 0975 | | TCMIY | 4 | |
| 004A | 001100000 | | 0976 | | TCMIY | 0 | |
| 0014 | 001100000 | | 0977 | | TCMIY | 0 | |
| 0029 | 010011010 | | 0978 | | LDX | 5 | |
| 0052 | 001001011 | | 0979 | | TCY | 13 | # OF CORRECT SCORES |
| 0024 | 000101001 | | 0980 | | TMA | | |
| 0048 | 000010101 | | 0981 | | AMAAC | | CORRY? |
| 0010 | 101001101 | 1012 | 0982 | | BRANCH | NOF2 | |
| 0021 | 010011000 | | 0983 | | LDX | 1 | |
| 0042 | 001000101 | | 0984 | | TCY | 10 | |
| 0004 | 000010101 | | 0985 | | AMAAC | | |
| 0009 | 101101010 | 1015 | 0986 | | BRANCH | NOF3 | |
| 0013 | 000101111 | | 0987 | | TAM | | |
| 0027 | 010111111 | | 0988 | FINL2 | RETN | | |
| 004F | 010000101 | | 0989 | | CALLL | MEMADDR | |
| 001C | 111011000 | 1501 | 0990 | | | | |
| 0039 | 010001110 | | 0991 | | CALLL | LOADRESS | LOAD ADDRESS |
| 0072 | 111000010 | 1121 | 0992 | | | | |
| 0065 | 010011000 | | 0993 | | LDX | 1 | |
| 0044 | 010000011 | | 0994 | | CALLL | TRANS-1 | STORE N DAM |
| 0015 | 110100011 | 1836 | 0995 | | | | |
| 002D | 010001001 | | 0996 | | BL | F4 | |

TABLE IX-6 (Continued)

| | | | | | | |
|---|---|---|---|---|---|---|
| 0054 | 101001101 | 1022 | 0997 | | | |
| 0034 | 001000101 | | 0998 | FINL3 | TCY | 10 |
| 0069 | 010011000 | | 0999 | FINL6 | LDX | 1 |
| 0051 | 001101001 | | 1000 | | TMA | |
| 0022 | 010010010 | | 1001 | | LDX | 4 |
| 0044 | 000101101 | | 1002 | | TAMIYC | |
| 0003 | 001010111 | | 1003 | | YNEC | 14 |
| 0011 | 101101000 | 0999 | 1004 | | BRANCH | FINL6 |
| 0023 | 010001010 | | 1005 | | CALLL | CURLEVL |
| 0046 | 111101111 | 0769 | 1006 | | | |
| 000C | 001100010 | | 1007 | | TCMIY | 4 |
| 0019 | 001101110 | | 1008 | | TCMIY | 7 |
| 0033 | 010001000 | | 1009 | | BL | SP+4 |
| 0066 | 101100101 | 0311 | 1010 | | | |
| | | | 1011 | * | | |
| 0040 | 010011000 | | 1012 | NOF2 | LDX | 1 |
| 001A | 001000101 | | 1013 | | TCY | 10 |
| 0035 | 000010101 | | 1014 | | AMAAC | |
| 0064 | 000101101 | | 1015 | NOF3 | TAMIYC | |
| 0055 | 000110010 | | 1016 | | IMAC | |
| 002A | 000101111 | | 1017 | | TAM | |
| 0059 | 100100111 | 0988 | 1018 | | BRANCH | FINL2 |

TABLE IX-7

| | | | | | | |
|---|---|---|---|---|---|---|
| | | | 1019 | | ORGPG | 7 ** |
| | | | 1020 | * LOADED 10 VALUES -STORE LAST VALUE | | |
| 0000 | 001100000 | | 1021 | RANSTOP | TCMIY | 0 |
| 0001 | 001000101 | | 1022 | | TCY | 10 |
| 0003 | 010011010 | | 1023 | | LDX | 5 |
| 0007 | 000101001 | | 1024 | | TMA | |
| 000F | 001001111 | | 1025 | | TCY | 14 |
| 001F | 000101111 | | 1026 | | TAM | |
| 003F | 010010010 | | 1027 | | LDX | 4 |
| 007F | 001000101 | | 1028 | | TCY | 10 |
| 007E | 000101001 | | 1029 | | TMA | |
| 007D | 001001111 | | 1030 | | TCY | 14 |
| 007B | 000101111 | | 1031 | | TAM | |
| 0077 | 010011010 | | 1032 | RSCRAM2 | LDX | 5 |
| 006F | 111110000 | 1052 | 1033 | | CALL | RSCRAM |

IX-7 (Continued)

```
005F  010010010         1034                   LDX      4
003E  111110000  1052   1035                   CALL     RSCRAM
007C  010001000         1036                   HL       RANRTN
0079  101110011  0215   1037
                        1038  *  LDPREV==> LOADS NEXT VALUE NTO R+E
0073  001000111         1039  LDPREV    TCY      14
0067  010010010         1040            LDX      4
004F  000101001         1041            TMA
001F  001000000         1042            TCY      0
0030  000101111         1043            TAM
007A  001000111         1044            TCY      14
0075  010011010         1045            LDX      5
0069  000101001         1046            TMA
0057  001000000         1047            TCY      0
002E  000101111         1048            TAM
005C  010001010         1049            LDP      5
0058  101011001  0837   1050            BRANCH   RANOK2
                        1051  *  SCRAMBLES R+E WORDS
0070  001000000         1052  RSCRAM    TCY      0
0061  000101001         1053            TMA
0043  001000110         1054            TCY      6
0006  000000011         1055            XMA
000E  001000000         1056            TCY      0
001B  000101101         1057            TAMIYC
0037  000101001         1058            TMA
006F  001001110         1059            TCY      7
0056  000001011         1060            XMA
003A  001001000         1061            TCY      1
0074  000101101         1062            TAMIYC
0069  000101001         1063            TMA
0053  001001010         1064            TCY      5
0026  000000011         1065            XMA
004C  001000100         1066            TCY      2
001B  000101101         1067            TAMIYC
0031  000101001         1068            TMA
0062  001000001         1069            TCY      8
0045  010000011         1070            XMA
000A  001001100         1071            TCY      3
0015  000101101         1072            TAMIYC
002B  000101001         1073            TMA
0056  001001001         1074            TCY      9
002C  000000011         1075            XMA
0058  001000010         1076            TCY      4
```

```
005A  010000011              XMA
0069  010111111              RETN
```

TABLE IX-7 (Continued)

```
                       *
                       *   OUTADDR2:
                       *   LOADS 4 BITS INTO K-LINES USING PDC AND OUTPUT 4 BITS
                       *
0043  001000011        OUTADDR2 TCY    12          ** CHIP SELECT
0002  000001101                 SETR               **
0005  001001101                 TCY    11          L/R = 0
0008  000001101                 SETR
0017  001000101                 TCY    10
002F  000000110                 CLA                ACC=OUTPUT 4 BITS COMMAND
005F  001110001                 ACACC  EIGHT       **
005C  000001101                 SETR               **
0078  000110110                 RSTR               **
0071  000001101                 SETR               **
0065  000110110                 RSTR               **
0047  000001101                 SETR               **
[illegible]  000110110          RSTR               **
001[illegible]  000001101       SETR               **
005[illegible]  000110110       RSTR               **
0076  000000110                 CLA                **
0060  001110010                 ACACC  FOUR        **
0051  000001101                 SETR               1ST PDC LOADS COMMAND
0035  000110110                 RSTR               *
006C  001001101                 TCY    11
0059  000110110                 RSTR
0032  001000101                 TCY    10
0064  000001101                 SETR               2ND PDC APPLIES SR TO K-LINES
0043  000110110                 RSTR               *
0012  001110000                 ACACC  0
0025  000001000                 TKA                LOAD INTO ACC
004A  000001101                 SETR               3RD PDC DISCONNECTS SR
0019  000110110                 RSTR               *
0024  001001101                 TCY    11
0032  000001101                 SETR
0024  010010100                 LDX    2
0048  000100011                 SBIT   3
0010  101001011  1131           BRANCH LSHIFT-1
0021  010111111                 RETN
                       *
                       *   END OF OUTADDR2 SUBROUTINE
                       *
                       *
```

TABLE IX-7 (Continued)

| | | | | | | | |
|---|---|---|---|---|---|---|---|
| 0042 | 001001101 | | 1121 | LOADRESS | TCY | 11 | |
| 0004 | 010010100 | | 1122 | | LDX | 2 | |
| 0009 | 010100011 | | 1123 | | SBIT | 3 | * |
| 0013 | 001000101 | | 1124 | | TCY | 10 | |
| 0027 | 000000110 | | 1125 | | CLA | | |
| 004E | 001111100 | | 1126 | | ACACC | 3 | |
| 001C | 010010100 | | 1127 | | LDY | 2 | MEMORY FOR LOOP |
| 0039 | 000101110 | | 1128 | LOADR+1 | TAMZA | | |
| 0072 | 010011000 | | 1129 | | LDX | 1 | |
| 0065 | 101000001 | 1083 | 1130 | | BRANCH | OUTADDR2 | |
| 004B | 001001011 | | 1131 | LSHIFT-1 | TCY | 13 | |
| 0016 | 010011000 | | 1132 | | LDX | 1 | |
| 002D | 000000011 | | 1133 | LSHIFT | XMA | | SHIFT ROUTINE |
| 005A | 010000100 | | 1134 | | DYN | | * |
| 0034 | 001011001 | | 1135 | | YNEC | 9 | * |
| 006A | 100101101 | 1133 | 1136 | | BRANCH | LSHIFT | * |
| 0051 | 001000101 | | 1137 | | TCY | 10 | TEST LOOP COUNT |
| 0022 | 010010100 | | 1138 | | LDX | 2 | * |
| 0044 | 000000111 | | 1139 | | DMAN | | * |
| 0008 | 100111001 | 1128 | 1140 | | BRANCH | LOADR+1 | * |
| 0011 | 001001101 | | 1141 | | TCY | 11 | |
| 0023 | 010100111 | | 1142 | | RBIT | 3 | |
| 0046 | 011111111 | | 1143 | | RETN | | |
| | | | 1144 | * | | | |
| 000C | 010011010 | | 1145 | FL2 | LDX | 5 | |
| 0019 | 001001011 | | 1146 | | TCY | 13 | |
| 0033 | 000000110 | | 1147 | | CLA | | |
| 0066 | 001110101 | | 1148 | | ACACC | 10 | |
| 004D | 000000011 | | 1149 | | XMA | | |
| 001A | 000110000 | | 1150 | | SAMAN | | |
| 0035 | 000101111 | | 1151 | | TAM | | |
| 006A | 010111111 | | 1152 | | RETN | | |
| 0055 | 001001110 | | 1153 | ROM | TCY | 6 | |
| 002A | 010010001 | | 1154 | | LDX | 8 | |
| 0054 | 000101001 | | 1155 | | TMA | | |
| 0028 | 001110001 | | 1156 | | ACACC | 8 | |
| 0050 | 000101111 | | 1157 | | TAM | | |
| 0020 | 010001111 | | 1158 | | BL | DISP/KB | |
| 0040 | 100101110 | 2219 | 1159 | | | | |

TABLE IX-8

| | | | | | | | |
|---|---|---|---|---|---|---|---|
| | | | 1160 | | UPGPG | 8 | |
| | | | 1161 | * | | | |
| | | | 1162 | * CALADDR--> STICKS ADDRESS WANTED INTO LNK/EDT | | | |
| | | | 1163 | * | | | |
| 0000 | 001000111 | | 1164 | CALADDR | TCY | 14 | |
| 0001 | 001100101 | | 1165 | | TCMIY | 10 | |
| 0003 | 001001001 | | 1166 | | TCY | 9 | |
| 0007 | 010011000 | | 1167 | | LDX | 1 | |
| 000F | 000101001 | | 1168 | | TMA | | |
| 001F | 001111111 | | 1169 | | ACACC | 15 | |
| 003F | 010110010 | | 1170 | | COMX8 | | ADDRESS DAM |
| 007F | 000101111 | | 1171 | | TAM | | |
| 007E | 001000101 | | 1172 | | TCY | 10 | |
| 007D | 000101001 | | 1173 | THAA | TMA | | |
| 007B | 010011000 | | 1174 | | LDX | 1 | |
| 0077 | 000101101 | | 1175 | | TAMIYC | | |
| 006F | 010110010 | | 1176 | | COMX8 | | ADDRESS DAM |
| 005F | 001010111 | | 1177 | | YNEC | 14 | |
| 003E | 101111101 | 1173 | 1178 | | BRANCH | THAA | |
| 007C | 111001111 | 1183 | 1179 | CALL+2 | CALL | CAL+1 | |
| 0079 | 010011110 | | 1180 | | LDX | 7 | |
| 0073 | 000101111 | | 1181 | | TAM | | STORE WORD |
| 0067 | 010110010 | | 1182 | | COMX8 | | ADDRESS DAM |
| 004F | 001100111 | | 1183 | CAL+1 | TCY | 14 | GET Y POINTER |
| 001E | 000110010 | | 1184 | | IMAC | | * |
| 003D | 000101111 | | 1185 | | TAM | | * |
| 007A | 000101010 | | 1186 | | TMY | | * |
| 0075 | 000000100 | | 1187 | | DYN | | |
| 006B | 000101001 | | 1188 | | TMA | | |
| 0057 | 001001001 | | 1189 | OUT$RTN | TCY | 9 | GET LNK/EDT POINTER |
| 002E | 000101010 | | 1190 | | TMY | | * |
| 005C | 010110010 | | 1191 | | COMX8 | | EXIT DAM |
| 0038 | 010111111 | | 1192 | | RETN | | |
| 0070 | 010010110 | | 1193 | | LDX | 6 | STORE WORD |
| 0061 | 000101111 | | 1194 | | TAM | | * |
| 0043 | 010110010 | | 1195 | | COMX8 | | ADDRESS DAM |
| 0006 | 001001001 | | 1196 | | TCY | 9 | |
| 000D | 000110010 | | 1197 | | IMAC | | |
| 001B | 000101111 | | 1198 | | TAM | | |
| 0037 | 001000111 | | 1199 | | TCY | 14 | |
| 006E | 000101010 | | 1200 | | TMY | | |
| 005D | 001010111 | | 1201 | | YNEC | 14 | Y=14? IF YES, |
| 003A | 101111100 | 1179 | 1202 | | BRANCH | CALL+2 | LOAD 2 MSW |

TABLE IX-8 (Continued)

| | | | | | | | |
|---|---|---|---|---|---|---|---|
| 0074 | 001100100 | | 1203 | | TCY | 2 | |
| 0069 | 010100101 | | 1204 | | RBIT | 2 | |
| 0053 | 010011000 | | 1205 | | LDX | 1 | |
| 0026 | 001001001 | | 1206 | | TCY | 9 | |
| 004C | 010010011 | | 1207 | | BL | LNKCNT2 | |
| 0019 | 101101100 | 1798 | 1208 | | | | |
| 0031 | 010011100 | | 1209 | ULRN+1 | LDX | 3 | |
| 0062 | 001001011 | | 1210 | | TCY | 13 | |
| 0045 | 001101010 | | 1211 | | TCMIY | 5 | |
| 000A | 010001101 | | 1212 | ULRN+2 | BL | CORR+1 | |
| 0015 | 101111110 | 1590 | 1213 | | | | |
| | | | 1214 | * | | | * CALCULATES ADDRESS |
| | | | 1215 | * | | | * LOADS CSB |
| 0028 | 001100000 | | 1216 | DISLP-1 | TCMIY | 0 | |
| 0036 | 010000101 | | 1217 | | BL | LOADDISP | |
| 002C | 101111001 | 1456 | 1218 | | | | |
| 0059 | 010000111 | | 1219 | DISLP7 | CALLL | SPEAK+1 | |
| 0030 | 110100001 | 2016 | 1220 | | | | |
| 0060 | 010000011 | | 1221 | | CALLL | TRANS-1 | |
| 0041 | 110100011 | 1836 | 1222 | | | | |
| 0002 | 010110100 | | 1223 | DISLP+2 | LDX | 2 | |
| 0005 | 001001111 | | 1224 | | TCY | 15 | * |
| 000A | 001101010 | | 1225 | | TCMIY | 5 | |
| 0017 | 010001010 | | 1226 | | CALLL | CURLEVL | |
| 002F | 111101111 | 0769 | 1227 | | | | |
| 005E | 001100111 | | 1228 | | TCMIY | 14 | |
| 003C | 001100110 | | 1229 | | TCMIY | 6 | |
| 0078 | 010000010 | | 1230 | | BL | ADDCTR6 | |
| 0071 | 101011001 | 0766 | 1231 | | | | |
| 0063 | 001001111 | | 1232 | DISLP-5 | TCY | 15 | |
| 0047 | 010110010 | | 1233 | | COMXB | | ADDRESS DAM |
| 000F | 001101111 | | 1234 | | TCMIY | 15 | |
| 001E | 010110010 | | 1235 | DISPLOOP | COMXB | | EXIT DAM |
| 003D | 001000111 | | 1236 | | TCY | 14 | |
| 0076 | 010011100 | | 1237 | | LDX | 3 | |
| 006D | 010100000 | | 1238 | | SBIT | 0 | |
| 005B | 010001111 | | 1239 | | BL | DISP/KB | |
| 0036 | 100101100 | 2219 | 1240 | | | | |
| 006C | 010110010 | | 1241 | DISLP+1 | COMXB | | ADDRESS DAM |
| 0059 | 001001111 | | 1242 | | TCY | 15 | LOOP |
| 0032 | 000000111 | | 1243 | | DMAN | | * |

TABLE IX-8 (Continued)

| | | | | | | | |
|---|---|---|---|---|---|---|---|
| 0064 | 00101111 | | 1244 | | TAM | | * |
| 0049 | 00110011 | | 1245 | | BNEZ | | * |
| 0012 | 10011101 | 1235 | 1246 | | BRANCH | DISPLOOP | * ELSE |
| 0025 | 00100111 | | 1247 | | TCY | 14 | |
| 004A | 01001110 | | 1248 | | LDX | 3 | |
| 0014 | 01010100 | | 1249 | | RBIT | 0 | |
| 0029 | 01001001 | | 1250 | | LDX | 8 | |
| 0052 | 01001001 | | 1251 | | LDP | 9 | |
| 0024 | 00100100 | | 1252 | | TCY | 2 | |
| 0048 | 00100011 | | 1253 | | TBIT | 3 | |
| 0010 | 10100011 | 1341 | 1254 | | BRANCH | LET4 | |
| 0021 | 00010001 | | 1255 | | TBIT | 2 | |
| 0042 | 10100101 | 1385 | 1256 | | BRANCH | REST02 | |
| 0004 | 01000001 | | 1257 | | LDP | 6 | |
| 0009 | 01010100 | | 1258 | | LDX | 2 | |
| 0013 | 00101111 | | 1259 | | TCY | 15 | |
| 0027 | 00101001 | | 1260 | | TMA | | |
| 004E | 01111001 | | 1261 | | ALEC | 9 | |
| 001C | 10111010 | 1264 | 1262 | | BRANCH | DISP8 | |
| 0039 | 10111000 | 1271 | 1263 | | BRANCH | DISP5 | |
| 0072 | 00110101 | | 1264 | DISP8 | TCMIY | 10 | |
| 0065 | 01001100 | | 1265 | | LDX | 1 | |
| 004A | 01011010 | | 1266 | | COMX8 | | ADDRESS DAM |
| 0016 | 01000011 | | 1267 | DISP9 | CALLL | TRANS=1 | |
| 0020 | 11010011 | 1036 | 1268 | | | | |
| 0054 | 01000111 | | 1269 | | BL | ADDRDS2 | |
| 0034 | 10001010 | 2057 | 1270 | | | | |
| 0068 | 01000101 | | 1271 | DISP5 | CALLL | DELAY2 | |
| 0051 | 11010111 | 1396 | 1272 | | | | |
| 0022 | 01011010 | | 1273 | | COMX8 | | |
| 0043 | 00100000 | | 1274 | | TCY | 6 | INCREMENT RWE POINTER |
| 0008 | 00110010 | | 1275 | | IMAC | | * |
| 0011 | 00101101 | | 1276 | | TAMIYC | | |
| 0023 | 00110000 | | 1277 | | TCMIY | 0 | |
| 0046 | 01110001 | | 1278 | | ALEC | 9 | |
| 000C | 10101000 | 1291 | 1279 | | BRANCH | DISP6 | |
| 0019 | 00100000 | | 1280 | | TCY | 0 | |
| 0033 | 00110000 | | 1281 | | TCMIY | 0 | |
| 0066 | 00110000 | | 1282 | | TCMIY | 0 | |
| 004C | 01011010 | | 1283 | | LDX | 5 | |
| 001A | 01001110 | | 1284 | | CALLL | RSCRAM | |
| 0035 | 11111000 | 1052 | 1285 | | | | |

TABLE IX-8 (Continued)

```
006A  010010010         1286                 LDX       4
0055  010001110         1287                 CALLL     RSCRAM
002A  111110000   1052  1288
0054  010000100         1289                 BL        USPELL+1
0029  100000111   0345  1290
0050  010001001         1291     DISP6       CALLL     DELAY2
0020  110100111   1398  1292
0040  100110001   1209  1293                 BRANCH    ULRN+1
```

TABLE IX-9

```
                        1294                 ORGPG     9
                        1295     *
                        1296     *  LETTER-->TRANSFERS LETTERS TO BE SPOKEN, FROM THE CSB
                        1297     *    INTO THE LINK/EDIT AND THEN CALCULATES THE ADDRESS FOR L/E.
                        1298     *
0000  001001111         1299     LETTER      TCY       15
0001  000000110         1300                 CLA
0003  010000111         1301                 CALLL     RETURN4
0007  110000100   2113  1302
000F  010001000         1303                 CALLL     CLEAR
001F  110111010   0236  1304
003F  001001000         1305                 TCY       1
007F  010110010         1306                 COMX8                        *
007E  001100000         1307                 TCMIY     0                  *
007D  001001111         1308                 TCY       15
007B  001101000         1309                 TCMIY     1
0077  010011100         1310     LETTER+1    LDX       3                  LOAD LSW -->ACC
006F  001001000         1311                 TCY       1                  *
005F  010001101         1312                 CALLL     COMX8              *
003F  110011000   1632  1313
007C  000101001         1314                 TMA                          *
0079  010011110         1315                 LDX       7                  STORE IN LNK/EDT
0073  001000000         1316                 TCY       0                  *
0067  000101111         1317                 TAM                          *
004F  010010100         1318                 LDX       2                  MSW
001E  001001000         1319                 TCY       1                  GET Y POINTER
003C  010001101         1320                 CALLL     COMX8              *
```

TABLE IX-9 (Continued)

```
76  110011000   1632  1321
75  000101001         1322            TMA                      EOAD MSW
69  010000101         1323            LDP      10
57  000100001         1324            TBIT     2               LAST LETTER?
2E  111010011   1485  1325            CALL     SETBIT2         YES, SETBIT2
5C  010001111         1326            LDP      15
38  000100011         1327            TBIT     3               SYLLABLE?
70  111010101   2291  1328            CALL     SETBIT3         SET SYLLABLE FLAG
61  001000000         1329            TCY      0               *
13  010010110         1330            LDX      6               *
06  000101111         1331            TAM                      *
0C  010100101         1332            RBIT     2
1A  010100111         1333            RBIT     3
                      1334    *  CALCULATE ADDRESS OF LETTER
47  001000100         1335            TCY      2               FLAG WORD
5E  010015001         1336            LDX      8
50  010000001         1337            LDP      8
3A  000100011         1338            TBIT     3               SYLLABLE?
74  100011101   1235  1339            BRANCH   DISPLOOP
69  010001001         1340            LDP      9
55  001000000         1341    LET4    TCY      0
26  010010110         1342            LDX      6
4C  000101001         1343            TMA
18  000010101         1344            AMAAC                    MULTIPLY BY 2
31  000101111         1345            TAM
62  010011110         1346            LDX      7               *
45  000101001         1347            TMA
0A  000010101         1348            AMAAC
15  111000010   1394  1349            CALL     TLETTER         CARRY, GO TO TLETTER
20  000101111         1350            TAM
50  010011110         1351            LDX      7
2C  000101001         1352            TMA
33  001110011         1353            ALACC    12
33  111000010   1394  1354            CALL     TLETTER
50  000101111         1355            TAM
                      1356    *  LOADS LETTER ADDRESS INTO FOM ADDR AREA (RAM)
41  010000111         1357            CALLL    SPEAK+1
02  110000001   2010  1358
05  010011100         1359            LDX      3               FLAG
03  001001011         1360            TCY      13              *
17  011100011         1361            TCMIY    12
2F  010010100         1362            LDX      2               FLAG
```

TABLE IX-9 (Continued)

| | | | | | | | |
|---|---|---|---|---|---|---|---|
| 0016 | 000101111 | | 1405 | DELAY2+1 | TAM | | |
| 0020 | 000110010 | | 1406 | | IMAC | | |
| 005A | 101101000 | 1409 | 1407 | | BRANCH | PLUSONE | |
| 0034 | 100010110 | 1405 | 1408 | | BRANCH | DELAY2+1 | |
| 0068 | 000101101 | | 1409 | PLUSONE | TAMIYC | | |
| 0051 | 000110010 | | 1410 | | IMAC | | |
| 0022 | 100010001 | 1414 | 1411 | | BRANCH | WORD3 | |
| 0044 | 000101100 | | 1412 | | TAMDYN | | |
| 0008 | 100010110 | 1405 | 1413 | | BRANCH | DELAY2+1 | |
| 0011 | 000101101 | | 1414 | WORD3 | TAMIYC | | |
| 0023 | 000110010 | | 1415 | | IMAC | | |
| 0046 | 101100110 | 1420 | 1416 | | BRANCH | QUIT | |
| 000C | 000101100 | | 1417 | | TAMDYN | | |
| 0019 | 000000100 | | 1418 | | DYN | | |
| 0033 | 100010110 | 1405 | 1419 | | BRANCH | DELAY2+1 | |
| 0066 | 010111111 | | 1420 | QUIT | RETN | | |
| | | | 1421 | * | | | |
| 0040 | 010001110 | | 1422 | F4 | CALLL | FL2 | STORE * OF WRONG RESPONSES |
| 001A | 110001100 | 1145 | 1423 | | | | |
| 0035 | 010000110 | | 1424 | | CALLL | F2LOOP | |
| 006A | 111100100 | 0972 | 1425 | | | | |
| 0055 | 010000101 | | 1426 | | CALLL | MEMADDR | |
| 002A | 111011000 | 1501 | 1427 | | | | |
| 0054 | 010001111 | | 1428 | | CALLL | LOADRESS | |
| 0028 | 111000010 | 1121 | 1429 | | | | |
| 0050 | 010000110 | | 1430 | | BL | FINL3 | |
| 0020 | 100110100 | 0998 | 1431 | | | | |

TABLE IX-10

| | | | | | | | |
|---|---|---|---|---|---|---|---|
| | | | 1432 | | ORGPG | 10 | |
| | | | 1433 | * | | | |
| | | | 1434 | * REPEAT ROUTINE-->REPEATS PHRASE PREVIOUSLY SPOKEN | | | |
| | | | 1435 | * TWO REPEATS OR MORE CAUSES PHRASE TO BE SPOKEN SLOWER | | | |
| | | | 1436 | * | | | |
| 0000 | 010010100 | | 1437 | REPEAT | LDX | 2 | |
| 0001 | 001001111 | | 1438 | | TCY | 15 | |
| 0003 | 001100000 | | 1439 | REPT2 | TCMIY | 0 | |
| 0007 | 010011000 | | 1440 | | LDX | 1 | |
| 005F | 001000101 | | 1441 | | TCY | 10 | |
| 001F | 010110010 | | 1442 | RPT+1 | COMXB | | DAM REG |
| 003F | 000101001 | | 1443 | | TMA | | STORE WORD-->ACC |
| 007F | 010110010 | | 1444 | | COMXB | | EXIT DAM |
| 007E | 000101101 | | 1445 | | TAMIYC | | |
| 007D | 001010111 | | 1446 | | YNEC | 14 | * |
| 007B | 100011111 | 1442 | 1447 | | BRANCH | RPT+1 | * |
| 0077 | 010110010 | | 1448 | | COMXB | | |
| 006F | 001001000 | | 1449 | | TCY | 1 | |
| 005F | 001100000 | | 1450 | | TCMIY | 0 | |
| 003E | 010000111 | | 1451 | | BL | ADDWDS2 | |
| 007C | 100001010 | 2057 | 1452 | | | | |
| | | | 1453 | * LOADDISP--> | | | |
| | | | 1454 | * SUBROUTINE TO DISPLAY WORD BEING USED IN LEARN MODE | | | |
| | | | 1455 | * | | | |
| 0079 | 001000000 | | 1456 | LOADDISP | TCY | 0 | INITIALIZE Y/POINTER |
| 0073 | 010011100 | | 1457 | DPLOAD | LDX | 3 | TRANSFER LSW'S |
| 0067 | 000101001 | | 1458 | | TMA | | * |
| 004F | 010011000 | | 1459 | | LDX | 1 | * |
| 001E | 000101111 | | 1460 | | TAM | | * |
| 003D | 010010100 | | 1461 | | LDX | 2 | TRANSFER MSW'S |
| 007A | 000101001 | | 1462 | | TMA | | * |
| 0075 | 010010000 | | 1463 | | LDX | 0 | * |
| 006B | 000101111 | | 1464 | | TAM | | |
| 0057 | 010111111 | | 1465 | | RETN | | |
| 002E | 000100000 | | 1466 | | TBIT | 0 | |
| 005C | 101100001 | 1470 | 1467 | | BRANCH | LDONE | |
| 0038 | 001100000 | | 1468 | | TCMIY | 0 | |
| 0070 | 101000011 | 1471 | 1469 | | BRANCH | LDONE+1 | |
| 0061 | 001101000 | | 1470 | LDONE | TCMIY | 1 | |
| 0043 | 001010001 | | 1471 | LDONE+1 | YNEC | 8 | |
| 0005 | 101110011 | 1457 | 1472 | | BRANCH | DPLOAD | NO, LOOP--FLSE, |
| 000D | 010010001 | | 1473 | | LDX | 8 | |

TABLE IX-10 (Continued)

```
0018  001101110               TCY      7
0037  000101010               TMY
006E  010000001               LDP      8
0050  001011010               YNEC     5
003A  101011000  1219         BRANCH   DISLP7
0074  010000010               BL       ADDCTR6
0069  101011001  0704
                         *
                         *
                         *   SETBIT2  -  SUBROUTINE TO USE DAM REG FOR FLAG PURPOSES
                         *
0053  010110010          SETBIT2  COMX8                          DAM REG
0026  001000100                   TCY      2
004C  010100001                   SBIT     2                     TEST BIT 2
0018  001001000                   TCY      1
0031  000101010                   TMY
0062  010110010                   COMX8                          EXIT DAM
0045  010111111                   RETN
                         *
000A  010110010          SETBIT1  COMX8
0015  001000100                   TCY      2
0028  010100010                   SBIT     1
0056  010110010                   COMX8
002C  010111111                   RETN
                         *
                         * MEMLOOP- LOADS ADDRESS INTO ROM ADDRESS, 4 BITS AT A TIME
                         *
0058  001000011          MEMADDR  TCY      12                    CHIP SELECT
0030  000001101                   SETR
0060  001001101                   TCY      11                    L/R = 1 (INPUT)
0041  000001101                   SETR                           R11 = 1
0002  001000101                   TCY      10
0005  000000110                   CLA
000B  001111100                   ACACC    3                     FOR LOOP COUNT, ACC = 3
0017  010010100                   LDX      2                     MEMORY FOR LOOP (SAVE ADDR)
002F  000101110          MEMLOOP  TAMZA
005E  010011000                   LDX      1
003C  001110100                   ACACC    TWO
0078  000001101                   SETR                           LOADS COMMAND
0071  000110110                   RSTR                           *
0063  000101001                   TMA                            4 BITS OF ADDR -->ACC
0047  001110000                   ACACC    0
```

TABLE IX-10 (Continued)

```
000E  000001101         1516                     SETH                     LOADS DATA
0010  000110110         1517                     RSTR                     *
0038  001001011         1518                     TCY     13
0076  000000011         1519  SHIFTUP  XMA                                SHIFT ROUTINE          *
006D  000000100         1520                     DYN                      *    SHIFT UP IN       *
0058  001011001         1521                     YNEC    9                *    SAME REGISTER     *
0036  101110110   1519  1522                     BRANCH  SHIFTUP          * * * * * * * * * * *
006C  001000101         1523                     TCY     10               ORIGINAL WORD
0059  010010100         1524                     LDX     2                REG=6
0032  000000111         1525                     DMAN                     MEM=1,==> ACC  LOOP
0064  100101111   1509  1526                     BRANCH  MEMLOOP
0049  000101111         1527                     TAM
0012  001111100         1528                     ACACC   3
0025  000001101         1529                     SETR
004A  000110110         1530                     RSTR
0014  000000110         1531                     CLA
0027  000001101         1532                     SETR
0052  000110110         1533                     RSTR
0024  010011000         1534  MEMDRED  LDX       ONE      * DUMMY READ TO SETUP MEMORY ADDRESS
0048  001000101         1535                     TCY     TEN              **
0010  001110001         1536                     ACACC   EIGHT            **
0021  000001101         1537                     SETR                     **
0042  000110110         1538                     RSTR                     **
0004  010111111         1539                     RETN
0009  010001000         1540  MSPEL3   CALLL     CLEAR
0013  110111010   0256  1541
0027  010001001         1542                     CALLL   DELAY2
004E  110100111   1398  1543
001C  100000000   1437  1544                     BRANCH  REPEAT
                        1545  * SPELLING IS INCORRECT
0039  010111111         1546  MISSPELL RETN
0072  010110010         1547                     COMX8
0065  001000110         1548                     TCY     6                FLAG
0044  010001000         1549                     LDP     1
0016  000100010         1550                     TBIT    1                BIT 1==>0=FIRST TRY
002D  100001001   0304  1551                     BRANCH  NOPHRASE         BIT 1==>1=SECOND TRY
005A  010100010         1552                     SBIT    1                *
                        1553  * LOAD NEGATIVE RESPONSE INTO L/E
0034  010011010         1554  SCORE    LDP       5
0068  001001011         1555                     TCY     13
0051  000110010         1556                     IMAC
0022  000101111         1557                     TAM
```

TABLE IX-10 (Continued)

```
0044  01001100         1558        LDX      3
0006  00101011         1559        TCY      13                     FLAG
0011  00110100         1560        TCMIY    2
0023  01000010         1561        CALLL    CURLEVL
0046  11110111   0769  1562
000C  00001101         1563        IYC
0019  00110110         1564        TCMIY    6
0033  01001100         1565        LDX      2                      FLAG
0066  00100111         1566        TCY      15                     *
004D  00110010         1567        TCMIY    4
001A  01001000         1568        BL       SPK4
0035  10110101   0311  1569
006A  00110000         1570 ADDCTR2 TCMIY   0                      FOR RETN$BCH
0055  01001100         1571        LDX      3
002A  00101011         1572        TCY      13
0054  00110010         1573        TCMIY    4
0028  01001101         1574        BL       CORR+1
0050  10111110   1590  1575
                       1576 *
```

TABLE IX-11

```
                       1577             ORGPG     11
                       1578 *
                       1579 *  POINTERS DAM-WORD 0--> RANDOM WORD ENTRY POINTER
                       1580 *  POINTER DAM-WORD 1 --> CORRECR SPELLING BUFFER POINTER
                       1581 *
0000  01011010         1582 CORR$SPL COMX8                    DAM REG-POINTER
0001  00100000         1583          TCY      0
0003  00110000         1584          TCMIY    0               ZEROS OUT POINTER
0007  00110000         1585          TCMIY    0
000F  00110000         1586          TCMIY    0
001F  00110000         1587          TCMIY    0
003F  01011010         1588          COMX8                    OUT OF DAM REG
007F  01011111         1589          RETN
007E  01000010         1590 CORR+1   CALLL    CURLEVL
007D  11110111   0769  1591
007B  00100111         1592          TCY      15
0077  00010101         1593          TMA
006F  00001101         1594          AMAAC
```

TABLE IX-11 (Continued)

```
005F  001110010         1595                ACACC    4
003E  001000101         1596                TCY      10
007C  000101111         1597                TAM
0079  010000111         1598                CALLL    ADDR
0073  110001100   2139  1599
0067  010000101         1600                CALLL    MEMADDR
004F  111011000   1501  1601
001E  010001110         1602                CALLL    LOADRESS
003D  111000010   1121  1603
                        1604     *
                        1605     *  RESIDENT:
                        1606     *     LOOP TO TRANSFER ADDRESS FROM RESIDENT (RAM) TO ADDRESS
                        1607     *     REGION (RAM)
                        1608     *
007A  001001110         1609     RESIDENT   TCY      7               OLD BLKCSB ROUTINE
0075  000000110         1610     CSB2       CLA
0068  001111000         1611                ACACC    1
0057  010010100         1612                LDX      2
002E  000101111         1613                TAM
005C  010011100         1614                LDX      3
0038  001110101         1615                ACACC    10
0070  000101100         1616                TAMDYN
0061  101110101   1610  1617                BRANCH   CSB2
0043  010011000         1618                LDX      1
0006  001000001         1619                TCY      8
000D  001100100         1620                TCMIY    2
0018  010011010         1621     ADR$CALC   LDX      5               LSW
0037  111001100   1631  1622                CALL     RCOMX8
006F  000101001         1623     ADD2ROM    TMA                      READY FOR ADDITION
0050  010011000         1624                LDX      1               LSW OF ROM ADDR REGION
003A  001000101         1625                TCY      10
0074  010000000         1626                CALLL    ADDCARRY
0069  111011000   0112  1627
0053  010010010         1628                LDX      4
0026  001000000         1629                TCY      0               *
                        1630     *
004C  001000000         1631     RCOMX8     TCY      0
0018  010110010         1632     COMX8      COMX8
0031  000101010         1633                TMY
0062  010110010         1634                COMX8
0045  010111111         1635                RETN
000A  000101001         1636                TMA
```

TABLE IX-11 (Continued)

| | | | | | | | |
|---|---|---|---|---|---|---|---|
| 0015 | 010011000 | | 1637 | | LDX | 1 | ROM ADDR REGION |
| 002B | 001001101 | | 1638 | | TCY | 11 | * |
| 0056 | 010000000 | | 1639 | | CALLL | ADDCARRY | |
| 002C | 111011000 | 0112 | 1640 | | | | |
| 0058 | 001000001 | | 1641 | | TCY | 8 | * |
| 0030 | 000000111 | | 1642 | | DMAN | | ADD2ROM TO BE EXECUTED TWICE |
| 0060 | 000101111 | | 1643 | | TAM | | * |
| 0041 | 000110011 | | 1644 | | MNEZ | | |
| 0002 | 100011011 | 1621 | 1645 | | BRANCH | ADRSCALC | |
| 0005 | 010000101 | | 1646 | | CALLL | MEMADDR | |
| 0008 | 111011000 | 1501 | 1647 | | | | |
| 0017 | 010001110 | | 1648 | | CALLL | LOADRESS | |
| 002F | 111000010 | 1121 | 1649 | | | | |
| 005E | 010000101 | | 1650 | | CALLL | MEMADDR | |
| 003C | 111011000 | 1501 | 1651 | | | | |
| | | | 1652 | * | | | |
| 0078 | 010000011 | | 1653 | | BL | OUTADDR | |
| 0071 | 100000000 | 1723 | 1654 | | | | |
| | | | 1655 | * | | | |
| 0063 | 000101111 | | 1656 | TONE22 | TAM | | |
| 0047 | 010001010 | | 1657 | TONES | CALLL | CURLEVL | |
| 000F | 111101111 | 0769 | 1658 | | | | |
| 0010 | 001100001 | | 1659 | | TCMIY | 8 | |
| 0038 | 001101110 | | 1660 | | TCMIY | 7 | * |
| 0076 | 010011100 | | 1661 | | LDX | 3 | |
| 0060 | 001000001 | | 1662 | | TCY | 8 | |
| 0050 | 010100100 | | 1663 | | RBIT | 0 | |
| 0036 | 010100111 | | 1664 | | RBIT | 3 | |
| 006C | 010101001 | | 1665 | | TMA | | |
| 0059 | 010011000 | | 1666 | | LDX | 1 | |
| 0032 | 001000101 | | 1667 | | TCY | 10 | |
| 0064 | 000010101 | | 1668 | | AMAAC | | |
| 0049 | 100100100 | 1676 | 1669 | | BRANCH | TONCARRY | |
| 0012 | 000101111 | | 1670 | TONE3 | TAM | | |
| 0025 | 010010100 | | 1671 | | LDX | 2 | |
| 004A | 001001111 | | 1672 | | TCY | 15 | |
| 0014 | 001100100 | | 1673 | | TCMIY | 2 | |
| 0029 | 010000010 | | 1674 | | ML | ADDCTR6 | |
| 0052 | 101011001 | 0704 | 1675 | | | | |
| 0024 | 000101101 | | 1676 | TONCARRY | TAMIYC | | |
| 0048 | 000110010 | | 1677 | | IMAC | | |
| 0010 | 000101111 | | 1678 | | TAM | | |

TABLE IX-11 (Continued)

| | | | | | | |
|---|---|---|---|---|---|---|
| 0021 | 100010010 | 1670 | 1679 | | BRANCH | TONE3 |
| 0042 | 001001110 | | 1680 | NXTTONE | TCY | 7 |
| 0004 | 010010001 | | 1681 | | LDX | 8 |
| 0009 | 000101010 | | 1682 | | TMY | |
| 0013 | 001011010 | | 1683 | | YNEC | 5 |
| 0027 | 101100101 | 1669 | 1684 | | BRANCH | CRY24 |
| 004E | 010010100 | | 1685 | | LDX | 2 |
| 001C | 001001111 | | 1686 | | TCY | 15 |
| 0039 | 001101110 | | 1687 | | TCMIY | 7 |
| 0072 | 101001011 | 1692 | 1688 | | BRANCH | TONESCOR |
| 0065 | 001100000 | | 1689 | CRY24 | TCMIY | 0 |
| | | | 1690 | * RETURN TO ROUTINE | | |
| | | | 1691 | * | | |
| 0048 | 011010001 | | 1692 | TONESCOR | LDX | 8 |
| 0016 | 001000001 | | 1693 | | TCY | 8 |
| 0020 | 000100001 | | 1694 | | TBIT | 2 |
| 005A | 101010001 | 1698 | 1695 | | BRANCH | TON12 |
| 0034 | 010001111 | | 1696 | | BL | DISP/KB |
| 0069 | 100101100 | 2219 | 1697 | | | |
| 0051 | 010010100 | | 1698 | TON12 | LDX | 2 |
| 0022 | 001000111 | | 1699 | | TCY | 10 |
| 0044 | 000000111 | | 1700 | | TMAN | |
| 0003 | 101100011 | 1656 | 1701 | | BRANCH | TONE22 |
| 0011 | 010010001 | | 1702 | | LDX | 8 |
| 0023 | 001000101 | | 1703 | | TCY | 8 |
| 0046 | 010100101 | | 1704 | | RBIT | 2 |
| 000C | 010011010 | | 1705 | | LDX | 5 |
| 0019 | 001001011 | | 1706 | | TCY | 13 |
| 0033 | 000101001 | | 1707 | | TMA | |
| 0066 | 010011000 | | 1708 | | LDX | 1 |
| 0040 | 010000110 | | 1709 | | LDP | 6 |
| 0014 | 011101001 | | 1710 | | ALEC | 9 |
| 0035 | 101101100 | 0969 | 1711 | | BRANCH | F5 |
| 006A | 010001010 | | 1712 | | CALLL | CURLEVL |
| 0055 | 111101111 | 0769 | 1713 | | | |
| 002A | 001100110 | | 1714 | | TCMIY | 6 |
| 0054 | 001101110 | | 1715 | | TCMIY | 7 |
| 0028 | 010000010 | | 1716 | | BL | ADDCTR6 |
| 0050 | 101011001 | 0704 | 1717 | | | |

TABLE IX-12

```
                                      ORGPG    12
                             *
                             *   OUTADDR*
                             *       LOADS CORRECT SPELLING BUFFER WITH ACTUAL SPELLING CODE
                             *
0000  01001110               OUTADDR  CALLL   OUTADDR2
0001  11100001   1083
0003  01001100                        LDX     3
0007  00101000                        TCY     1                          *
000F  01000101                        CALLL   COMX8
001F  11001000   1632
003E  00101111                        TAM
007F  01001110                        CALLL   OUTADDR2        PDC FOR OUTPUT COMMAND
007E  11100001   1085
007D  01000100                        LDX     2
007A  00101000                        TCY     1
0077  01000101                        CALLL   COMX8
006F  11001000   1632
005E  01000101                        LDP     10
003E  00101111                        TAM
007C  00110101                        TBIT    2               END OF SPELLING?
0079  11001010   1493                 CALL    SETBIT1
0073  01000011                        LDP     12
0067  01011010                        COMX8
004F  00101000                        TCY     1
001E  00110010                        IMAC                    INCREMENT COR SPEL POINTER
003D  00101111                        TAM
007B  00100100                        TCY     2
0075  00111010                        TBIT    1               TEST FLAG
006B  10111000   1751                 BRANCH  LNKSET
0057  10101110   1749                 BRANCH  EXDAM2
002F  01011010               EXDAM2   COMX8
005E  10000000   1725                 BRANCH  OUTADDR         ADDR--> ALWAYS BRANCH
003C  00000110               LNKSET   CLA
0079  00101001                        TCY     9
0071  01001000                        LDX     1
0043  00101111               LNKSET+1 TAM
0007  01001110                        CALLL   OUTADDR2        PDC FOR OUTPUT 4 BITS
000F  11100001   1085
001E  01000101                        LDP     10
003D  01110000                        ALEC    0
007B  11101011   1485                 CALL    SETBIT2
```

TABLE IX-12 (Continued)

| | | | | | | | |
|---|---|---|---|---|---|---|---|
| 0050 | 010000011 | | 1760 | | LDP | 12 | |
| 005A | 011100000 | | 1761 | | ALEC | 0 | |
| 0074 | 101001100 | 1766 | 1762 | | BRANCH | LNKON | |
| 0067 | 010000101 | | 1763 | | LDP | 10 | |
| 0053 | 011101000 | | 1764 | | ALEC | 1 | |
| 0026 | 110001010 | 1493 | 1765 | | CALL | SETBIT1 | |
| 004C | 010000011 | | 1766 | LNKON | CALLL | LNKPTR2 | |
| 0018 | 111011110 | 1785 | 1767 | | | | |
| 0051 | 010001110 | | 1768 | | CALLL | OUTADDR2 | PDC |
| 0062 | 111000001 | 1083 | 1769 | | | | |
| 0045 | 010000010 | | 1770 | | LDP | 4 | |
| 000A | 001111111 | | 1771 | | ACACC | 15 | |
| 0015 | 110011001 | 0745 | 1772 | | CALL | TSTBIT2 | |
| 002B | 001111000 | | 1773 | | ACACC | 1 | |
| 0056 | 010000111 | | 1774 | | CALLL | LNKPTR | |
| 002C | 111101000 | 2130 | 1775 | | | | |
| 0058 | 000110010 | | 1776 | | IMAC | | |
| 0030 | 000101111 | | 1777 | | TAM | | * |
| 0060 | 010001110 | | 1778 | | CALLL | OUTADDR2 | PDC'S |
| 0041 | 111000001 | 1083 | 1779 | | | | |
| 0042 | 010000010 | | 1780 | | LDP | 4 | |
| 0005 | 001111111 | | 1781 | | ACACC | 15 | |
| 0004 | 110011001 | 0745 | 1782 | | CALL | TSTBIT2 | |
| 0017 | 010000011 | | 1783 | | LDP | 12 | |
| 002F | 001111000 | | 1784 | | ACACC | 1 | |
| 005F | 010011000 | | 1785 | LNKPTR2 | LDX | 1 | |
| 003C | 001001001 | | 1786 | | TCY | 9 | * |
| 007B | 000101010 | | 1787 | | TMY | | * |
| 0071 | 010011110 | | 1788 | | LDX | 7 | |
| 0063 | 000101111 | | 1789 | | TAM | | STORE WORD |
| 0047 | 001000101 | | 1790 | | TCY | 10 | R10 |
| 000F | 010111111 | | 1791 | | RETN | | |
| 0010 | 010001110 | | 1792 | | CALLL | OUTADDR2 | |
| 003E | 111000001 | 1083 | 1793 | | | | |
| 0076 | 011100000 | | 1794 | | ALEC | 0 | |
| 006D | 101100100 | 1801 | 1795 | | BRANCH | LNKEND | |
| 005D | 010000111 | | 1796 | LNKCNT | CALLL | LNKPTR | |
| 0036 | 111101000 | 2130 | 1797 | | | | |
| 006C | 000110010 | | 1798 | LNKCNT2 | IMAC | | |
| 0059 | 101000010 | 1813 | 1799 | | BRANCH | ENDSPEL | GO TO ENDSPEL |
| 0032 | 101000011 | 1754 | 1800 | | BRANCH | LNKSET+1 | ELSE |
| 0064 | 010110010 | | 1801 | LNKEND | COMX8 | | |

TABLE IX-12 (Continued)

| | | | | | | | |
|---|---|---|---|---|---|---|---|
| 0049 | 001000100 | | 1802 | | TCY | 2 | |
| 0012 | 000100010 | | 1803 | | TBIT | 1 | |
| 0025 | 100000100 | 1814 | 1804 | | BRANCH | ENDSPEL1 | |
| 0044 | 000100001 | | 1805 | | TBIT | 2 | |
| 0014 | 101010010 | 1808 | 1806 | | BRANCH | LNK4 | |
| 0027 | 101011011 | 1796 | 1807 | | BRANCH | LNKCNT | |
| 0052 | 000100000 | | 1808 | LNK4 | TBIT | 0 | |
| 0024 | 100010001 | 1833 | 1809 | | BRANCH | F9 | |
| 0045 | 010100000 | | 1810 | | SBIT | 0 | |
| 0015 | 010000001 | | 1811 | | BL | CALADDR | |
| 0021 | 100000000 | 1164 | 1812 | | | | |
| 0042 | 010110010 | | 1813 | ENDSPEL | COMX8 | | ADDRESS DAM |
| 0003 | 001000100 | | 1814 | ENDSPEL1 | TCY | 2 | |
| 0009 | 001100000 | | 1815 | | TCMIY | 0 | |
| 0013 | 010011100 | | 1816 | | LDX | 3 | |
| 0027 | 001001011 | | 1817 | | TCY | 13 | |
| 004F | 000101001 | | 1818 | | TMA | | |
| 001C | 010000111 | | 1819 | | LDP | 14 | |
| 0039 | 011101100 | | 1820 | | ALEC | 3 | |
| 0072 | 100000000 | 2009 | 1821 | | BRANCH | SPEAK | |
| 0065 | 010000011 | | 1822 | | LDP | 12 | |
| 0045 | 011100010 | | 1823 | | ALEC | 4 | 'SPELL' |
| 0016 | 100101010 | 1847 | 1824 | | BRANCH | USPELL3 | |
| 0020 | 010000001 | | 1825 | | LDP | 8 | |
| 0054 | 011101010 | | 1826 | | ALEC | 5 | 'SAY IT' |
| 0034 | 100101011 | 1216 | 1827 | | BRANCH | DISLP-1 | |
| 0068 | 010001100 | | 1828 | | LDP | 3 | |
| 0051 | 011100111 | | 1829 | | ALEC | 14 | |
| 0022 | 111001111 | 0501 | 1830 | | BRANCH | HANG | |
| 0044 | 010001111 | | 1831 | | BL | DISP/KB | |
| 0008 | 100101100 | 2219 | 1832 | | | | |
| 0011 | 010010010 | | 1833 | F9 | LDX | 4 | |
| | | | 1834 | * | TRANS-->STORES CALCULATED ADDRESS IN DAM FOR USE IN LINK/EDIT | | |
| | | | 1835 | * | | | |
| 0025 | 001000101 | | 1836 | TRANS-1 | TCY | 10 | |
| 0046 | 000101001 | | 1837 | TRANS | TMA | | LOAD ACC |
| 000C | 010110010 | | 1838 | | COMX8 | | |
| 0019 | 000101101 | | 1839 | | TAMIYC | | |
| 0055 | 010110010 | | 1840 | | COMX8 | | |
| 0066 | 001010111 | | 1841 | | YNEC | 14 | |
| 0040 | 101000110 | 1837 | 1842 | | BRANCH | TRANS | |
| 001A | 010111111 | | 1843 | | RETN | | |

TABLE IX-12 (Continued)

```
0055  010110010         1844                   COMXB
006A  010000001         1845                   BL         CALADDR
0055  100000000  1164   1846
002A  010000111         1847   USPELL3   CALLL      SPEAK+1
0054  110000001  2010   1848
002B  010000011         1849             CALLL      TRANS-1
0050  110100011  1836   1850
0020  010000111         1851             BL         SPEAK
0040  100000000  2009   1852
```

TABLE IX-13

```
                        1853             ORGPG      13
                        1854   *
                        1855   *
                        1856   *
                        1857   *         THE FOLLOWING ROUTINE DIRECTS THE PROGRAM FLOW ACCORDING TO THE
                        1858   *         KEY PRESSED.
                        1859   *
0000  000100010         1860   KEY00     TBIT       1
0001  100111011  1953   1861             BRANCH     KEY2
0003  010010001         1862   KEY0      LDX        8                  * LETTER KEYS
0007  001000001         1863             TCY        8
000F  000100010         1864             TBIT       1                  TEST GO FLAG
001F  101011111  1875   1865             BRANCH     TRANSFER
003F  001001110         1866             TCY        7
007F  000100001         1867             TBIT       2                  TEST FOR MODE OTHER THAN SPELL
                        1868   *                                       *  OR LEARN
007E  101011111  1875   1869             BRANCH     TRANSFER
007D  011101100         1870             ALEC       3                  A,B,C,D?
007B  101100001  1892   1871             BRANCH     KEY12
0077  010000010         1872   KEY13     BL         DIFFSLV            CHANGE LEVL IN DISPLAY
006F  101111110  0629   1873
                        1874   *
005F  001001110         1875   TRANSFER  TCY        7
003E  010001001         1876             LDX        8
007C  000101010         1877             TMY
0079  001011010         1878             YNEC       5
0073  100011110  1882   1879             BRANCH     TRANS3
0067  010000010         1880             BL         NOSTRANS
004F  100101110  0080   1881
```

TABLE IX-13 (Continued)

| | | | | | | | |
|---|---|---|---|---|---|---|---|
| 001E | 001001111 | | 1882 | TRANS3 | TCY | 15 | |
| 0030 | 010010000 | | 1883 | | LDX | 0 | |
| 0074 | 000101001 | | 1884 | | TMA | | |
| 0075 | 001001101 | | 1885 | | TCY | 11 | |
| 0068 | 000101010 | | 1886 | | TMY | | |
| 0057 | 010001000 | | 1887 | | LDP | 1 | |
| 002E | 001010001 | | 1888 | | YNEC | 8 | |
| 005C | 100000000 | 0194 | 1889 | | BRANCH | NOTFULL | |
| 003A | 010001011 | | 1890 | | LDP | 13 | |
| 0070 | 100010100 | 1946 | 1891 | | BRANCH | NOP | |
| 0061 | 001001111 | | 1892 | KEY12 | TCY | 15 | * STORE |
| 0043 | 010011000 | | 1893 | | LDX | 1 | * NEW |
| 0006 | 000101111 | | 1894 | | TAM | | * DIFFICULTY LEVEL |
| 000D | 101110111 | 1872 | 1895 | | BRANCH | KEY13 | |
| 001B | 011100101 | | 1896 | KEY1 | ALFC | 10 | * MSD=1 |
| 0037 | 101000111 | 1950 | 1897 | | BRANCH | KEY15 | |
| 006E | 011100111 | | 1898 | | ALEC | 14 | |
| 0050 | 101101001 | 1902 | 1899 | | BRANCH | KEY7 | |
| 003A | 010000010 | | 1900 | | BL | GAME#2 | KEY=1F * CODEBREAKER |
| 0074 | 100000000 | 0620 | 1901 | | | | |
| 0069 | 011101011 | | 1902 | KEY7 | ALEC | 13 | |
| 0053 | 100011000 | 1906 | 1903 | | BRANCH | KEY8 | |
| 0026 | 010001100 | | 1904 | | BL | GAME#1 | KEY=1E * HANGMAN |
| 004C | 100000000 | 0479 | 1905 | | | | |
| 0018 | 010010001 | | 1906 | KEY8 | LDX | 8 | |
| 0031 | 001001110 | | 1907 | | TCY | 7 | |
| 0062 | 000101010 | | 1908 | | TMY | | PUT MODE # IN Y |
| 0045 | 011101101 | | 1909 | | ALEC | 11 | |
| 000A | [illegible] | 1918 | 1910 | | BRANCH | KEY14 | |
| 0015 | 001011010 | | 1911 | | YNEC | 5 | * CHECK MODE -- |
| 0028 | 100101100 | 1914 | 1912 | | BRANCH | K10A | * IGNORE ERASE AND |
| 0056 | 100010100 | 1946 | 1913 | | BRANCH | NOP | |
| 002C | 001000001 | | 1914 | K10A | TCY | 8 | |
| 0058 | 000100010 | | 1915 | | TBIT | 1 | TEST GO FLAG |
| 0030 | 100000101 | 1921 | 1916 | | BRANCH | KEY10 | |
| 0060 | 100010100 | 1946 | 1917 | | BRANCH | NOP | |
| 0041 | 010001110 | | 1918 | KEY14 | BL | ROM | |
| 0002 | 101010101 | 1153 | 1919 | | | | |
| | | | 1920 | * | | | * HANGMAN MODE |
| 0005 | 011100011 | | 1921 | KEY10 | ALEC | 12 | |
| 000B | 100010001 | 1974 | 1922 | | BRANCH | ERASE | KEY=1C * ERASE |
| 0017 | 001001110 | | 1923 | | TCY | 7 | |
| 002F | 000101010 | | 1924 | | TMY | | |

TABLE IX-13 (Continued)

| | | | | | | | |
|---|---|---|---|---|---|---|---|
| 005F | 001011110 | | 1925 | | YNEC | 7 | * IGNORE ENTER |
| 003C | 101110001 | 1928 | 1926 | | BRANCH | KEY9 | * IN RANDOM LETTER |
| 0078 | 100010100 | 1946 | 1927 | | BRANCH | NOP | * MODE |
| 0071 | 010001000 | | 1928 | KEY9 | BL | ENTER | KEY=1D * ENTER |
| 0063 | 101011000 | 0254 | 1929 | | | | |
| 0047 | 000101011 | | 1930 | KEY15 | TYA | | PUT 15 IN ACC |
| 000E | 010001011 | | 1931 | | BL | KEY0 | * LETTERS 0-Z |
| 0016 | 100000011 | 1862 | 1932 | | | | |
| 0038 | 010010001 | | 1933 | KEY2 | LDX | 8 | MC: -2 |
| 0076 | 001001110 | | 1934 | | TCY | 7 | |
| 006D | 011101100 | | 1935 | | ALEC | 3 | |
| 0053 | 101010010 | 1949 | 1936 | | BRANCH | KEY3 | |
| 0036 | 011100110 | | 1937 | | ALEC | 6 | |
| 006C | 101110010 | 1962 | 1938 | | BRANCH | KEY6 | |
| 0059 | 000101010 | | 1939 | | TMY | | PUT MODE IN Y |
| 0032 | 001011010 | | 1940 | | YNEC | 5 | * IGNORE CLUE |
| 0064 | 100010100 | 1946 | 1941 | | BRANCH | NOP | * KEY UNLESS |
| 0049 | 010000110 | | 1942 | | LDP | 6 | |
| 0012 | 001000001 | | 1943 | | TCY | 8 | * IN HANGMAN MODE |
| 0025 | 000100010 | | 1944 | | TBIT | 1 | * AND GO FLAG |
| 004A | 101110000 | 0923 | 1945 | | BRANCH | CLUE | |
| 0014 | 010101111 | | 1946 | NOP | BL | DISP/KB | * ENTER KEYS IN |
| 0029 | 100101100 | 2219 | 1947 | | | | |
| | | | 1948 | * | | | KEY=27 * CLUE |
| 0052 | 011100110 | | 1949 | KEY3 | ALEC | 2 | |
| 0024 | 100100011 | 1953 | 1950 | | BRANCH | KEY4 | |
| 0048 | 010000000 | | 1951 | | BL | OFF | KEY=23 * OFF |
| 0010 | 101110001 | 0124 | 1952 | | | | |
| 0021 | 011101000 | | 1953 | KEY4 | ALEC | 1 | |
| 0042 | 100010011 | 1957 | 1954 | | BRANCH | KEY5 | |
| 0004 | 010000100 | | 1955 | | BL | SPELL | |
| 0009 | 100010001 | 0462 | 1956 | | | | |
| 0013 | 010000000 | | 1957 | KEY5 | LDP | 0 | |
| 0027 | 011100000 | | 1958 | | ALEC | 0 | |
| 004F | 101001011 | 0142 | 1959 | | BRANCH | GAME#3 | KEY=20 * RANDOM LETTER |
| 001C | 010000100 | | 1960 | | BL | LEARN | KEY=21 * LEARN |
| 0039 | 100011001 | 0466 | 1961 | | | | |
| 0072 | 000100001 | | 1962 | KEY6 | TBIT | 2 | * TEST FOR MODES OTHER |
| 0065 | 100010100 | 1946 | 1963 | | BRANCH | NOP | * THAN SPELL OR LEARN |
| 0068 | 011100010 | | 1964 | K16 | ALEC | 4 | |
| 0016 | 101000100 | 1972 | 1965 | | BRANCH | K17 | |
| 0020 | 001000001 | | 1966 | | TCY | 6 | |

TABLE IX-13 (Continued)

| | | | | | | | | |
|---|---|---|---|---|---|---|---|---|
| 005A | 000100010 | | 1967 | | TBIT | 1 | GO FLAG |
| 0034 | 100001100 | 1977 | 1968 | | BRANCH | K19 | |
| 0068 | 011101010 | | 1969 | | ALEC | 5 | REPLAY? |
| 0051 | 101001101 | 1981 | 1970 | | BRANCH | K23 | |
| 0022 | 100010100 | 1946 | 1971 | | BRANCH | NOP | |
| 0044 | 010001000 | | 1972 | K17 | BL | GO | KEY=24 * GO |
| 0008 | 101111100 | 0213 | 1973 | | | | |
| 0011 | 010001000 | | 1974 | ERASE | CALLL | CLEAR | |
| 0023 | 110111010 | 0236 | 1975 | | | | |
| 0046 | 100010100 | 1946 | 1976 | | BRANCH | NOP | |
| 000C | 011101010 | | 1977 | K19 | ALEC | 5 | |
| 0019 | 100100000 | 1990 | 1978 | | BRANCH | K21 | |
| 0033 | 010000101 | | 1979 | | BL | REPEAT | |
| 0066 | 100000000 | 1437 | 1980 | | | | |
| 0040 | 010010000 | | 1981 | K23 | LDX | 0 | |
| 001A | 001000000 | | 1982 | | TCY | 0 | |
| 0035 | 000110011 | | 1983 | | MNEZ | | |
| 005A | 100101010 | 1986 | 1984 | | BRANCH | K20 | |
| 0055 | 100010100 | 1946 | 1985 | | BRANCH | NOP | |
| 002A | 010011000 | | 1986 | K20 | LDX | 1 | |
| 0054 | 001110001 | | 1987 | | ACALC | 8 | ACC=13 AFTER THIS INSTRUCTION |
| 0024 | 000001001 | | 1988 | | MNEA | | |
| 0050 | 100010100 | 1946 | 1989 | | BRANCH | NOP | |
| 0020 | 010001000 | | 1990 | K21 | BL | REPLAY | |
| 0040 | 100101100 | 0250 | 1991 | | | | |

TABLE IX-14

```
1992            ORGPG      14
1993   ************************************************************************
1994   * SPEAK                                                                *
1995   * ROUTINE TO CONTROL SPEECH TO AND FROM SYNTHESIZER                    *
1996   *                                                                      *
1997   * IF SS--SET, SPEAK WAS CALLED                                         *
1998   * IF SS--RESET, MEMADDR WAS CALLED                                     *
1999   *                                                                      *
2000   * IF SS=1, ADDRESSES ARE TRANSFERED FROM FILES 6 AND 7 TO FILE         *
2001   * 1, WORDS 10-13, ELSE IF SS=0, ADDRESS IS IN FILE 1 PRIOR TO CALL     *
2002   *                                                                      *
2003   * 2 POINTERS USED                                                      *
2004   *    1) LINK/EDIT POINTER FOR WORDS IN FILES 6 AND 7                   *
2005   *    2) ROM ADDR POINTER FOR WORDS IN FILE 1.                          *
2006   *                                                                      *
2007   ************************************************************************
2008   *                                                                      *
```

TABLE IX-14 (Continued)

| | | | | | | | |
|---|---|---|---|---|---|---|---|
| 0000 | 010110101 | | 2009 | SPEAK | SEAC | | |
| 0001 | 010011000 | | 2010 | SPEAK+1 | LDX | 1 | |
| 0003 | 001000001 | | 2011 | | TCY | 8 | |
| 0007 | 001100101 | | 2012 | | TCMIY | 10 | INITIALIZE ROM ADDR POINTER |
| 000F | 001110000 | | 2013 | | TCMIY | 0 | INITIALIZE LNK/EDT POINTER |
| 001F | 001001001 | | 2014 | SPKLOP-1 | TCY | 9 | |
| 003F | 000101010 | | 2015 | SPKLOOP | TMY | | |
| 007F | 010011110 | | 2016 | | LDX | 7 | GET WORD FROM LNK/EDT |
| 007E | 000101001 | | 2017 | | TMA | | LOAD WORD IN ACC |
| 007D | 010011000 | | 2018 | | LDX | 1 | POINTER |
| 007B | 001000001 | | 2019 | | TCY | 8 | * |
| 0077 | 000101010 | | 2020 | | TMY | | * |
| 006F | 000101111 | | 2021 | | TAM | | STORE WORD |
| 005F | 001000001 | | 2022 | | TCY | 8 | BUMP POINTER |
| 003E | 000110010 | | 2023 | | IMAC | | * |
| 007C | 000101111 | | 2024 | | TAM | | * |
| 0079 | 001001001 | | 2025 | | TCY | 9 | GET FILE FOR NEXT WORD |
| 0073 | 000101010 | | 2026 | | TMY | | |
| 0067 | 000000000 | | 2027 | | COMX | | FILE 6 |
| 004F | 000101001 | | 2028 | | TMA | | WORD--ACC |
| 001E | 000000000 | | 2029 | | COMX | | FILE 1 |
| 003D | 001000001 | | 2030 | | TCY | 8 | POINTER |
| 007A | 000101010 | | 2031 | | TMY | | * |
| 0075 | 000101111 | | 2032 | | TAM | | STORE WORD |
| 006B | 001001001 | | 2033 | | TCY | 9 | BUMP LNK/EDT POINTER |
| 0057 | 000110010 | | 2034 | | IMAC | | IF > 15, RETURN |
| 002E | 100100001 | 2111 | 2035 | | BRANCH | RETURN | |
| 005C | 000101111 | | 2036 | | TAM | | STORE INCREMENT |
| 0038 | 001000001 | | 2037 | | TCY | 8 | BUMP ROM AREA POINTER |
| 0070 | 000110010 | | 2038 | | IMAC | | * |
| 0061 | 000101110 | | 2039 | | TAMZA | | |
| 0043 | 000101010 | | 2040 | | TMY | | * |
| 0006 | 001010111 | | 2041 | | YNEC | 14 | IS Y = 14? |
| 000D | 100011111 | 2014 | 2042 | | BRANCH | SPKLOP-1 | |
| 001B | 010111111 | | 2043 | | RETN | | |
| 0037 | 001000101 | | 2044 | | TCY | 10 | YES, CONTINUE |
| 006E | 010000111 | | 2045 | ADDWDS | LDP | 14 | |
| 005D | 000010101 | | 2046 | | AMAAC | | |
| 003A | 100001010 | 2057 | 2047 | | BRANCH | ADDWDS2 | |
| 0074 | 010000111 | | 2048 | | LDP | 14 | |
| 0069 | 000000101 | | 2049 | | TYC | | LOOP COUNT |
| 0053 | 001010111 | | 2050 | | YNEC | 14 | * |

TABLE IX-14 (Continued)

```
0026  101101110  2045  2051                BRANCH  ADDWDS      *
004C  011101000        2052                ALEC    1
0016  100100001  2111  2053                BRANCH  RETURN      IF YES, RETURN
0031  010001001        2054                LDP     9
0062  011100100        2055                ALEC    2           ACC-->2?
0045  100100000  1294  2056                BRANCH  LETTER
000A  010000101        2057  ADDWDS2       CALL    MEMADDR
0015  111011000  1501  2058
                       2059  *   ROM ADDRESSING SUBROUTINE:
                       2060  *   ASSUMES X AND Y HAVE BEEN DEFINED PRIOR TO CALLING     *
                       2061  *                                                          *
                       2062  *                                                          *
                       2063  *   LOADS ADDRESS INTO ROM ADDRESS AREA                    *
                       2064  *   ALL R LINES, ETC.,.. REMAIN THE SAME AS WHEN           *
                       2065  *   ENTERING SUBROUTINE.                                   *
                       2066  *                                                          *
                       2067  ************************************************************
                       2068  *                                                          *
                       2069  *                                                          *
                       2070  *   END OF ROUTINE                                         *
                       2071  *
0028  001000011        2072  MEMADDR2      TCY     12          CS , GIVING SYN, COMMANDS
0056  000001101        2073                SETR                R12 = 1
002C  000000110        2074                CLA
0058  001110101        2075  SPKREG        ACACC   TEN
0030  001000101        2076                TCY     10
0060  000001101        2077                SETR
0041  000110110        2078                RSTR                *
0002  000000110        2079  SPKREG+1      CLA
0005  001000011        2080                TCY     12
000B  000001101        2081                SETR
0017  001000101        2082                TCY     10
002F  001110111        2083                ACACC   14
005E  000001101        2084                SETR                1ST PDC LOADS COMMAND
003C  000110110        2085                RSTR                *
0078  001001101        2086                TCY     11
0071  000110110        2087                RSTR
0063  001000101        2088                TCY     10
0047  000001101        2089                SETR                2ND PDC APPLIES TALK TO CTLB
000E  000110110        2090                RSTR                *
0010  001110000        2091                ACACC   0
0035  000001000        2092                TKA
0076  000001101        2093                SETR                3RD PDC RELEASES OUTPUT
0065  000110110        2094                RSTR                *
```

TABLE IX-14 (Continued)

```
0054  001001101         2095              TCY      11
0035  000001101         2096              SETR
006C  010011100         2097              LDX      3
0059  001001111         2098              TCY      15
0032  000101111         2099              TAM
0064  000100000         2100              TBIT     0
0049  101011010   2125  2101              BRANCH   BITSETO
0012  010011000         2102              LDX      1
0025  001000001         2103              TCY      8
004A  001100101         2104              TCMIY    10
0014  000010010         2105              CCLA
0029  011100000         2106              ALEC     ZERO
0052  101001000   2109  2107              BRANCH   RETS
0024  100011111   2014  2108              BRANCH   SPKLUP-1
0048  010011000         2109   RETS       LDX      1
0010  001000001         2110              TCY      8
0021  000101110         2111   RETURN     TAMZA                        ACC = ZERO
0042  001001111         2112              TCY      15
0054  010010110         2113   RETURN4    LDX      SIX
0009  000101111         2114              TAM
0013  010011110         2115              LDX      SEVEN
0027  000101100         2116              TAMDYN
004E  100000100   2113  2117              BRANCH   RETURN4
001C  010111111         2118              RETN
0039  010110100         2119   RETURN+1   REAC
0072  001001111         2120   RETURN+2   TCY      15                  TALK BIT
0065  010011100         2121              LDX      3                   *
0048  010100100         2122              RBIT     0                   *
0016  010000010         2123              BL       RETNSBCH
0020  101001010   0710  2124
0054  010001111         2125   BITSETO    LDP      15
0034  100101100   2219  2126              BRANCH   DISP/KB
                        2127   *
                        2128   *          END OF SPEECH CONTROL SUBROUTINE
                        2129   *
0068  010011000         2130   LNKPTR     LDX      1                   POINTER FOR LNK/EDT
0051  001001001         2131              TCY      9                   *
0022  000101010         2132              TMY                          *
0044  010011110         2133              LDX      6
0005  000101111         2134              TAM                          STORE WORD
0011  010011000         2135              LDX      1                   POINTER
0023  001001001         2136              TCY      9                   *
0045  010111111         2137              RETN
```

```
                              2138    *
000C  001000110               2139    ADD8     TCY      6
0019  010010001               2140             LDX      8
0033  000100011               2141             TBIT     3
0066  100011010      2144     2142             BRANCH   RADD8
0040  101010101      2147     2143             BRANCH   RADD2
0014  010011000               2144    RADD8    LDX      1
0035  001001011               2145             TCY      13
0064  001100001               2146             TCMIY    8
0055  010111111               2147    RADD2    RETN
```

TABLE IX-15

```
                              2148             ORGPG    15
                              2149    *
                              2150    *                 POWER UP / CLEAR ROUTINE
                              2151    *
                              2152    *        THIS ROUTINE SETS UP INITIAL CONDITIONS IN RAM
                              2153    *
                              2154    *
                              2155    *
0000  001001111               2156    START    TCY      FIFTEEN           * RESET ALL R-LINES
0001  000110110               2157    LOOP$ST  RSTR                       **
0003  000000100               2158             DYN                        **
0007  100000001      2157     2159             BRANCH   LOOP$ST           **
000F  001001011               2160             TCY      13
001F  000001101               2161             SETR
003F  001001111               2162             TCY      15
007F  010111111               2163             RETN                       **
007E  000000110               2164             CLA                        **
007D  010010001               2165             LDX      8
007B  110101110      2183     2166             CALL     FILSLOOP          **
0077  010011110               2167             LDX      SEVEN             **
006F  110101110      2183     2168             CALL     FILSLOOP          **
005F  010010110               2169             LDX      SIX               **
003F  110101110      2183     2170             CALL     FILSLOOP          **
007C  010011010               2171             LDX      FIVE              **
0079  110101110      2183     2172             CALL     FILSLOOP          **
0073  010010010               2173             LDX      FOUR              **
0067  110101110      2183     2174             CALL     FILSLOOP          **
004F  010011100               2175             LDX      THREE             **
001F  110101110      2183     2176             CALL     FILSLOOP          **
003D  010010100               2177             LDX      TWO               **
007A  110101110      2183     2178             CALL     FILSLOOP          **
0075  010011000               2179             LDX      ONE               **
006B  110101110      2183     2180             CALL     FILSLOOP          **
```

TABLE IX-15 (Continued)

```
0057  010010000         2181          LDX      ZERO                  **
                        2182   *
002E  000101100         2183   FILSLOOP TAMDYN                       * ROUTINE FILLS FILE WITH CONTENTS
035C  101101110   2183  2184          BRANCH   FILSLOOP              **OF ACC.
003A  010111111         2185          RETN                           **
                        2186   *
                        2187   *
0070  010001000         2188   DSP7   CALLL    CLEAR
0061  110111010   0236  2189
                        2190   *
0043  010000010         2191          CALLL    DIFFSLV               * DISPLAY DIFF LEVEL A - SPELL MODE
0006  111111110   0629  2192
0000  000000110         2193          CLA
0019  001001101         2194          TCY      11
0037  000110110         2195          RSTR
006E  001000011         2196          TCY      12
0050  000001101         2197          SETR
0034  001000101         2198          TCY      10
0074  000001101         2199          SETR
0069  000110110         2200          RSTR
0053  000001101         2201          SETR
0026  000110110         2202          RSTR
004C  001001101         2203          TCY      11
0018  000001101         2204          SETR
0031  001000101         2205          TCY      10
0062  000001101         2206          SETR
0045  000110110         2207          RSTR
000A  010000101         2208          CALLL    MEMORED
0015  110100100   1534  2209
002A  010001101         2210          BL       TONES
0056  101001111   1657  2211
                        2212   *
                        2213   *
                        2214   *               KEYBOARD SCAN / DISPLAY ROUTINE
                        2215   *
                        2216   *      THIS ROUTINE DISPLAYS THE CONTENTS OF 'DISPLAY BUFFER' AND
                        2217   *      CHECKS FOR A KEYPRESS.
                        2218   *
002C  010011100         2219   DISP/KB LDX     3
0058  001001101         2220          TCY      11
0130  001110000         2221          TCMIY    0                    RESET TIMEOUT COUNTER
0060  000110110         2222          RSTR                          RESET R12 TO ENABLE DISPLAY
0041  001100000         2223          TCMIY    0
```

TABLE IX-15 (Continued)

```
0002  00000110         2224            CLA
0005  00100011         2225  DSP1      TCY      12
000B  01001000         2226            LDX      0
0017  00101101         2227            TAMIYC                STORE DEBOUNCE COUNTER; SET Y=0
002F  01110000         2228            TCMIY    0            RESET R-LINE POINTER
005F  00101111         2229            TCY      15
003C  00001101         2230            SETR                  R=15, TURN ON FILAMENT
0078  00100000         2231            TCY      0
0071  01001100         2232  DSP2      LDX      1            *
0063  00101001         2233            TMA                   *
0047  01011000         2234            TDO                   * LOAD SEGMENT PLA
000F  01001000         2235            LDX      0            *
0010  00101001         2236            TMA                   *
0058  00001001         2237            MNEA                  *
0076  01011000         2238            TDO                   *
0060  00001101         2239            SETR                  TURN ON NEW R-LINE
0058  00101111         2240            TCY      15
0036  00110110         2241            RSTR                  R=15, TURN OFF FILAMENT
006C  01000000         2242            BL       TIMEUP       * INCREMENT RANDOM NUMBER GENERATOR/
0059  10100101   0103  2243
                       2244  *                               * TIMEOUT COUNTER
0032  00101011         2245  DISP/KB1  TCY      13
0064  00110010         2246            IMAC                  INCREMENT R-LINE POINTER
0049  00100111         2247            TAM
0012  00101111         2248            TCY      15
0025  00001101         2249            SETR                  TURN ON FILAMENT
004A  00101000         2250            TAY
0014  00000100         2251            DYN
0029  00110110         2252            RSTR                  RESET LAST R-LINE
0052  00000101         2253            TYC
0025  00101001         2254            YNEC     8            SCAN COMPLETE?
004B  10111001   2232  2255            BRANCH   DSP2         NO
0010  00101111         2256            TCY      15           YES
0121  00110110         2257            RSTR                  RESET FILAMENT
0042  01000000         2258            CALLL    TIMEUP1      INCREMENT RANDOM NUMBER/TIMEOUT COUNTER
0066  11010011   0106  2259
                       2260  *                               ONE EXTRA TIME, TOTAL=9 PER DISPLAY SCAN
0009  01001000         2261            LDX      0
0013  00100101         2262            TCY      10
0027  00110010         2263            IMAC                  INCREMENT DEBOUNCE COUNTER
004F  10111001   2266  2264            BRANCH   DSP3
001C  00100111         2265            TAM
0039  00100011         2266  DSP3      TCY      12
```

TABLE IX-15 (Continued)

```
0072  00111010         2267            IMAC
0065  01100101         2268            ALEC     10
0048  10000101   2225  2269            BRANCH   DSP1           CONTINUE DISPLAY IF<8
0016  01000111         2270            LDP      14
0020  00101111         2271            TCY      15
005A  01001100         2272            LDX      3
0034  00010000         2273            TBIT     0
005*  10101100   2075  2274            BRANCH   SP*REG + 1     TEST TALK
0051  01000001         2275            LDP      8
0022  00100111         2276            TCY      14
0034  00101011         2277            TYA                     SET ACC=14
0008  00100000         2278            TBIT     0
0011  10110110   1241  2279            BRANCH   DISLP+1
0023  01001111         2280            LDP      15
0046  10000101   2225  2281            BRANCH   DSP1           RET
003C  01001000         2282  KEYSEVL   LDX      0
0019  00100111         2283            TCY      14             * PUT LSD OF KEY CODE
0033  00101001         2284            TMA                     * IN ACC
0066  00101111         2285            TCY      15
0043  01001011         2286            LDP      13
001A  00010000         2287            TBIT     0
0035  10001011   1896  2288            BRANCH   KEY1
0064  10000000   1860  2289            BRANCH   KEY00
                       2290  *
0055  01001001         2291  SETBIT3   LDX      8
0024  00100100         2292            TCY      2
0052  01010011         2293            SBIT     3              SET BIT 3
002*  01011111         2294            RETN
                       2295  *
                       2296            END
```

TABLE X $I_0/I_1$ COMMANDS

| $I_0$ | $I_1$ | |
|---|---|---|
| 0 | 0 | No Operation |
| 0 | 1 | Load Address (LA) |
| 1 | 0 | Transfer Bit (TB) |
| 1 | 1 | Read and Branch (RB) |

TABLE XI

Counter 619/PLA 620 Timing Sequence

| STEP | COUNTER CONTENTS (HEX) | SIGNALS GENERATED |
|---|---|---|
| 1 | 0 | $\overline{LA1}$, TB8 |
| 2 | 8 | $\overline{LA2}$ |
| 3 | C | $\overline{LA3}$ |
| 4 | E | $\overline{LA4}$ |
| 5 | F | |
| 6 | 7 | |
| 7 | 3 | |
| 8 | 1 | |

TABLE XII

TB8 READ SEQUENCE

| STEP | COUNTER 623 CONTENTS (BINARY) | COUNTER 624 CONTENTS (HEX) | SIGNALS GENERATED |
|---|---|---|---|
| 1 | 10 | F | SAD, INC |
| 2 | 10 | E | DC, INC |
| 3 | 10 | C | DC, INC |
| 4 | 10 | 8 | DC, INC |
| 5 | 10 | 0 | DC, INC |
| 6 | 10 | 1 | DC, INC |
| 7 | 10 | 3 | SAM, DC, INC |
| 8 | 10 | 7 | PC, $\overline{ZERO}$ |

RB READ SEQUENCE

TB8 READ SEQUENCE

| STEP | COUNTER 623 CONTENTS (BINARY) | COUNTER 624 CONTENTS (HEX) | SIGNALS GENERATED |
|---|---|---|---|
| 1 | 11 | F | SAD, INC |
| 2 | 11 | E | DC, INC |
| 3 | 11 | C | DC, INC |
| 4 | 11 | 8 | DC, INC |
| 5 | 11 | 0 | DC, INC |
| 6 | 11 | 1 | DC, INC |
| 7 | 11 | 3 | SAM, DC, INC |
| 8 | 11 | 7 | PC |
| 9 | 01 | F | SAD, TF |
| 10 | 01 | E | BR, PC |
| 11 | 01 | C | BR, DC |
| 12 | 01 | 8 | BR, DC |
| 13 | 01 | 0 | BR, DC |
| 14 | 01 | 1 | DC |
| 15 | 01 | 3 | SAM, DC |
| 16 | 01 | 7 | PC |
| 17 | 00 | F | SAD, TF |
| 18 | 00 | E | BR |
| 19 | 00 | C | BR |
| 20 | 00 | 8 | BR |
| 21 | 00 | 0 | |
| 22 | 00 | 1 | |
| 23 | 00 | 3 | |
| 24 | 00 | 7 | PC |
| 25 | 10 | F | SAD, INC |
| 26 | 10 | E | DC, INC |
| 27 | 10 | C | DC, INC |
| 28 | 10 | 8 | DC, INC |
| 29 | 10 | 0 | DC, INC |
| 30 | 10 | 1 | DC, INC |
| 31 | 10 | 3 | SAM, DC, INC |
| 32 | 10 | 7 | PC, ZERO |

What is claimed is:

1. A talking electronic apparatus comprising:

memory means for storing digital speech data and digital control data from which a plurality of requests in synthesized human speech for respective operator responses and appropriate operator responses corresponding to said plurality of requests may be respectively derived, speech synthesizer means operably associated with said memory means for converting said digital speech data into audible human speech, means for randomly accessing a portion of said digital speech data stored in said memory means from which a request for an operator response may be derived, means for transferring said randomly accessed portion of said digital speech data from said memory means to said speech synthesizer means to produce a randomly selected audible request in human speech, operator input means for receiving an operator response to said randomly selected audible request, and means responsive to said digital control data and said operator response to said randomly selected audible request for responding in a manner producing an output indicative of the appropriateness of said operator response with respect to the appropriate operator response corresponding to said randomly selected audible request.

2. A talking electronic apparatus according to claim 1 wherein said plurality of requests includes at least one request for an operator to spell a word in a human language and wherein said appropriate operator response comprises the correct spelling of said word.

3. A talking electronic apparatus according to claim 1, wherein said operator input means comprises a keyboard.

4. A talking electronic apparatus according to claim 1, wherein said means responsive to said digital control data and said operator response includes visual presentation means for informing said operator if said operator response is appropriate.

5. A talking electronic apparatus according to claim 1, wherein said means responsive to said digital control data and said operator response responds in a manner causing said speech synthesizer means to audibly inform said operator if said operator response is appropriate.

6. A talking electronic apparatus according to claim 1, wherein said memory means comprises non-volatile digital semiconductor memory means.

7. A talking electronic apparatus according to claim 1, further including battery receiving means for holding a battery power source to provide electrical power to said apparatus.

8. A talking electronic apparatus as set forth in claim 1, wherein said means responsive to said digital control data and said operator response is effective to initiate a second selected audible request in human speech via said speech synthesizer means if said operator response to the first selected audible request conforms to the appropriate operator response corresponding thereto.

9. A talking electronic apparatus according to claim 8, wherein said plurality of requests includes at least one request for an operator to spell a word in a human language and wherein said appropriate operator response comprises the correct spelling of said word.

10. A talking electronic apparatus according to claim 8, wherein said operator input means comprises a keyboard.

11. A talking electronic apparatus according to claim 8, wherein said memory means comprises non-volatile digital semiconductor memory means.

12. A talking electronic apparatus according to claim 8, further including battery receiving means for holding a battery power source to provide electrical power to said apparatus.

13. A talking electronic apparatus as set forth in claim 1, wherein said means responsive to said digital control data and said operator response to said selected audible request is effective to cause said speech synthesizer means to repeat said selected audible request if said operator response is inappropriate.

14. A talking electronic apparatus according to claim 13, wherein said plurality of requests includes at least one request for an operator to spell a word in a human language and wherein said appropriate operator response comprises the correct spelling of said word.

15. A talking electronic apparatus according to claim 13, wherein said operator input means comprises a keyboard.

16. A talking electronic apparatus according to claim 13, wherein said memory means comprises non-volatile digital semiconductor memory means.

17. A talking electronic apparatus according to claim 13, further including battery receiving means for holding a battery power source to provide electrical power to said apparatus.

18. A talking electronic apparatus comprising:
- memory means for storing digital speech data and digital control data from which a plurality of requests in synthesized human speech for respective operator responses and appropriate operator responses corresponding to said plurality of requests may be respectively derived,
- speech synthesizer means operably associated with said memory means for converting said digital speech data into audible human speech,
- means for selectively transferring said digital speech data to said speech synthesizer means to produce a selected audible request in human speech,
- operator input means for receiving an operator response to said selected audible request, and
- means responsive to said digital control data and said operator response to said selected audible request for responding in a manner producing an output indicative of the appropriateness of said operator response with respect to the appropriate operator response corresponding to said selected audible request.

19. A talking electronic apparatus according to claim 18, wherein said plurality of requests includes at least one request for an operator to spell a word in a human language and wherein said appropriate operator response comprises the correct spelling of said word.

20. A talking electronic apparatus according to claim 18, wherein said operator input means comprises a keyboard.

21. A talking electronic apparatus according to claim 18, wherein said memory means comprises non-volatile digital semiconductor memory means.

22. A talking electronic apparatus according to claim 18, further including battery receiving means for holding a battery power source to provide electrical power to said apparatus.

23. An electronic learning aid for training an operator in spelling, said learning aid comprising:
- memory means for storing digital data including digitized speech data from which one or more words of human speech and the correct spellings thereof may be respectively derived,
- speech synthesizer means operably associated with said memory means and including means for converting said digitized speech data into audible human speech,
- means for receiving inputs from an operator of said learning aid,
- means for providing said digitized speech data from said memory means to said speech synthesizer means,
- means for randomly selecting a particular word to be spelled by an operator of said learning aid, said particular word being derived from digitized speech data stored in said memory means and converted to audible human speech by said speech synthesizer means,
- means for comparing an input entered at said operator input means with said correct spelling stored as digital data in said memory means and for generating a result signal indicative of the results of said comparison, and
- means for generating a response to said operator in accordance with said result signal.

24. An electronic learning aid according to claim 23, wherein said operator input means comprises a keyboard.

25. An electronic learning aid according to claim 23, wherein said memory means comprises non-volatile digital semiconductor memory means.

26. An electronic learning aid according to claim 23 further including battery receiving means for holding a battery power source to provide electrical power to said learning aid.

27. An electronic learning aid according to claim 23, wherein said response generating means includes means for providing digitized speech data to said speech synthesizer means whereby said operator may be audibly informed in human speech of the results of said comparison.

28. An electronic learning aid for training an operator in pronunciation, said learning aid comprising:
- memory means storing digital speech data from which a plurality of words in human speech may be derived and digital control data associated with respective derivable words;
- speech synthesizer means operably associated with said memory means for converting said digital speech data into audible human speech;

means for transferring a selected portion of said digital speech data from said memory means representative of at least one word to said speech synthesizer means;

means responsive to said digital control data corresponding to the selected said one word for visually displaying said selected one word in letter images in a human language; and said speech synthesizer means being responsive to the visual display of said selected one word by said visual displaying means for generating audible speech stating said selected one word a predetermined time interval after the visual display thereof, said predetermined time interval being of sufficient duration to allow an operator to pronounce said selected one word prior to the audible speaking thereof by said speech synthesizer means.

29. An electronic learning aid according to claim 28, further including means operably associated with said speech synthesizer means for causing said speech synthesizer means to audibly request that an operator pronounce a visually displayed word.

30. An electronic learning aid according to claim 28, further including means for randomly selecting a set of words to be pronounced by an operator, each word in said set of words being visually displayed and audibly stated in sequence by said visual displaying means and said speech synthesizer means.

31. An electronic learning aid according to claim 28, wherein said memory means comprises non-volatile digital semiconductor memory means.

32. A talking electronic apparatus comprising:

memory means for storing digital speech data and digital control data from which a plurality of requests in synthesized human speech for respective operator responses and appropriate operator responses corresponding to said plurality of requests may be respectively derived, speech synthesizer means operably associated with said memory means for converting said digital speech data into audible human speech, means for randomly accessing a portion of said digital speech data stored in said memory means from which a request for an operator response may be derived, means for transferring said randomly accessed portion of said digital speech data from said memory means to said speech synthesizer means to produce a randomly selected audible request in human speech, means responsive to said digital control data for producing a visual display corresponding to said randomly selected audible request, operator input means for receiving an operator response to said randomly selected audible request, and means responsive to said digital control data and said operator response to said randomly selected audible request for responding in a manner producing an output indicative of the appropriateness of said operator response with respect to the appropriate operator response corresponding to said randomly selected audible request.

33. A talking electronic apparatus according to claim 32, wherein said plurality of requests includes at least one request for an operator to spell a word in a human language and wherein said appropriate operator response comprises the correct spelling of said word.

34. A talking electronic apparatus according to claim 32, wherein said operator input means comprises a keyboard.

35. A talking electronic apparatus according to claim 32, wherein said means responsive to said digital control data and said operator response responds in a manner causing said speech synthesizer means to audibly inform said operator if said operator response is appropriate.

36. A talking electronic apparatus according to claim 32, wherein said memory means comprises non-volatile digital semiconductor memory means.

37. A talking electronic apparatus according to claim 32, further including battery receiving means for holding a battery power source to provide electrical power to said apparatus.

38. A talking electronic apparatus as set forth in claim 32, wherein said means responsive to said digital control data and said operator response is effective to initiate a second selected audible request in human speech via said speech synthesizer means if said operator response to the first selected audible request conforms to the appropriate operator response corresponding thereto.

39. A talking electronic apparatus according to claim 38, wherein said plurality of requests includes at least one request for an operator to spell a word in a human language and wherein said appropriate operator response comprises the correct spelling of said word.

40. A talking electronic apparatus according to claim 38, wherein said operator input means comprises a keyboard.

41. A talking electronic apparatus according to claim 38, wherein said means responsive to said digital control data and said operator response responds in a manner causing said speech synthesizer means to audibly inform said operator if said operator response is appropriate.

42. A talking electronic apparatus according to claim 38, wherein said memory means comprises non-volatile digital semiconductor memory means.

43. A talking electronic apparatus according to claim 38, further including battery receiving means for holding a battery power source to provide electrical power to said apparatus.

44. A talking electronic apparatus as set forth in claim 32, wherein said means responsive to said digital control data and said operator response to said selected audible request is effective to cause said speech synthesizer means to repeat said selected audible request if said operator response is inappropriate.

45. A talking electronic apparatus according to claim 44, wherein said plurality of requests includes at least one request for an operator to spell a word in a human language and wherein said appropriate operator response comprises the correct spelling of said word.

46. A talking electronic apparatus according to claim 44, wherein said operator input means comprises a keyboard.

47. A talking electronic apparatus according to claim 44, wherein said means responsive to said digital control data and said operator response responds in a manner causing said speech synthesizer means to audibly inform said operator if said operator response is appropriate.

48. A talking electronic apparatus according to claim 44, wherein said memory means comprises non-volatile digital semiconductor memory means.

49. A talking electronic apparatus according to claim 44, further including battery receiving means for holding a battery power source to provide electrical power to said apparatus.

50. A talking electronic apparatus comprising:
memory means for storing digital speech data and digital control data from which a plurality of requests in synthesized human speech for respective operator responses and appropriate operator responses corresponding to each of said plurality of requests may be respectively derived,
speech synthesizer means operably associated with said memory means for converting said digital speech data into audible human speech,
means for selectively transferring said digital speech data to said speech synthesizer means to produce a selected audible request in human speech,
means responsive to said digital control data for producing a visual display corresponding to said selected audible request,
operator input means for receiving an operator response to said selected audible request, and
means responsive to said digital control data and said operator response to said selected audible request for responding in a manner producing an output indicative of the appropriateness of said operator response with respect to the appropriate operator response corresponding to said selected audible request.

51. A talking electronic apparatus according to claim 50, wherein said plurality of requests includes at least one request for an operator to spell a word in a human language and wherein said appropriate operator response comprises the correct spelling of said word.

52. A talking electronic apparatus according to claim 50, wherein said operator input means comprises a keyboard.

53. A talking electronic apparatus according to claim 50, wherein said means responsive to said digital control data and said operator response responds in a manner causing said speech synthesizer means to audibly inform said operator if said operator response is appropriate.

54. A talking electronic apparatus according to claim 50, wherein said memory means comprises non-volatile digital semiconductor memory means.

55. A talking electronic apparatus according to claim 50, further including battery receiving means for holding a battery power source to provide electrical power to said apparatus.

56. A talking electronic apparatus comprising:
memory means for storing digital speech data and digital control data from which a plurality of requests in synthesized human speech for respective operator responses and appropriate operator responses corresponding to said plurality of requests may be respectively derived,
speech synthesizer means operably associated with said memory means for converting said digital speech data into audible human speech,
means for selectively transferring said digital speech data to said speech synthesizer means to produce a selected audible request in human speech,
operator input means for receiving an operator response to said selected audible request,
means responsive to said digital control data for producing a visual display corresponding to said selected audible request and responsive to said operator input means for producing a visual display corresponding to the operator input, and
means responsive to said digital control data and said operator response to said selected audible request for causing said speech synthesizer means to audibly command in human speech that the operator further respond to said selected audible request if said operator response is inappropriate.

57. A talking electronic apparatus according to claim 56, wherein said plurality of requests includes at least one request for an operator to spell a word in a human language and wherein said appropriate operator response comprises the correct spelling of said word.

58. A talking electronic apparatus according to claim 56, further including battery receiving means for holding a battery power source to provide electrical power to said apparatus.

59. A talking electronic apparatus comprising:
memory means having digital data stored therein including digital speech data from which synthesized speech in a human language may be derived concerning a plurality of word-related problems in the form of requests for respective operator responses as answers to the word-related problems, the appropriate operator responses corresponding to said plurality of requests, and comments reflecting upon the appropriateness of responses made by an operator as proposed answers to the respective requests;
problem posing means for randomly selecting a word-related problem derivable from digital speech data stored in said memory means;
speech synthesis means operably associated with said problem posing means and said memory means for generating analog signals representative of human speech from digital speech data stored in said memory means and corresponding to the randomly selected word-related problem as randomly selected by said problem posing means;
audio means coupled to said speech synthesis means for converting said analog signals into audible human speech for audibly requesting the operator to provide a response to the randomly selected word-related problem;
operator input means for receiving an input from the operator indicative of a proposed answer to said randomly selected word-related problem as presented audibly;
comparator means operably associated with said problem posing means, said operator input means and said memory means for determining the appropriateness of the input received by said operator input means from the operator with respect to said word-related problem randomly selected by said problem posing means and providing an output indicative thereof; and
said speech synthesis means and said audio means being responsive to the output from said comparator means for providing an audible comment in synthesized human speech indicative of the accuracy of the answer proposed by the operator in relation to the appropriate operator response corresponding to the randomly selected word-related problem.

60. A talking electronic apparatus as set forth in claim 59, wherein at least some of the plurality of word-related problems involve respective requests to the operator to spell individual words and the appropriate operator responses corresponding thereto are the correct spellings of the respective words as derived from said digital speech data stored in said memory means.

61. A talking electronic apparatus as set forth in claim 60, wherein the audibly presented randomly selected word-related problem comprises a request to spell a particular word; and said operator input means comprising a keyboard having a plurality of individual keys at least representative of the letters of the alphabet and adapted to be selectively actuated by the operator to generate a keyboard input of a sequence of letters as the suggested spelling of said particular word provided by the operator as a proposed answer.

62. A talking electronic apparatus comprising:

a housing having an exposed major surface;

keyboard means disposed in said housing and including a plurality of individual keys disposed on said major surface thereof for selective actuation by an operator to provide a keyboard input;

memory means having digital data stored therein including digital speech data from which synthesized speech as words in a human language may be derived as a plurality of word-related problems for which respective operator responses as answers are desired and appropriate operator responses as correct answers for each of said plurality of word-related problems;

speech synthesis means operably associated with said memory means for generating analog signals representative of human speech from said digital speech data stored in said memory means;

audio means coupled to said speech synthesis means for converting said analog signals into audible human speech;

means for selectively transferring a portion of said digital speech data corresponding to a particular word-related problem from said memory means to said speech synthesis means to produce a selected word-related problem as an audible request via said audio means to an operator for response;

said plurality of individual keys of said keyboard means being adapted to be selectively actuated by the operator to generate a keyboard input in providing an answer as an operator response to the word-related problem posed by said selected audible request; and means responsive to said keyboard input generated by said keyboard means in accordance with the actuation by the operator of at least one individual key thereof and to said digital data in said memory means corresponding to the correct answer to said selected word-related problem for responding in a manner producing an output indicative of the appropriateness of said operator response with respect to the correct answer for said selected word-related problem.

63. A talking electronic apparatus as set forth in claim 62, wherein said means responsive to said keyboard input and to said digital data in said memory means corresponding to the correct answer responds in a manner causing said speech synthesis means and said audio means to provide an audible comment in synthesized human speech indicative of the accuracy of said operator response with respect to the correct answer for said selected word-related problem.

64. A talking electronic apparatus as set forth in claim 63, wherein at least some of the plurality of word-related problems involve respective requests to the operator to spell individual words and the correct answers corresponding thereto comprising the correct spelling of those words as derived from said digital speech data stored in said memory means.

65. A talking electronic apparatus as set forth in claim 64, wherein said means for selectively transferring a portion of said digital speech data from said memory means to said speech synthesis means comprises problem posing means for randomly selecting a word-related problem derivable from digital speech data stored in said memory means.

66. A talking electronic apparatus as set forth in claim 65, wherein said housing contains said memory means, said speech synthesis means, said audio means, said means for selectively transferring a portion of said digital speech data, and said means responsive to said keyboard input and to said digital data in said memory means corresponding to the correct answer; and said housing being of sufficiently small size so as to define said apparatus as a self-contained hand-held unit.

67. A talking electronic apparatus comprising:

a housing having an exposed major surface;

keyboard means disposed in said housing and having a plurality of individual keys at least representative of the letters of the alphabet, said keys being disposed on said major surface of said housing and adapted to be selectively actuated by an operator to generate a keyboard input;

visual display means provided in said housing and including a display panel disposed on said major surface of said housing for receiving letter combinations to provide visual images thereof as transmitted thereto;

memory means having digital speech data and digital control data stored therein from which words of synthesized human speech may be derived for forming a plurality of word-related problems and the correct answers corresponding thereto;

speech synthesis means operably associated with said memory means for converting said digital speech data into analog signals representative of human speech;

audio means coupled to said speech synthesis means for converting said analog signals into audible human speech;

means for selectively transferring a portion of said digital speech data representative of a particular word-related problem from said memory means to said speech synthesis means for providing a selected word-related problem via said audio means in audible human speech as a request to an operator for response; and comparator means operably associated with said keyboard means, said visual display means, and said memory means and being responsive to a keyboard input as generated by the selective actuation of at least one key by the operator comprising an operator response as a proposed answer to said selected word-related problem and to digital control data in said memory means corresponding to the correct answer to said selected word-related problem for responding in a manner producing an output by at least one of said visual display means and said audio means indicative of the appropriateness of said operator response with respect to the correct answer for said selected word-related problem.

68. A talking electronic apparatus as set forth in claim 67, wherein said comparator means responsive to said keyboard input and to said digital control data in said memory means corresponding to the correct answer responds in a manner causing said speech synthesis means and said audio means to provide an audible comment in synthesized human speech indicative of the accuracy of said operator response with respect to the correct answer for said selected word-related problem.

69. A talking electronic apparatus as set forth in claim 68, wherein said visual display means is responsive to respective actuations of individual keys representative of letters of the alphabet by the operator in generating said keyboard input as said operator response for displaying visual letter images corresponding to the actuated keys on said display panel.

70. A talking electronic apparatus as set forth in claim 69, wherein at least some of the plurality of word-related problems involve respective requests to the operator to spell individual words and the correct answers corresponding thereto comprising the correct spelling of those words as derived from said digital speech data stored in said memory means.

71. A talking electronic apparatus as set forth in claim 70, wherein the audibly presented selected word-related problem comprises a request to spell a particular word; and wherein said keyboard input as generated by the operator is displayed as a sequence of visual letter images on said display panel as the suggested spelling of said particular word provided by the operator as a proposed answer.

72. A talking electronic apparatus as set forth in claim 71, wherein said housing contains said memory means, said speech synthesis means, said audio means, said means for selectively transferring a portion of said digital speech data, and said comparator means; and said housing being of sufficiently small size so as to define said apparatus as a self-contained hand-held unit.

73. A talking electronic learning aid comprising:

memory means having digital data stored therein including digital speech data from which synthesized speech in a human language may be derived concerning a plurality of problems to which respective operator responses as answers are desired, the appropriate operator responses corresponding to said plurality of problems, and comments reflecting upon the appropriateness of responses made by an operator as proposed answers to the respective problems;

problem posing means for randomly selecting a problem derivable from digital speech data stored in said memory means;

speech synthesis means operably associated with said problem posing means and said memory means for generating analog signals representative of human speech from digital speech data stored in said memory means and corresponding to the randomly selected problem as randomly selected by said problem posing means;

audio means coupled to said speech synthesis means for converting said analog signals into audible human speech for audibly requesting the operator to provide a response to the randomly selected problem;

operator input means for receiving an input from the operator indicative of a proposed answer to said randomly selected problem as presented audibly;

comparator means operably associated with said problem posing means, said operator input means and said memory means for determining the appropriateness of the input received by said operator input means from the operator with respect to said problem randomly selected by said problem posing means; and said speech synthesis means and said audio means being responsive to the output from said comparator means for providing an audible comment in synthesized human speech indicative of the accuracy of the answer proposed by the operator in relation to the correct answer to the randomly selected problem.

74. A talking electronic learning aid as set forth in claim 73, further including visual display means operably associated with said memory means and said problem posing means for displaying indicia at least related to said randomly selected problem.

75. A talking electronic learning aid as set forth in claim 74, wherein at least some of said indicia are displayed by said visual display means in response to the input from the operator as received by said operator input means.

76. A talking electronic apparatus as set forth in any of claims 1, 18, 32, 50, 56, 59, 62 and 67, wherein the digital speech data stored in said memory means is representative of a plurality of words.

77. A talking electronic learning aid as set forth in any of claims 23, 28 and 73, wherein the digital speech data stored in said memory means is representative of a plurality of words.

* * * * *